United States Patent [19]

Mercado et al.

[11] Patent Number: 5,210,646
[45] Date of Patent: May 11, 1993

[54] COLOR-CORRECTED OPTICAL SYSTEMS AND METHOD OF SELECTING OPTICAL MATERIALS THEREFOR

[75] Inventors: Romeo I. Mercado, San Jose; Paul N. Robb, Sunnyvale, both of Calif.

[73] Assignee: Lockheed Missiles & Space Company, Inc., Sunnyvale, Calif.

[21] Appl. No.: 617,305

[22] Filed: Nov. 19, 1990

Related U.S. Application Data

[60] Continuation of Ser. No. 519,343, Apr. 16, 1990, abandoned, which is a continuation of Ser. No. 758,626, Jul. 24, 1985, abandoned, which is a division of Ser. No. 419,705, Sep. 20, 1982, abandoned.

[51] Int. Cl.$^5$ .............................................. G02B 9/04
[52] U.S. Cl. ................................... 359/793; 359/796; 359/797
[58] Field of Search ............... 350/479, 482, 483, 476; 359/785, 793, 796, 797

[56] References Cited

PUBLICATIONS

Willey, Jr.; "Machine Aidad Selection of Optical Glasses for Two-Element, Three-Color Achromats", Applied Optics; vol. 1, No. 3; May 1962; pp. 368-369.
Kubota, Optics, Iwanami Books, 1971, pp. 53-55.

Primary Examiner—Scott J. Sugarman
Attorney, Agent, or Firm—John J. Morrissey

[57] ABSTRACT

A method is described for selecting optical materials to use in designing color-corrected optical systems. Various dioptric, catadioptric and anamorphic optical systems are described, which use only two different types of optical materials to obtain precise axial color correction at three, four or five wavelengths (depending upon the particular optical materials), with only very small chromatic aberration occurring at wavelengths between the precisely color-corrected wavelengths. Examples of color-corrected lens systems comprising more than two glasses are also described.

28 Claims, 23 Drawing Sheets

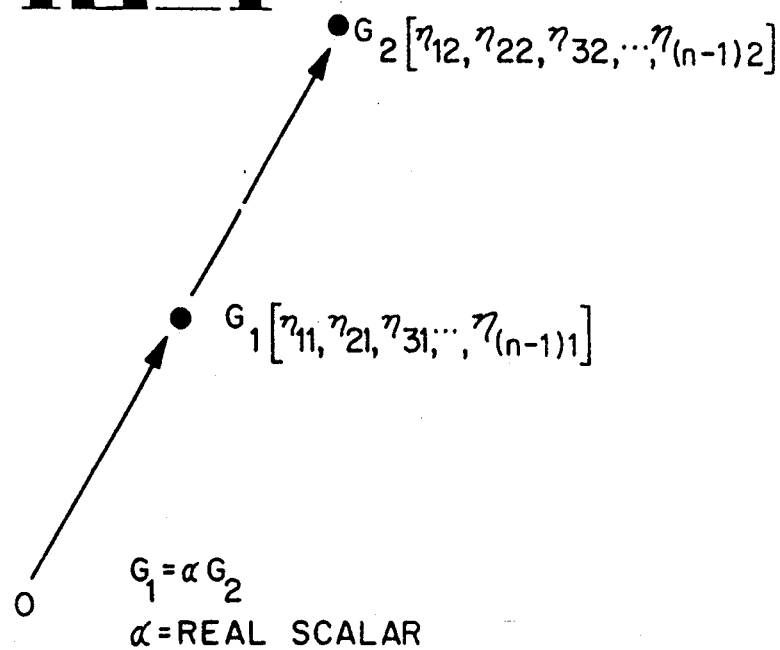
FIG_1
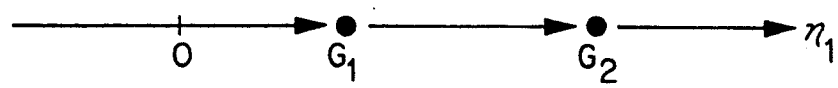
FIG_2
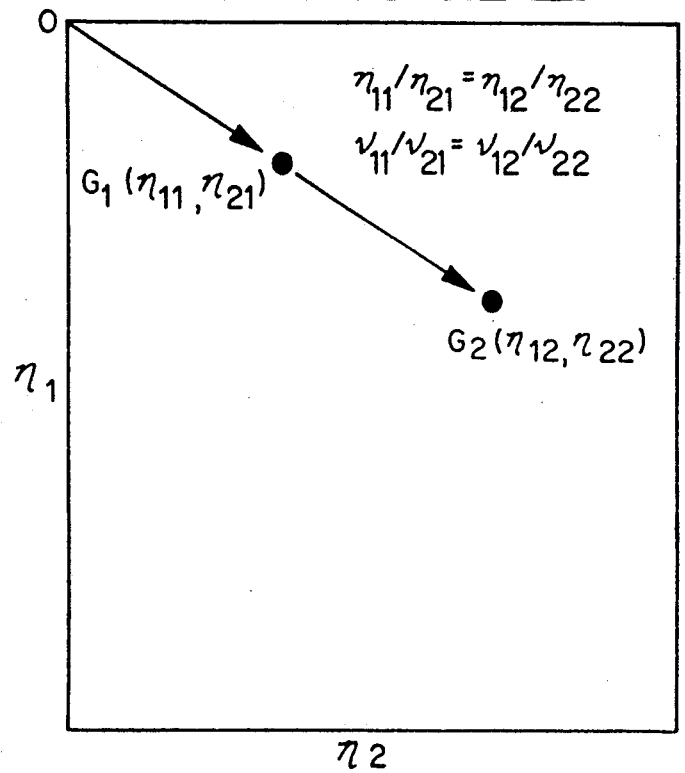
FIG_3

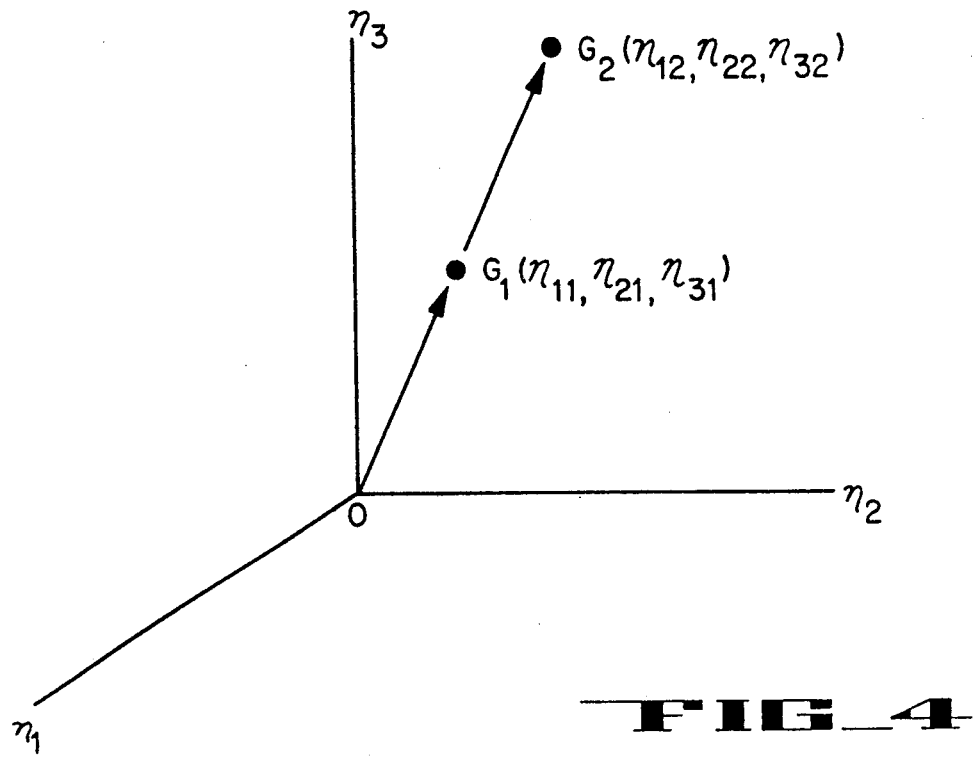
FIG_4
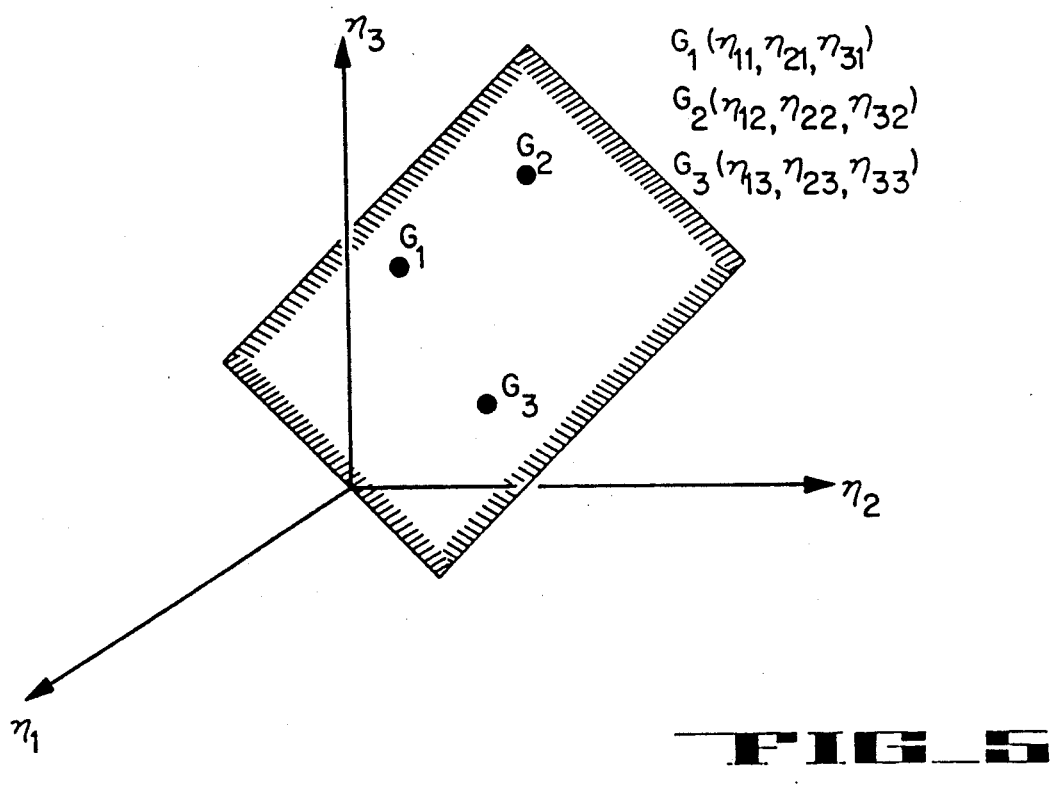
FIG_5

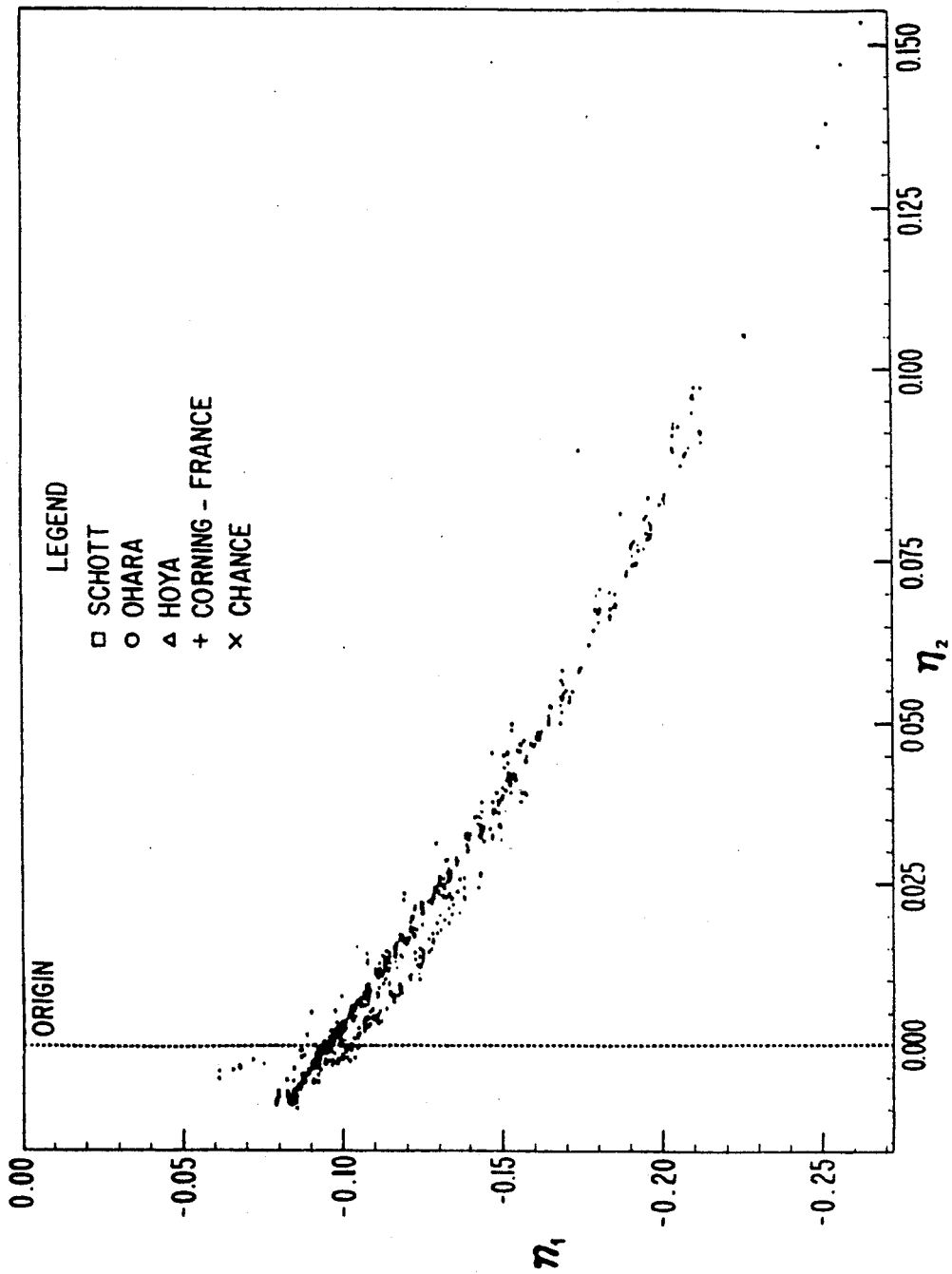

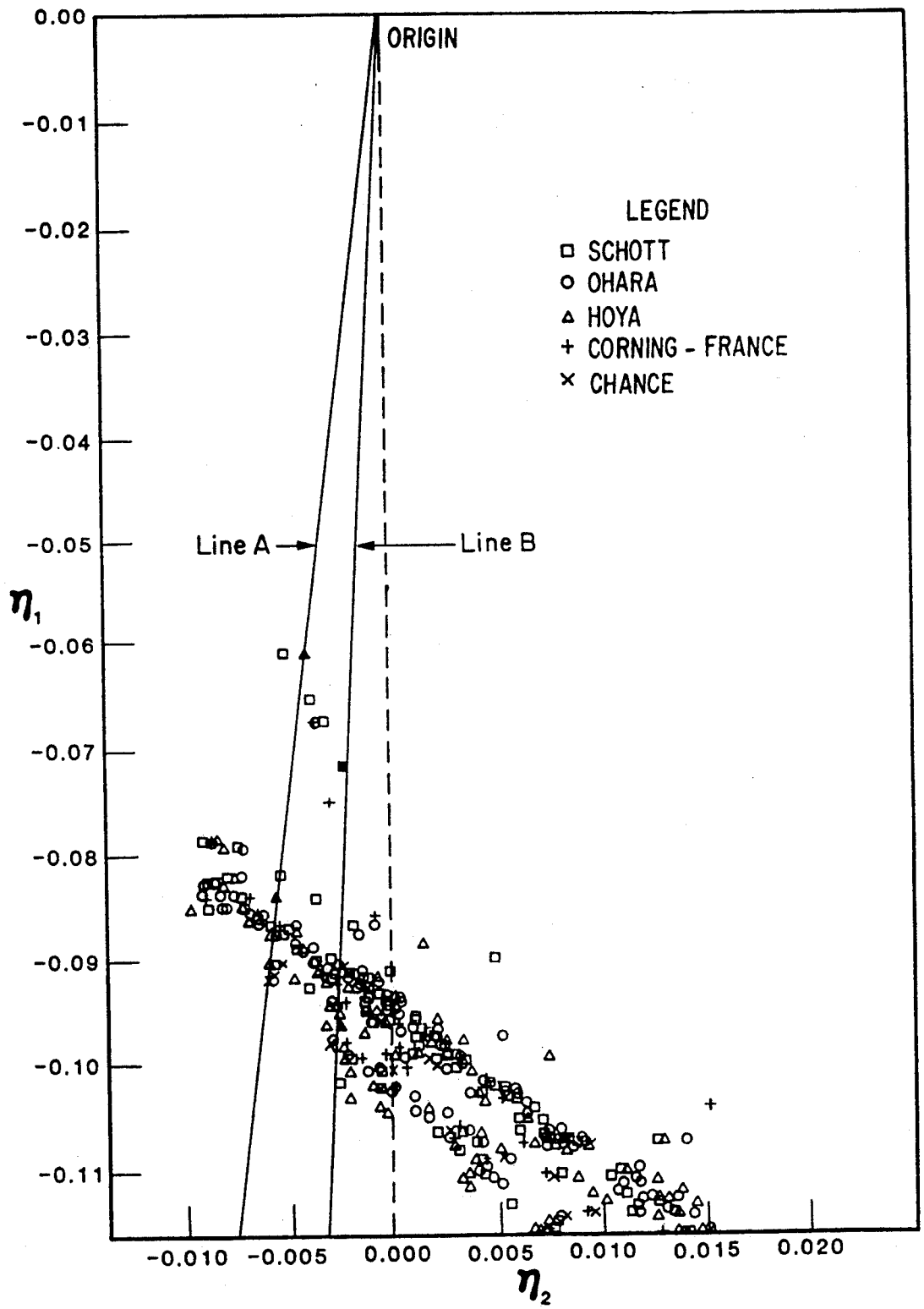

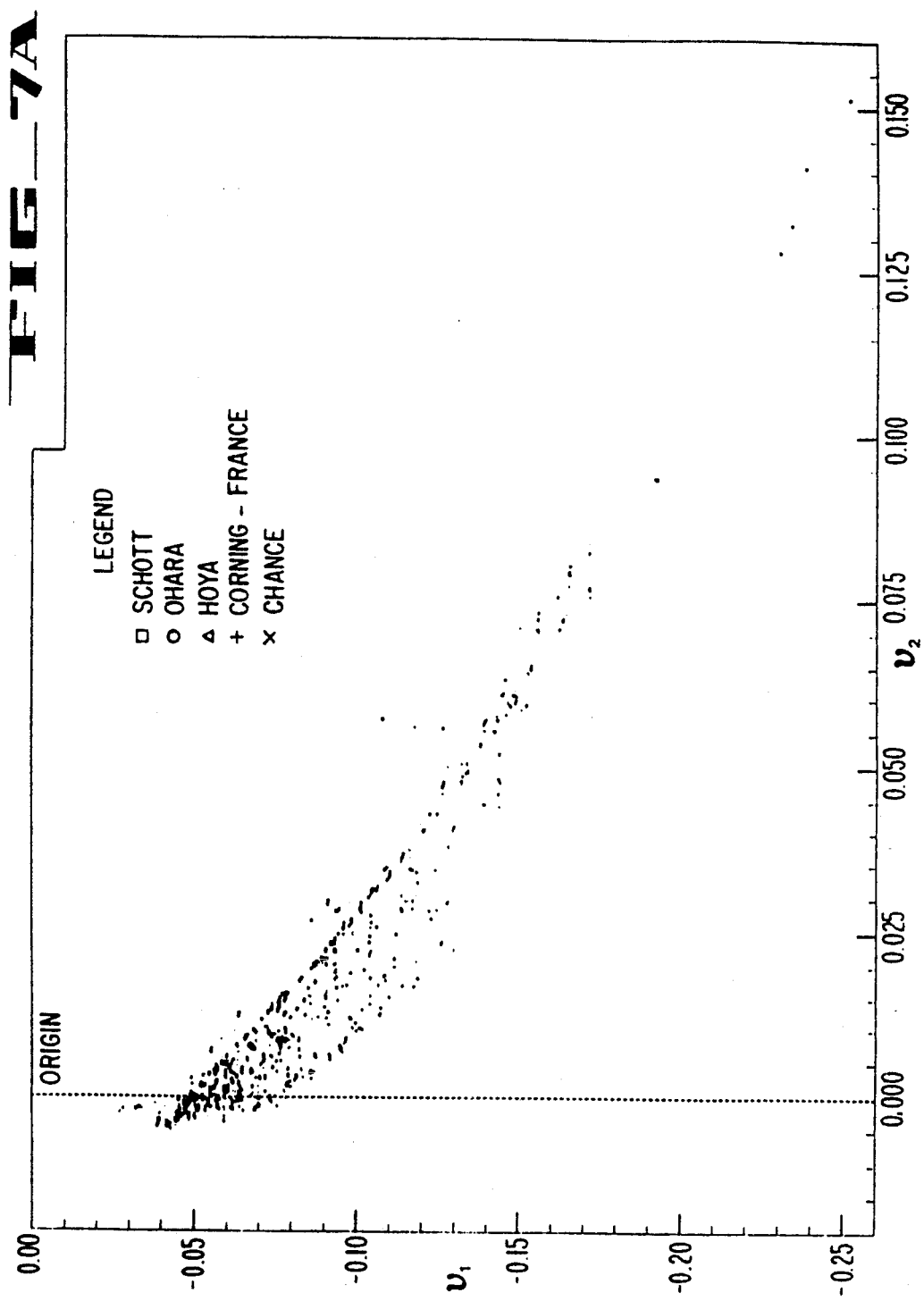

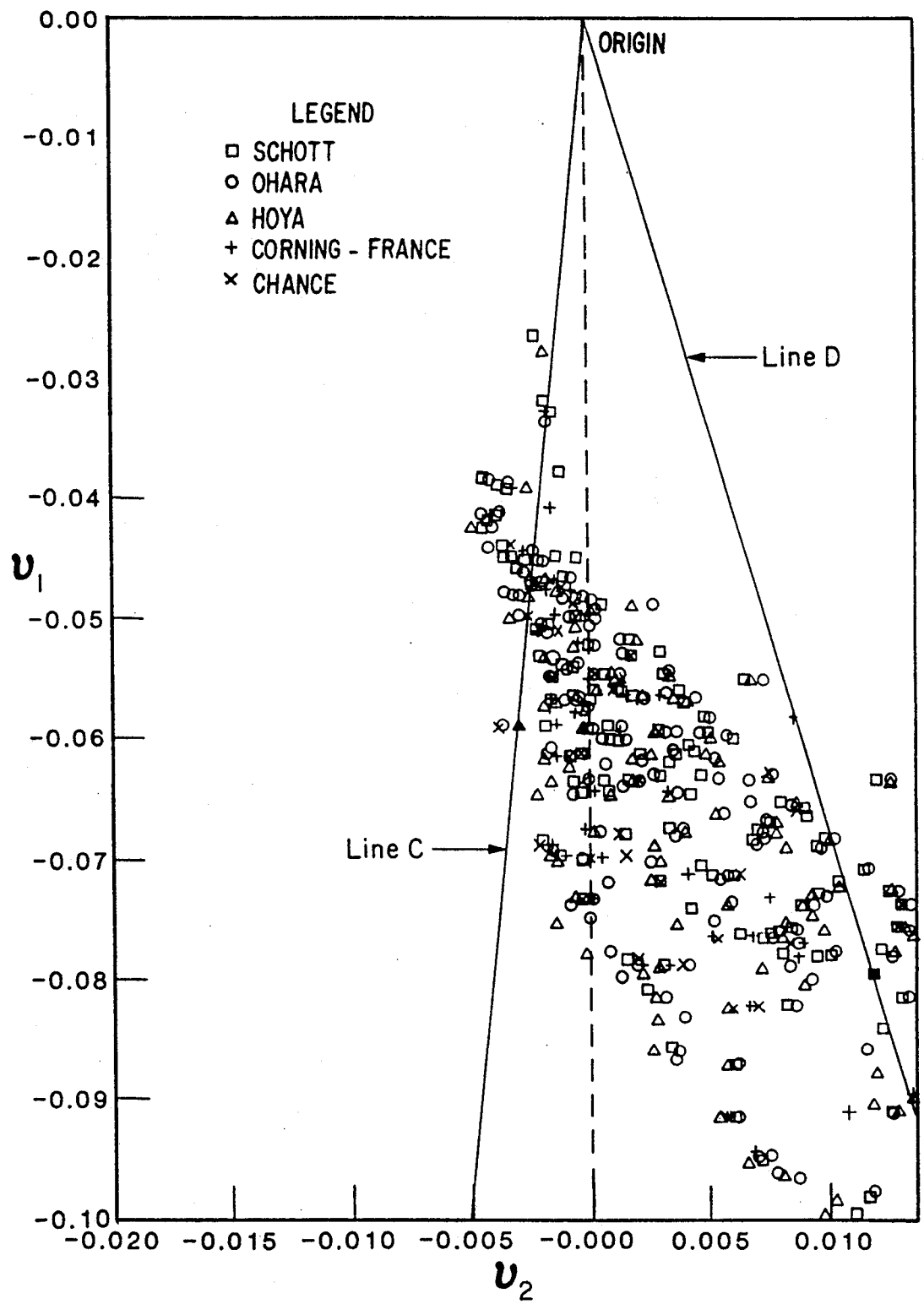

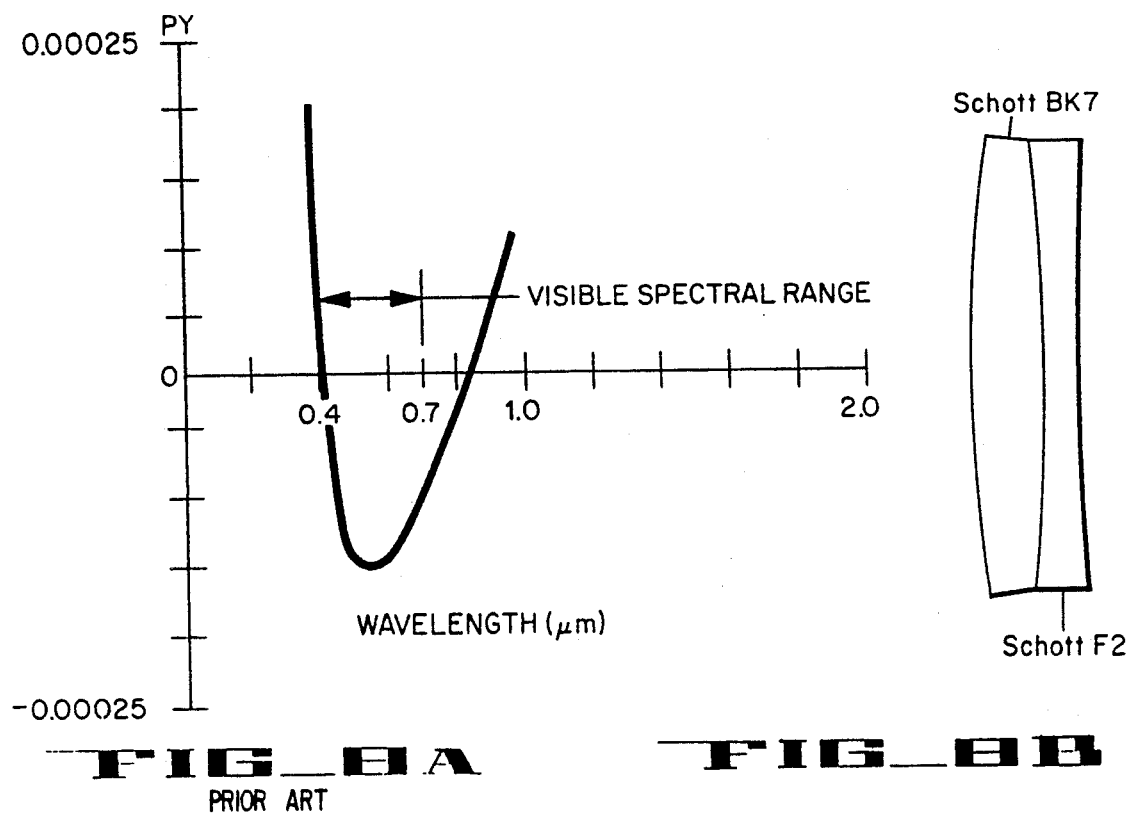
FIG_8A PRIOR ART
FIG_8B
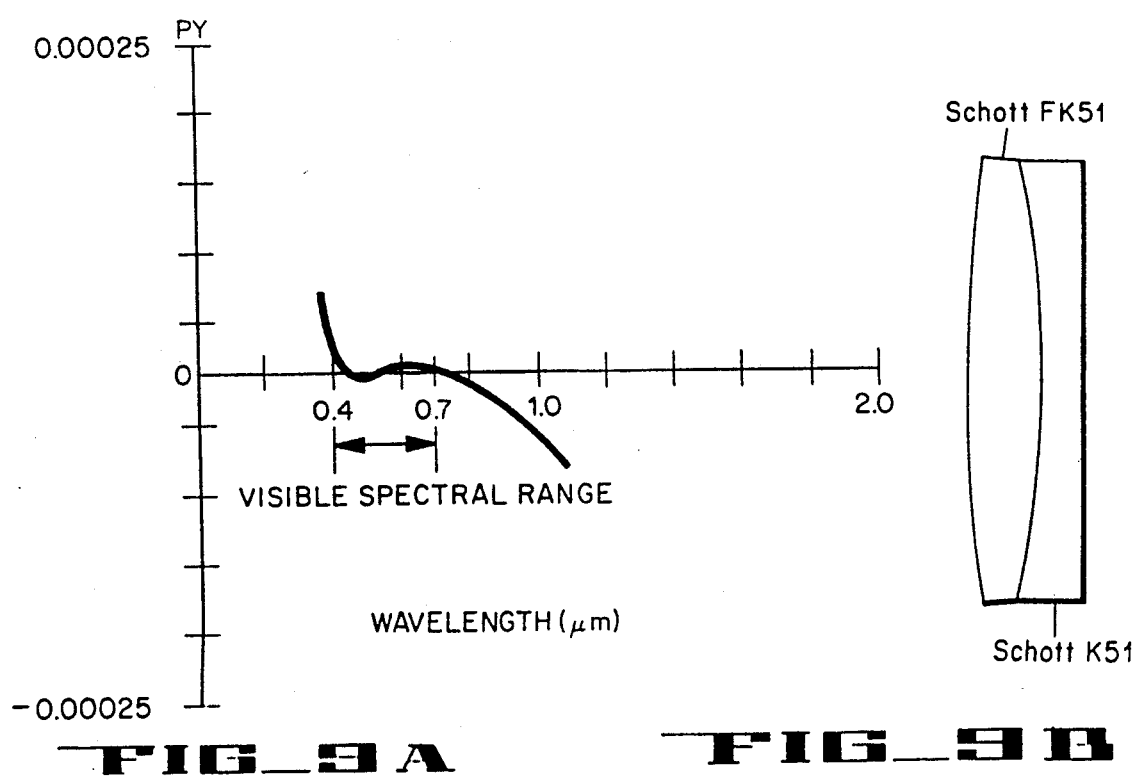
FIG_9A
FIG_9B

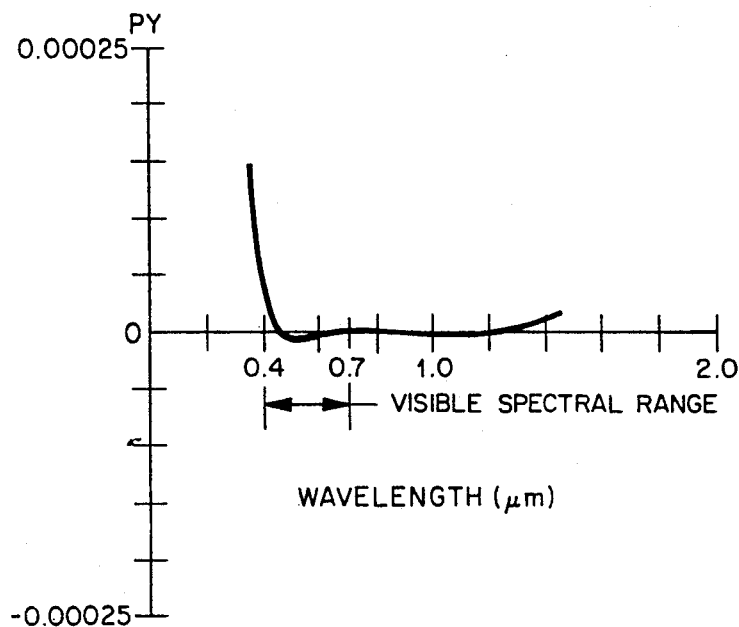
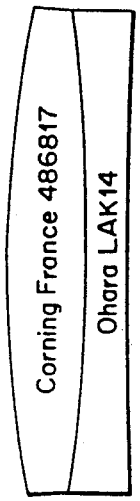
FIG_10A  FIG_10B
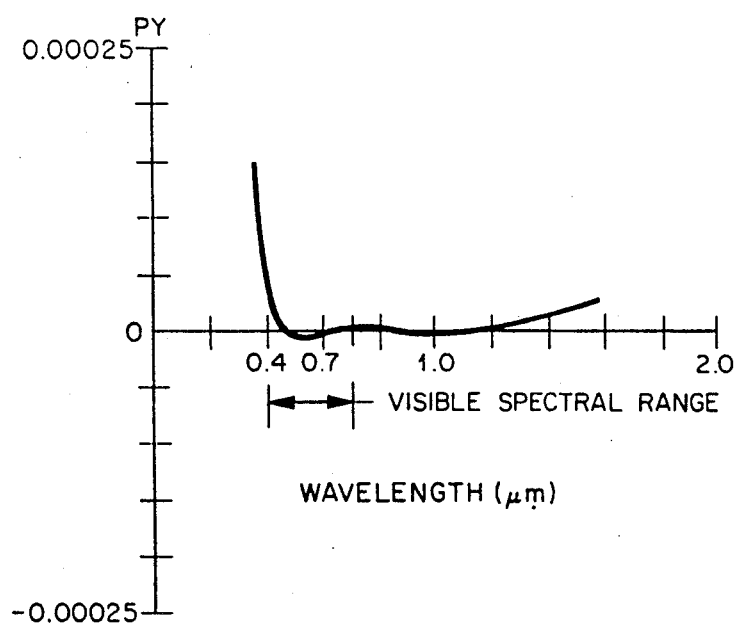
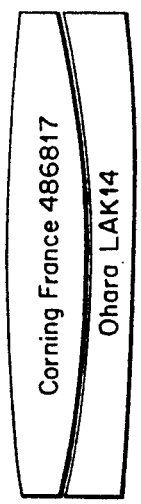
FIG_11A  FIG_11B

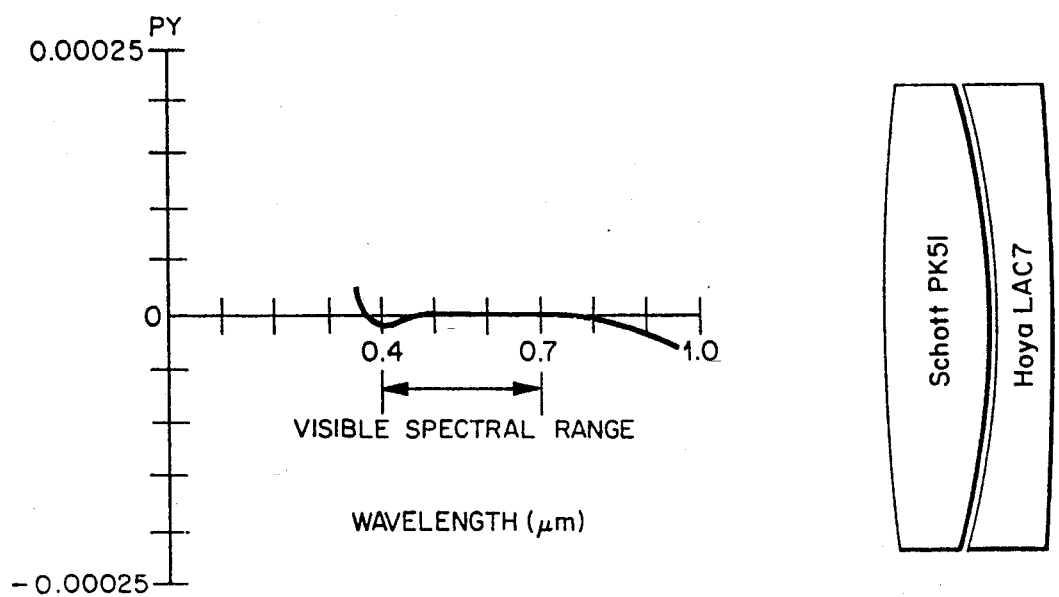
FIG_12A   FIG_12B
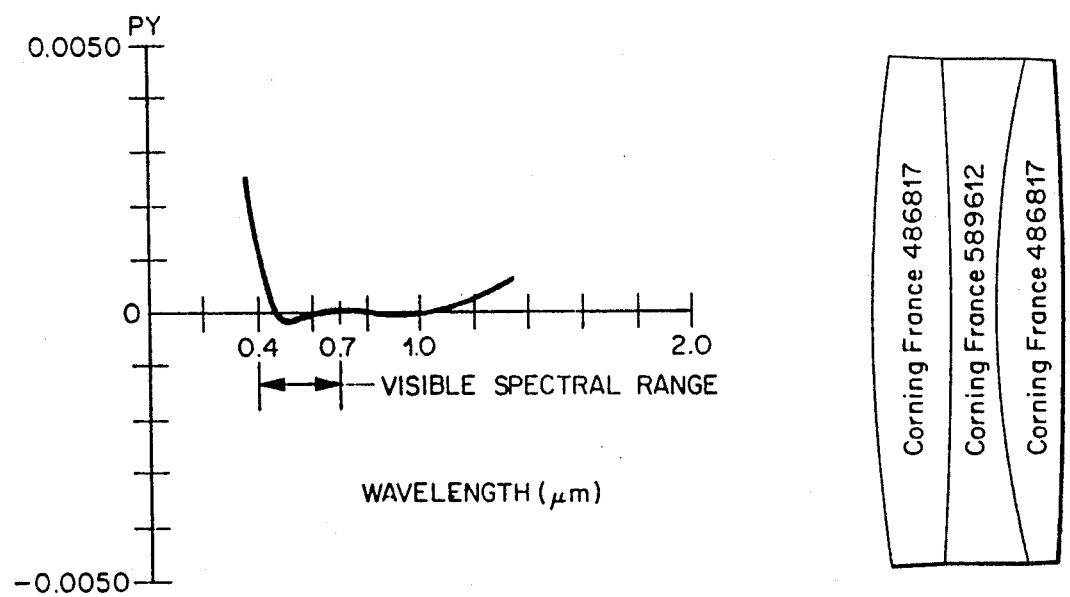
FIG_13A   FIG_13B

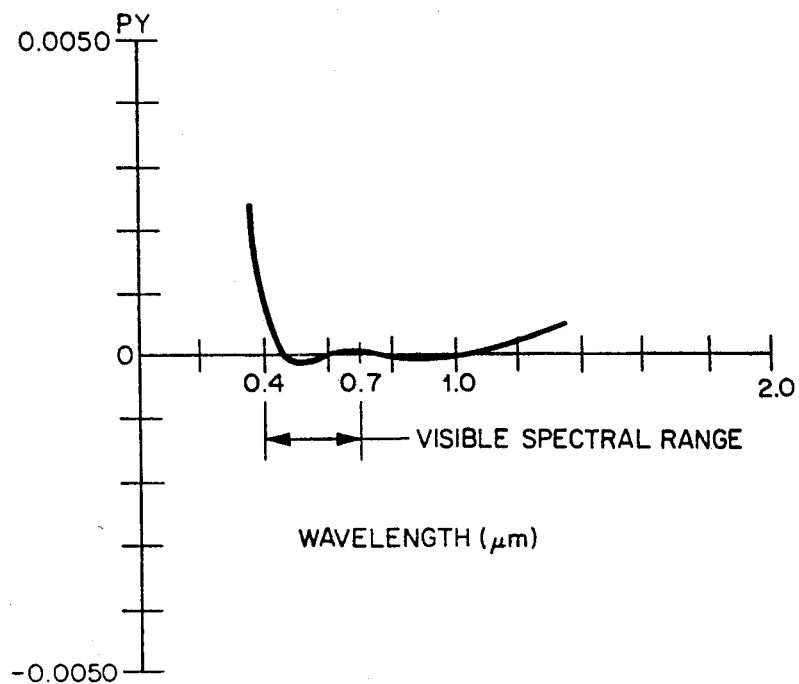
FIG_14A    FIG_14B
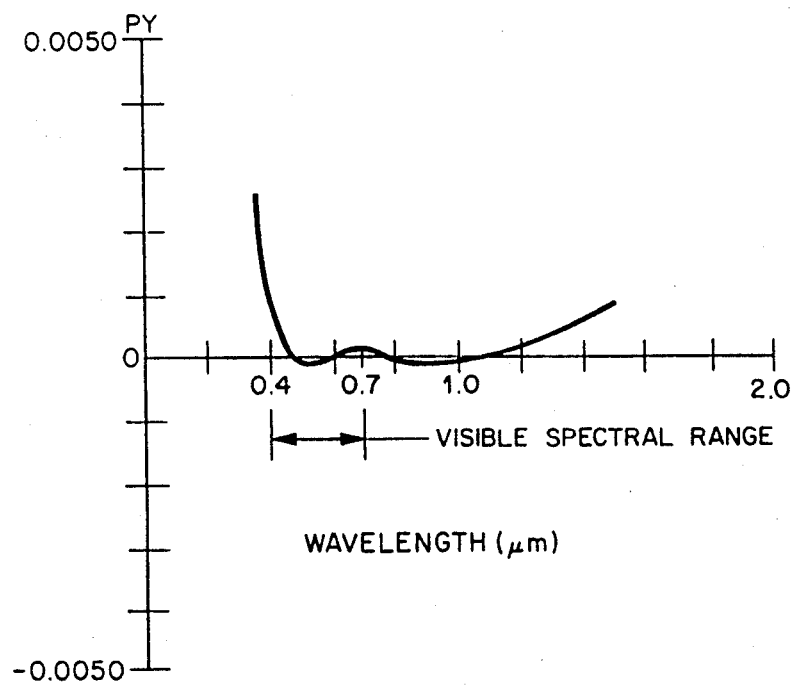
FIG_15A    FIG_15B

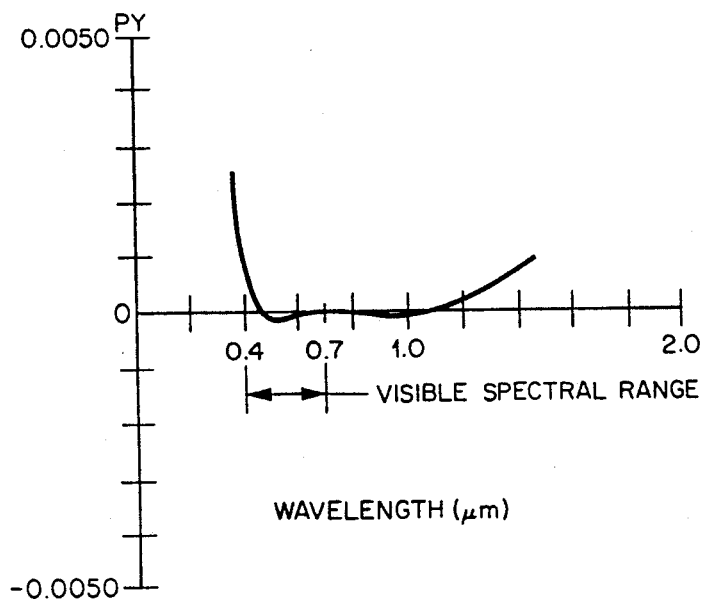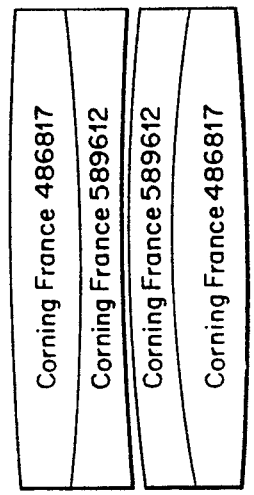
FIG_16A  FIG_16B
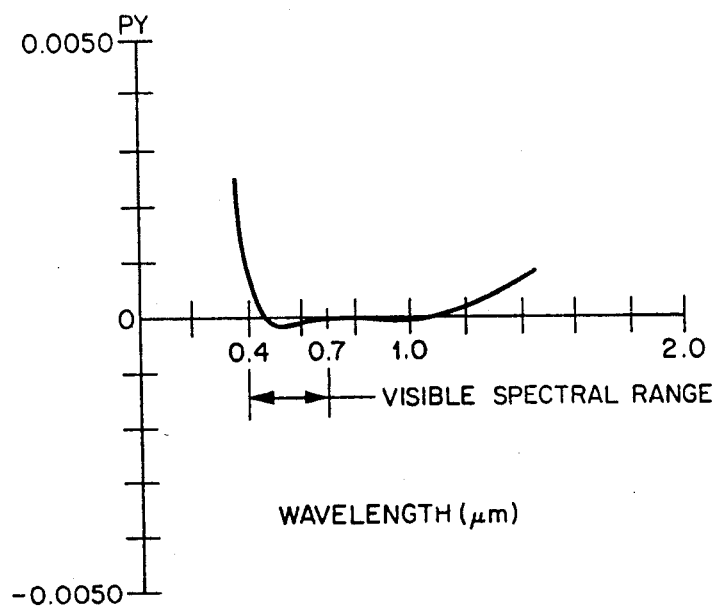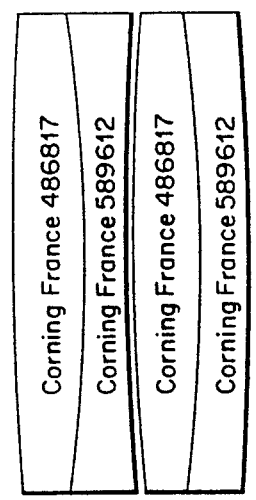
FIG_17A  FIG_17B

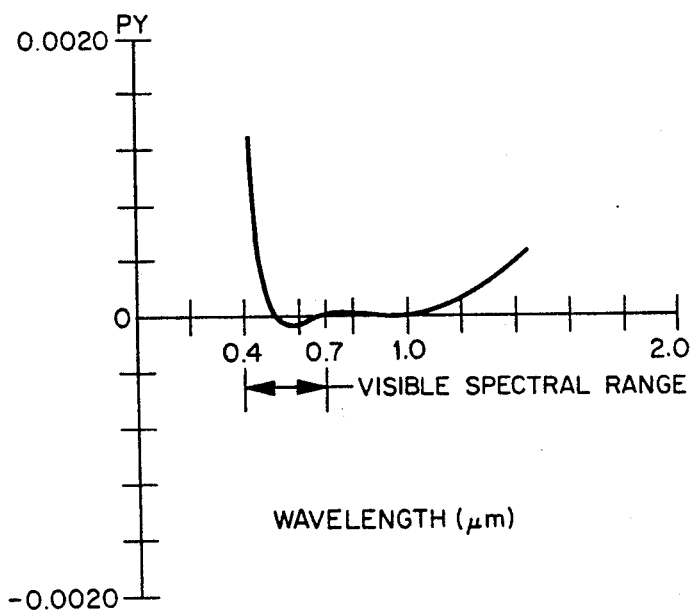
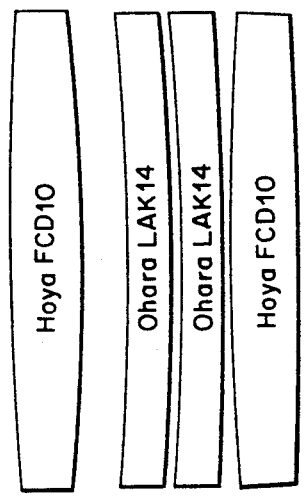
FIG_18A  FIG_18B
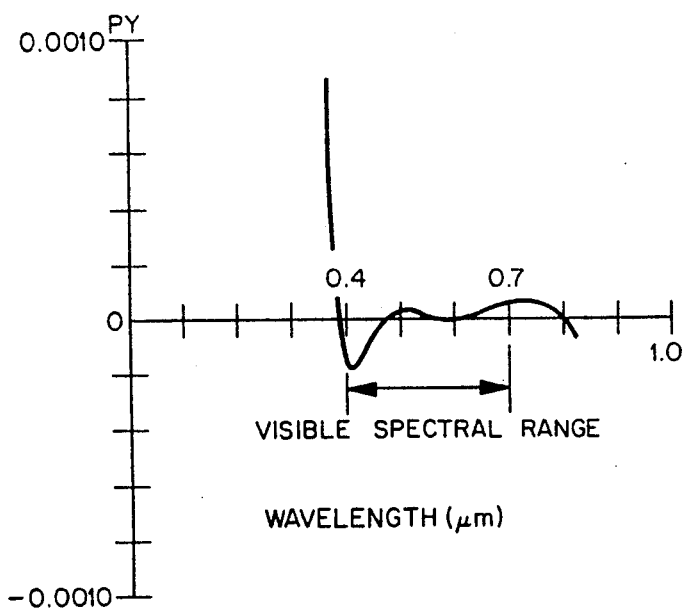
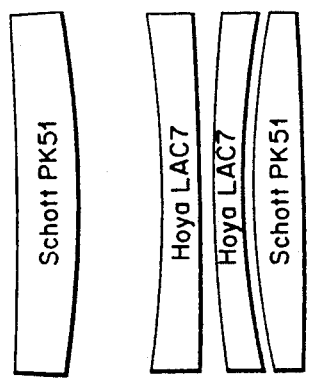
FIG_19A  FIG_19B

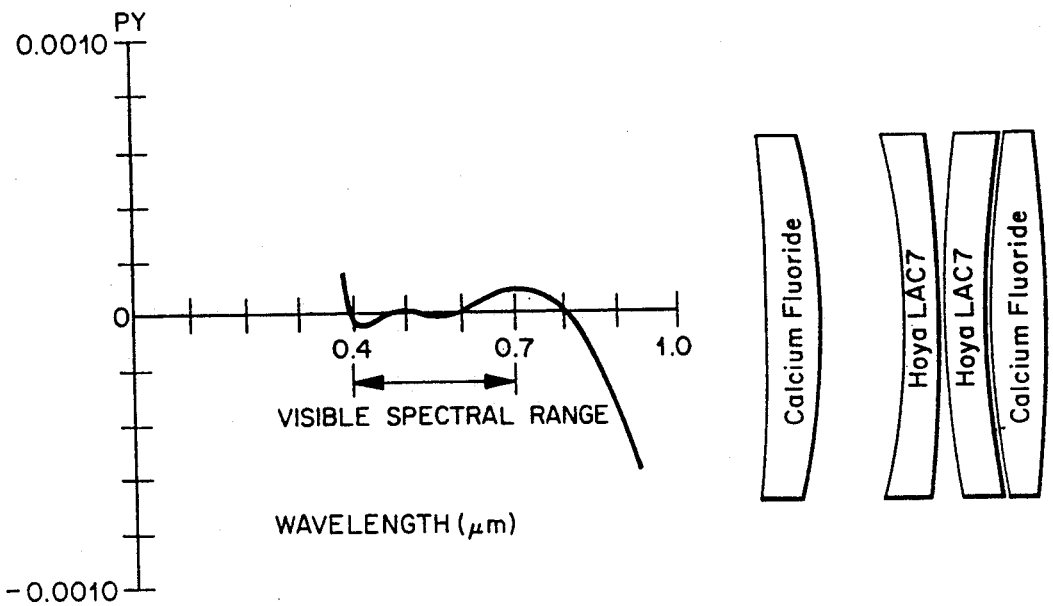
FIG_20A  FIG_20B
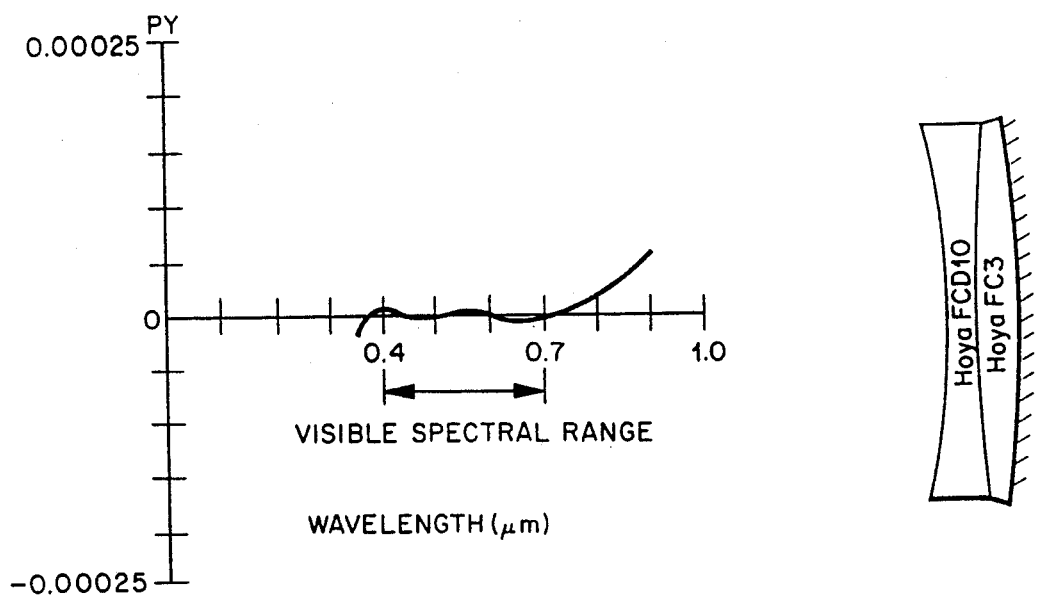
FIG_21A  FIG_21B

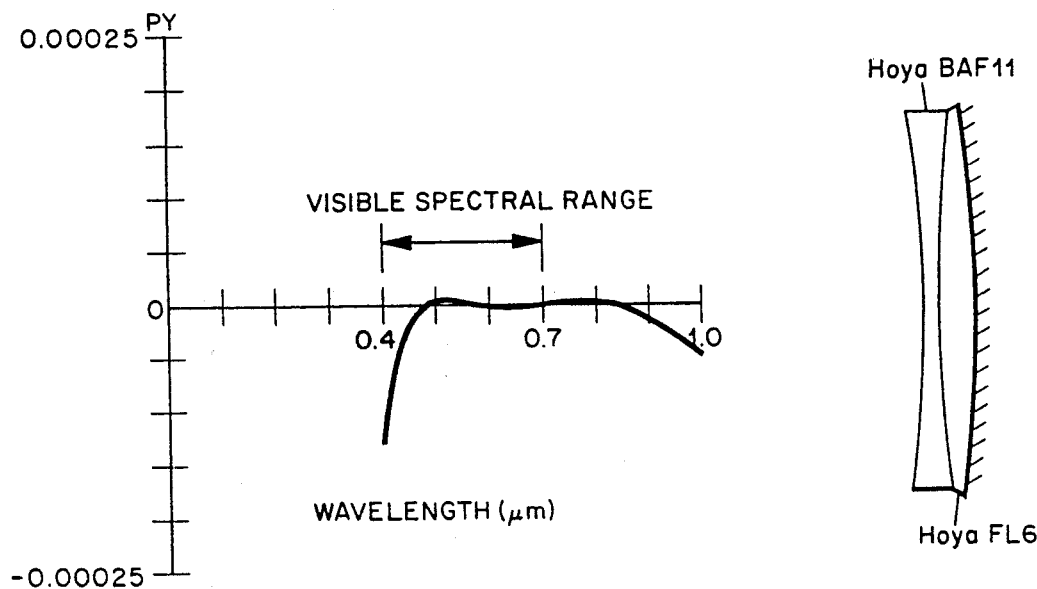
FIG_22A  FIG_22B
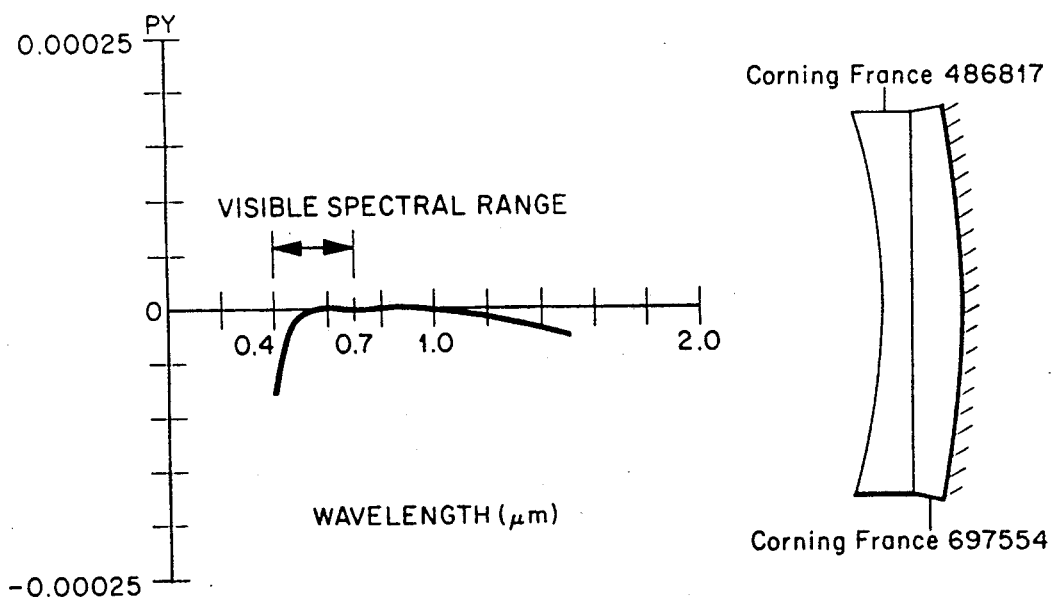
FIG_23A  FIG_23B

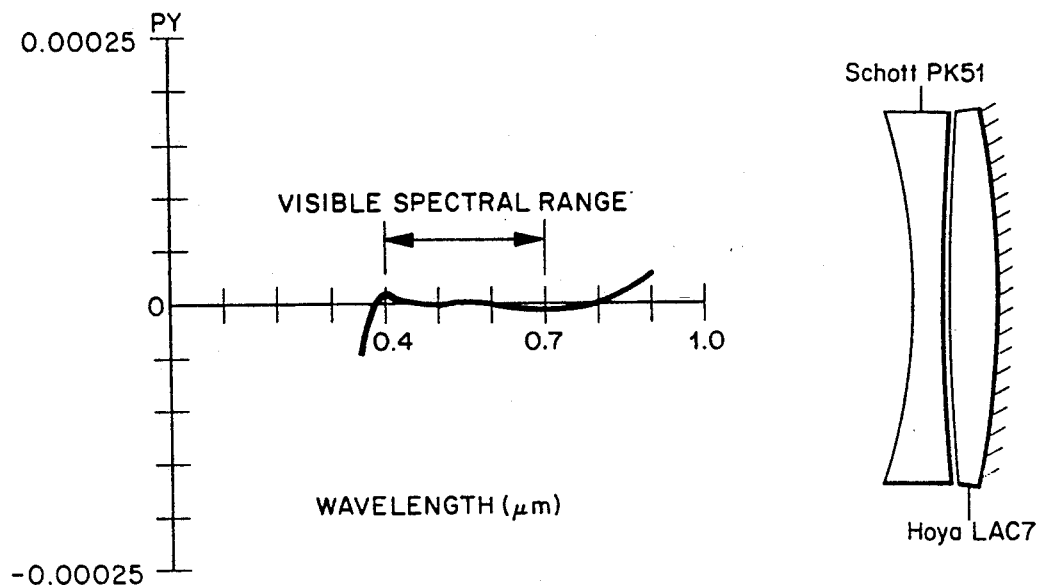
FIG_24A  FIG_24B
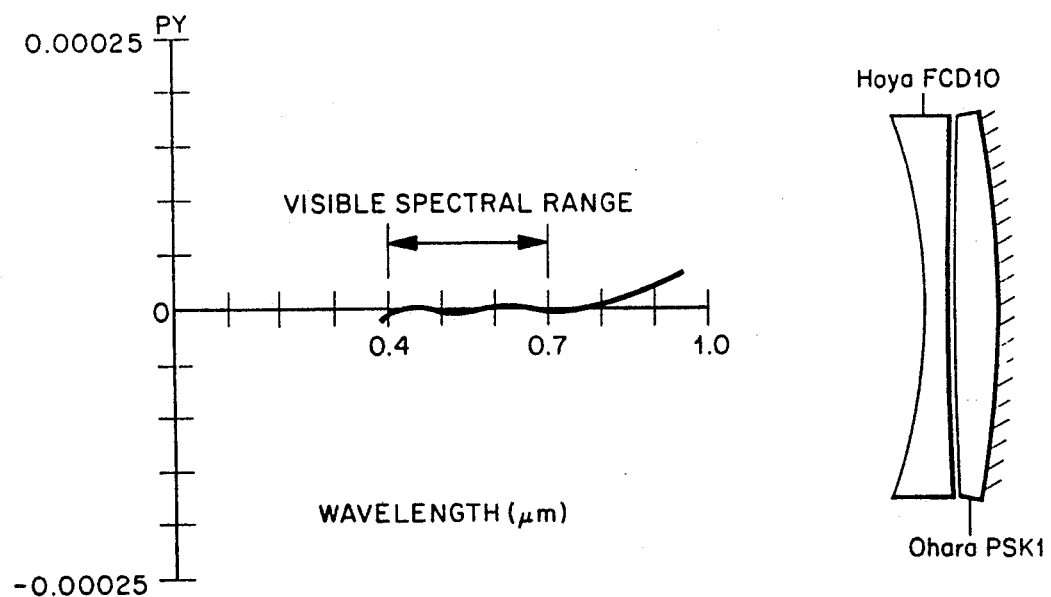
FIG_25A  FIG_25B

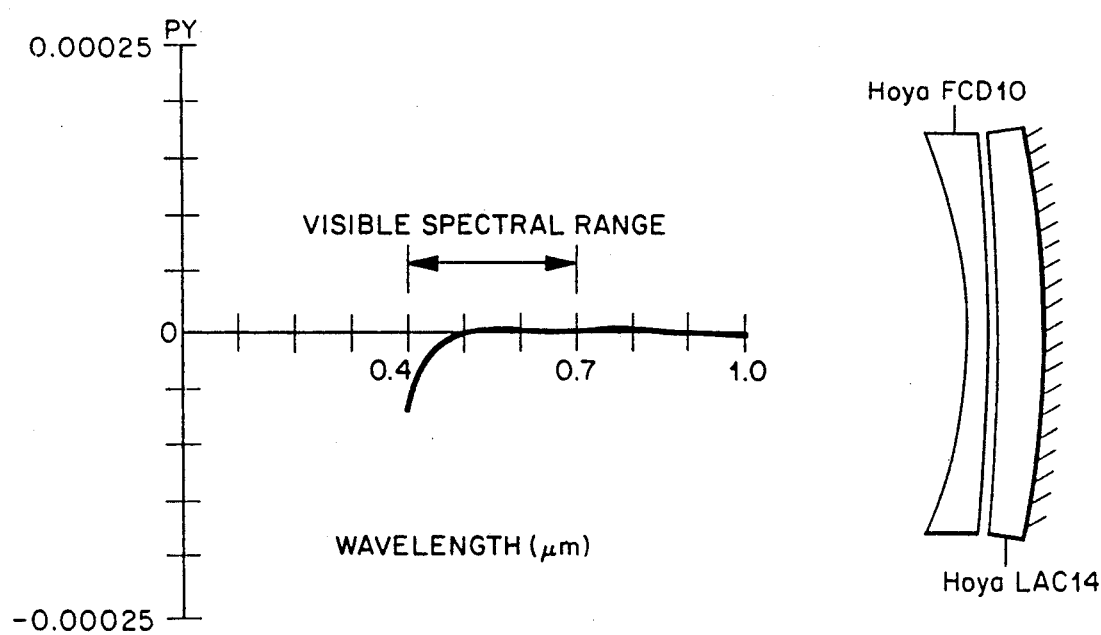
FIG_26A  FIG_26B

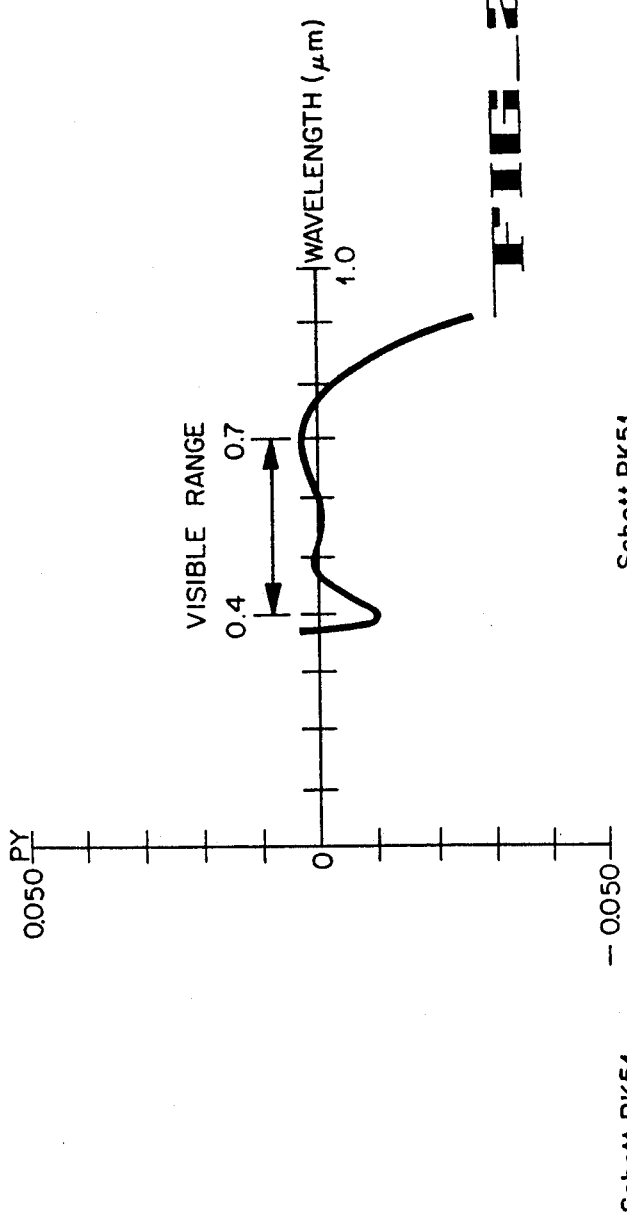
FIG_27A
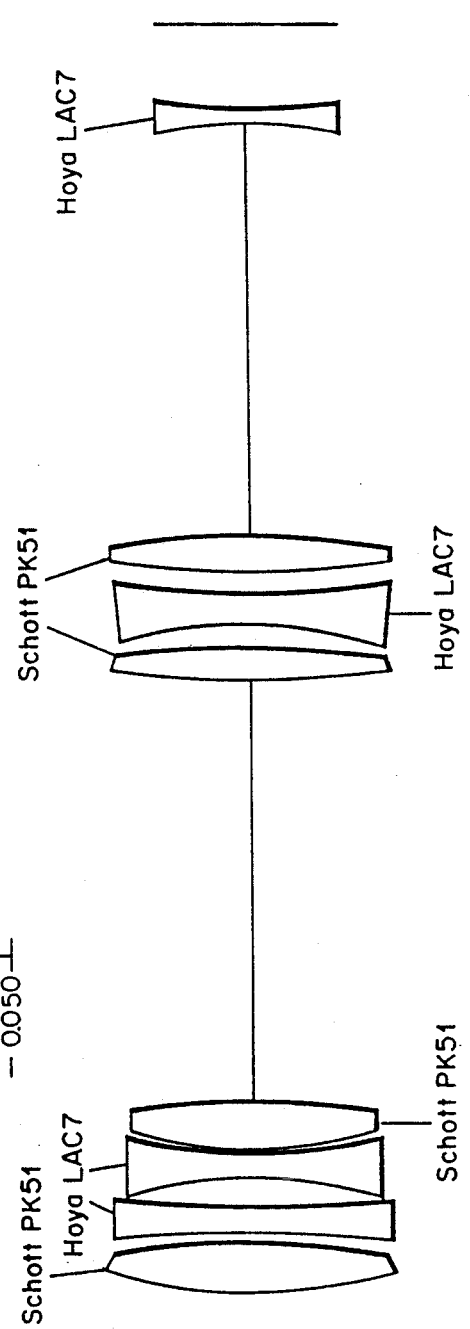
FIG_27B

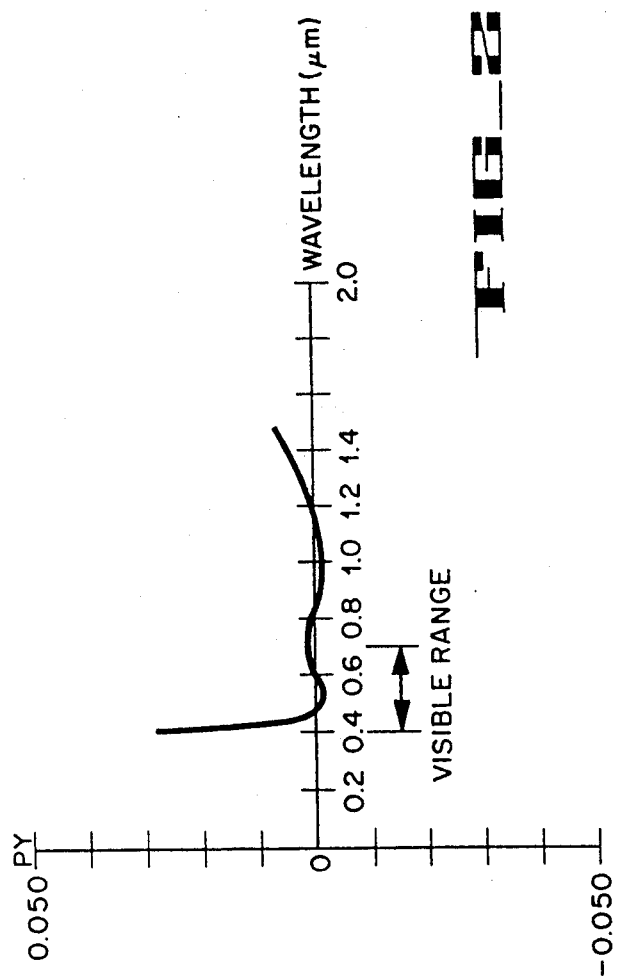
FIG_28A
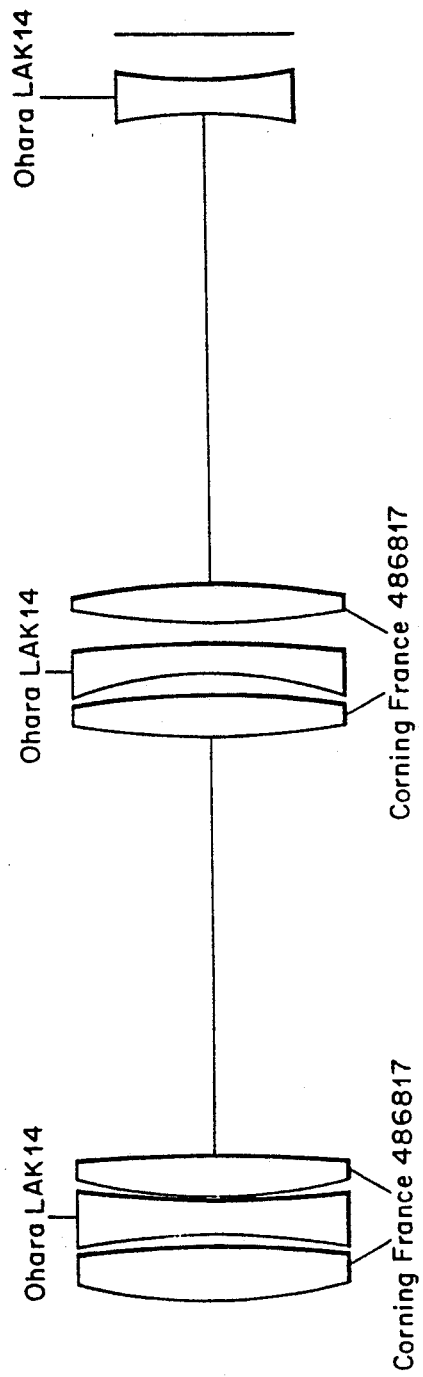
FIG_28B

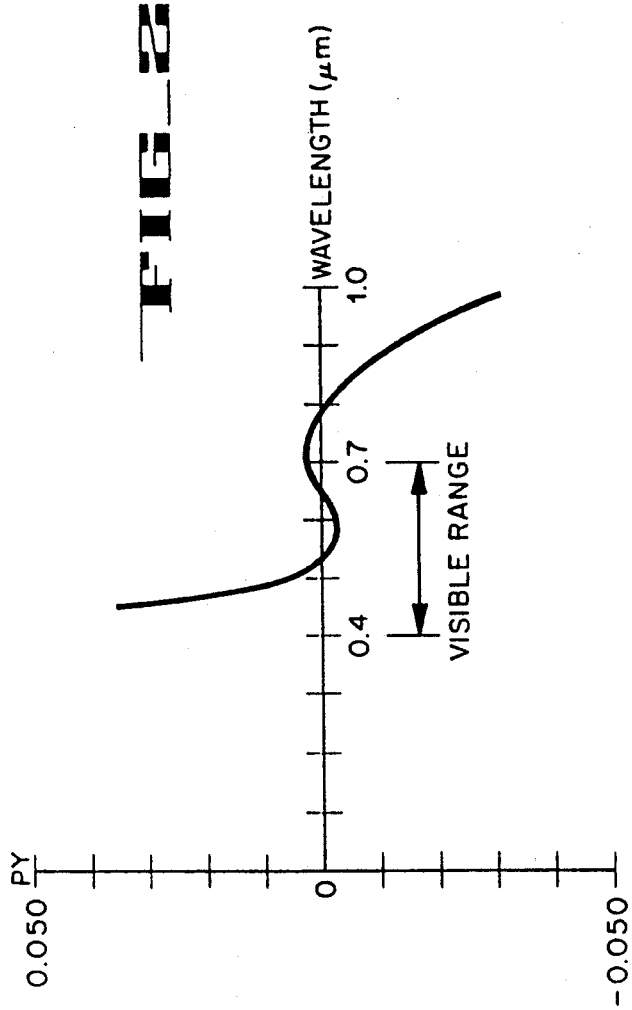
FIG_29A
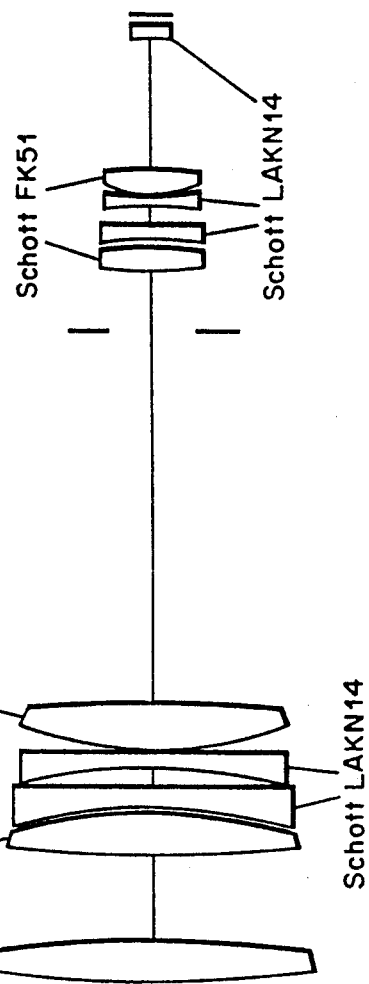
FIG_29B

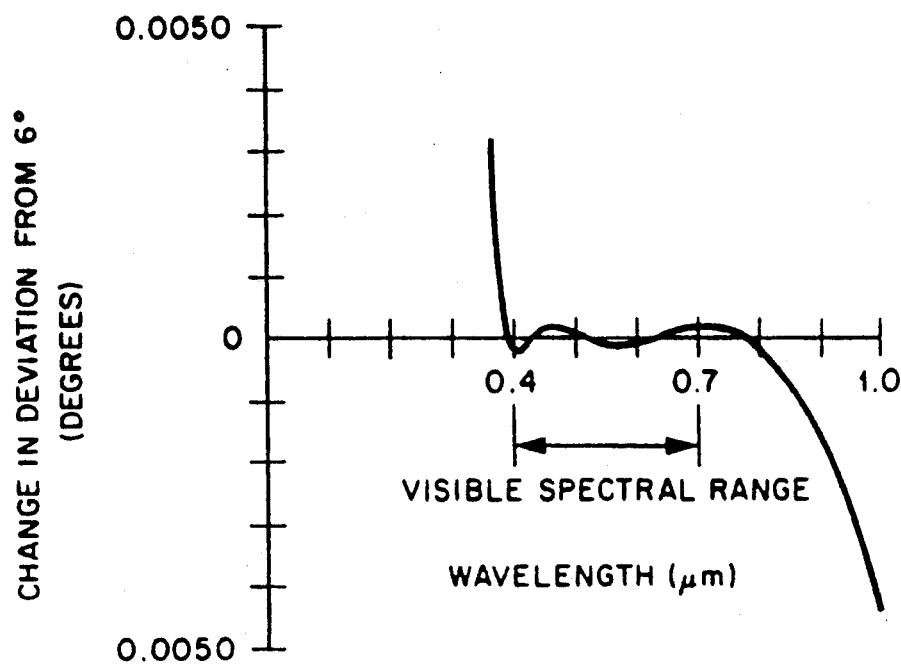
FIG_30A
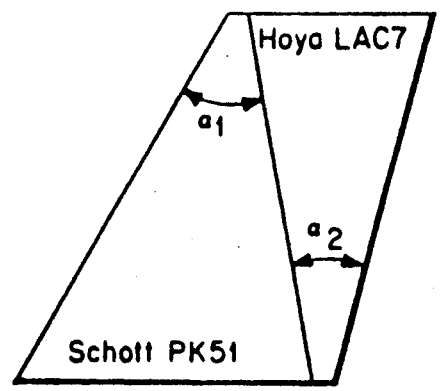
FIG_30B

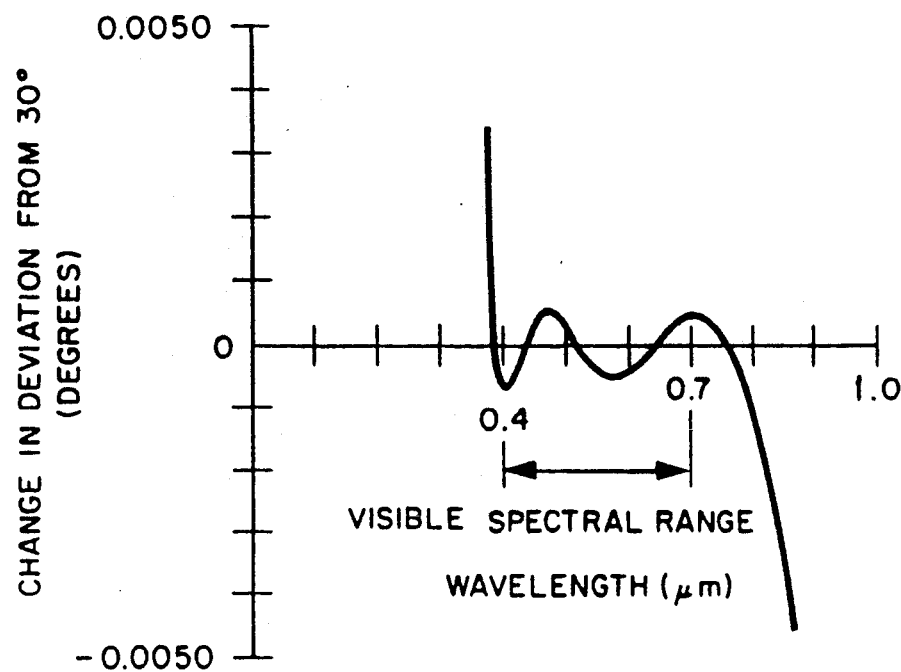
FIG_31A
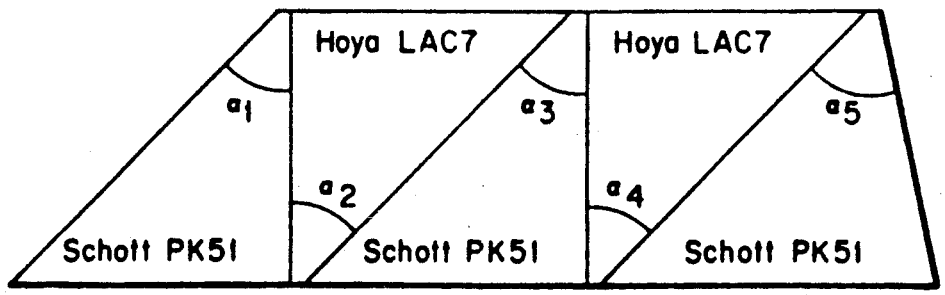
FIG_31B

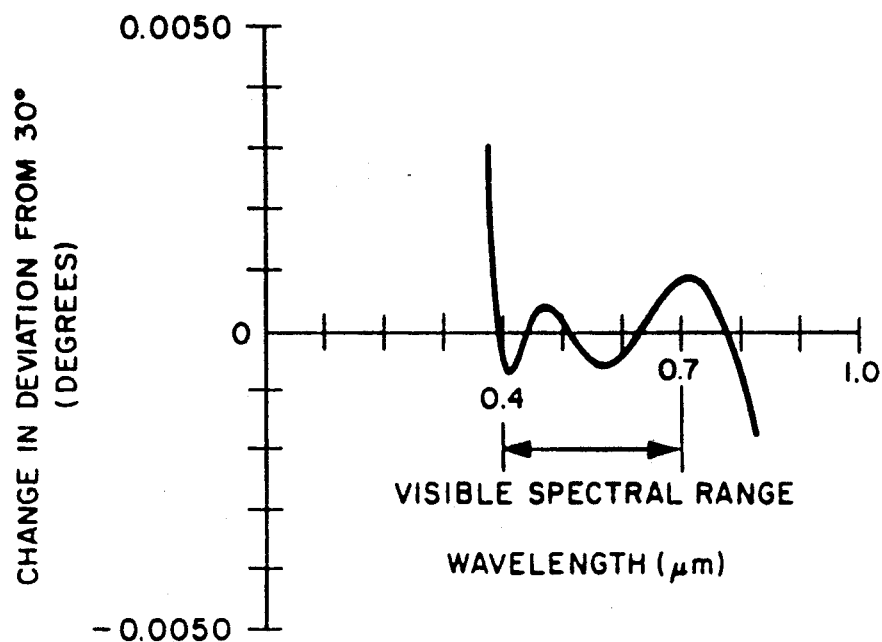
FIG_32A
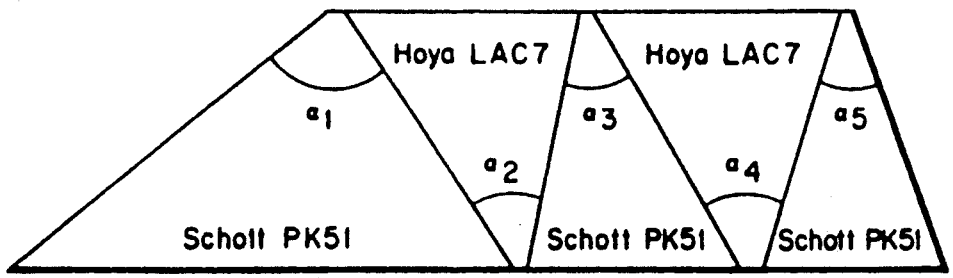
FIG_32B

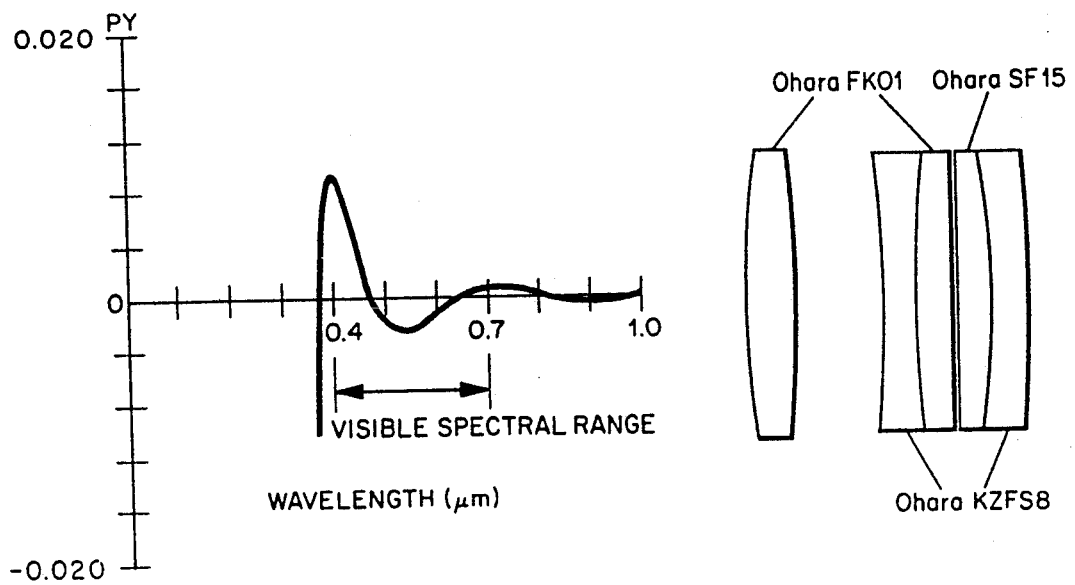
FIG_33A  FIG_33B
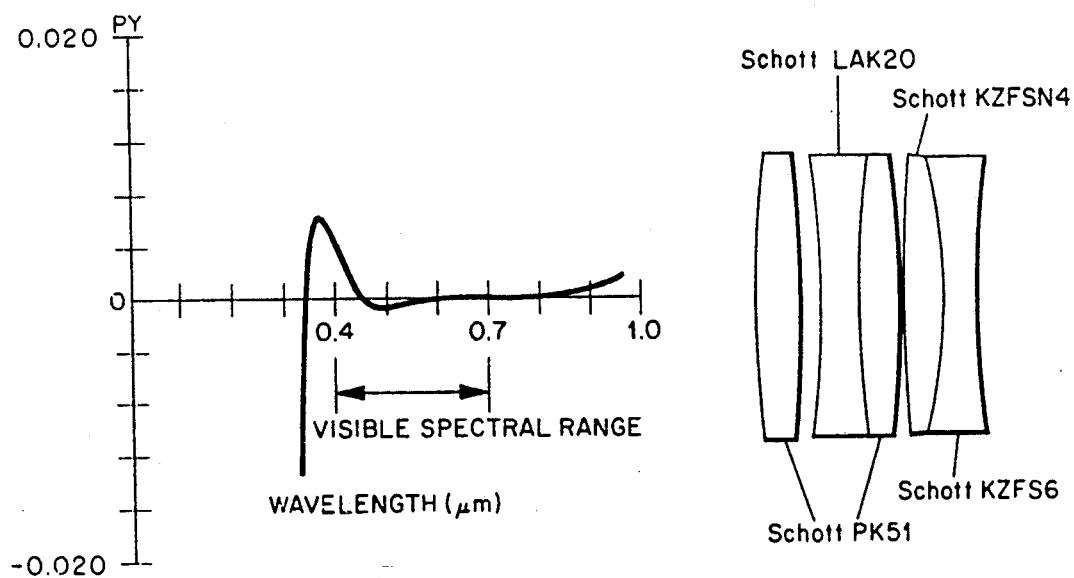
FIG_34A  FIG_34B

COLOR-CORRECTED OPTICAL SYSTEMS AND METHOD OF SELECTING OPTICAL MATERIALS THEREFOR

This application is a continuation of Ser. No. 519,343 filed on Apr. 16, 1990, now abandoned, which was a continuation of Ser. No. 758,626 filed on Jul. 24, 1985, now abandoned, which was a division of Ser. No. 419,705 filed on Sep. 20, 1982, now abandoned.

TECHNICAL FIELD

This invention relates generally to color-corrected optical systems. More particularly, this invention pertains to the selection of optical materials for designing optical systems that are color-corrected at more than two wavelengths.

BACKGROUND ART

The optical region of the electromagnetic spectrum is generally understood to extend from the far ultraviolet wavelengths (about 0.36 $\mu$m) to the near infrared wavelengths (about 1.10 $\mu$m). The selection of optical glasses for designing lens systems that are color-corrected at more than two wavelengths in the optical region has been discussed by a number of investigators, including:
(a) N.v.d.W. Lessing, J. Opt. Soc. Am. 47, 955 (1957)
(b) N.v.d.W. Lessing, J. Opt. Soc. Am. 48, 269 (1958)
(c) N.v.d.W. Lessing, Appl. Opt. 9, 1665 (1970)
(d) R. E. Stephens, J. Opt. Soc. Am. 49, 398 (1959)
(e) R. E. Stephens, J. Opt. Soc. Am. 50, 1016 (1960)
(f) M. Herzberger, Optica Acta 6, 197 (1959)
(g) M. Herzberger and N. R. McClure, Appl. Opt. 2, 553 (1963)
(h) M. Herzberger, Optik 35, 1 (1972)
(i) H. Drucks, Optik 23, 523 (1966)
(j) H. Schulz, Optik 25, 203 (1967)
(k) H. Schulz, Optik 25, 208 (1967)
(l) H. Pulvermacher, Optik 30, 297 (1969)
(m) H. Pulvermacher, Optik 30, 396 (1970)
(n) H. Herzberger and H. Pulvermacher, Optica Acta 17, 349 (1970)
(o) B. L. Nefedov, Sov. J. Opt. Technol. 40, 46 (1973)
(p) A. B. Agurok, Sov. J. Opt. Technol. 44, 114 (1977)
(q) M. G. Shpyakin, Sov. J. Opt. Technol. 45, 81 (1978)
(r) M. G. Shpyakin, Sov. J. Opt. Technol. 45, 219 (1978)
(s) G. A. Mozharov, Sov. J. Opt. Technol. 44, 146 (1977)
(t) G. A. Mozharov, Sov. J. Opt. Technol. 47, 398 (1980).

An optical "multiplet" is an optical system comprising a number (designated generally herein by k) of refracting elements made of a number (designated generally herein by q) of different optical materials, where each refracting element is made entirely of a particular optical material, with the various refracting elements in combination providing color correction at a number (designated generally herein by n) of wavelengths. The refracting elements could be configured as lens elements, prism elements, or anamorphic elements, depending upon the nature of the optical system. The term "color correction" as used herein with respect to dioptric and catadioptric systems means correction of axial chromatic aberration. Thus, to say that a lens system or a Mangin mirror system is color-corrected at n wavelengths means that n wavelengths are brought to a common focus on the optic axis of the system. For a prism system, "color correction" means correction of chromatic dispersion from the total deviation angle of the system.

Various combinations of optical glasses were discovered in the prior art for designing lens systems that bring more than two wavelengths to a common focus. Previous lens systems, which were color-corrected at more than two wavelengths, generally required three or more different types of optical glasses for making three or more lens elements. There was little success in the prior art in identifying suitable pairs of optical glasses for designing lens doublets (i.e., lens systems comprising only two lens elements) capable of bringing more than two wavelengths to a common focus.

U.S. Pat. No. 3,395,962 to Herzberger, et al. described a photographic objective comprising three lens triplets, with each triplet being individually color-corrected at four wavelengths. M. Herzberger, in reference (f) on the above list, suggested that color correction of an optical lens system at four wavelengths is substantially equivalent to color correction for the entire spectrum bounded by the most widely separated of those four wavelengths.

A lens system comprising only two lens elements, i.e., a doublet, is inherently simpler than a lens system comprising a triplet or higher-number multiplet of a lens system. In terms of fabrication cost and compatibility with constraints imposed by the practical considerations involved in designing optical instruments, a lens doublet that is color-corrected at three or more wavelengths would ordinarily be preferable to a higher-number lens multiplet color-corrected at the same number of wavelengths. A computer-aided search to identify pairs of optical glasses suitable for designing lens doublets that are color-corrected at four wavelengths was made without success by R. R. Willey, Jr., as reported in Appl. Opt. 1, 368 (1962). However, Willey did report that certain pairs of glasses can be used for designing lens doublets color-corrected at three wavelengths.

An article by M. Gaj and J. Nowak in Optik 29, 321 (1969) stated that lens triplets color-corrected at three wavelengths could be designed using various pairs of glasses listed in the optical glass catalog published by Glaswerke Schott of Mainz, West Germany. However, two of the pairs of glasses identified by Gaj and Nowak were said to require an additional fluorite lens element to produce the desired color correction at three wavelengths. Gaj and Nowak did not report any design data necessary for verifying the design and for constructing lens elements made from the optical materials identified in their article.

U.S. Pat. No. 3,674,330 disclosed particular pairs of alkali halide crystals from which lens doublets that are substantially achromatic over a broad spectrum of wavelengths in the far infrared region, i.e., at wavelengths longer than 1.5 $\mu$m, can be designed. However, there have been no reports in the literature of any crystal pairs that can be used for designing lens systems color-corrected at more than two wavelengths in the optical region.

The 1977 article by A. B. Agurok, which is reference (p) on the above list, reported on an investigation of the glasses listed in the Russian optical glass catalog GOST (All Union State Standard) to identify pairs of optical glasses suitable for designing lens doublets color-corrected at more than three wavelengths. The search indicated that no two glasses in the GOST catalog can be combined to make a lens doublet that is color-corrected at four wavelengths. Agurok also reported that no two glasses in the Schott catalog had been found, which in combination make a lens doublet that is color-corrected at four wavelengths.

The various algorithms that were developed in the prior art for selecting optical glasses for designing color-corrected lens systems made use of conventional glass parameters (i.e., Abbe numbers and relative partial dispersion ratios) to characterize the dispersive properties of the available types of optical glasses. The approaches taken in the prior art, however, never led to an algorithm of general validity for identifying compatible combinations of optical materials for designing lens multiplets that bring more than two wavelengths to a common focus.

Until the present invention, the problem of correcting optical systems for chromatic aberration has been one of the most difficult problems facing optical designers. A theoretically rigorous procedure for selecting compatible pairs of optical glasses for designing lens doublets that are color-corrected at more than two wavelengths has eluded previous researchers. Non-rigorous "cut-and-try" methods have failed to identify compatible pairs of optical glasses for designing lens doublets color-corrected at more than three wavelengths. C. G. Wynne, in an article entitled "Secondary Spectrum Correction with Normal Glasses", Optics Communications 21, 419 (1977), noted: "It has been generally accepted that the correction of secondary spectrum aberrations, in optical imaging systems, necessarily requires the use of glasses having abnormal relative partial dispersions. This is . . . an error, arising from defects in the accepted theory of first order chromatic aberrations."

The inability of the prior art to develop a unified theory for selecting optical materials to use in designing optical systems that are color-corrected at more than two wavelengths can be attributed to the unavailability, until now, of a tractable mathematical model for representing optical materials in terms of their dispersion characteristics.

DISCLOSURE OF THE INVENTION

Buchdahl's Dispersion Equation

The index of refraction (also called the refractive index) of an isotropic homogeneous optical material such as a glass, a crystal or a plastic is a function of the wavelength $\lambda$ of the optical energy passing through the material. Thus, when an optical material is cut and polished to make a lens element, each wavelength (i.e., each color) is brought to a focus at a different focal position.

Manufacturers of optical glasses conventionally characterize each type of glass in terms of the refractive index of the glass at certain specified wavelengths, viz., the wavelengths of the solar emission lines. In the catalogs published by the leading glass manufacturers, measured values of the refractive index of each glass are listed for the specified wavelengths. In optical design work, however, it is often necessary to know the value of the refractive index of a glass at some wavelength other than those wavelengths specified in the manufacturer's catalog. The refractive index of a glass at any particular wavelength is determined by interpolation from the values given in the catalog by using a so-called dispersion formula.

A great variety of dispersion formulae have been developed over the years to express refractive index as a function of wavelength. A collection of well-known dispersion formulae is given by W. J. Smith in *Modern Optical Engineering*, McGraw-Hill Book Company, Inc., New York (1966), pp. 147–148. In recent years, a power series dispersion formula derived from a quantum model has come into practically universal use among optical glass manufacturers throughout the world. This power series dispersion formula, which expresses refractive index N in terms of wavelength $\lambda$ measured in micrometers, is:

$$N^2 = A_0 + A_1\lambda^2 + A_2\lambda^{-2} + A_3\lambda^{-4} + A_4\lambda^{-6} + A_5\lambda^{-8}, \quad (1)$$

where the so-called dispersion coefficients $A_j$ (j=0, 1, 2, 3, 4, 5), which are provided for each glass by the manufacturer, are obtained by a method of numerical analysis based upon a least squared fit for measured values of the refractive index averaged over several glass melts. All major optical glass manufacturers provide these dispersion coefficients $A_j$ for each glass, so that optical designers can compute the refractive index of any optical glass for any desired wavelength.

A formidable obstacle to the development of a tractable mathematical model for representing any optical material in terms of its dispersion characteristics has been the lack of a dispersion formula in the form $N = \Sigma a_n x^n$ for predicting the refractive index N, where the coefficients $a_n$ are characteristic of the particular optical material and are independent of the wavelength $\lambda$, and where the variable x is a function of the wavelength, i.e., $x = x(\lambda)$. None of the dispersion formulae collected by Smith, op. cit., expresses refractive index in this mathematically suitable $\Sigma a_n x^n$ form; and neither does the quantum model dispersion formula of equation (1).

An expression for refractive index, which provided the starting point for a mathematical model that made the present invention possible, was first introduced by H. A. Buchdahl in a monograph published by Oxford University Press in 1954. This monograph was subsequently reprinted as *Optical Abberration Coefficients*, Dover Publications, Inc., New York (1968). Buchdahl's analysis began with an expression for refractive index in the form $N = N^* + c/(\lambda - \lambda^*)$, which is known as the Hartmann dispersion formula, where $N^*$, c and $\lambda^*$ are constants that are characteristic of the particular optical material. Buchdahl introduced a change of variable from wavelength $\lambda$ to a so-called color coordinate, or chromatic coordinate, $\omega$, which allowed the refractive index to be expressed in the form $$N = N_0 + \nu_1\omega + \nu_2\omega^2 + \nu_3\omega^3 + \ldots + \nu_n\omega^n, \quad (2)$$

where $N_0$ is the value of the refractive index at a selected base wavelength $\lambda_0$, and where the color coordinate $\omega$ is defined as $$\omega = \delta\lambda/(1 + \alpha\delta\lambda). \quad (3)$$

The quantity $\delta\lambda$ is defined as the change in wavelength relative to the base wavelength, i.e., $$\delta\lambda = \lambda - \lambda_0, \quad (4)$$

and the term $\alpha$ is a "universal" constant that is substantially independent of the dispersion characteristics of the particular optical material. The coefficients $\epsilon_n$, called the dispersion coefficients, are constants characteristic of the particular optical material, and in general vary from one type of optical material to another. P. J.

Sands in J. Opt. Soc. Am. 61, 777 (1971), in which he developed the theory of homogeneous lenses, discussed the accuracy of Buchdahl's dispersion formula as given in equation (2).

The color coordinate $\omega$ introduced in equation (2) is a function of wavelength $\lambda$, and is "universal" in the sense that it does not involve characteristics of the particular optical material. Upon computing values of $\alpha$ for six common optical glasses, Buchdahl found that the values of $\alpha$ lie within rather narrow bounds for wavelengths in the visible spectrum when the base wavelength $\lambda_0$ is chosen to be that of the sodium-D line, i.e., 0.5893 $\mu$m. This suggested to Buchdahl that $\alpha$ could be regarded as a "universal" constant for all glasses for wavelengths in the visible spectrum. The value of $\alpha$ calculated by Buchdahl was $\alpha = 2.5$.

Ordinarily, the optical materials used for designing lens systems are optical glasses. For this reason, the analysis presented hereinafter usually refers to optical glasses. However, the analysis is valid for optical materials generally, and is, therefore, applicable regardless of whether the particular optical material under consideration is a glass or some other material such as, e.g., a crystal (e.g., fluorite or quartz), or a viscous liquid (e.g., immersion oil).

The change in refractive index $\delta N$ as a function of change in wavelength $\delta\lambda$ relative to the selected base wavelength $\lambda_0$, i.e., $\delta N(\lambda) = N(\lambda) - N_0$, is defined as the dispersion of the optical material at the wavelength $\lambda$ relative to the base wavelength $\lambda_0$. From equation (2), the dispersion $\delta N$ of an optical material can be expressed by an equation in the form $$\delta N(\lambda) = \sum_{i=1}^{\infty} \nu_i \omega^i, \quad (5)$$

which will be referred to hereinafter as Buchdahl's dispersion equation.

A detailed analysis of Buchdahl's dispersion equation (5) for all the various types of optical glasses listed in the latest catalogs published by five leading optical glass manufacturers was undertaken by P. N. Robb and R. I. Mercado, applicants herein. The optical glass manufacturers whose catalogs were used were Schott Optical Glass, Inc., Duryea, Pa., Ohara Optical Glass Mfg. Co., Ltd., Sagamihara, Japan; Hoya Corporation, Tokyo, Japan; Corning-France, Avon, France; and Chance Pilkington Ltd., St. Asaph, Clywd, U.K. A total of 813 different types of optical glasses were included in the analysis. An announcement of this analysis was published in an abstract in J. Opt. Soc. Am. 71 (12), 1638 (1981).

The power series in equation (5) converges very rapidly. The convergence was found to be so rapid that all 813 glasses studied could be mathematically modelled using only the first three terms of the power series, with a resulting maximum absolute error of only 0.0001 in the visible spectral range from 0.4 $\mu$m to 0.7 $\mu$m. It is noted that precision glass melts, on the other hand, can be made to a tolerance of only $\pm 0.0002$. Thus, a quadratic dispersion model based upon Buchdahl's dispersion equation, i.e., a dispersion model wherein the degree of the polynomial in equation (5) is given by $n=2$, can predict the refractive index of an optical glass twice as accurately as the glass can be made.

It was also found that a cubic dispersion model based upon Buchdahl's dispersion equation, i.e., a dispersion model wherein the degree of the polynomial in equation (5) is given by $n=3$, can predict the refractive index of an optical glass over an extended spectral range from 0.365 $\mu$m to 1.014 $\mu$m with an accuracy that is approximately equal to the accuracy that can be maintained in making precision glass melts.

It is remarkable that the value of $\alpha$, for which Buchdahl adopted the "universal" value of 2.5 on the basis of an analysis of only six glasses, was found to vary within the narrow range from 2.299 to 2.960, with an average value of 2.577, for a population of 813 glasses. Buchdahl's value of $\alpha = 2.5$ used in defining the color coordinate $\omega$ in equation (3) was therefore virtually exact. Buchdahl calculated the dispersion coefficients $\nu_i$ of equation (5) using refractive indices for n wavelengths in an nth-degree polynomial and using a base wavelength of $\lambda_0 = 0.5893$ $\mu$m, which is the wavelength of the yellow sodium-D line. Since equation (5) is linear in the dispersion coefficients $\nu_i$, Buchdahl's procedure yields a system of n simultaneous linear equations in n unknowns. Buchdahl's procedure can be readily implemented with the aid of a computer.

Values for the dispersion coefficients $\nu_i$ obtained using Buchdahl's procedure were compared with a least-squares solution using seven wavelengths in the visible range (from 0.4 $\mu$m to 0.7 $\mu$m) and ten wavelengths in the extended spectral range (from 0.365 $\mu$m in the ultraviolet to 1.014 $\mu$m in the near infrared). It was found that the maximum error could be reduced by a factor of three or more using the least squares methods. Adjustment of the least-squares weights and selection of a base wavelength so as to reduce the maximum error further gave a total error reduction factor of five.

R. I. Mercado and P. N. Robb announced in an abstract published in J. Opt. Soc. Am. 71 (12), 1639 (1981) that they had developed a method for selecting optical glasses for two-element lens systems whereby paraxial color correction could be obtained for three, four and five wavelengths. The glass election method was indicated to be based on use of Buchdahl's color coordinate $\omega$ rather than on the use of Abbe numbers and relative partial dispersion ratios. Meanwhile, the method has been generalized to enable selection of glasses for designing multiplet optical systems comprising two or more different types of glasses.

Theoretical Basis for the Invention

In the mathematical model leading to the present invention, the dispersive properties of a particular type of optical glass are described in terms of the dispersive power D of the glass. The dispersive power D is a function of wavelength $\lambda$ according to the relationship $$D(\lambda) = \frac{\delta N}{N_0 - 1}, \quad (6)$$

where $N_0$ is the value of the refractive index N of the glass at the base wavelength $\lambda_0$. The base wavelength $\lambda_0$ may be arbitrarily selected, but is preferably the wavelength at which monochromatic aberrations are calculated for the optical system that is to be designed using the glass.

In developing the theoretical basis for the present invention, the dispersion term $\delta N$ in equation (6) is replaced by an nth-degree polynomial in the color coordinate $\omega$ in accordance with Buchdahl's dispersion equation (5). Thus, equation (6) is rewritten as $$D(\lambda) = \sum_{i=1}^{n} \eta_i \omega^i(\lambda), \tag{7}$$

where the coefficients $\eta_i$, called the $\eta$-dispersion coefficients, are given by $\eta_i = \nu_i/(N_0-1)$. Like the $\nu$-dispersion coefficients of equation (5), the $\eta$-dispersion coefficients of equation (7) are constants of the particular type of glass and in general vary from one type of glass to another.

The difference in the dispersive power of a particular type of optical glass over a wavelength range $\lambda_1 < \lambda < \lambda_2$ is represented by $D(\lambda_1,\lambda_2) = D(\lambda_1) - D(\lambda_2)$. Using equation (7), $D(\lambda_1,\lambda_2)$ can be expressed in terms of the color coordinate $\omega$ by the power series $$D(\lambda_1,\lambda_2) = \sum_{i=1}^{n} \eta_i[\omega^i(\lambda_1) - \omega^i(\lambda_2)]. \tag{8}$$

For the special case where $\lambda_1$ is the hydrogen F line (0.48613 μm), $\lambda_2$ is the hydrogen C line (0.65627 μm) and $\lambda_0$ is the helium d line (0.58756 μm), it is of interest to note that equation (8) becomes a power series expansion in terms of the reciprocal of the Abbe number for the glass.

Thin Lens Equations

Equations (6), (7) and (8) lead to an elegant expression for the total dioptric power of a lens system comprising a number of thin lens elements in contact. For a single thin lens in air, the dioptric power $\phi$ is a function of wavelength $\lambda$ according to the relationship $$\phi(\lambda) = [N(\lambda)-1](C_1-C_2),$$

where $C_1$ and $C_2$ are the two curvatures of the lens. The curvatures $C_1$ and $C_2$ are independent of the wavelength $\lambda$, and are conveniently represented by a constant $K = C_1 - C_2$ that is characteristic of the configuration of the particular lens. Thus, $\phi(\lambda) = [N(\lambda)-1]K$. For the base wavelength $\lambda_0$, the thin lens power is $\phi(\lambda_0) = [N_0-1]K$. Since $N(\lambda) = N_0 + \delta N(\lambda)$, the thin lens power can be written as $$\phi(\lambda) = \phi(\lambda_0) + K\delta N(\lambda). \tag{10}$$

In terms of the dispersive power D as defined by equation (6), equation (10) can be written in the form $$\phi(\lambda) = \phi(\lambda_0)[1+D(\lambda)]. \tag{11}$$

In terms of the color coordinate $\omega$, equation (11) can be expressed as $$\phi(\lambda) = \phi(\lambda_0)\left[1 + \sum_{i=1}^{n} \eta_i \omega^i(\lambda)\right]. \tag{12}$$

Since $\omega \to 0$ as $\lambda \to \lambda_0$, it follows that $\phi(\lambda) \to \phi(\lambda_0)$ as $\lambda \to \lambda_0$.

More generally, the total dioptric power $\Phi$ of an optical system comprising a number of thin lens elements in contact in air is equal to the sum of the dioptric powers of the individual thin lens elements comprising the system. Thus, for an optical system comprising k thin lens elements in contact having individual lens powers $\phi_1, \phi_2, \ldots, \phi_k$ at the base wavelength $\lambda_0$, the total dioptric power $\Phi$ of the system as the base wavelength $\lambda_0$ is $$\Phi(\lambda_0) = \sum_{j=1}^{k} \phi_j. \tag{13}$$

The total dioptric power $\Phi$ for any wavelength $\lambda$ is given by $$\Phi(\lambda) = \Phi(\lambda_0) + \sum_{j=1}^{k} \phi_j D_j(\lambda), \tag{14}$$

where $\phi_j$ is the dioptric power of the jth lens element in the system at $\lambda_0$, and $D_j(\lambda)$ is the dispersive power of the particular type of glass from which the jth lens element is made. For any wavelength $\lambda$, $$D_j(\lambda) = \sum_{i=1}^{n} \eta_{ij} \omega^i(\lambda), \tag{15}$$

so that the difference in the total dispersive power of the system over the wavelength range $\lambda_1 < \lambda < \lambda_2$, i.e., $D_j(\lambda_1,\lambda_2) = D_j(\lambda_1) - D_j(\lambda_2)$, is given by $$D_j(\lambda_1,\lambda_2) = \sum_{i=1}^{n} \eta_{ij}[\omega^i(\lambda_1) - \omega^i(\lambda_2)]. \tag{16}$$

and the difference in the total dioptric power of the system at the wavelengths $\lambda_1$ and $\lambda_2$ is $$\Delta\Phi(\lambda_1,\lambda_2) = \sum_{j=1}^{k} \phi_j D_j(\lambda_1,\lambda_2). \tag{17}$$

Thin Lens Doublet

Applying the general equations (13) to (17) for thin lenses in contact to the particular case of a thin lens doublet (i.e., a lens system for which k=2), the total dioptric power of the doublet at $\lambda_0$ is $$\Phi(\lambda_0) = \lambda_1 + \lambda_2. \tag{18}$$

From equation (14), the dioptric power of the lens doublet for any wavelength $\lambda$ is $$\Phi(\lambda) = \Phi(\lambda_0) + \phi_1 D_1(\lambda) + \phi_2 D_2(\lambda). \tag{19}$$

In the case of two separated thin lenses in air, the total dioptric power at $\lambda_0$ is $$\Phi(\lambda_0) = \phi_1 + (1-k)\phi_2, \tag{20}$$

where $k = d\phi_1$, where d is the axial separation of the lenses. The parameter k is a function of wavelength according to the relationship $k(\lambda) = k[1 + D_1(\lambda)]$.

In the case of a lens doublet comprising two different types of glasses, where the two lens elements of the doublet are cemented together, the condition that the doublet be color-corrected at two wavelengths $\lambda_1$ and $\lambda_2$ is that $\Phi(\lambda_1) = \Phi(\lambda_2)$. This implies that $$\phi_1 D_1(\lambda_1,\lambda_2) + \phi_2 D_2(\lambda_1,\lambda_2) = 0, \tag{21}$$

where $D_j(\lambda_1,\lambda_2)$ for $j=1, 2$ is given by equation (16). Solving the system of equations (18) and (21) yields the dioptric powers of the individual lens elements of the thin lens doublet, to wit:

$$\phi_1 = -\Phi(\lambda_0)D_2(\lambda_1, \lambda_2)/[D_1(\lambda_1,\lambda_2) - D_2(\lambda_1,\lambda_2)] \quad (22)$$

and $$\phi_2 = +\Phi(\lambda_0)D_1(\lambda_1,\lambda_2)/[D_1(\lambda_1, \lambda_2) - D_2(\lambda_1,\lambda_2)]. \quad (23)$$

The set of equations (22) and (23) is equivalent to the set of equations commonly used for calculating the dioptric powers of the individual lens elements of a two-glass lens doublet color-corrected at the two wavelengths $\lambda_1$ and $\lambda_2$, where the dioptric powers of the lens elements comprising the doublet are expressed in terms of the Abbe numbers for the glasses from which the lens elements are made.

In the neighborhood of the base wavelength $\lambda_0$, the dispersion $\delta N(\lambda)$ of a two-glass lens doublet can be approximated by a linear function in the color coordinate $\omega$. Thus, for a two-glass thin lens doublet, equation (5) can be written in the form $$\delta N(\lambda) = N(\lambda_0) + \sigma_1 \omega(\lambda), \quad (24)$$

and equations (7) and (8), respectively, become $$D(\lambda) = \eta_1 \omega(\lambda) \quad (25)$$

and $$D(\lambda_1,\lambda_2) = \eta_1[\omega(\lambda_1) - \omega(\lambda_2)]. \quad (26)$$

Equations (25) and (26) are, respectively, linear models of the dispersive power $D(\lambda)$ and of the difference in the dispersive powder $D(\lambda_1,\lambda_2)$ for the two-glass thin lens doublet over the wavelength range $\lambda_1 < \lambda < \lambda_2$.

Two-Glass Lens Double Color-Corrected at Two Wavelengths

In designing a two-glass thin lens doublet that is corrected for paraxial chromatic aberration at two wavelengths, (also called a two-glass two-color lens doublet), it is assumed that the dispersion properties of the optical glasses from which the lens elements of the doublet are made are substantially approximated by equations (25) and (26), i.e., by a linear dispersion model. Thus, each type of optical glass is uniquely represented by two parameters, viz., the refractive index $N(\lambda_0)$ at the base wave-length $\lambda_0$, and the dispersion coefficient $\eta_1$ as defined by equation (26). When $\lambda_0$ corresponds to the helium d line, and $\lambda_1$ and $\lambda_2$ are the hydrogen F and C lines, respectively, equation (26) becomes $$[N(\lambda_F) - N(\lambda_C)]/[N(\lambda_d) - 1] = \eta_1[\omega(\lambda_F) - \omega(\lambda_C)]. \quad (27)$$

The left side of equation (27) is the reciprocal of the Abbe number. Since the factor $[\omega(\lambda_F) - \omega(\lambda_C)]$ is a constant, equation (27) implies that the dispersion coefficient $\eta_1$ of an optical glass is directly proportional to the reciprocal of the Abbe number of the glass. The $[N(\lambda_0), \eta_1]$ glass parameter representation, as suggested by the foregoing analysis, is analogous to the $(N_d, V_d)$ representation commonly used by optical glass manufacturers for uniquely representing an optical glass, where $N_d$ and $V_d$ are the refractive index and the Abbe number, respectively, for the glass at the wavelength of the helium d line.

In terms of the dispersion coefficients $\eta_1$ of the glasses from which the lens elements of a two-glass two-color lens doublet are made, the dioptric powers of the individual lens elements at the base wavelength $\lambda_0$ can be expressed by equations in the form $$\phi_1 = -\eta_{12}\Phi(\lambda_0)/(\eta_{11} - \eta_{12}) \quad (28)$$

and $$\phi_2 = +\eta_{11}\Phi(\lambda_0)/(\eta_{11} - \eta_{12}), \quad (29)$$

where $\eta_{11}$ is called the primary dispersion coefficient for the first glass of the doublet, and $\eta_{12}$ is called the primary dispersion coefficient for the second glass of the doublet. Ordinarily, it is desirable that the dioptric powers $\phi_1$ and $\phi_2$ of the lens elements of the doublet be small in value, so that the curvatures of the lens elements will be small. From equations (28) and (29), it is apparent that the absolute values of the dioptric powers $\phi_1$ and $\phi_2$ are small when the absolute value of the factor $(\eta_{11} - \eta_{12})$ is large. Therefore, to obtain a good dioptric power distribution for a lens doublet, there must be a relatively large difference between the primary dispersion coefficients of the glass from which the lens elements of the doublet are made.

The foregoing analysis has been developed with reference to the $\eta$-dispersion coefficients. However, inasmuch as $\nu_1$ is directly proportional to $\eta_1$, the analysis is also valid with reference to the $\nu$-dispersion coefficients. The technique of the prior art for designing a two-glass lens doublet that is color-corrected at two wavelengths is thus comprehended as a special case of the algorithm developed for the present invention, wherein a linear approximation of the power series in Buchdahl's dispersion equation (5) is used.

Two-Glass Lens Doublet Color-Corrected at Three Wavelengths

An extension of the foregoing analysis enables selection of compatible glasses for designing a two-glass thin lens doublet that is corrected for axial chromatic aberration at three wavelengths, i.e., a so-called two-glass three-color doublet. To initiate the design of a two-glass thin lens doublet that is color-corrected at wavelengths $\lambda_1$, $\lambda_2$ and $\lambda_3$, where $\lambda_1 < \lambda_2 < \lambda_3$, the focal length of the doublet may be set equal to unity at the base wavelength $\lambda_0$, so that $\Phi(\lambda_0) = 1$ in equation (18). The conditions that must be satisfied to obtain axial color correction of the lens doublet at $\lambda_1$, $\lambda_2$ and $\lambda_3$ imply that $\Phi(\lambda_1) - \Phi(\lambda_2) = 0$ and $\Phi(\lambda_2) - \Phi(\lambda_3) = 0$. These conditions lead to a set of homogeneous equations that are linear in $\phi_1$ and $\phi_2$. Cast in matrix form, these equations can be expressed as $$\overline{D}\,\overline{\Phi} = \overline{0}, \quad (30)$$

where $$\overline{D} = \begin{bmatrix} D_1(\lambda_1,\lambda_2) & D_2(\lambda_1,\lambda_2) \\ D_1(\lambda_2,\lambda_3) & D_2(\lambda_2,\lambda_3) \end{bmatrix}$$

and $$\overline{\Phi} = \begin{bmatrix} \phi_1 \\ \phi_2 \end{bmatrix}.$$

To express equation (30) in terms of the dispersion coefficients of the optical glasses from which the lens elements comprising the doublet are to be made, a quadratic approximation of the power series in Buchdahl's dispersion equation (5) is used to obtain axial color correction at three wavelengths. More generally, the power series in Buchdahl's dispersion equation (5) is approximated by an (n−1)th degree polynomial in representing a two-glass lens doublet that is color-corrected at n wavelengths.

Assuming that the dispersion properties of each glass of a two-glass three-color lens doublet (i.e., a two-glass three-color lens system comprising k lens element, where k=1, 2) are approximated with substantial accuracy by a quadratic dispersion model, equation (7) becomes $$D_k(\lambda) = \eta_{1k}\omega(\lambda) + \eta_{2k}\omega^2(\lambda), \tag{31}$$

and equation (8) becomes $$D_k(\lambda_i,\lambda_j) = \eta_{1k}(\omega_i - \omega_j) + \eta_{2k}(\omega_i^2 - \omega_j^2). \tag{32}$$

In designing a two-glass three-color lens doublet, each type of glass used in making the lens elements of the doublet is uniquely represented by the three parameters $N_0(\lambda)$, $\eta_1$ and $\eta_2$, which comprise the $[N_0(\lambda), \eta_1, \eta_2]$ glass parameter representation. Since $\eta_1$ and $\eta_2$ are proportional to $\nu_1$ and $\nu_2$, respectively, a $[N_0(\lambda), \nu_1, \nu_2]$ glass parameter representation in terms of the $\nu$-dispersion coefficients could also be used for uniquely representing each type of optical glass.

Using the $[N_0(\lambda), \eta_1, \eta_2]$ glass parameter representation relative to the base wavelength $\lambda_0$, and specifying three wavelengths $\lambda_1$, $\lambda_2$ and $\lambda_3$ for which color correction is desired, a system of two nonhomogeneous equations can be obtained from equation (32) for each of the k glasses of the lens doublet, where k=1, 2. This system of equations, however, is linear in the dispersion coefficients $\eta_{1k}$ and $\eta_{2k}$. In matrix form, this system of equations may be written as $$\bar{\Omega}\bar{\eta}_k = \bar{D}_k, \tag{33}$$

where $$\bar{\Omega} = \begin{bmatrix} (\omega_1 - \omega_2) & (\omega_1^2 - \omega_2^2) \\ (\omega_2 - \omega_3) & (\omega_2^2 - \omega_3^2) \end{bmatrix},$$

$$\bar{\eta}_k = \begin{bmatrix} \eta_{1k} \\ \eta_{2k} \end{bmatrix}$$

and $$\bar{D}_k = \begin{bmatrix} D_k(\lambda_1,\lambda_2) \\ D_k(\lambda_2,\lambda_3) \end{bmatrix}.$$

Substituting equation (33) into equation (30) yields $$\bar{\Omega}\bar{\eta}\bar{\Phi} = \bar{0}, \tag{34}$$

where $$\bar{\eta} = \begin{bmatrix} \eta_{11} & \eta_{12} \\ \eta_{21} & \eta_{22} \end{bmatrix}.$$

The elements of each column vector of the matrix $\eta$ are the dispersion coefficients of the glasses from which the lens elements of the two-glass three-color doublet are made. The matrix element $\eta_{11}$ is called the primary dispersion coefficient of the first glass of the doublet, and the matrix element $\eta_{21}$ is called the secondary dispersion coefficient of the first glass of the doublet. Similarly, the matrix elements $\eta_{12}$ and $\eta_{22}$ are called the primary and secondary dispersion coefficients, respectively, of the second glass of the doublet.

The matrix $\bar{\Omega}$ in equation (33) may be factored in the following form $$\bar{\Omega} = \begin{bmatrix} (\omega_1 - \omega_2) & 0 \\ 0 & (\omega_2 - \omega_3) \end{bmatrix} \begin{bmatrix} 1 & (\omega_1 + \omega_2) \\ 1 & (\omega_2 + \omega_3) \end{bmatrix}. \tag{35}$$

Since $\bar{\Omega}$ is nonsingular, it has a unique inverse. Hence, if equation (34) is multiplied by the inverse of $\Omega$, a system of homogeneous equations is obtained in the powers of the constituent lens elements of the doublet, where the elements of the coefficient matrix $\eta$ are the dispersion coefficients of the optical glasses comprising the doublet. Thus, $$\bar{\eta}\bar{\Phi} = \bar{0}, \tag{36}$$

which has a nontrivial solution if and only if the determinant of the $\eta$-dispersion coefficient matrix vanishes, i.e., if and only if the determinant $$|\bar{\eta}| = \begin{vmatrix} \eta_{11} & \eta_{12} \\ \eta_{21} & \eta_{22} \end{vmatrix} = 0. \tag{37}$$

This condition must be satisfied by the pair of glasses comprising the doublet, if axial color correction at three wavelengths is to be achieved by the thin lens doublet design. Thus, a particular pair of optical glasses can be used for designing a two-glass three-color lens doublet, if and only if the ratios of the primary dispersion coefficient to the secondary dispersion coefficient for both glasses are substantially equal, i.e., if and only if $$\frac{\eta_{11}}{\eta_{21}} = \frac{\eta_{12}}{\eta_{22}}. \tag{38}$$

Since $\eta_{ij} = \nu_{ij}/[N(\lambda)-1]$, equation (37) implies that the determinant of the matrix of the corresponding $\nu$-dispersion coefficients also vanishes, i.e., that $$|\bar{\nu}| = \begin{vmatrix} \nu_{11} & \nu_{12} \\ \nu_{21} & \nu_{22} \end{vmatrix} = 0. \tag{39}$$

Thus, using the $\nu$-dispersion coefficients, the condition that must be satisfied by a pair of optical glasses in order for those glasses to be compatible with each other in a two-glass three-color lens doublet can be expressed in terms of the ratios of the primary to secondary $v$-dispersion coefficients as, viz., $$\frac{v_{11}}{v_{21}} = \frac{v_{12}}{v_{22}}. \tag{40}$$

Equation (36) indicates that the dioptric powers of the individual lens elements comprising the two-glass three-color lens doublet are functions of the dispersion coefficients of the glass from which the lens elements comprising the doublet are made. The solution of equation (36) can be expressed in terms of the elements of either the first-row vector or the second-row vector of the $\overline{\eta}$ matrix. In terms of the elements of the first-row vector, $$\phi_1 = +k_1 \eta_{12} \tag{41}$$

and $$\phi_2 = -k_1 \eta_{11}, \tag{42}$$

where $k_1$ is a proportionality factor. For a lens doublet having unit focal length at the base wavelength $\lambda_0$, which is the specified focal length of the two-glass three-color doublet for purposes of this analysis, $$k_1 = 1/(\eta_{12} - \eta_{11}). \tag{43}$$

Similarly, in terms of the elements of the second-row vector, $$\phi_1 = +k_2 \eta_{22} \tag{44}$$

and $$\phi_2 = -k_2 \eta_{21}, \tag{45}$$

where the proportionality factor $k_2$ is given by $$k_2 = 1/(\eta_{22} - \eta_{21}( \tag{46}$$

for the lens doublet having unit focal length at $\lambda_0$.

It is instructive to compare equations (41) and (42), which give the dioptric powers of the lens elements of a three-color lens doublet, with equations (28) and (29), which give the dioptric powers of the lens elements of a two-color lens doublet. In format, equations (41) and (42) are similar to equations (28) and (29). However, the values of the dispersion coefficients $\eta_{ij}$ obtained from the quadratic dispersion model for the three-color doublet are in general different from the values of the dispersion coefficients $\eta_{ij}$ obtained from the linear dispersion model for the two-color doublet.

Two-Glass n-Color Lens Doublet

The theoretical considerations presented above for selecting pairs of glasses that are compatible for designing two-color and three-color lens doublets can be generalized and extended mathematically to define the conditions that must be satisfied in order for a pair of glasses to be compatible for designing thin lens doublets color-corrected at n wavelengths, i.e., two-glass n-color lens doublets.

An n-color lens doublet has, by definition, a common paraxial focal point at wavelengths $\lambda_j$ for $j = 1, 2, 3, \ldots$, n. For an n-color lens doublet of unit total dioptric power (i.e., $\Phi = 1$), at the base wavelength $\lambda_0$, the dioptric powers $\phi_1$ and $\phi_2$ of the individual lens elements comprising the doublet are related by the expressions $$\phi_1 + \phi_2 = 1 \tag{47}$$

and $$\overline{D}\,\overline{\Phi} = \overline{0} \tag{48}$$

where $$\overline{D} = \begin{bmatrix} D_1(\lambda_1,\lambda_2) & D_2(\lambda_1,\lambda_2) \\ D_1(\lambda_2,\lambda_3) & D_2(\lambda_2,\lambda_3) \\ \cdot & \cdot \\ \cdot & \cdot \\ \cdot & \cdot \\ D_1(\lambda_{j-1},\lambda_j) & D_2(\lambda_{j-1},\lambda_j) \\ \cdot & \cdot \\ \cdot & \cdot \\ \cdot & \cdot \\ D_1(\lambda_{n-1},\lambda_n) & D_2(\lambda_{n-1},\lambda_n) \end{bmatrix},$$

$$\overline{\Phi} = \begin{bmatrix} \phi_1 \\ \phi_2 \end{bmatrix},$$

and $\overline{0}$ is a column null vector, where $\lambda_1 < \lambda_2 < \lambda_3 < \ldots < \lambda_{j-1} < \lambda_j < \ldots < \lambda_n$. Equation (48), which represents a set of $(n-1)$ homogeneous equations that are linear in $\phi_1$ and $\phi_2$, has a nontrivial solution if and only if the rank of the coefficient matrix $\overline{D}$ is less than 2. The rank of the coefficient matrix $\overline{D}$ can be determined by examining all possible determinants of order 2 that can be formed by fixing any two rows of the matrix $\overline{D}$. If all possible determinants of order 2 vanish, the rank of $\overline{D}$ is less than 2 and a nontrivial solution of equation (48) exists.

Two-Glass Four-Color Lens Doublet

For a two-glass lens doublet that is color-corrected at four wavelengths (i.e., for $n=4$), submatrices $\overline{A}$, $\overline{B}$ and $\overline{C}$ of order 2 obtained from the coefficient matrix $\overline{D}$ of equation (48) are given by $$\overline{A} = \begin{bmatrix} D_1(\lambda_1,\lambda_2) & D_2(\lambda_1,\lambda_2) \\ D_1(\lambda_2,\lambda_3) & D_2(\lambda_2,\lambda_3) \end{bmatrix}, \tag{49}$$

$$\overline{B} = \begin{bmatrix} D_1(\lambda_1,\lambda_2) & D_2(\lambda_1,\lambda_2) \\ D_1(\lambda_3,\lambda_4) & D_2(\lambda_3,\lambda_4) \end{bmatrix} \tag{50}$$

and $$\overline{C} = \begin{bmatrix} D_1(\lambda_2,\lambda_3) & D_2(\lambda_2,\lambda_3) \\ D_1(\lambda_3,\lambda_4) & D_2(\lambda_3,\lambda_4) \end{bmatrix}. \tag{51}$$

A necessary condition for the existence of a two-glass lens doublet color-corrected at four wavelengths is that the determinants of the submatrices $\overline{A}$, $\overline{B}$ and $\overline{C}$ vanish identically, which implies that the relationships $$\frac{D_1(\lambda_1,\lambda_2)}{D_2(\lambda_1,\lambda_2)} = \frac{D_1(\lambda_2,\lambda_3)}{D_2(\lambda_2,\lambda_3)} = \frac{D_1(\lambda_3,\lambda_4)}{D_2(\lambda_3,\lambda_4)} \tag{52}$$

must be satisfied by the pair of optical glasses comprising the doublet.

To relate equation (52) to the $\eta$-dispersion coefficients of the glasses, a cubic model of the dispersion polynomial is used. Thus, the submatrix $\overline{A}$ of equation (49) can be written in the form $$\overline{A} = \overline{\Omega}_A \overline{\eta} \tag{53}$$

where $$\overline{\Omega}_A = \begin{bmatrix} (\omega_1 - \omega_2) & (\omega_1^2 - \omega_2^2) & (\omega_1^3 - \omega_2^3) \\ (\omega_2 - \omega_3) & (\omega_2^2 - \omega_3^2) & (\omega_2^3 - \omega_3^3) \end{bmatrix}$$

and $$\overline{\eta} = \begin{bmatrix} \eta_{11} & \eta_{12} \\ \eta_{21} & \eta_{22} \\ \eta_{31} & \eta_{32} \end{bmatrix}.$$

The elements of the first and second column vectors of the $\overline{\eta}$ matrix are the $\eta$-dispersion coefficients of the first and second optical glasses, respectively, comprising the doublet. The matrix elements $\eta_{11}$, $\eta_{21}$ and $\eta_{31}$ are called the primary, secondary and tertiary dispersion coefficients, respectively, of the first glass of the doublet; and the matrix elements $\eta_{12}$, $\eta_{22}$ and $\eta_{32}$ are called the primary, secondary and tertiary dispersion coefficients, respectively, of the second glass of the doublet.

In equation (53), the submatrix $\overline{A}$ may be considered as the product of the factors $\overline{\Omega}_A$ and $\overline{\eta}$. From linear algebra, the rank of the submatrix $\overline{A}$, written $R(\overline{A})$, is related to the ranks of its factors $\overline{\Omega}_A$ and $\overline{\eta}$ by the expression $$R(\overline{A}) \leq \text{Minimum } [R(\overline{\Omega}_A), R(\overline{\eta})]. \tag{54}$$

Since the determinant of the submatrix $\overline{A}$ vanishes as a necessary condition for the existence of a lens doublet that is color-corrected at four wavelengths, the rank of $\overline{A}$ must be less than 2, i.e., $R(\overline{A}) < 2$. The color coordinates $\omega_j$ are distinct in value for each wavelength. Since the highest-order nonsingular submatrix obtainable from the elements of the matrix $\overline{\Omega}_A$ is equal to 2, it follows that $R(\overline{\Omega}_A) = 2$. Since the $\eta$-dispersion coefficients are finite in value, $R(\overline{\eta}) \neq 0$. Furthermore, since $R(\overline{A}) < 2$, it follows from equation (54) that $R(\overline{\eta}) < 2$. Since $R(\overline{\eta})$ must have an integral value less than 2 and greater than zero, it therefore follows that $R(\overline{\eta}) = 1$.

The fact that the rank of $\overline{\eta}$ in equation (53) is equal to unity implies that $$\begin{vmatrix} \eta_{11} & \eta_{12} \\ \eta_{21} & \eta_{22} \end{vmatrix} = \begin{vmatrix} \eta_{11} & \eta_{12} \\ \eta_{31} & \eta_{32} \end{vmatrix} = \begin{vmatrix} \eta_{21} & \eta_{22} \\ \eta_{31} & \eta_{32} \end{vmatrix} = 0. \tag{55}$$

Thus, $$\frac{\eta_{11}}{\eta_{21}} = \frac{\eta_{12}}{\eta_{22}} \tag{56}$$

$$\frac{\eta_{11}}{\eta_{31}} = \frac{\eta_{12}}{\eta_{32}} \tag{57}$$

$$\frac{\eta_{21}}{\eta_{31}} = \frac{\eta_{22}}{\eta_{32}}; \tag{58}$$

which is to say that a particular pair of optical glasses can be used in designing a two-glass lens doublet that is color-corrected at four wavelengths, if and only if the ratios of the primary, secondary and tertiary dispersion coefficients of the two glasses are related to each other in accordance with equations (56), (57) and (58).

Just as the submatrix $\overline{A}$ in equation (49) was related to the $\eta$-dispersion coefficients by equation (53), so also the submatrix $\overline{B}$ in equation (50) and the submatrix $\overline{C}$ in equation (51) can be related to the $\eta$-dispersion coefficients by corresponding equations having the form $\overline{B} = \overline{\Omega}_B \overline{\eta}$ and $\overline{C} = \overline{\Omega}_C \overline{\eta}$. These equations for $\overline{B}$ and $\overline{C}$ differ from the corresponding equation for $\overline{A}$ only in the first factor. Thus, an analysis of the equations $\overline{B} = \overline{\Omega}_B \overline{\eta}$ and $\overline{C} = \overline{\Omega}_C \overline{\eta}$ in the same way as was done above for equation (53) leads to the same result as expressed in equations (56), (57) and (58).

To understand the conditions expressed by equations (56), (57) and (58) in geometrical terms, consider each type of optical glass available to the designer to be represented by a unique point in a three-dimensional space, called a glass space, which is defined by a coordinate system having the $\eta$-dispersion coefficients $\eta_1$, $\eta_2$ and $\eta_3$ as orthogonal axes. Two particular optical glasses $G_1$ and $G_2$ having coordinates $G_1(\eta_{11}, \eta_{21}, \eta_{31})$ and $G_2(\eta_{12}, \eta_{22}, \eta_{32})$, respectively, in the glass space satisfy the conditions of equations (56), (57) and (58), if and only if $G_1$ and $G_2$ are collinear with the origin of the coordinate system.

The various optical glasses available to the designer can be represented as position vectors in $\eta$-space. The conditions of equations (56), (57) and (58), which must be satisfied in designing a two-glass lens doublet that is color-corrected at four wavelengths, require that the two glasses $G_1$ and $G_2$ selected for making the lens elements of the doublet must satisfy the vector equation $$\overline{G}_1 = \alpha \overline{G}_2, \tag{59}$$

where $\overline{G}_1$ and $\overline{G}_2$ are the position vectors for the respective glasses, and $\alpha$ is a real scalar. Since the vectors $\overline{G}_1$ and $\overline{G}_2$ are collinear, the projections of $\overline{G}_1$ and $\overline{G}_2$ on the three orthogonal planes intersecting at the origin of the coordinate system must also be collinear, which is the geometric interpretation of the ratios given in equations (56), (57) and (58).

Two-Glass n-Color Lens Multiplet

In a two-glass lens multiplet, there may be any specified number of lens elements, but at least one of the lens elements is made of one type of glass and at least one other of the lens elements is made of another type of glass. A two-glass lens doublet is a special case of a two-glass lens multiplet in which there are only two lens elements.

In designing a two-glass n-color lens doublet, an $(n-1)$th degree glass dispersion model is used, which is to say that the power series in Buchdahl's dispersion equation (5) is approximated by an $(n-1)$th degree polynomial when axial color correction at n wavelengths is desired. In vector representation, each type of optical material available to the designer is represented as a unique glass point in an $(n-1)$-dimensional vector space having the dispersion coefficients $\eta_1, \eta_2, \eta_3, \ldots, \eta_{n-1}$ as orthogonal axes. Any two optical materials whose glass points are collinear with the origin of the $(n-1)$-dimensional vector space could in principle be used for designing a two-glass lens doublet that is color-corrected at n wavelengths.

Since axial color correction of a lens multiplet is dependent upon the dispersion properties of the glasses from which the lens elements comprising the multiplet are made, and does not depend upon the design form (i.e., the number, configuration and arrangement) of the individual lens elements, the technique described above for designing a two-glass n-color lens doublet can be extended for designing a two-glass n-color lens multiplet comprising more than two lens elements. For purposes of axial color correction, a two-glass lens multiplet can be treated mathematically as a quasi-doublet, where all the individual lens elements made of one type of glass are considered collectively as the first lens element of the quasi-doublet, and where all the individual lens elements made of the other type of glass are considered collectively as the second lens element of the quasi-doublet. Each of the two lens elements of the quasi-doublet is treated as having a dioptric power that is the sum of the dioptric powers of all the individual lens elements made of the same type of glass. Thus, in the mathematical analysis of a two-glass lens triplet, quadruplet, or higher-number multiplet treated as a quasi-doublet, at least one of the lens elements of the quasi-doublet actually comprises two or more individual lens elements made of the same type of glass. The total dioptric power of the quasi-doublet, of course, is the same as the total dioptric power obtained by summing the dioptric powers of the individual lens elements comprising the multiplet.

Since correction for axial chromatic aberration does not depend upon the design form of an optical system, the degree of axial color correction that can be obtained for an optical system using a particular pair of optical glasses cannot be varied by changing the design form of the system. Thus, the same degree of axial color correction can be obtained for any lens multiplet using two given optical glasses, regardless of the number of lens elements comprising the multiplet, and regardless of the configurations and dispositions of the lens elements. However, the remaining optical aberrations, including lateral color, the monochromatic aberrations, and the chromatic variations of the monochromatic aberrations, are sensitive to the design form of a lens system.

The selection of compatible optical materials is a necessary condition for designing an optical system that is color-corrected at a desired number of wavelengths. However, it is not sufficient merely to select compatible optical materials. The designer, working with compatible optical materials, must further apply his craft with skill in order to determine a design form that will enable the optical system to meet its specified requirements.

A designer can select a compatible pair of optical materials from among all the various types of optical materials available to him for designing a two-glass n-color lens multiplet by:

(a) Determining the dispersion coefficients for each type of optical material, the dispersion coefficients being coordinates defining a unique "glass point" for each type of optical material in an $(n-1)$-dimensional "glass space" coordinate system, where n is the number of wavelengths for which color correction is desired;

(b) Calculating the slope of the hyperline connecting the origin of the "glass space" coordinate system with the "glass point" for each type of optical material;

(c) Sorting the various types of optical materials in ascending order of the slopes of the hyperlines connecting the "glass points" with the origin of the coordinate system; and (d) Selecting a pair of optical materials for which the hyperline slopes are substantially equal.

After identifying the various pairs of optical materials that are suitable in principle for designing the two-glass n-color lens multiplet, the designer then selects a preferred pair (or pairs) of optical materials to use in implementing the design. Ordinarily, it would be desirable for the dioptric powers of the individual lens elements comprising the lens multiplet to be minimized, which occurs when the absolute value of the difference between corresponding primary dispersion coefficients of the two glasses from which the lens elements are made is a maximum. A further step in the glass selection process, therefore, would ordinarily be to calculate the value of $\eta_{12} - \eta_{11}$ for each pair of glasses that could in principle be used for designing the lens multiplet. The preferred pair of glasses is a pair for which the difference $|\eta_{12} - \eta_{11}|$ is a maximum.

A particular pair of optical glasses selected according to the above-described procedure for designing a two-glass three-color lens doublet might also be found to provide color correction at more than three wavelengths. This result can occur, because the conditions for three-color correction comprise a subset of the conditions for color correction at more than three wavelengths. In general, if two glass vectors $\overline{G}_1$ and $\overline{G}_2$ are collinear, i.e., if the glass points $G_1$ and $G_2$ lie on the same hyperline in $(n-1)$-dimensional $\eta$-space, the projections of the vectors $\overline{G}_1$ and $\overline{G}_2$ on the hyperplane of the next lower degeneracy, i.e., the projections of $\overline{G}_1$ and $\overline{G}_2$ on the hyperplane in $(n-2)$-dimensional $\eta$-space, must also be collinear with respect to the origin.

Introduction of Lens Thickness

The foregoing mathematical analysis was developed using the thin lens equations (13) to (17), which represent an idealization that ignores the effect of lens thickness. In the real world, after a compatible pair of optical materials has been selected for designing a two-glass color-corrected lens multiplet, the individual lens element to be made from those optical materials must be given suitable thicknesses in order to be constructible.

In accordance with the present invention, an algorithm has been developed for introducing lens thickness into the design of a two-glass lens multiplet whose "thin lens" elements are to be made from optical glasses selected according to the above-described procedure. The algorithm for lens thickening requires that the powers of the "thin lens" elements be unchanged during the introduction of lens thickness. Also, in order for the "thickened" multiplet to have a total dioptric power (or focal length) that is identically equal to the total dioptric power (or focal length) of the idealized thin lens multiplet that it replaces, the second principal plane of any given lens element of the multiplet must coincide with the first principal plane of an adjacent lens element of the multiplet.

The algorithm for two-glass lens multiplet thickening is described in detail below for the special cases of a cemented lens doublet and an air-spaced lens doublet.

Two-Glass Cemented Lens Doublet

The thick lens dioptric powers $\phi_1$ and $\phi_2$, respectively, of the lens elements comprising a thickened lens doublet are given by the equations $$\phi_1 = P_1 + P_2 - \frac{t_1}{N_1} P_1 P_2 \tag{60}$$

and $$\phi_2 = P_3 + P_4 - \frac{t_2}{N_2} P_3 P_4, \tag{61}$$

where $P_j$ (j=1, 2, 3, 4) are the refractive powers of the lens element surfaces in the doublet system, where $t_1$ and $t_2$ are the axial thicknesses of the respective lens elements of the system, and where $N_1$ and $N_2$ are the refractive indices of the respective glasses at the base wavelength $\lambda_0$.

The refractive power $P_j$ of a surface of a lens element is a function of the surface curvature $C_j$ (j=1, 2, 3, 4) and of the refractive index of the particular glass from which the lens element is made, according to the equations $$P_1 = C_1(N_1 - 1) \tag{62}$$

$$P_2 = C_2(1 - N_1) \tag{63}$$

$$P_3 = C_3(N_2 - 1) \tag{64}$$

$$P_4 = C_3(1 - N_2). \tag{65}$$

The requirement that adjacent principal planes of the two lens elements of the doublet coincide implies that $$\frac{t_1 P_1}{N_1 \phi_1} = -\frac{t_2 P_4}{N_2 \phi_2}, \tag{66}$$

which when solved for $P_4$ yields $$P_4 = -\frac{N_2 t_1 \phi_2 P_1}{N_1 t_2 \phi_1}. \tag{67}$$

If the two lens elements are cemented together, $C_2 = C_3$. Thus, equations (63) and (64) can be combined and solved for $P_3$ to yield $$P_3 = \frac{P_2(N_2 - 1)}{1 - N_1}. \tag{68}$$

Substituting the expressions for $P_4$ and $P_3$ from equations (67) and (68) into equation (61) yields $$\phi_2 = a_1 P_1 + a_2 P_2 + a_3 P_1 P_2, \tag{69}$$

where $a_1 = -(N_2 t_1 \phi_2)/N_1 t_2 \phi_1$;
$a_2 = (N_2 - 1)/(1 - N_1)$; and
$a_3 = (N_2 - 1) t_1 \phi_2/(1 - N_1) N_1 \phi_1$.

Equation (69) and the equations for $a_1$, $a_2$ and $a_3$ can be solved simultaneously to yield an equation $$A P_2^2 + B P_2 + C = 0, \tag{70}$$

which is quadratic in $P_2$, where $A = a_2 b - a_3$; $B = a_2 - a_1 + a_3 \phi_1 - b \phi_2$; $C = a_1 \phi_1 - \phi_2$; and $b = -t_1/N_1$. When the discriminant of the quadratic equation (70) is positive, there are two distinct values for $P_2$. Usually, only one of the two values for $P_2$ can result in a physically realizable lens system.

After the values of $P_4$, $P_3$ and $P_2$ have been determined, the values of $P_1$ can be found by simple algebraic substitution in equation (66). The values of the constructional parameters of the lens system are calculated from equations (62) to (65), after the values of the refractive powers $P_j$ have been determined.

Two-Glass Air-Spaced Lens Doublet

The total dioptric power $\Phi$ of an air-spaced lens doublet is $$\Phi = \phi_1 + (1-k) \phi_2, \tag{71}$$

where $k = d\phi_1$, where d is the axial separation of the lens elements in air. The procedure used to calculate the dioptric powers $\phi_1$ and $\phi_2$ of the individual lens elements of the doublet is identical to the procedure used for the idealized case of two thin lenses in contact, except that total dioptric power $\Phi$ is given by equation (71) and the parameter k varies with wavelength according to the relationship $$k(\lambda) = k [1 + D_1(\lambda)], \tag{72}$$

where k is the value of $k(\lambda)$ at the base wavelength $\lambda_0$.

Introduction of thickness into the design of an air-spaced lens doublet follows the general procedure described above for designing a cemented lens doublet. The individual lens elements are "thickened" by keeping the powers $\phi_1$ and $\phi_2$ the same, and by keeping the axial separation of the adjacent principal planes equal to d.

Two-Glass Mangin Mirror

The glass selection procedure described above is applicable to catadioptric systems (i.e., systems involving both reflection and refraction of light), as well as to dioptric systems involving only refraction of light. The simplest form of catadioptric system comprises a meniscus lens with spherical surfaces, one surface of which is provided with a reflective coating to form a mirror. Such a "lens mirror" is commonly called a Mangin mirror, after the French military officer who first proposed such imaging systems.

The classical Mangin mirror, which comprises only a negative singlet lens made of one optical material, is not corrected for primary chromatic aberration. In order for a Mangin mirror to be useful in imaging applications over a reasonable spectral range, it is necessary to provide color correction. The requirement for a color-corrected Mangin mirror led to the development of the so-called Mangin doublet mirror, which is a compound Mangin mirror in which the classical negative meniscus lens is replaced by a doublet lens system in which the two lens elements are made of different types of glasses.

Mangin doublet mirrors corrected for axial chromatic aberration at two wavelengths, like ordinary achromatic lens doublets (i.e., two-glass lens doublets corrected at two wavelengths), were known in the prior art. Designs for Mangin doublet mirrors color-corrected at two wavelengths were described by N.v.d.W.

Lessing in Appl. Opt. 8, 979 (1969), and by S. Rosin and M. Amon in Appl. Opt. 6, 963 (1967) and in U.S. Pat. No. 3,494,688. A method for selecting pairs of optical glasses for designing cemented Mangin doublet mirrors that are color-corrected at two wavelengths was described by N.v.d.W. Lessing in Appl. Opt. 8, 1245 (1969). However, the prior art had no unified theory for selecting optical materials for designing compound Mangin mirrors color-corrected at more than two wavelengths.

Algorithms developed in the prior art for selecting optical materials to be used for designing two-glass Mangin mirrors failed to identify any combinations of glasses or other optical materials that could be used for designing any kind of catadioptric system capable of bringing more than two wavelengths to a common focus. The unified theory leading to the present invention, however, provides a method for selecting optical materials for designing Mangin mirrors that are color-corrected at more than two wavelengths.

Two-Glass Mangin Doublet Mirror

A thin cemented Mangin doublet mirror in air, having total catadioptric power $\Phi$ at base wavelength $\lambda_0$, can be considered as a system comprising two thin lenses and a mirror in contact. For a marginal paraxial ray trace through the system, the total catadioptric power $\Phi$ is therefore given by $$\Phi = 2\phi_1 + 2\phi_2 + \phi_m, \tag{73}$$

where $\phi_1$ and $\phi_2$ are the respective dioptric powers of the thin lens elements and $\phi_m$ is the catoptric power of the mirror element comprising the system.

At a wavelength other than $\lambda_0$, the total catadioptric power $\Phi$ of a Mangin doublet mirror in terms of the dispersive powers $D_1(\lambda)$ and $D_2(\lambda)$ of the respective thin lens elements, as defined by equation (7), is given by $$\Phi(\lambda) = 2\phi_1[1 + D_1(\lambda)] + 2\phi_2[1 + D_2(\lambda)] + \phi_m, \tag{74}$$

which after algebraic simplification becomes $$\Phi(\lambda) - = \Phi + 2\phi_1 D_1(\lambda) + 2\phi_2 D_2(\lambda). \tag{75}$$

The difference in the total catadioptric power of a Mangin doublet mirror at the wavelengths $\lambda_i$ and $\lambda_j$, which is represented as $\Delta\Phi(\lambda_i,\lambda_j) = \Phi(\lambda_i) - \Phi(\lambda_j)$, is given by $$\Delta\Phi(\lambda_i,\lambda_j) = 2[\phi_1 D_1(\lambda_i,\lambda_j) + \phi_2 D_2(\lambda_i,\lambda_j)], \tag{76}$$

where $D_1(\lambda_i,\lambda_j)$ and $D_2(\lambda_i,\lambda_j)$ represent the differences over the wavelength range from $\lambda_i$ to $\lambda_j$ between the dispersive powers of the respective glasses from which the lens elements comprising the Mangin doublet mirror are made.

Two-Glass Mangin Doublet Mirror Color-Corrected at Three Wavelengths

The conditions that must be satisfied for a two-glass Mangin doublet mirror to be color-corrected at three wavelengths $\lambda_1$, $\lambda_2$ and $\lambda_3$, where $\lambda_1 < \lambda_2 < \lambda_3$, imply that $\Delta\Phi(\lambda_1,\lambda_2)$ and $\Delta\Phi(\lambda_2,\lambda_3)$ must both be identically equal to zero. In matrix form, this can be written as $$\overline{D}\overline{\Phi} = \overline{0} \tag{77}$$

where $$\overline{D} = \begin{bmatrix} D_1(\lambda_1,\lambda_2) & D_2(\lambda_1,\lambda_2) \\ D_1(\lambda_2,\lambda_3) & D_2(\lambda_2,\lambda_3) \end{bmatrix}$$

and $$\overline{\Phi} = \begin{bmatrix} \phi_1 \\ \phi_2 \end{bmatrix}.$$

Equation (77) is identical to equation (30), which expresses the conditions that must be satisfied for a two-glass doublet lens system to be color-corrected at three wavelengths. Thus, as suggested above in the development of equations (31) to (38), in order for two particular optical materials to be suitable for designing a Mangin doublet mirror that is color-corrected at three wavelengths, it is necessary that the ratio of the primary dispersion coefficient to the secondary dispersion coefficient be substantially the same for both optical materials. Geometrically, the glass points for both optical materials in dispersion coefficient space must lie on a common line through the origin of the two-dimensional coordinate system defining the dispersion coefficient space.

The dioptric powers of the two thin lenses comprising the Mangin doublet mirror at the base wavelength $\lambda_0$ are given by $$\phi_1 = K \eta_{12} \tag{78}$$

and $$\phi_2 = -K \eta_{11} \tag{79}$$

where K is a proportionality factor. Equations (78) and (79) are correspondingly similar to equations (41) and (42), respectively; although the proportionality factor K of equations (78) and (79) is in general different from the proportionality factor $k_1$ of equations (41) and (42). For a Mangin doublet mirror having unit focal length (and therefore unit total dioptric power) at the base wavelength $\lambda_0$, equation (73) becomes $$2\phi_1 + 2\phi_2 + \phi_m = 1. \tag{80}$$

Substituting equations (78) and (79) into equation (80) yields $$K = \frac{1 - \phi_m}{2(\eta_{12} - \eta_{11})}, \tag{81}$$

which enables equations (78) and (79) to be written in the form $$\phi_1 = \frac{1 - \phi_m}{2} \left( \frac{\eta_{12}}{\eta_{12} - \eta_{11}} \right) \tag{82}$$

and $$\phi_2 = \frac{1 - \phi_m}{2} \left( \frac{-\eta_{11}}{\eta_{12} - \eta_{11}} \right). \tag{83}$$

Equations (82) and (83) give the dioptric powers at $\lambda_0$ of the lens elements of the Mangin doublet mirror as a function of the η-dispersion coefficients of the lens materials and the catoptric power of the mirror element. The catoptric power $\phi_m$ of the mirror element is independent of wavelength variations, and can be set to a desired value by the optical designer. For any given value chosen for $\phi_m$, the powers $\phi_1$ and $\phi_2$ of the lens elements are inversely proportional to $(\eta_{12}-\eta_{11})$. Thus, in order to minimize the values of $\phi_1$ and $\phi_2$, the glass pair used for designing the Mangin doublet mirror should be selected so that $|\eta_{12}-\eta_{11}|$ is as large as possible.

In the special case where the mirror element of the Margin doublet mirror is planar, i.e., where $\phi_m=0$, equations (82) and (83) become $$\phi_1 = \frac{1}{2}\left(\frac{\eta_{12}}{\eta_{12}-\eta_{11}}\right) \quad (84)$$

and $$\phi_2 = -\frac{1}{2}\left(\frac{\eta_{11}}{\eta_{12}-\eta_{11}}\right), \quad (85)$$

indicating that the dioptric power distribution of the lens elements of a Mangin doublet mirror that is color-corrected at three wavelengths has a value of one-half the dioptric power distribution of the same lens elements used for a two-glass lens doublet that is color-corrected at three wavelengths.

In the special case where the catoptric power of the mirror element of the Mangin doublet mirror is given by $\phi_m=-1$, equations (82) and (83) reduce to $$\phi_1 = \frac{\eta_{12}}{\eta_{12}-\eta_{11}} \quad (86)$$

and $$\phi_2 = \frac{-\eta_{11}}{\eta_{12}-\eta_{11}}. \quad (87)$$

For this particular configuration of the mirror element, the dioptric power distribution of the lens elements of a Mangin doublet mirror that is color-corrected at three wavelengths is equal to the dioptric power distribution of the same lens elements used for a two-glass lens doublet that is color-corrected at three wavelengths.

Two-Glass Mangin Doublet Mirror Color-Corrected at n Wavelengths

The procedure for selecting two different optical materials for designing a Mangin doublet mirror that is color-corrected at n wavelengths is the same as the procedure described above for selecting two different optical materials for designing a lens doublet that is color-corrected at n wavelengths. Each optical material available to the designer is represented as a unique glass point $G_q$ (q=1,2) in an (n−1)-dimensional vector space, where the η-dispersion coefficients of each particular optical material are the coordinates of the glass point representing that particular optical material.

A pair of optical materials is suitable for designing a Mangin doublet mirror that is color-corrected at n wavelengths, if and only if the glass points $G_1$ and $G_2$ for the two materials obey the vector equation $\overline{G}_1=\alpha\overline{G}_2$. In comparing a Mangin doublet mirror color-corrected at n wavelengths with a lens doublet color-corrected at n wavelengths, where the same two types of glasses are used in making the Mangin doublet mirror and the lens doublet, the only difference appearing in the mathematical analysis of the system designs would be in the dioptric power distributions of the thin lens elements.

Two-Glass Mangin Multiplet Mirror Color-Corrected at n Wavelengths

The procedure described above for designing a two-glass Mangin doublet mirror color-corrected at n wavelengths can be generalized for designing a two-glass Mangin multiplet mirror color-corrected at n wavelengths. The two-glass Mangin multiplet mirror can be treated mathematically as a two-glass Mangin quasi-doublet mirror, where all the individual lens elements made of one type of glass are considered collectively as the fruit lens element of the Mangin quasi-doublet mirror, and all the individual lens elements made of the other type of glass are considered collectively as the second lens element of the Mangin quasi-doublet mirror. The total dioptric power of the first lens element is the sum of the dioptric powers of all the individual lens elements made of one type of glass, and the total dioptric power of the other lens element is the sum of the dioptric powers of all the individual lens elements made of the other type of glass. The total catadioptric power $\Phi$ of the Mangin multiplet mirror is obtained by generalizing equation (73) into the form $$\Phi = 2\sum_{i=1}^{r} P_i + 2\sum_{j=1}^{s} Q_j + \phi_m, \quad (88)$$

where $P_i$ (i=1, 2, ..., r) represents the dioptric power of the ith lens element made of one type of glass, and $Q_j$ (j=1, 2, ..., s) represents the dioptric power of the jth lens element made of the other type of glass. The splitting of the powers of the lens elements of an optical system is a useful technique in optical design to reduce spherochromatism and the higher-order monochromatic aberrations.

Color-Corrected Anamorphic Optical Systems

Each of the optical systems described above is rotationally symmetrical about a principal axis, called the optical axis, of the system. However, the glass selection procedure of the present invention is generally applicable regardless of whether such symmetry exists, and hence is also applicable to anamorphic optical systems comprising, e.g., prisms.

For a thin prism of refractive index $N_0$ at the base wavelength $\lambda_0$ with apex angle $a$, the angle of deviation $\beta_0$ of a ray at wavelength $\lambda_0$ after passing through the prism is given by $$\beta_0=a[N_0-1]. \quad (89)$$

The angle of deviation $\beta$ of a ray at wavelength $\lambda$ after passing through the prism is given by $$\beta(\lambda)=a[N(\lambda)-1]. \quad (90)$$

From equation (6), $N(\lambda)-N_0=\lambda N=(N_0-1) D(\lambda)$, where $D(\lambda)$ is the dispersive power of the glass from which the prism is made. Solving for $[N(\lambda)-1]$ in terms of $D(\lambda)$, and substituting $a=\beta_0/(N_0-1)$ from equation (89), yields $$\beta(\lambda) = \beta_0[1 + D(\lambda)]. \quad (91)$$

In terms of the difference in the dispersive power $D(\lambda_i, \lambda_j)$ of the glass over the wavelength range from $\lambda_i$ to $\lambda_j$, as defined above in connection with equation (8), the chromatic dispersion of the prism from which the glass is made, i.e., $\Delta\beta(\lambda_i, \lambda_j) = \beta(\lambda_i) - \beta(\lambda_j)$, is given by $$\Delta\beta(\lambda_i, \lambda_j) = \beta_0 D(\lambda_i, \lambda_j). \quad (92)$$

Two-Glass Prism System Color-Corrected at Three Wavelengths

Consider a prism system comprising two thin prisms made of different optical materials having refractive indices $N_1$ and $N_2$, respectively, at the base wavelength $\lambda_0$, and having apex angles $\alpha_1$ and $\alpha_2$, respectively. The total angular deviation B of a ray passing through the prism system is the sum of the angular deviations produced by the individual prisms comprising the system. Thus, at the base wavelength $\lambda_0$, the total angular deviation is $$B = \beta_1 + \beta_2, \quad (93)$$

where
$\beta_1 = \alpha_1(N_1 - 1)$ and
$\beta_2 = \alpha_2(N_2 - 1)$.

The conditions for the prism system to have zero chromatic dispersion at $\lambda_1$, $\lambda_2$ and $\lambda_3$, where $\lambda_1 < \lambda_2 < \lambda_3$, are that $\Delta\beta(\lambda_1, \lambda_2)$ and $\Delta\beta(\lambda_2, \lambda_3)$ both identically equal zero. From equation (92), these conditions can be written in matrix form as $$\begin{bmatrix} D_1(\lambda_1, \lambda_2) & D_2(\lambda_1, \lambda_2) \\ D_1(\lambda_2, \lambda_3) & D_2(\lambda_2, \lambda_3) \end{bmatrix} \begin{bmatrix} \beta_1 \\ \beta_2 \end{bmatrix} = 0. \quad (94)$$

Equation (94) is similar to equation (30) for a two-glass lens doublet color-corrected at three wavelengths, and to equation (77) for a two-glass Mangin doublet mirror color-corrected at three wavelengths. Using a quadratic dispersion model, the requirement for a particular pair of optical glasses to be suitable for designing a two-glass prism system, whose chromatic dispersion at wavelengths $\lambda_1$, $\lambda_2$ and $\lambda_3$ is zero, is that the determinant of the $\eta$-dispersion coefficients of the glasses vanish, i.e., $$\begin{vmatrix} \eta_{11} & \eta_{12} \\ \eta_{21} & \eta_{22} \end{vmatrix} = 0. \quad (95)$$

This implies that the individual thin prisms comprising the prison system must have angular deviations given by $$\beta_1 = k \eta_{12} \quad (96)$$

and $$\beta_2 = -k \eta_{11}, \quad (97)$$

where k is another proportionality constant. Substituting equations (96) and (97) into equation (93), yields $$k = \frac{B}{\eta_{12} - \eta_{11}} \quad (98)$$

for the proportionality constant. Thus, equations (96) and (97) can be rewritten as $$\beta_1 = \left( \frac{\eta_{12}}{\eta_{12} - \eta_{11}} \right) B \quad (99)$$

and $$\beta_2 = \left( \frac{-\eta_{11}}{\eta_{12} - \eta_{11}} \right) B \quad (100)$$

from equations (99) and (100), the apex angles $\alpha_1 = \beta_1/(N_1 - 1)$ and $\alpha_2 = \beta_2/(N_1 - 1)$ can be written as $$\alpha_1 = \left( \frac{\eta_{12}}{\eta_{12} - \eta_{11}} \right) \frac{B}{(N_1 - 1)} \quad (101)$$

and $$\alpha_2 = \left( \frac{-\eta_{11}}{\eta_{12} - \eta_{11}} \right) \frac{B}{(N_2 - 1)}. \quad (102)$$

Dividing equation (101) by equation (102) yields the ratio $$\frac{\alpha_1}{\alpha_2} = - \frac{\eta_{12}(N_2 - 1)}{\eta_{11}(N_1 - 1)}. \quad (103)$$

Since $\eta_{ij} = \nu_{ij}/(N_j - 1)$, equation (103) reduces to $$\frac{\alpha_1}{\alpha_2} = - \frac{\nu_{12}}{\nu_{11}}, \quad (104)$$

which indicates that in order for a two-glass prism system to be color-corrected at three wavelengths, the ratio of the apex angles of the individual prisms comprising the system must be inversely proportional to the ratio of the $\nu$-dispersion-coefficients of the optical materials from which the prisms are made.

Equations (101) and (102) were derived using equations for thin prisms, and hence yield only approximate values. In designing a real prism system, the approximate values for $\alpha_1$ and $\alpha_2$ provided by thin lens theory can be adjusted by exact ray-tracing based on Snell's law.

Two-Glass Prism System Color-Corrected at More than Three Wavelengths

Three-Glass prism systems color-corrected at four wavelengths were described by R. E. Stephens in J. Opt. Soc. Am. 56, 213 (1966). However, the prior art did not have a unified theory for selecting optical materials from which such three-glass four-color prisms could be designed. No two-glass prism system color-corrected at more than three wavelengths has been reported in the prior art.

In accordance with the present invention, the procedure for selecting optical materials for designing a two-glass prism system that has zero chromatic dispersion at more than three wavelengths is the same as the procedure described above for selecting optical materials for designing a two-glass lens system or a two-glass catadioptric system that is color-corrected at more than three wavelengths.

The glass selection procedure described above is of general validity, and can be used for designing two-glass optical systems, e.g., lens systems, catadioptric systems and prism systems, in which color correction at three or more wavelengths is required. Any color-corrected optical system designed using the glass selection procedure described above would therefore be within the scope of the present invention.

Extention of Theory to Include Optical Systems Comprising More Than Two Glasses Considering an optical multiplet comprising k thin lens elements in contact made from q different types of glasses, where $k \geq q$, and where the multiplet is color-corrected at n wavelengths, the power series expansion in Buchdahl's dispersion equation (5) is approximated by an (n−1)th degree polynomial in the color coordinate $\omega$. Thus, in equation (7), the terms higher than the (n−1)th degree term are neglected, so that the dispersive power $D_q(\lambda)$ for each glass q of the multiplet can be expressed as $$D_q(\lambda) = \sum_{i=1}^{n-1} \eta_{iq} \, \omega^i, \tag{105}$$

where the dispersion coefficients $\eta_{iq}$ in general vary from glass to glass. Using this (n−1)th degree polynomial dispersion model, each glass of the multiplet can be represented by the parameters $n_q(\lambda_O)$, $\eta_{1q}, \eta_{2q}, \ldots, \eta_{(n-1)q}$, where $N_q(\lambda_O)$ is the refractive index of the qth glass at the base wavelength $\lambda_O$.

Similarly, the difference in the dispersive power over a wavelength range $\lambda_1 < \lambda < \lambda_2$ for each glass q, represented by $D_q(\lambda_1, \lambda_2) = D_q(\lambda_1) - D_q(\lambda_2)$, can be expressed in terms of the color coordinate $\omega$ by the power series $$D_q(\lambda_1, \lambda_2) = \sum_{i=1}^{n-1} \eta_{iq} [\omega^i(\lambda_1) - \omega^i(\lambda_2)]. \tag{106}$$

It is noted than an $[N_q(\lambda_O), \nu_{1q}, \nu_{2q}, \ldots, \nu_{(n-1)q}]$ glass parameter representation could be used instead of the $[N_q(\lambda_O), \eta_{1q}, \eta_{2q}, \ldots, \eta_{(n-1)q}]$ glass parameter representation. However, since the dioptric power of each lens element in the multiplet at $\lambda_O$ is directly proportional to $[N(\lambda_O)-1]$, which is used in defining the $\eta$-dispersion coefficients, the $\eta$ dispersion coefficients generally lead to more compact and simpler algebraic formulations than the $\nu$ dispersion coefficients, and are thus more desirable for rigorous mathematical analysis.

Algorithms for Determining Dispersion Coefficients

The dispersion coefficients $\eta_{iq}$ for the various types of glasses listed in the catalogs of the major optical glass manufactures can be calculated using either equation (105) or equation (106).

Since the dispersive power $D_q(\lambda)$ for a particular optical glass q at any wavelength $\lambda$ can be calculated from $$D_q(\lambda) = \frac{N_q(\lambda) - N_q(\lambda_0)}{N_q(\lambda_0) - 1} \tag{107}$$

using data provided in the manufacturer's catalog for that particular glass, it is possible to form a system of (n−1) equations that are linear in the dispersion coefficients $\eta_{iq}$ derived from equations (105) and (107), where the (n−1) equations correspond to (n−1) different wavelengths that are all different from the base wavelength $\lambda_O$. For each glass q, this system of nonhomogeneous linear equations can be written in matrix form as $$\overline{\Omega} \, \overline{\eta}_q = \overline{D}_q, \tag{108}$$

where $$\overline{\Omega} = \begin{bmatrix} \omega_1 & \omega_1^2 & \omega_1^3 & \ldots & \omega_1^{n-1} \\ \omega_2 & \omega_2^2 & \omega_2^3 & \ldots & \omega_2^{n-1} \\ \cdot & \cdot & & \ldots & \cdot \\ \cdot & \cdot & & \ldots & \cdot \\ \cdot & \cdot & & \ldots & \cdot \\ \omega_{n-1} & \omega_{n-1}^2 & \omega_{n-1}^3 & \ldots & \omega_{n-1}^{n-1} \end{bmatrix},$$

$$\overline{\eta}_q = \begin{bmatrix} \eta_{1q} \\ \eta_{2q} \\ \cdot \\ \cdot \\ \cdot \\ \eta_{(n-1)q} \end{bmatrix}$$

and $$\overline{D}_q = \begin{bmatrix} D_q(\lambda_1) \\ D_q(\lambda_2) \\ \cdot \\ \cdot \\ \cdot \\ D_q(\lambda_{n-1}) \end{bmatrix}.$$

It is a property of equation (108) that the matrix $\overline{\Omega}$ of the color coordinates $\omega$ can be expressed as the product of two square matrices of order (n−1), where one of the factors is a diagonal matrix and the other is a Vandermonde matrix. In factored form, the matrix $\overline{\Omega}$ can be written $$\overline{\Omega} = \text{Diag}(\omega_1, \omega_2, \omega_3, \ldots, \omega_{n-1}) \, \overline{V}(\omega_1, \omega_2, \omega_3, \ldots, \omega_{n-1}), \tag{109}$$

where $$\overline{V} = \begin{bmatrix} 1 & \omega_1 & \omega_1^2 & \omega_1^3 & \ldots & \omega_1^{n-2} \\ 1 & \omega_2 & \omega_2^2 & \omega_2^3 & \ldots & \omega_2^{n-2} \\ 1 & \omega_3 & \omega_3^2 & \omega_3^3 & \ldots & \omega_3^{n-2} \\ . & . & . & & \ldots & . \\ . & . & . & & \ldots & . \\ . & . & . & & \ldots & . \\ 1 & \omega_{n-1} & \omega_{n-1}^2 & \omega_{n-1}^3 & \ldots & \omega_{n-1}^{n-2} \end{bmatrix}$$

The determinant of $\overline{\Omega}$ is equal to the product of the determinants of its factors. Thus, $$det \, \overline{\Omega} = \left( \prod_{i=1}^{n-1} \omega_i \right) \prod_{1 \leq i < j \leq (n-1)} (\omega_j - \omega_i), \qquad (110)$$

where $\Pi$ is the product symbol.

For a given selection of the base wavelength $\lambda_O$ and $(n-1)$ wavelengths $\lambda_j$, where $\lambda_j \neq \lambda_O$ and $j=1, 2, \ldots, (n-1)$, the corresponding color coordinates $\omega_j$, where $j=1, 2, \ldots, (n-1)$, are distinct and not equal to zero. This implies that the values of the determinants of the factors of $\overline{\Omega}$ can never be zero. Thus, $\overline{\Omega}$ is a nonsingular matrix with rank equal to its order. This further implies that equation (108) has a unique solution, and that the set of values of the dispersion coefficients $\eta_{iq}$ for the glasses from which the lens elements comprising the multiplet are made is unique relative to the n wavelengths $\lambda_j$.

According to the generalized algorithm, therefore, the $(n-1)$th degree polynomial as defined by equation (105) is equivalent to a polynomial fit of the dispersive power $D_q(\lambda)$ of the optical glasses for $(n-1)$ wavelengths $\lambda_j$ relative to the base wavelength $\lambda_O$. The $(n-1)$ wavelengths $\lambda_j$ can be selected to be the particular wavelengths for which color correction is required, i.e., the wavelengths for which the multiplet is designed to have a common focus.

An alternative algorithm for obtaining a set of $(n-1)$ dispersion coefficients $\eta_{iq}$ characterizing the dispersion properties of an optical glass can be developed using equation (106) for the dispersive power differences relative to wavelength pairs. For each glass, n values of its refractive index at n different wavelengths $\lambda_j$, where $j=1, 2, \ldots, n$, are selected from the manufacturer's catalog. Assuming that $\lambda_j \neq \lambda_O$, and that $\lambda_1 < \lambda_2 < \ldots < \lambda_{n-1} < \lambda_n$, a system of $(n-1)$ nonhomogeneous equations that are linear in the glass dispersion coefficients is obtained, from which the values of $\eta_{iq}$ are calculated. This system of equations can be written in matrix form as $$\overline{\Delta\Omega} \, \overline{\eta}_q = \overline{\Delta D}_q, \qquad (111)$$

where $$\overline{\Delta\Omega} = \begin{bmatrix} (\omega_1 - \omega_2) & (\omega_1^2 - \omega_2^2) & \ldots & (\omega_1^{n-1} - \omega_2^{n-1}) \\ (\omega_2 - \omega_3) & (\omega_2^2 - \omega_3^2) & \ldots & . \\ . & . & \ldots & . \\ . & . & \ldots & . \\ . & . & \ldots & . \\ (\omega_{n-1} - \omega_n) & (\omega_{n-1}^2 - \omega_n^2) & \ldots & (\omega_{n-1}^{n-1} - \omega_n^{n-1}) \end{bmatrix},$$

$$\overline{\eta}_q = \begin{bmatrix} \eta_{1q} \\ \eta_{2q} \\ . \\ . \\ . \\ \eta_{(n-1)q} \end{bmatrix}$$

and $$\overline{\Delta D}_q = \begin{bmatrix} D_q(\lambda_1,\lambda_2) \\ D_q(\lambda_2,\lambda_3) \\ . \\ . \\ . \\ D_q(\lambda_{n-1},\lambda_n) \end{bmatrix}.$$

This system of equations represented by the matrix equation (111) is different from the system of equations represented by the matrix equation (108) obtained using the first algorithm described above. In general, the dispersion coefficients obtained from equation (111) have values that are slightly different from the dispersion coefficients obtained from equation (108) for the same types of glasses. This second algorithm using equation (111) may be viewed as a polynomial fit of the dispersive power differences of the glasses in terms of $(n-1)$ wavelength pairs, rather than as a polynomial fit of the dispersive powers in terms of $(n-1)$ wavelengths as in the first algorithm using equation (108).

Dioptric Powers of Lens Elements

Considering an optical multiplet comprising k cemented thin lens elements in air, where the thin lens elements are made from q different types of glasses, where $k \geq q$, the total dioptric power $\Phi$ of the multiplet at the base wavelength $\lambda_0$ is equal to the sum of the dioptric powers of the individual thin lens elements at the same base wavelength $\lambda_0$. Thus, $$\Phi(\lambda_0) = \sum_{i=1}^{q} \phi_i, \qquad (112)$$

where $\Phi_i$ represents the subtotal dioptric power of the group of lens elements made of the same ith type of glass. For a multiplet of unit total dioptric power at $\lambda_0$ and color-corrected at n wavelengths $\lambda_j (J=1, 2, \ldots, n)$, the subtotal dioptric powers $\Phi_i$ at $\lambda_0$ are related by the expressions $$\phi_1 + \phi_2 + \ldots + \phi_i + \ldots + \phi_q = 1 \qquad (113)$$

and $$\Delta\Phi(\lambda_1, \lambda_2) = \Delta\Phi(\lambda_2, \lambda_3) = \ldots = \Delta\Phi(\lambda_{n-1}, \lambda_n) = 0, \quad (114)$$

where $$\Delta\Phi(\lambda_{n-1}, \lambda_n) = \sum_{i=1}^{q} \phi_i D_i(\lambda_{n-1}, \lambda_n). \quad (115)$$

In matrix form, equations (113) and (114) can be represented as $$\overline{G}\,\overline{\Phi} = \hat{e}_1, \quad (116)$$

where $$\overline{G} = \begin{bmatrix} 1 & 1 & \ldots & 1 \\ D_1(\lambda_1,\lambda_2) & D_2(\lambda_1,\lambda_2) & \ldots & D_q(\lambda_1,\lambda_2) \\ D_1(\lambda_2,\lambda_3) & D_2(\lambda_2,\lambda_3) & \ldots & D_q(\lambda_2,\lambda_3) \\ \cdot & \cdot & \ldots & \cdot \\ \cdot & \cdot & \ldots & \cdot \\ \cdot & \cdot & \ldots & \cdot \\ D_1(\lambda_{n-1},\lambda_n) & D_2(\lambda_{n-1},\lambda_n) & \ldots & D_q(\lambda_{n-1},\lambda_n) \end{bmatrix},$$

$$\overline{\Phi} = \begin{bmatrix} \phi_1 \\ \phi_2 \\ \phi_3 \\ \cdot \\ \cdot \\ \phi_q \end{bmatrix}$$

and $$\hat{e}_1 = \begin{bmatrix} 1 \\ 0 \\ 0 \\ 0 \\ \cdot \\ \cdot \\ 0 \end{bmatrix}.$$

A unique solution of equation (116) exists, if the determinant of the $\overline{G}$ is not equal to zero. From equation (111), the $\overline{G}$ matrix can be written in terms of the dispersion coefficients $\eta_{iq}$ and the color coordinates $\omega_q$ of the glasses. Expressing $\overline{G}$ as the product of two matrices, $$\overline{G} = \begin{bmatrix} 1 & 0 \\ 0 & \Delta\Omega \end{bmatrix} \begin{bmatrix} \overline{S} \\ \overline{\eta} \end{bmatrix}, \quad (117)$$

where $\overline{S} = (1, 1, \ldots, 1)$ is a sum vector (i.e., a vector having unity as a value for each component) of order q, and $\eta$ is an "(n−1) by q" matrix in the dispersion coefficients given by $$\overline{\eta} = \begin{bmatrix} \eta_{11} & \eta_{12} & \ldots & \eta_{1q} \\ \eta_{21} & \eta_{22} & \ldots & \eta_{2q} \\ \cdot & \cdot & \ldots & \cdot \\ \cdot & \cdot & \ldots & \cdot \\ \cdot & \cdot & \ldots & \cdot \\ \eta_{(n-1)1} & \eta_{(n-1)2} & \ldots & \eta_{(n-1)q} \end{bmatrix},$$

and where $\overline{\Delta\Omega}$ is the matrix defined above by equation (111), and the $\overline{0}$ matrices are null matrices of order (n−1).

Two particular cases are of special interest in considering the dioptric power distribution of the lens elements, or subgroups of lens elements, of a color-corrected multiplet made of different types of glasses, viz., the case where n=q, and the case where n>q.

For the case where n=q, equation (116) represents a system of q equations that are linear in the unknown powers $\phi_i$ (i=1, 2, ..., q). Since the number of equations is equal to the number of unknowns when n=q, a unique solution of equation (116) exists when the determinant of $\overline{G}$ is not equal to zero. The dioptric powers $\phi_i$ can then readily be calculated by using Cramer's Rule, or any of a number of other methods for solving systems of linear equations.

When $\overline{G}$ is written as the product of two matrices as in equation (117), the determinant of $\overline{G}$ is equal to the product of the determinants of its factors. Thus, $$\det \overline{G} = \det \overline{\Delta\Omega} \det \begin{bmatrix} \overline{S} \\ \overline{\eta} \end{bmatrix}, \quad (118)$$

where $$\det \begin{bmatrix} \overline{S} \\ \overline{\eta} \end{bmatrix} = \begin{vmatrix} 1 & 1 & \ldots & 1 \\ \eta_{11} & \eta_{12} & \ldots & \eta_{1n} \\ \eta_{21} & \eta_{22} & \ldots & \eta_{2n} \\ \cdot & \cdot & \ldots & \cdot \\ \cdot & \cdot & \ldots & \cdot \\ \cdot & \cdot & \ldots & \cdot \\ \eta_{(n-1)1} & \eta_{(n-1)2} & \ldots & \eta_{(n-1)n} \end{vmatrix} \neq 0. \quad (119)$$

By Cramer's Rule, the dioptric powers $\phi_i$ can be expressed as $$\phi_i = \det \overline{M}_i / \det \overline{G} \quad (120)$$

for i=1, 2, 3, ..., n, where $\overline{M}_i$ is the matrix obtained from $\overline{G}$ by replacing the ith column of $\overline{G}$ by the unit column vector $\hat{e}_1$.

In terms of the dispersion coefficients $\eta_{iq}$ of the glasses, the matrix $\overline{M}_i$ can be written as the product of two matrices $$\overline{M}_i = \begin{bmatrix} 1 & \overline{0} \\ \overline{0} & \overline{\Delta\Omega} \end{bmatrix} \begin{bmatrix} \overline{S} \\ \overline{\eta}_i \end{bmatrix}, \quad (121)$$

where $\overline{\eta}_i$ is the matrix obtained from the dispersion coefficients matrix $\overline{\eta}$ when the ith column of $\overline{\eta}$ is replaced by a null column vector. Since $$\det \overline{M}_i = \det \overline{\Delta\Omega} \det \left[\frac{\overline{S}}{\overline{\eta}_i}\right], \quad (122)$$

equation (120) becomes $$\phi_i = \det \left[\frac{\overline{S}}{\overline{\eta}_i}\right] / \det \left[\frac{\overline{S}}{\overline{\eta}}\right], \quad (123)$$

where the matrix $$\left[\frac{\overline{S}}{\overline{\eta}_i}\right]$$

is obtainable from $$\left[\frac{\overline{S}}{\overline{\eta}}\right]$$

by replacing the ith column of $$\left[\frac{\overline{S}}{\overline{\eta}}\right]$$

with the unit column vector $\hat{e}_1$. Thus, $$\left[\frac{\overline{S}}{\overline{\eta}_i}\right] = \begin{bmatrix} 1 & 1 & \cdots & 0 & 1 & \cdots & 1 \\ \eta_{11} & \eta_{12} & \cdots & 0 & \eta_{1(i+1)} & \cdots & \eta_{1n} \\ \eta_{21} & \eta_{22} & \cdots & 0 & \eta_{2(i+1)} & \cdots & \eta_{2n} \\ \cdot & \cdot & \cdots & \cdot & \cdot & \cdots & \cdot \\ \cdot & \cdot & \cdots & \cdot & \cdot & \cdots & \cdot \\ \cdot & \cdot & \cdots & \cdot & \cdot & \cdots & \cdot \\ \eta_{(n-1)1} & \eta_{(n-1)2} & \cdots & 0 & \eta_{(n-1)(i+1)} & \cdots & \eta_{(n-1)n} \end{bmatrix} \quad (124)$$

The determinant of $$\left[\frac{\overline{S}}{\overline{\eta}_i}\right],$$

when expanded in terms of the elements of the ith column and its cofactors, yields $$\det \left[\frac{\overline{S}}{\overline{\eta}_i}\right] = (-1)^{1+i} \det \overline{\eta}_{i(0)}, \quad (125)$$

where $\overline{\eta}_{i(0)}$ is a square matrix of order $(n-1)$, which is obtained from the rectangular matrix $\overline{\eta}$ by deleting the ith column vector of $\overline{\eta}$.

The determinant of $$\left[\frac{\overline{S}}{\overline{\eta}}\right],$$

when expanded in terms of the elements of its first row and its cofactors, yields $$\det \left[\frac{\overline{S}}{\overline{\eta}}\right] = \sum_{j=1}^{n} (-1)^{1+j} \det \overline{\eta}_{j(0)}. \quad (126)$$

Combining equations (125) and (126) with equation (123) yields $$\phi_i = \frac{(-1)^{1+i} \det \overline{\eta}_{i(0)}}{\sum_{j=1}^{n} (-1)^{1+j} \det \overline{\eta}_{j(0)}}, \quad (127)$$

which expresses the dioptric powers $\phi_i$ of the lens elements, or groups of lens elements, in the multiplet as functions of the dispersion coefficients of the various types of glasses from which the lens elements are made.

Dioptric Powers of Two-Glass Lens Multiplet

In the simple case of a two-glass lens multiplet color-corrected at two wavelengths, i.e., where $q=n=2$, the dispersion model is linear and the $\overline{\eta}$ matrix in equation (117) reduces to $\overline{\eta} = [\eta_{11} \ \eta_{12}]$. Thus, $\overline{\eta}_{1(0)} = [\eta_{12}]$ and $\overline{\eta}_{2(0)} = [\eta_{11}]$, so that the dioptric powers $\phi_i$ ($i=1, 2$) for the two glasses, as given by equation (127), are $$\phi_1 = \frac{-\eta_{12}}{\eta_{11} - \eta_{12}} \quad (128)$$

and $$\phi_2 = \frac{\eta_{11}}{\eta_{11} - \eta_{12}}. \quad (129)$$

Equation (128) and (129) are thus seen to be identical to equations (28) and (29) derived above for the case of a two-glass doublet whose total power is equal to unity at the base wavelength.

Dioptric Powers of Three-Glass Lens Multiplet

It is convenient to treat a three-glass lens multiplet as a quasi-triplet (i.e., $q=3$) in which each effective lens element comprises all the individual lens elements of the multiplet made from one particular type of glass. A particular case of interest is a three-glass triplet color-corrected at three wavelengths (i.e., $k=q=n=3$), for which the dispersion model is quadratic, so that the $\overline{\eta}$ matrix in equation (117) assumes the form $$\overline{\eta} = \begin{bmatrix} \eta_{11} & \eta_{12} & \eta_{13} \\ \eta_{21} & \eta_{22} & \eta_{23} \end{bmatrix}. \quad (130)$$

From equation (130), the submatrices $\overline{\eta}_{1(0)}$, $\overline{\eta}_{2(0)}$ and $\overline{\eta}_{3(0)}$ reduce to $$\overline{\eta}_{1(0)} = \begin{bmatrix} \eta_{12} & \eta_{13} \\ \eta_{22} & \eta_{23} \end{bmatrix}, \overline{\eta}_{2(0)} = \begin{bmatrix} \eta_{11} & \eta_{13} \\ \eta_{21} & \eta_{23} \end{bmatrix}$$

and $$\overline{\eta}_{3(0)} = \begin{bmatrix} \eta_{11} & \eta_{12} \\ \eta_{21} & \eta_{22} \end{bmatrix},$$

which when substituted into equation (127) yield the dioptric powers $$\phi_1 = (\eta_{12}\eta_{23} - \eta_{22}\eta_{13})/d \tag{131}$$

$$\phi_2 = -(\eta_{11}\eta_{23} - \eta_{21}\eta_{13})/d \tag{132}$$

$$\phi_3 = (\eta_{11}\eta_{12} - \eta_{21}\eta_{12})/d, \tag{133}$$

where $$d = \sum_{j=1}^{3} (-1)^{1+j} \det \overline{\eta}_{j(0)},$$

i.e., $$d = \eta_{11}(\eta_{22} - \eta_{33}) + \eta_{12}(\eta_{23} - \eta_{21}) + \eta_{13}(\eta_{21} - \eta_{22}).$$

Four-Glass Lens Multiplet

Another particular case of interest is a four-glass lens quadruplet that is color-corrected at four wavelengths, i.e., k=q=n=4. Such a quadruplet was called a superachromatic quadruplet by N. v. d. W. Lessing in Appl. Opt. 9, 2390 (1970). Although various combinations of four different types of optical glasses suitable for designing such superachromatic quadruplets were reported in the prior art, a general technique for identifying all the optical materials that could be used for designing such superachromatic quadruplets was not developed until the present invention.

In accordance with the present invention, a cubic dispersion model is used to select glasses for designing a superachromatic quadruplet. Accordingly, the $\overline{\eta}$ matrix in equation (117) assumes the form $$\overline{\eta} = \begin{bmatrix} \eta_{11} & \eta_{12} & \eta_{13} & \eta_{14} \\ \eta_{21} & \eta_{22} & \eta_{23} & \eta_{24} \\ \eta_{31} & \eta_{32} & \eta_{33} & \eta_{34} \end{bmatrix}, \tag{134}$$

from which the submatrices $\overline{\eta}_{j(0)}$ are obtained, and the dioptric power distributions $\phi_i$ (i=1, 2, 3, 4) are calculated from equation (127).

Although lens multiplets comprising q different types of optical glasses color-corrected at n=q wavelengths were known in the prior art for q=2, 3, 4, the method of the present invention whereby suitable optical materials for designing such multiplets can be identified by expressing the dispersion characteristics of the optical materials in terms of $\eta$-dispersion coefficients is completely novel. Furthermore, it is also a novel feature of the present invention that the practicality of using any particular combination of optical materials to design a lens multiplet can be determined a priori by expressing the dioptric powers of the individual lens elements of the multiplet as functions of the $\eta$-dispersion coefficients of the optical materials selected for making the lens elements.

Special Case for n>q

Equation (116), $\overline{G}\Phi = \hat{e}_1$, represents a system of n equations that are linear in the unknown dioptric powers $\phi_i$ (i=1, 2, ..., q). For the case where n>q, the number of equations would be greater than the number of unkowns. For k=q=2, i.e., for a two-glass doublet color-corrected at n wavelengths, equation (116) becomes $$\begin{bmatrix} 1 & 1 \\ D_1(\lambda_1,\lambda_2) & D_2(\lambda_1,\lambda_2) \\ D_1(\lambda_2,\lambda_3) & D_2(\lambda_2,\lambda_3) \\ \cdot & \cdot \\ \cdot & \cdot \\ \cdot & \cdot \\ D_1(\lambda_{n-1},\lambda_n) & D_2(\lambda_{n-1},\lambda_n) \end{bmatrix} \begin{bmatrix} \phi_1 \\ \phi_2 \end{bmatrix} = \begin{bmatrix} 1 \\ 0 \\ 0 \\ \cdot \\ \cdot \\ \cdot \\ 0 \end{bmatrix}, \tag{135}$$

which is the matrix equation equivalent of equations (47) and (48) for a two-glass n-color lens doublet.

In general, for a lens multiplet made of q different types of glasses, the matrix $\overline{D}$ in equation (48) is an "(n−1)×q" rectangular matrix in $D_q(\lambda_{j-1},\lambda_j)$. The conditions that must be satisfied by the individual glasses are obtained in the same way as for the doublet case, i.e., by examining the rank of the matrix $\overline{D}$. Thus, a set of q glasses could be used for designing a lens multiplet that is color-corrected at n wavelengths, if and only if the rank of the matrix $\overline{D}$ for that set of glasses is less than q.

Special Case for n=q+1

An interesting special case, which is instructive in describing the invention, is a lens multiplet comprising q different types of optical glasses color-corrected at q+1 wavelengths. For this case, equation (116) becomes $$\begin{bmatrix} 1 & 1 & \cdots & 1 \\ D_1(\lambda_1,\lambda_2) & D_2(\lambda_1,\lambda_2) & \cdots & D_q(\lambda_1,\lambda_2) \\ D_1(\lambda_2,\lambda_3) & D_2(\lambda_2,\lambda_3) & \cdots & D_q(\lambda_2,\lambda_3) \\ \cdot & \cdot & \cdots & \cdot \\ \cdot & \cdot & \cdots & \cdot \\ \cdot & \cdot & \cdots & \cdot \\ D_1(\lambda_q,\lambda_{q+1}) & D_2(\lambda_q,\lambda_{q+1}) & \cdots & D_q(\lambda_q,\lambda_{q+1}) \end{bmatrix} \begin{bmatrix} \phi_1 \\ \phi_2 \\ \cdot \\ \cdot \\ \cdot \\ \phi_q \end{bmatrix} = \begin{bmatrix} 1 \\ 0 \\ 0 \\ \cdot \\ \cdot \\ \cdot \\ 0 \end{bmatrix} \tag{136}$$

Equation (136) is equivalent to the sets of equations $$\phi_1 + \phi_2 + \cdots + \phi_q = 1 \tag{137}$$

and $$\overline{D}\Phi = \overline{0}, \tag{138}$$

where $$\overline{D} = \begin{bmatrix} D_1(\lambda_1,\lambda_2) & D_2(\lambda_1,\lambda_2) & \cdots & D_q(\lambda_1,\lambda_2) \\ D_1(\lambda_2,\lambda_3) & D_2(\lambda_2,\lambda_3) & \cdots & D_q(\lambda_2,\lambda_3) \\ \cdot & \cdot & \cdots & \cdot \\ \cdot & \cdot & \cdots & \cdot \\ \cdot & \cdot & \cdots & \cdot \\ D_1(\lambda_q,\lambda_{q+1}) & D_2(\lambda_q,\lambda_{q+1}) & \cdots & D_q(\lambda_q,\lambda_{q+1}) \end{bmatrix},$$

$$\overline{\Phi} = \begin{bmatrix} \phi_1 \\ \phi_2 \\ \cdot \\ \cdot \\ \cdot \\ \phi_q \end{bmatrix}$$

and $\overline{0}$ is a null column vector of order q.

In terms of the chromatic coordinates and the dispersion coefficients of the glasses, the homogeneous matrix equation (138) can be written as $$\overline{\Delta\Omega}\overline{\eta}\overline{\Phi} = \overline{0}, \tag{139}$$

where $\overline{\Delta\Omega}$ is defined as in equation (111), and $\overline{\eta}$ is the matrix of the dispersion coefficients as defined in equation (117). Both $\overline{\Delta\Omega}$ and $\overline{\eta}$ are square matrices of order q. The matrix $\overline{\Delta\Omega}$ is nonsingular, so that equation (139) reduces to $$\overline{\eta}\overline{\Phi} = \overline{0}. \tag{140}$$

In order for equation (140) to have a nontrivial solution, it is necessary that the determinant of $\overline{\eta}$ vanish, i.e., that $$\begin{vmatrix} \eta_{11} & \eta_{12} & \cdots & \eta_{1q} \\ \eta_{21} & \eta_{22} & \cdots & \eta_{2q} \\ \eta_{31} & \eta_{32} & \cdots & \eta_{3q} \\ \cdot & \cdot & \cdots & \cdot \\ \cdot & \cdot & \cdots & \cdot \\ \cdot & \cdot & \cdots & \cdot \\ \eta_{q1} & \eta_{q2} & \cdots & \eta_{qq} \end{vmatrix} = 0. \tag{141}$$

Thus, equation (141) represents the condition that must be satisfied by the $\eta$-dispersion coefficients of the q different types of glasses used in designing the lens multiplet in order for the multiplet to be color-corrected at q+1 wavelengths.

The general solution of the homogeneous equation (140) is $$\phi_j = \alpha N_{ij} \tag{142}$$

for j = 1, 2, . . . q, where $\alpha$ is an arbitrary constant and the $N_{ij}$ are the cofactors of the elements of the ith row of the $\overline{\eta}$ matrix. The constant $\alpha$ can be chosen to normalize the total dioptric power of the lens multiplet at the base wavelength $\lambda_0$. Substituting equation (142) into equation (137) yields $$\alpha = 1 / \sum_{j=1}^{q} N_{ij}. \tag{143}$$

The set of equations (142) and (143) enables the dioptric powers of the q different groups of lens elements corresponding to the q different types of glasses used in making the lens multiplet to be determined, where the lens multiplet is color-corrected at q+1 wavelengths. The above analysis for the case where $n = q+1$ holds true in the particular case where there is only one lens element in each of the groups of lens elements, i.e., where k=q.

When k=2, where k=q, there are only two lens elements, with each lens element being made of a different type of glass. Thus, equation (141) reduces to equation (37), and equation (142) reduces to equations (41) and (42), which were derived above for the case of a two-glass lens doublet color-connected at three wavelengths.

When k=3, where k=q, the resulting lens multiplet is a three-glass triplet. In the case under consideration, the lens multiplet color-corrected at n+q+1 wavelengths becomes a three-glass lens triplet color-corrected at four wavelengths, for which the designation "superachromat" was used by Herzberger in U.S. Pat. No. 3,395,962. The present invention provides a technique for identifying all possible glass combinations that could be used in designing such superachromatic lens triplets, and for selecting practical three-glass combinations in terms of dioptric power distributions.

For k=q=3, equation (141) reduces to $$\begin{vmatrix} \eta_{11} & \eta_{12} & \eta_{13} \\ \eta_{21} & \eta_{22} & \eta_{23} \\ \eta_{31} & \eta_{32} & \eta_{33} \end{vmatrix} = 0, \tag{144}$$

and the dioptric powers of the individual lens elements, as given by equation (142), become $$\phi_1 = \alpha_1(\eta_{12}\eta_{23} - \eta_{22}\eta_{13}) \tag{145}$$

$$\phi_2 = -\alpha_1(\eta_{11}\eta_{23} - \eta_{21}\eta_{13}) \tag{146}$$

$$\phi_3 = \alpha_1(\eta_{11}\eta_{22} - \eta_{21}\eta_{12}), \tag{147}$$

where $$\alpha_1 = 1/[\eta_{11}(\eta_{22} - \eta_{23}) + \eta_{12}(\eta_{23} - \eta_{21}) + \eta_{13}(\eta_{21} - \eta_{22})].$$

The expressions for the dioptric powers $\phi_1$, $\phi_2$ and $\phi_3$ given in equations (145), (146) and (147) are identical to those in equations (131), (132) and (133) for the case of a three-glass lens triplet color-corrected at three wavelengths. However, a three-glass lens triplet color-corrected at four wavelengths must satisfy the additional conditions implied in equation (144). The conditions of equation (144) can be interpreted geometrically by considering each glass available to the designer as a unique point in a three-dimensional glass space defined by the axes $\eta_1$, $\eta_2$ and $\eta_3$. Three glasses, represented by the points $G_1$, $G_2$ and $G_3$, satisfy the conditions of equation (144), if and only if $G_1$, $G_2$ and $G_3$ lie in a common plane that passes through the origin of the coordinate system.

Applying a series of elementary row and column operations to the matrix of equation (144) results in $$\begin{vmatrix} \eta_{11}/\eta_{31} & \eta_{12}/\eta_{32} & \eta_{13}/\eta_{33} \\ \eta_{21}/\eta_{31} & \eta_{21}/\eta_{32} & \eta_{31}/\eta_{33} \\ 1 & 1 & 1 \end{vmatrix} = 0. \tag{148}$$

Defining $\mu_1 = \eta_1/\eta_3$ and $\mu_2 = \eta_2/\eta_3$, so that $\mu_{1k} = \eta_{1k}/\eta_{3k}$ and $\mu_{2k} = \eta_{2k}/\eta_{3k}$ for k=1, 2, 3, the parameters $\mu_1$ and $\mu_2$ can be considered as axes of a two-dimensional rectangular coordinate system into which the three-dimensional coordinate system defined by the axes $\eta_1$, $\eta_2$ and $\eta_3$ is transformed. Equation (148) implies that when the various optical materials available to the designer are plotted as points in the two-dimensional coordinate system with axes $\mu_1$ and $\mu_2$, the glass points $G_1(\mu_{11}, \mu_{21})$, $G_2(\mu_{12}, \mu_{22})$ and $G_3(\mu_{13}, \mu_{23})$ are collinear. This two-dimensional geometrical representation of the glasses in $(\mu_1, \mu_2)$ space is more convenient than the three-dimensional representation in $(\eta_1, \eta_2, \eta_3)$ space. With the aid of a digital computer, it is relatively easy to obtain the coordinates for the glasses in $(\mu_1,\mu_2)$ space from the known values of the n-dispersion coefficients of the optical materials in $(\eta_1, \eta_2, \eta_3)$ space.

When $k=4$, where $k=q$, the resulting lens multiplet is a four-glass quadruplet. The case under consideration of a lens multiplet color-corrected at $n=q+1$ wavelengths becomes a four-glass lens quadruplet color-corrected at five wavelengths. The dispersion model is quartic, and equation (141) becomes $$\begin{vmatrix} \eta_{11} & \eta_{12} & \eta_{13} & \eta_{14} \\ \eta_{21} & \eta_{22} & \eta_{23} & \eta_{24} \\ \eta_{31} & \eta_{32} & \eta_{33} & \eta_{34} \\ \eta_{41} & \eta_{42} & \eta_{43} & \eta_{44} \end{vmatrix} = 0. \qquad (149)$$

Equation (149) expresses the conditions that must be satisfied by a set of four optical materials in order for those four optical materials to be compatible with each other for use in designing a five-color lens quadruplet. The dioptric powers of the optical materials selected for designing the five-color lens quadruplet can be calculated from equation (142).

Geometrically, equation (149) implies that if each optical material available to the designer is represented by a unique point in a four-dimensional n-dispersion coefficient space with rectangular coordinate axes $\eta_1$, $\eta_2$, $\eta_3$ and $\eta_4$, the glass points $G_1$, $G_2$, $G_3$ and $G_4$ must lie in a common hyperplane that passes through the origin of the coordinate system.

A more easily visualizable geometrical interpretation of equation (149) can be obtained by applying a series of elementary row and column operations to the matrix of equation (149), which results in the transformed equation $$\begin{vmatrix} \mu_{11} & \mu_{12} & \mu_{13} & \mu_{14} \\ \mu_{21} & \mu_{22} & \mu_{23} & \mu_{24} \\ \mu_{31} & \mu_{32} & \mu_{33} & \mu_{34} \\ 1 & 1 & 1 & 1 \end{vmatrix} = 0, \qquad (150)$$

where $\mu_{1k}=\eta_{1k}/\eta_{4k}$, $\mu_{2k}=\eta_{2k}/\beta_{4k}$ and $\mu_{3k}=\eta_{3k}/\eta_{4k}$ for $k=1, 2, 3, 4$.

It is noted that the definition of the parameter $\mu_{ik}$ ($i=1, 2, 3$) for the case of a four-glass five-color lens quadruple is different from the definition of the parameter $\mu_i$ ($i=1, 2$) introduced above for the case of a three-glass four-color lens triplet.

Equation (150) implies that if each optical material available to the designer is represented by a unique point in a three-dimensional rectangular coordinate system with axes $\mu_1$, $\mu_2$ and $\mu_3$, the four glasses with coordinates $(G_1(\mu_{11},\mu_{21},\mu_{31})$, $G_2$ $(\mu_{12},\mu_{22}, \mu_{32})$, $G_3(\mu_{13},\mu_{23}, \mu_{33})$ and $G_4(\mu_{14},\mu_{24},\mu_{34})$ must be collinear in the three-dimensional $(\mu_1, \mu_2,\mu_3)$ space in order to be suitable for designing a four-glass five-color lens quadruplet. With the aid of a digital computer, it is relatively easy to obtain the coordinates of the optical materials in the three dimensional $(\mu_1,\mu_2, \mu_3)$ space from the known values of the $\eta$-dispersion coefficients of those materials in the four dimensional $(\eta_1, \eta_2, \eta_3, \eta_4)$ space.

Method for Selecting Three Compatible Glasses

In selecting a combination of three different optical materials for designing a "three-glass" multiplet (i.e., an optical system made of three different optical materials, whether of glass or otherwise) that is color-corrected at four wavelengths, it is more convenient to use a two-dimensional glass point representation in $(\mu_1,\mu_2)$ space rather than a three-dimensional glass point representation in $(\eta_1,\eta_2,\eta_3)$ space for each of the available optical materials.

The selection process starts with the choice of a particular optical material represented by glass point $G_1$ $(\mu_{11},\mu_{21})$. The origin of the coordinate system defined by the axes $\mu_1$ and $\mu_2$ is then translated to $G_1$, so that the "new" axes $\mu_1'$ and $\mu_2'$ (i.e., the axes after translation) are parallel to the original axes $\mu_1$ and $\mu_2$, respectively. The coordinates of each optical material are then expressed in terms of the translated axes $\mu_1'$ and $\mu_2'$, so that $G_k(\mu_{1k},\mu_{2k})$ is expressed as $G_k'(\mu_{1k}',\mu_{2k}')$, where $$\left.\begin{array}{l}\lambda_{1k}' = \mu_{1k} - \mu_{11} \\ \mu_{2k}' = \mu_{2k} - \mu_{21}\end{array}\right\}, \qquad (151)$$

which are the equations for transformation of coordinates.

The equation of a straight line through the origin $G_1'(0,0)$ of the transformed coordinate system defined by the translated axes $\mu_1'$ and $\mu_2'$ is given by $\mu_2'=m' \mu_1'$, where m' is the slope of the line referred to the translated axes. Thus, a straight line passing through $G_1'(0,0)$ and a glass point $G_k'(\mu_{1k}',\mu_{2k}')$ has a slope $$m' = \mu_{2k}'/\mu_{1k}', \qquad (152)$$

which is the equation used to determine the slope m' for each available optical material. The arc tangent of m' is the slope angle of the glass point $G_k'$ relative to the $\mu_1'$ axis.

Using equation (152), a table is then made in which all available optical materials are sorted in ascending or descending order of the values of m'. Any pair of optical materials having substantially the same value of m' (or, equivalently, having substantially the same value of the arc tangent of m') as the originally chosen optical material, whose glass point $G_1$ is the origin of the translated axes, can be used in combination with that originally chosen optical material for designing a "three-glass" optical system that is color-corrected at four wavelengths.

Method for Selecting Four Compatible Glasses

In selecting a combination of four different optical materials for designing a "four-glass" multiplet that is color-corrected at five wavelengths, it is more convenient to use a three-dimensional glass point representation in $(\mu_1,\mu_2,\mu_3)$ space rather than a four-dimensional glass point representation in $(\eta_1,\eta_2,\eta_3,\eta_4)$ space for each of the available optical materials.

The selection process starts by choosing two optical materials represented by glass points $G_1(\mu_{11},\mu_{21},\mu_{31})$ and $G_2(\mu_{12},\mu_{22},\mu_{32})$, respectively. The origin of the coordinate system defined by the orthogonal axes $\mu_1$, $\mu_2$ and $\mu_3$ is then translated to $G_1$, so that the translated axes $\mu_1'$, $\mu_2'$ and $\mu_3'$ are parallel to the original axes $\mu_1$, $\mu_2$ and $\mu_3$, respectively. The coordinates of each optical material are then expressed in terms of the translated axes, so that $G_k(\mu_{1k},\mu_{2k},\mu_{3k})$ is expressed as $G_k'(\mu_{1k}',\mu_{2k}',\mu_{3k}')$, where $$\left. \begin{array}{l} \mu_{1k}' = \mu_{1k} - \mu_{11} \\ \mu_{2k}' = \mu_{2k} - \mu_{21} \\ \mu_{3k}' = \mu_{3k} - \mu_{31} \end{array} \right\} \quad (153)$$

The equation of a straight line through the origin $G_1'(0,0,0$ of the transformed coordinate system defined by the translated axes $\mu_1'$, $\mu_2'$ and $\mu_3'$ is given by $\mu_1'/\mu_{12}' = \mu_2'/\mu_{22}' = \mu_3'/\mu_{32}'$, which is equivalent to the system of equations $$\left. \begin{array}{l} \mu_1'/\mu_{12}' - \mu_2'/\mu_{22}' = 0 \\ \mu_1'/\mu_{12}' - \mu_3'/\mu_{32}' = 0 \\ \mu_2'/\mu_{22}' - \mu_3'/\mu_{32}' = 0 \end{array} \right\} \quad (154)$$

It is noted that any values for $\mu_1$, $\mu_2$ and $\mu_3$ satisfying any two of the equations (154) also satisfy the third equation. Equations (154) also imply that $$\left. \begin{array}{l} \mu_1' = k\mu_{12}' \\ \mu_2' = k\mu_{22}' \\ \mu_3' = k\mu_{32}' \end{array} \right\} \quad (155)$$

where k is a constant different from zero. Therefore, the glass points $G_2'(\mu_{12}',\mu_{22}',\mu_{32}')$, $G_3'(\mu_{13}',\mu_{23}',\mu_{33}')$ and $G_4'(\mu_{14}',\mu_{24}',\mu_{34}')$ are collinear with the origin $G_1'(0,0,0)$, if and only if their corresponding coordinates are proportional to each other. Optical materials represented by glass points $G_3'$ and $G_4'$ can be selected from among those optical materials having coordinates that are substantially proportional to the corresponding coordinates of $G_2'$.

DESCRIPTION OF THE DRAWING

FIG. 1 is a geometrical representation in dispersion coefficient space of an (n−1)th degree dispersion model for an optical system comprising two different optical materials.

FIG. 2 is a geometrical representation in dispersion coefficient space of a linear dispersion model for an optical system comprising two different optical materials.

FIG. 3 is a geometrical representation in dispersion coefficient space of a quadratic dispersion model for an optical system comprising two different optical materials.

FIG. 4 is a geometrical representation in dispersion coefficient space of a cubic dispersion model for an optical system comprising two different optical materials.

FIG. 5 is a geometrical representation in dispersion coefficient space of a cubic dispersion model for an optical system comprising three different optical materials.

FIG. 6A is a plot in the $(\eta_1,\eta_2)$ plane of the $\eta$-dispersion coefficients for 813 different types of optical glasses listed in the catalogs of five major optical glass manufacturers.

FIG. 6B is an enlargement of a portion of the plot shown in FIG. 6A.

FIG. 7A is a plot in the $(\nu_1,\nu_2)$ plane of the $\nu$-dispersion coefficients for the same 813 different types of optical glasses whose $\eta$-dispersion coefficients are shown in FIG. 6A.

FIG. 7B is an enlargement of the portion of the plot shown in FIG. 7A.

FIG. 8A is a plot of paraxial marginal ray height versus wavelength for a two-color cemented lens doublet having unit focal length at $\lambda_0=0.54607$ μm for a relative aperture of f/10, where the lens elements comprising the doublet are made of Schott BK7 and Schott F2 glasses.

FIG. 8B is a profile drawing of the two-color cemented lens doublet of FIG. 8A.

FIG. 9A is a plot of paraxial marginal ray height versus wavelength for a three-color cemented lens doublet of unit focal length at $\lambda_0=0.54607$ μm for a relative aperture of f/10, where the lens elements comprising the doublet are made of Schott FK51 and Schott K51 glasses.

FIG. 9B is a profile drawing of the three-color cemented lens doublet of FIG. 9A.

FIG. 10A is a plot of paraxial marginal ray height versus wavelength for a four-color cemented lens doublet of unit focal length at $\lambda_0=0.54607$ μm for a relative aperture of f/10, where the lens elements comprising the doublet are made of Corning-France 486817 and Ohara LAK14 glasses.

FIG. 10B is a profile drawing of the four-color cemented lens doublet of FIG. 10A.

FIG. 11A is a plot of paraxial marginal ray height versus wavelength for a four-color air-spaced lens doublet of unit focal length at $\lambda_0=0.54607$ μm for a relative aperture of f/10, where the lens elements comprising the doublet are made of the same types of glasses as for the lens doublet of FIG. 10.

FIG. 11B is a profile drawing of the four-color air spaced lens doublet of FIG. 11A.

FIG. 12A is a plot of paraxial marginal ray height versus wavelength for a five-color air-spaced lens doublet of unit focal length at $\lambda_0=0.54607$ μm for a relative aperture of f/10, where the lens elements comprising the doublet are made of Schott PK51 and Hoya LAC7 glasses.

FIG. 12B is a profile drawing of the five-color air-spacedlens doublet of FIG. 12A.

FIG. 13A is a plot of paraxial marginal ray height versus wavelength for a four-color cemented two-glass lens triplet having a focal length that is 40 times the focal length of the doublets shown in FIGS. 8–12 at $\lambda_0=0.54607$ μm for a relative aperture of f/10, where the first and third lens elements are made of Corning-France 486817 glass and the second lens element is made of Corning-France 589612 glass.

FIG. 13B is a profile drawing of the four-color cemented two-glass lens triplet of FIG. 13A.

FIG. 14A is a plot of paraxial marginal ray height versus wavelength for a four-color two-glass lens triplet having a focal length that is 40 times the focal length of the doublets shown in FIGS. 8–12 at $\lambda_0=0.54607$ μm for a relative aperture of f/10, where the lens elements are made of the same types of glasses as for the lens triplet shown in FIG. 13, the first and second lens element are cemented together, and an air gap is provided between the second and third lens elements.

FIG. 14B is a profile drawing of the four-color two-glass lens triplet of FIG. 14A.

FIG. 15A is a plot of paraxial marginal ray height versus wavelength for a four-color cemented two-glass lens quadruplet having a focal length that is 40 times the focal length of the doublets shown in FIGS. 8–12 at $\lambda_0=0.54607$ μm for a relative aperture of f/10, where the first and third lens elements are made of Corning-France 486817 glass, and the second and fourth lens elements are made of Corning-France 589612 glass.

FIG. 15B is a profile drawing of the four-color cemented two-glass lens quadruplet of FIG. 15A.

FIG. 16A is a plot of paraxial marginal ray height versus wavelength for a four-color two-glass lens quadruplet having a focal length that is 40 times the focal length of the doublets shown in FIGS. 8–12 at $\lambda_0=0.54607$ μm for a relative aperture of f/10, where the lens elements are made of the same types of glasses as for the quadruplet shown in FIG. 15, except that the first and fourth lens elements are made of Corning-France 486817 glass, and the second and third lens elements are made of Corning-France 589612 glass, where the first and second lens elements are cemented together, the third and fourth lens elements are cemented together, and an air gap is provided between the second and third lens elements.

FIG. 16B is a profile drawing of the four-color two-glass lens quadruplet of FIG. 16A.

FIG. 17A is a plot of paraxial marginal ray height versus wavelength for a four-color two-glass lens quadruplet having a focal length that is 40 times the focal length of the lens doublets shown in FIGS. 8–12 at $\lambda_0=0.54607$ μm for a relative aperture of f/10, where the lens elements are made of the same types of glasses as for the quadruplet show in FIG. 15, where the first and third lens elements are made of Corning-France 486817 glass, and the second and fourth lens elements are made of Corning-France 589612 glass, where the first and second lens elements are cemented together, the third and fourth lens elements are cemented together, and an air gap is provided between the second and third lens elements.

FIG. 17B is a profile drawing of the four-color two-glass lens quadruplet of FIG. 17A.

FIG. 18A is a plot of paraxial marginal ray height versus wavelength for a four-color collimator comprising a two-glass lens quadruplet, where the two glasses from which the lens elements of the quadruplet are made are Hoya FCD10 glass and Ohara LAK14 glass.

FIG. 18B is a profile drawing of the four-color collimator of FIG. 18A.

FIG. 19A is a plot of paraxial marginal ray height versus wavelength for a five-color collimator comprising a two-glass lens quadruplet, where the two glasses from which the lens elements of the quadruplet are made are Schott PK51 glass and Hoya LAC7 glass.

FIG. 19B is a profile drawing of the five-color collimator of FIG. 19A.

FIG. 20A is a plot of paraxial marginal ray height versus wavelength for a five-color collimator comprising a lens quadruplet made of one type of optical glass and one type of crystal, where the glass is Hoya LAC7 glass and the crystal is calcium fluoride.

FIG. 20B is a profile drawing of the five-color collimator of FIG. 20 A.

FIG. 21A is a plot of paraxial marginal ray height versus wavelength for a five-color two-glass cemented Mangin doublet mirror system of unit focal length at $\lambda_0=0.54607$ μm for a relative aperture of f/2, where the system elements comprise a first lens element made of Hoya FDC10 glass and a second lens element made of Hoya FC3 glass, the outward facing surface of the second lens element having a reflective coating.

FIG. 21B is a profile drawing of the five-color two-glass cemented Mangin doublet mirror system of FIG. 21A.

FIG. 22A is a plot of paraxial marginal ray height versus wavelength for a four-color two-glass cemented Mangin doublet mirror system of unit focal length at $\lambda_0=0.54607$ μm for a relative aperture of f/2, where the system elements comprise a first lens element made of Hoya BAF11 glass and a second lens element made of Hoya FL6 glass, the outward facing surface of the second lens element having a reflective coating.

FIG. 22B is a profile drawing of the four-color two-glass cemented Mangin doublet mirror system of FIG. 22A.

FIG. 23A is a plot of paraxial marginal ray height versus wavelength for a four-color two-glass cemented Mangin doublet mirror system of unit focal length at $\lambda_0=0.54607$ μm for a relative aperture of f/2, where the system elements comprise a first lens element made of Corning-France 486817 glass and a second lens element made of Corning-France 6697554 glass, the outward facing surface of the second lens element having a reflective coating.

FIG. 23B is a profile drawing of the four-color two-glass cemented Mangin doublet mirror system of FIG. 23A.

FIG. 24A is a plot of paraxial marginal ray height versus wavelength for a five-color two-glass air-spaced Mangin doublet mirror system of unit focal length at $\lambda_0=0.54607$ μm for a relative aperture of f/2, where the system elements comprise a first lens element made of Schott PH51 glass and a second lens element made of Hoya LAC7 glass, the outward facing surface of the second lens element having a reflective coating.

FIG. 24B is a profile drawing of the five-color two-glass air-spaced Mangin doublet mirror system of FIG. 24A.

FIG. 25A is a plot of paraxial marginal ray height versus wavelength for a five-color two-glass air-spaced Mangin doublet mirror system of unit focal length at $\lambda_0=0.54607$ μm for a relative aperture of f/2, where the system elements comprise a first lens element made of Haya FCD10 glass and a second lens element made of Ohara PSK1 glass, the outward facing surface of the second lens element having a reflective coating.

FIG. 25B is a profile drawing of the five-color air-spaced Mangin doublet mirror system of FIG. 25A.

FIG. 26A is a plot of paraxial marginal ray height versus wavelength for a four-color two-glass air-spaced Mangin doublet mirror system of unit focal length at $\lambda_0=0.54607$ μm for a relative aperture of f/2, where the system elements comprise a first lens element made of Haya FCD10 glass and a second lens element made of Hoya LAC14 glass, the outward facing surface of the second lens element having a reflective coating.

FIG. 26B is a profile drawing of the four-color two-glass air-spaced Mangin doublet mirror system of FIG. 26A.

FIG. 27A is a plot of paraxial marginal ray height versus wavelength for a two-glass five-color Petzval lens system having a focal length of 600 mm at $\lambda_0 = 0.54607$ μm for a relative aperture of f/3.5 and an angular field of ±6°.

FIG. 27B is a profile drawing of the two-glass five-color Petzval lens system of FIG. 27A.

FIG. 28A is a plot of paraxial marginal ray height versus wavelength for a two-glass four-color Ptezval lens system having a focal length of 360 mm at $\lambda_0 = 0.54607$ μm for a relative aperture of f/3.5 and an angular field of ±6°.

FIG. 28B is a profile drawing of the two-glass four-color Petzval lens system of FIG. 28A.

FIG. 29A is a plot of paraxial marginal ray height versus wavelength for a two-glass three-color Ptezval lens system having a focal length of 1000 mm at $\lambda_0 = 0.54607$ μm for a relative aperture of f/2 and an angular field of ±2.1°.

FIG. 29B is a profile drawing of the two-glass three-color Petzval lens system of FIG. 29A.

FIG. 30A is a plot of change in total deviation angle versus wavelength for a two-glass five-color doublet prism system having a total deviation angle of 6°.

FIG. 30B is a profile drawing of the two-glass five-color doublet prism system of FIG. 30A.

FIG. 31A is a plot of change in total deviation angle versus wavelength for a two-glass five-color quintuplet prism system having a total deviation angle of 30°, where the apex angles of the first, second, third and fourth prism elements are equal to each other in absolute value, and where the apexes of the second and fourth prism elements have an orientation that is opposite to the orientation of the apexes of the first and third prism elements.

FIG. 31B is a profile drawing of the two-glass two-color quintuplet prism system of FIG. 31A.

FIG. 32A is a plot of change in total deviation angle versus wavelength for a two-glass five-color quintuplet prism system having a total deviation angle of 30°, where the prism elements are made of the same types of glasses as for the corresponding prism elements of the prism system shown in FIG. 31, but where the apex angles of the five prism elements are all different in value from each other.

FIG. 32B is a profile drawing of the two-glass five-color quintuplet prism system of FIG. 32A.

FIG. 33A is a plot of paraxial marginal ray height versus wavelength for a three-glass lens quintuplet that is color-corrected at five wavelengths, the quintuplet having a focal length of 1000 mm at $\lambda_0 = 0.54607$ μm for a relative aperture of f/10, and comprising a first lens element made of Ohara FK01 glass, a second lens element made of Ohara KZFS8 glass and air-spaced from the first lens element, a third lens element made of Ohara FK01 glass and cemented to the second lens element, a fourth lens element made of Ohara SF15 glass and air-spaced from the third lens element, and a fifth lens element made of Ohara KZFS8 glass and cemented to the fourth lens element.

FIG. 33B is a profile drawing of the three-glass lens quintuplet of FIG. 33A.

FIG. 34A is a plot of paraxial marginal ray height versus wavelength for a four-glass lens quintuplet that is color-corrected at five wavelengths, the quintuplet having a focal length of 1000 mm at $\lambda_0 = 0.54607$ μm for a relative aperture of f/10, and comprising a first lens element made of Schott PH51 glass, a second lens element made of Schott LAK20 glass and air-spaced from the first lens element, a third lens element made of Schott PK51 glass and cemented to the second lens element, a fourth lens element made of Schott KZFSN4 glass and air-spaced from a third lens element, and a fifth lens element made of Schott KSFS6 glass and cemented to the fourth lens element.

FIG. 34B is a profile drawing of the four-glass lens quintuplet of FIG. 34A.

BEST MODE OF CARRYING OUT THE INVENTION

It is a feature of the present invention that combinations of optical glasses, which are compatible with each other for designing optical systems that are color-corrected at three or more wavelengths, can be readily selected from among the various optical glasses available to the designer.

Commercially available types of optical glasses are listed in catalogs published by various manufacturers. The latest edition (1980 Edition) of the Schott catalog lists 238 different types of optical glasses. The latest Ohara catalog (distributed in 1981) lists 227 different types of optical glasses. The latest Hoya catalog (distributed in 1981) lists 206 different optical glass types. The latest Corning-France catalog($\neq$1980 Edition) lists 80 different optical glass types. The latest Chance Pilkington catalog (1980Edition) lists 62 different optical glass types. These five manufacturers presently produce a total of 813 different types of optical glasses.

The initial problem in designing an optical system that is to be color-corrected at more than two wavelengths is to select a suitable combination of optical materials from among the various types of optical materials available to the designer. The present invention provides a unified procedure for selecting suitable combinations of optical materials for use in designing color-corrected optical systems. The procedure of the present invention can be conveniently illustrated in connection with the design of a two-glass lens doublet (i.e., a multiplet comprising two lens elements made from different types of glasses), which is color-corrected at n different wavelengths, where n>2. The principles discussed herein apply as well to the selection of glasses or other optical materials for designing color-corrected lens triplets and higher-number lens multiplets.

The number of possible pairs of glasses that can be formed from the 813 different types of optical glasses listed in the catalogs published by the leading optical glass manufacturers can be determined by calculating the combination of n things taken r at a time, i.e., $C(n,r) = n!/r!(n-r)!$, where n=813 and r=2. This number, which is independent of the order in which the glasses are selected, is 330,078. Thus, if a "cut-and-try" approach were used to identify pairs of optical glasses that are compatible with each other for designing a two-glass color-corrected lens doublet, more than 330,000 different combinations of glasses would have to be investigated.

Very few pairs of optical glasses suitable for designing a two-glass lens doublet that is color-corrected at three wavelengths have been reported in the literature; and those few suitable glass pairs that have been reported were discovered by cut-and-try techniques without the benefit of a unified theoretical basis for selecting the particular glasses. Until the present invention, there has been no systematic way of knowing whether any particular glass could be paired with any other particular glass to produce an optical system that is color-corrected at more than two wavelengths.

In FIG. 1, two optical materials $G_1$ and $G_2$ are represented by corresponding glass points $G_1[\eta_{11}, \eta_{21}, \eta_{31}, \ldots, \eta_{(\eta-1)1}]$ and $G_2[\eta_{12}, \eta_{22}, \eta_{32}, \ldots, \eta_{(n-1)2}]$ in an $(n-1)$-dimensional orthogonal coordinate system defining a so-called glass space. The coordinates of any particular optical material in the glass space are the $\eta$-dispersion coefficients of the optical material, as derived from a generalized $(n-1)$th degree dispersion model. The condition that must be satisfied in order for a two-glass optical system comprising these two particular optical materials $G_1$ and $G_2$ in the glass space satisfy the vector equation $\overline{G}_1 = \alpha \overline{G}_2$, where $\alpha$ is a real scalar quantity. In graphic terms, as illustrated in FIG. 1, the glass points $G_1$ and $G_2$ must be substantially collinear with the origin of the coordinate system.

For the special case of a two-glass optical system that is color-corrected at two wavelengths (i.e., where $n=2$), the dispersion model used to derive the $\eta$-dispersion coefficients is linear. As shown in FIG. 2, a two-glass two-color optical system can be designed using any pair of optical glasses, because the glass points for all optical glasses necessarily lie on the same straight line in the one-dimensional $\eta$-dispersion coefficient space of the linear dispersion model. Although, any two different optical glasses could in principle be used in combination with each other for designing an optical system that is color-corrected at two wavelengths, it would normally be desirable to use only those pairs of glasses for which the absolute value of th e difference between their corresponding primary dispersion coefficients is as large as possible.

For the special case of a two-glass optical system that is color-corrected at three wavelengths (i.e., where $n=3$), the dispersion model used to derive the $\eta$-dispersion coefficients is quadratic. As shown in FIG. 3, a two-glass three-color optical system can be designed using a pair of optical glasses whose glass points are collinear with the origin of the coordinate system defining the two-dimensional $\eta$-dispersion coefficient space of the quadratic dispersion model. Thus, if the glass points for the various optical glasses available to the designer are plotted on the $(\eta_1, \eta_2)$ plane, suitable pairs of glasses that could in principle be used for designing an optical system that is color-corrected at three wavelengths an be ascertained by drawing straight lines from the origin of the coordinate system. Those glasses whose glass points are collinear with each other along any straight line through the origin of the coordinate system are in principle suitable candidates from which glass pairs can be selected for designing the two-glass three-color optical system.

Although any pair of glasses whose glass points are collinear with each other and with the origin of the coordinate system as shown in FIG. 3 could be used for designing a two-glass three-color optical system, it would ordinarily be desirable to select a pair of glasses from among those glasses satisfying the further condition that the absolute value of the difference between the corresponding primary dispersion coefficients is large. The particular design form of the optical system, including a determination of the appropriate number of lens elements (e.g., doublet, triplet, or higher-number multiplet), is determined in accordance with the principle of geometrical optics.

For the special case of a two-glass optical system that is color-corrected at four wavelengths (i.e., where $n=4$), the dispersion model used to derive the $\eta$-dispersion coefficients is cubic. As shown in FIG. 4, a two-glass four-color optical system can be designed using a pair of optical glasses whose glass points are collinear with the origin of the coordinate system defining the three-dimensional $\eta$-dispersion coefficient space of the cubic dispersion model. Thus, if the glass points for the various optical glasses available to the designer are plotted in the three-dimensional $(\eta_1, \eta_2, \eta_3)$ space, suitable pairs of glasses that could in principle be used for designing an optical system that is color-corrected at four wavelengths can be ascertained by drawing straight lines from the origin of the coordinate system. Those glasses whose glass points are collinear with each other along any straight line through the origin of the coordinate system are in principle suitable candidates from which glass pairs can be selected for designing the two-glass four-color optical system. A preferred pair of glasses would ordinarily comprise glasses for which the absolute value of the difference between their corresponding primary dispersion coefficients is as large as possible.

The degree of the dispersion model used to derive the $\eta$-dispersion coefficients does not depend upon the number of glasses used in making the lens elements of the optical system. Therefore, the same three-dimensional plot of glass points shown in FIG. 4 in connection with the design of a four-color optical system comprising two different types of glasses could also be used for designing a four-color optical system comprising three different types of glasses. A three-glass lens system must necessarily comprise at least three lens elements. For a three-glass optical system that is color-corrected at four wavelengths (i.e., where $n=4$), the dispersion model used to derive the $\eta$-dispersion coefficients is cubic. As shown in FIG. 5, three glasses $G_1$, $G_2$ and $G_3$ are suitable for designing an optical system that is color-corrected at four or more wavelengths, if the glass points representing those three glasses in three-dimensional $\eta$-dispersion coefficient space are coplanar with each other and with the origin of the coordinate system.

In general, for an optical system that is color-corrected at n wavelengths, the dispersion model used to derive the $\eta$-dispersion coefficients is and $(n-1)$th degree polynomial, where n is the number of wavelengths for which color-correction is desired. Thus, a two-glass five-color optical system could be designed using any pair of glasses whose glass points lie on a common hyperline through the origin of an orthogonal coordinate system defining a four-dimensional hyperspace, where the axes of the coordinate system are the $\eta$-dispersion coefficients according to a fourth degree dispersion model. Likewise, a three-glass five-color optical system could be designed using any three glasses whose glass points lie on a common hyperplane that passes through the origin of the coordinate system defining the same four-dimensional hyperspace.

In accordance with the present invention, an $(n-1)$th degree glass dispersion model is used to identify optical materials that are compatible with each other for designing an optical system color-corrected an n wavelengths. Each of the optical glasses available to the designer is represented by a unique point in an $(n-1)$-dimensional glass space, where the dispersion coefficients of the individual glasses are the coordinates of the glasses in the glass space. In practice, it is convenient to employ a digital computer to calculate and compare dispersion coefficient ratios for the various glasses available to the designer, where the dispersion coefficients are determined from a glass dispersion model in accordance with the number of wavelengths for which color correction is required for the particular application. For most color-correction requirements, it would not be necessary to use a glass dispersion model of order higher than cubic, i.e., n=4. For the analysis described herein, the $\eta$-dispersion coefficients are used, although the $\nu$-dispersion coefficients could have been used.

In FIG. 6A, the glass points in $\eta$-dispersion coefficient space for 813 different optical glasses listed in the current catalogs of the five leading optical glass manufacturers are plotted in the two-dimensional $\eta$-dispersion coefficient space of the quadratic dispersion model. The values of $\eta_1$ and $\eta_2$, which are called the primary and secondary $\eta$-dispersion coefficients, respectively, for the glasses according to a quadratic dispersion model, were calculated from equation (7) using a least-squares method for seven wavelengths in the visible region with a base wavelength of $\lambda_0 = 0.5740$ $\mu$m. The seven wavelengths used were the solar emission lines 0.4047 $\mu$m, 0.4350 $\mu$m, 0.5461 $\mu$m, 0.5876 $\mu$m, 0.6563 $\mu$m and 0.7065 $\mu$m.

The optical glasses whose glass point coordinates $\eta_1$ and $\eta_2$ are plotted graphically in FIG. 6A are also listed in TABLE I. The 813 glasses manufactured by the five leading optical glass manufacturers are identified in TABLE I by manufacturer's name, i.e., SCHOTT, OHARA, HOYA, Corning-France (abbreviated as CORN-F) and Chance Pilkington (abbreviated as CHANCE), and by catalog number. Also given for each glass listed in TABLE I are the base refractive index at $\lambda_0 = 0.574$ $\mu$m, the primary dispersion coefficient $\eta_1$, the secondary dispersion coefficient $\eta_2$, the ratio $(\eta_1/\eta_2)$, and the arc tangent of the ratio $(\eta_1/\eta_2)$. The glasses are sorted in TABLE I in ascending order of the ratios $(\eta_1/\eta_2)$. The arc tangent of the ratio $(\eta_1/\eta_2)$ indicates the slope angle relative to the $\eta_1$-axis, so that glasses having substantially the same arc tangent of the ratio $(\eta_1/\eta_2)$ are substantially collinear, and are therefore candidates for selection in forming pairs of glasses for designing optical systems that are color-corrected at three or more wavelengths. FIG. 6B provides an enlargement of a portion of the plot shown in FIG. 6A.

The glass selection procedure in accordance with the present invention can be illustrated graphically with reference to FIGS. 6A and 6B. In selecting a pair of glasses from among all the optical glasses whose glass points are plotted in FIG. 6A for designing a two-glass optical system that is color-corrected at three wavelengths, a designer first chooses one glass that is available to him and locates the glass point representing that one glass point on the plot. The designer then draws a straight line extending through the glass point for that one glass and through the origin of the coordinate system. Other glasses that in principle are suitable for use in combination with that one glass for designing the desired two-glass three-color lens doublet lie substantially on the same straight line.

All glass points on the same straight line through the origin of the coordinate system have the same slope angle relative to the $\eta_1$-axis. Therefore, a tabulation of the available optical glasses in terms of a convenient function of the slope angle, e.g., the arc tangent of the ratio $(\eta_1/\eta_2)$, as provided in Table I, can be used by an optical designer with greater convenience and accuracy than the graphical technique described above. With such a tabulation, all that the designer need do in selecting a pair of glasses for designing two-glass three-color lens doublet is to choose a first glass, and then to identify other glasses whose tabulated values for the arc tangent of the ratio $(\eta_1/\eta_2)$ are substantially the same as for the chosen first glass. A suitable pair of glasses can be selected from among the glasses having substantially the same value for the arc tangent of the ratio $(\eta_1/\eta_2)$.

Each of the glasses listed in TABLE I can be identified unambiguously by the manufacturer's catalog number, which might be an alphanumeric designation or a purely numeric designation depending upon the manufacturer. In a case where a new type of glass is manufactured by changing the constituents or percentage composition of an older type of glass, the new type of glass is invariably given a new catalog number by the manufacturer. Even where the new type of glass is made to meet the same optical specifications as an older type of glass, the new type of glass is given a new catalog number. The process of making any particular type of optical glass is ordinarily regarded by the manufacturer as proprietary information, and is ordinarily not known in detail by the optical designer who uses the glass. Accordingly, optical designers universally identify particular optical glasses by manufacturers' catalog numbers.

Considering the portion of the plot of FIG. 6A shown in enlarged view in FIG. 6B, it is instructive to identify glasses that could be paired with, for example, Hoya FCD10 glass for designing a two-glass optical system that is color-corrected at three wavelengths. Hoya FCD10 glass, with coordinates $\eta_1 = -0.0610293$ and $\eta_2 ' 2 - 0.00399528$ in two-dimensional $\eta$-dispersion coordinate space (as ascertained by reference to page 10 of TABLE I), was selected for instructional purposes because the glass point for this particular optical glass is relatively isolated on the plot in FIG. 6B. A straight line, Line A, drawn through the origin of the coordinate system and the glass point for Hoya FCD10 glass indicates that, e.g., Hoya FC3 glass (coordinates $\eta_1 = -0.0842094$ and $\eta_2 = -0.00547060$) can be combined with Hoya FCD10 glass for designing a two-glass optical system that is color-corrected at at least three wavelengths. An examination of the cubic and quartic dispersion models for these two glasses in the same spectral region as covered by TABLE I for the quadratic dispersion model shows that this particular pair of optical glasses can yield axial color correction at up to five wavelengths. This phenomenal compatibility of the Hoya FCD10 and Hoya FC3 glasses is discussed hereinafter in connection with a Mangin doublet mirror as illustrated in FIG. 21.

Line A in FIG. 6B also show several other glasses that could be combined with Hoya FCD10 glass to form pairs of compatible glasses for designing optical systems that are color-corrected at at least three wavelengths. Thus, Schott BK8 glass (coordinates $\eta_1 = -0.0870925$ and $\eta_2 = -0.00577220$), Schott PSK50 glass (coordinates $\eta_1 = -0.0823975$ and $\eta_2 = -0.00530444$), Hoya PCD2 glass (coordinates $\eta_1 = -0.0878957$ and $\eta_2 = -0.00577861$), Hoya ZNC7 glass (coordinates $\eta_1 = -0.0905172$ and $\eta_2 = -0.00582287$), and Chance Pilkington 641601 glass (coordinates $\eta_1 = -0.0923210$ and $\eta_2 = -0.00588984$) are also all substantially colinear with each other and with Hoya FCD10 glass and Hoya FC3 glass on Line A, and could in principle be considered along with Hoya FCD10 glass and Hoya FC3 glass as suitable candidates from which to select a pair of glasses for designing the desired two-glass three-color optical system. For optimum dioptric power distribution, however, it would usually be desirable to select a pair of glasses whose glass points are widely separated from each other along Line A, so that the difference between the $\eta_1$ primary dispersion coefficients for the two glasses is large.

As another example, it is instructive to consider the glasses that could be combined with Schott PK51 glass (coordinates $\eta_1 = -0.0718368$ and $\eta_2 = -0.00220267$) for designing a two-glass optical system that is color-corrected at at least three wavelengths. A line, Line B, drawn through the origin of the coordinate system and the glass point for Schott PK51 glass indicates that, e.g., Hoya LAC7 glass (coordinates $\eta_1 = -0.0946047$ and $\eta_2 = -0.00290279$ could be paired with Schott PK51 glass to form a pair of compatible glasses for designing an optical system that is color-corrected at least three wavelengths. An examination of the cubic and quartic dispersion models for these two glasses in the same spectral region as covered by TABLE I for the quadratic dispersion model shows that this particular pair of glasses can be used for designing optical systems that are color-corrected at five wavelengths. This phenomenal compatibility of the Schott PK51 and Hoya LAC7 glasses is demonstrated hereinafter by the lens doublet shown in FIG. 12, the lens quadruplet shown in FIG. 19, the Mangin doublet mirror shown in FIG. 24, the Petzval lens system shown in FIG. 27, and the prism systems shown in FIGS. 30, 31 and 32.

A glance at Line B indicates that a number of other glasses, whose glass points lie substantially on Line B, are also suitable candidates for use in combination with Schott PK51 glass for designing an optical system that is color-corrected at three wavelengths, e.g., Schott K11 glass (coordinates $\eta_1 = -0.0900976$ and $\eta_2 = -0.00275514$), Schott LAK21 glass (coordinates $\eta_1 = -0.0920718$ and $\eta_2 = -0.00285003$), and Corning-France 511604 glass (coordinates $\eta_1 = -0.0916603$ and $\eta_2 = -0.00283942$).

It is important to remember that the values of $\eta_1$ and $\eta_2$ for the optical glasses listed in TABLE I were calculated using a least-squares method for seven selected wavelengths in the visible spectrum extending from a minimum wavelength of approximately 0.4 µm to a maximum wavelength of approximately 0.7 µm, with a base wavelength of 0.5740 µm. These wavelengths provide a statistically good representation of the entire visible spectrum. However, in a particular application, the designer might find it preferable to calculate values of $\eta_1$ and $\eta_2$ for the optical materials of interest by a least-squares method, or indeed by any other mathematical procedure, using different wavelengths. For example, if the designer were concerned with color-correction for infrared wavelengths, he could calculate a table of values for $\eta_1$ and $\eta_2$ for several wavelengths in the infrared wavelength band or bands of interest. If the designer were interested in obtaining color-correction at a number of different wavelength bands, as might be appropriate in designing, e.g., a color-corrected astronomical instrument having a common focal plane for radiation in the infrared and ultraviolet portions of the spectrum, he could calculate a table of values for $\eta_1$ and $\eta_2$ using several wavelengths in each of the wavelength bands of interest.

The values calculated for $\eta_1$ and $\eta_2$, and therefore also the values calculated for the ratios ($\eta_1/\eta_2$) and for the arc tangents of the ratios ($\eta_1/\eta_2$), depend upon the wavelengths used in the quadratic dispersion model obtained from equation (7). In general, therefore, the values for $\eta_1$ and $\eta_2$ would differ from those shown in TABLE I, if different wavelengths were to be used in representing the spectral range (or the discontinuous spectral bands) of interest to the designer. The values listed in TABLE I, however, are useful in illustrating the invention, and furthermore are of practical utility in selecting pairs of compatible glasses for designing optical systems that are substantially color-corrected at at least three wavelengths in the visible spectrum.

In TABLE II, the same glasses manufactured by the same five optical glass manufacturers are again listed and unambiguously identified by manufacturer's name and catalog number, along with the base refractive index at $\lambda_0 = 0.589$ µm for each glass. Also listed for each glass in TABLE II are the primary dispersion coefficient $\eta_1$, the secondary dispersion coefficient $\eta_2$, the tertiary dispersion coefficient $\eta_3$, and the ratios ($\eta_1/\eta_2$), ($\eta_2/\eta_3$) and ($\eta_1/\eta_3$), as calculated from equation (7) using a least-squares fitted cubic dispersion model. For each glass, the $\eta$-dispersion coefficients $\eta_1$, $\eta_2$ and $\eta_3$, as well as the base refractive index, were obtained for ten wavelengths in the extended spectral region from 0.3650 µm to 1.014 µm, with a base wavelength of $\lambda_0 = 0.589$ µm. The glasses are sorted in TABLE II in ascending order of the ratios ($\eta_1/\eta_2$). The ten wavelengths used were the solar emission lines 0.3650 µm, 0.4047 µm, 0.4350 µm, 0.4861 µm, 0.5461 µm, 0.5876 µm, 0.7065 µm, 0.7682 µm and 1.014 µm.

Ordinarily, those optical glasses for which the corresponding ratios ($\eta_1/\eta_2$), ($\eta_2/\eta_3$) and ($\eta_1/\eta_3$) are substantially equal to each other, and for which the glass points are substantially collinear with each other and with the origin of the coordinate system, are candidates for selection in forming pairs of compatible glasses to use for designing optical systems that are color-corrected at four wavelengths. It is sometimes more convenient to use the arc tangents of the ratios ($\eta_1/\eta_2$), ($\eta_2/\eta_3$) and ($\eta_1/\eta_3$) rather than the ratios themselves in selecting compatible pairs of glasses for designing optical systems that are color-corrected at at least four wavelengths.

Since the $\eta$-dispersion coefficients and the $\nu$-dispersion coefficients for any optical material are related by the equation $\eta_{ij} = \nu_{ij}/(N_0 - 1)$, the selection of glass pairs for designing a two-glass three-color optical system could also be made from a plot of the glass points in $\nu$-dispersion coefficient space, or from a tabulation of the values for the arc tangents of the ratios ($\nu_1/\nu_2$), for the various optical glasses available to the designer. In FIG. 7A, the glass points are plotted in $\nu$-dispersion coefficient space for the same 813 glasses whose glass points in $\eta$-dispersion coefficient are plotted in FIG. 6A. An enlargement of a portion of the plot shown in FIG. 7A is shown in FIG. 7B.

To illustrate graphically the method of selecting a pair of compatible glasses for designing a two-glass three-color optical system using the $\nu$-dispersion coefficients for the glasses available to the designer, consider Schott FK51 glass as the initial selection. Schott FK51 glass is represented in FIG. 7B by a glass point whose coordinates in $\nu$-dispersion coefficient space are $\nu_1 = -0.031926$ and $\nu_2 = -0.001819$, as determined by the quadratic dispersion model used to plot the glass points shown in FIGS. 7A and 7B. A straight line, Line C, drawn through the origin of the coordinate system and the glass point for Schott FK51 glass indicates a number of other optical glasses whose glass points are substantially collinear with the origin and with the glass point for Schott FK51 glass. Examples of other suitable glasses lying on Line C include Schott K51 glass and Hoya ADF1 glass. All such glasses, whose glass points are substantially collinear with each other and with the origin, are suitable candidates from which to select a pair of glasses for designing an optical system having the required color correction at three wavelengths.

In FIG. 7B, straight lines could be drawn at various angles from the origin through the glass points representing the optical glasses available to the designer, thereby identifying suitable pairs of glasses for designing two-glass three-color optical systems. Thus, Line D in FIG. 7B indicates that, e.g., Corning-France 558525 glass and Schott BAF50 glass can be paired for designing a two-glass three-color optical system.

In FIG. 6A or FIG. 7A, any pair of optical glasses whose glass points lie substantially on the same straight line passing through the origin of the coordinate system can in principle be used for designing a two-glass three-color lens systems. Conversely, optical glasses whose glass points do not lie substantially on the same straight line cannot be used for designing a two-glass lens system that is color-corrected at three wavelengths. From equations (41) to (46), the dioptric powers $\phi_1$ and $\phi_2$ of the individual lens elements of a two-glass three-color lens doublet are inversely proportional to the absolute value of the difference between the primary dispersion coefficients $\eta_{11}$ and $\eta_{12}$ of the glasses used to make the lens elements of the doublet. It is therefore necessary that the absolute value $|\eta_{12} = \eta_{11}|$ be as large as possible in order to minimize the dioptric powers of the individual lens elements. If the dioptric powers of the lens elements were too large, the configurations of the lens elements might be so rounded (resembling toy marbles in an extreme case) that it would be impractical to use them in most optical systems. The requirement that $|\eta_{12} = \eta_{11}|$ be large would, therefore, ordinarily be treated as an additional condition that must be satisfied when selecting a pair of glasses for designing a color-corrected optical system.

In FIG. 6B or 7B, those optical glasses whose glass points are substantially collinear with each other and with the origin of the coordinate system are suitable candidates from which to select a pair of glasses for designing a two-glass optical system that is color-corrected at three or more wavelengths. Those glasses whose glass points are substantially collinear with the origin have ratios of primary to secondary dispersion coefficients that are substantially equal. Thus, in mathematical terms, when $$\frac{\eta_{11}}{\eta_{21}} = \frac{\eta_{12}}{\eta_{22}},$$

or, equivalently, when $$\frac{\nu_{11}}{\nu_{21}} = \frac{\nu_{12}}{\nu_{22}},$$

for two optical glasses, those two glasses in combination are suitable for designing a two-glass optical system that is color-corrected at three wavelengths. This property can readily be exploited with a digital computer by computing the slope of the line connecting each glass point with the origin, and then sorting all the glasses in ascending order of these "glass point" slopes.

It was known in the prior art that any two optical glasses can in principle be used in combination with each other for designing a lens doublet that is color-corrected at two wavelengths. This prior art knowledge is seen to be a special case of the unified theory upon which the present invention is based, where $n=2$. In FIGS. 8A and 8B, a cemented lens doublet of unit focal length at $\lambda_0 = 0.54607$ μm for a relative aperture of f/10 is described, where the lens elements comprising the doublet are made of Schott BK7 glass and Schott F2 glass. The two lens elements could be cemented together by any technique well-known in the art, as by using Canada balsam, optical cement or immersion oil. It can be seen by reference to page 9 of TABLE I that the ratio $\eta_1/\eta_2 = -13.6653$ for Schott BK7 glass, and by reference to page 7 of TABLE I that the ratio $\eta_1/\eta_2 = -3.91263$ for Schott F2 glass, are quite different in value. Thus, the unified theory upon which the present invention is based indicates that a lens doublet made of Schott BK7 and Schott F2 glasses cannot provide color correction at more than two wavelengths. Color correction is a function of the choice of glasses used for designing the doublet, and is independent of the particular design form of the doublet made from the chosen glasses. Thus, no amount of manipulation of the design form of a lens doublet made from these two glasses can result in color correction at more that two wavelengths.

It is a feature of the present invention that the suitability or non-suitability of any particular combination of optical materials for designing a color-corrected optical system can be readily determined by reference to tabulated data, such as by comparing tabulated values of the ratios $\eta_1/\eta_2$ for a pair of optical materials being considered. The present invention eliminates the need for "cut-and-try" methods for determining whether any particular pair of optical materials can provide color correction at more than two wavelengths.

Although any two optical glasses are suitable in principle for designing a two-glass two-color lens doublet, there was no unified theory in the prior art for predicting whether any two particular optical glasses would have appropriate dioptric powers so that lens elements with practical configurations could be made from those particular glasses. It is a feature of the present invention, on the other hand, that the practicality or non-practicality of any two particular optical glasses for designing a lens doublet that is color-corrected at two or more wavelengths can be readily determined by reference to tabulated data.

The cemented lens doublet shown in FIG. 8B, comprising lens elements made of Schott BK7 and Schott F2 glasses, is color-corrected at only two wavelengths. By reference to TABLE I, it can be ascertained that the absolute value of the difference between corresponding values of $\eta_1$ for Schott BK7 and Schott F2 glasses is quite large, i.e., $|\eta_{12} - \eta_{11}| = 0.063435$, indicating that the distribution of dioptric powers for lens elements made from these two glasses would be desirably small. Thus, the present invention provides a method for determining the practicality of using two particular glasses, e.g., Schott BK7 glass and Schott F2 glass, in combination for designing a two-glass two-color lens doublet. As an empirical rule, it has been found that where the absolute value of the difference between the values of the primary dispersion coefficients $\eta_{1j}$ where $j=1, 2$) for two optical glasses is greater than about 0.02, i.e., when $|\Delta\eta_{1j}| = |\eta_{12} - \eta_{11}| > 0.02$, the dioptric powers of lens elements made from those two glasses will be small enough so that the lens elements will have sufficiently large radii of curvature to enable a lens doublet of practical configuration to be made.

The curve in FIG. 8A shows the relationship of paraxial marginal ray height (conventionally designated PY in the drawing) to wavelength for the lens doublet comprising first and second lens elements made of Schott BK7 and Schott F2 glasses, respectively. Such a curve, hereinafter called a "wavelength scan", for an optical system provides an indication of the quality of axial color correction obtainable with the optical system. The paraxial marginal ray height for an optical system at any particular wavelength is a measure of the so-called secondary spectrum of the system at that wavelength, i.e., a measure of the extent to which light at that particular wavelength is out-of-focus with respect to the common focus for which color-correction of the system is desired. Perfect color correction is achieved for those wavelengths at which the paraxial marginal ray height is zero, i.e., for those wavelengths at which the "wavelength scan" curve crosses the horizontal axis. For wavelengths at which perfect color correction is not achieved, the closeness of the "wavelength scan" curve to the horizontal axis provides a measure of the extent to which the optical system approaches perfect color correction.

For the lens doublet shown in FIG. 8B, color correction is obtained at one wavelength in the blue portion of the visible spectrum and at one wavelength in the infrared spectrum. In between these two color-corrected wavelengths, however, the dispersion produced by the lens elements of the doublet is quite pronounced. The "wavelength scan" curve in FIG. 8A indicates that a lens doublet made Schott BK7 and Schott F2 glasses cannot provide a good degree of color correction at wavelengths between the crossings of the horizontal axis, because the curve (i.e., the paraxial marginal ray height) departs rapidly from the horizontal axis even for wave lengths close to the two crossings of the horizontal axis.

INDUSTRIAL APPLICABILITY

Two-Glass Lens Doublets:

FIGS. 9A and 9B describe a particular example of a three-color cemented lens doublet in which the optical glasses from which the two lens elements of the doublet are made were selected in accordance with the present invention. The lens doublet of FIGS. 9A and 9B is of unit focal length at $\lambda_0=0.54607$ μm for a relative aperture of f/10, and the two glasses used in making the lens elements of the doublet are Schott FK51 and Schott K51 glasses. These glasses were chosen because the ratios of their primary to secondary $\eta$-dispersion coefficients are substantially equal, and because the absolute value of the difference between corresponding values of the primary dispersion coefficient $\eta_1$ for the two glasses is large.

The wavelength scan curve shown in FIG. 9A crosses the horizontal axis at three discrete wavelengths in the visible spectrum, and is close to the horizontal axis throughout the entire wavelength band extending over the visible spectrum. Thus, a lens doublet made from this particular pair of optical glasses can provide very effective (if not perfect) color correction over substantially the entire visible spectrum.

The design form of the lens doublet shown in FIG. 9B is specified in tabular format as follows:

| Surface No. | Radius | Thickness | $N_e$ | $V_e$ | Material |
|---|---|---|---|---|---|
| 1 | .421 f | .016 f | 1.48794 | 84.07 | Schott FK51 |
| 2 | −.215 f | .009 f | 1.50720 | 59.34 | Schott K51 |
| 3 | 7.034 f | | | | —. | where the various lens element surfaces of the doublet system are numbered, in accordance with conventional practice, from left to right. The "Radius" listed for each surface is the radius of curvature of the surface expressed as a multiple of the focal length f of the lens system at a relative aperture of f/10. In accordance with convention, the radius of curvature of an optical surface is said to be positive if the center of curvature of the surface lies to the right of the surface, and negative if the center of curvature of the surface lies to the left of the surface. The "Thickness" listed for a particular surface is the thickness of the lens element bounded on the left by the indicated surface, where the thickness is measured along the optical axis of the lens system. The thickness of each lens element is expressed as a multiple of the focal length f of the lens system. $N_e$ is the refractive index of the lens element bounded on the left by the indicated surface, where the value of the refractive index is given for the mercury e line, i.e., for a wavelength of $\lambda_0=0.54607$ μm. $V_e$ is the Abbe number for the same lens element at the same base wavelength. "Material" refers to the type of optical material from which the lens element is made, where the type of optical material is identified by manufacturer and by manufacturer's catalog number.

FIGS. 10A and 10B describe a particular example of a four-color cemented lens doublet in which the optical glasses from which the two lens elements of the doublet are made were selected in accordance with the present invention. The lens doublet of FIGS. 10A and 10B is of unit focal length at $\lambda_0=0.54607$ μm for a relative aperture of f/10. The glasses used in making the two lens elements of the doublet of FIG. 10A are Corning France 486817 and Ohara LAK14 glasses, which were chosen because their ratios $(\eta_1/\eta_2)$ are substantially equal in the extended spectral region from 0.365 μm to 1.014 μm, and because the difference between corresponding values of $\eta_1$ for the two glasses is large.

The wavelength scan curve shown in FIG. 10B crosses the horizontal axis at four discrete wavelengths in the visible and near infrared spectrum, and is close to the horizontal axis throughout this spectral range. Thus, a lens doublet made from this particular pair of optical glasses can provide very effective color correction over a wide spectral range bridging the visible and infrared wavelengths, especially in the range extending from the blue wavelengths through the near infrared wavelengths beyond 1.0 μm.

The design form of the lens doublet shown in FIG. 10B is specified in tabular format as follows:

| Surface No. | Radius | Thickness | $N_e$ | $V_e$ | Material |
|---|---|---|---|---|---|
| 1 | .257 f | .016 f | 1.48746 | 81.40 | Corn-F 486817 |
| 2 | −.372 f | .009 f | 1.69979 | 55.31 | Ohara LAK14 |
| 3 | 2.022 f | | | | | where the specified design parameters are as defined above in connection with FIGS. 9A and 9B.

FIGS. 11A and 11B describe a particular example of a four-color air-spaced lens doublet in which the two lens elements are made of the same types of optical glasses as for the cemented lens doublet shown in FIG. 10B. The lens doublet of FIGS. 11A and 11B is likewise of unit focal length at $\lambda_0 = 0.54607$ μm for a relative aperture of f/10. The wavelength scan curve shown in FIG. 11A crosses the horizontal axis at four discrete wavelengths in the visible and near infrared spectrum, and is close to the horizontal axis throughout the same spectral range for which the lens doublet of FIG. 10B provides effective color correction. Thus, the degree of color correction obtainable using the glasses of the cemented lens doublet shown in FIG. 10B is retained when an air space is provided between the lens elements, which implies that the quality of axial (i.e., longitudinal) color correction obtainable with a two-glass lens doublet is determined by the choice of glasses used for making the lens elements, and is independent of the design form of the doublet. The quality of correction for lateral chromatic aberration, spherochromatism and the remaining aberrations, however, depends upon the design form of the lens doublet.

The design form of the lens doublet shown in FIG. 11B is specified in tabular format as follows:

| Surface No. | Radius | Thickness | $N_e$ | $V_e$ | Material |
|---|---|---|---|---|---|
| 1 | .598 f | .016 f | 1.48746 | 81.40 | Corn-F 486817 |
| 2 | −.207 f | .0005 f | | | Air |
| 3 | −.221 f | .009 f | 1.69979 | 55.31 | Ohara LAK14 |
| 4 | −.699 f | | | | |

FIGS. 12A and 12B describe a particular example of a five-color cemented lens doublet in which the optical glasses from which the two lens elements of the doublet are made were selected in accordance with the present invention. The lens system of FIGS. 12A and 12B is of unit focal length at $\lambda_0 = 0.54607$ μm for a relative aperture of f/10. The glasses used in making the two lens elements of the cemented doublet of FIGS. 12A and 12B are Schott PK51 and Hoya LAC7 glasses, which were chosen because the ratios of their primary to secondary η-dispersion coefficients are substantially equal, and because the absolute value of the difference between corresponding values of $\eta_1$ for the two glasses is large.

The wavelength scan curve shown in FIG. 12A crosses the horizontal axis at five discrete wavelengths in the spectral range extending from the ultraviolet to the near infrared wavelengths. Furthermore, the wavelength scan curve is extremely close to the horizontal axis throughout the spectral range extending from the green wavelengths to about 0.8 μm in the near infrared region. Thus, a lens doublet made from this particular pair of optical glasses can provide very effective axial color correction throughout this region of the optical spectrum.

The design form of the lens doublet shown in FIG. 12B is specified in tabular format as follows:

| Surface No. | Radius | Thickness | $N_e$ | $V_e$ | Material |
|---|---|---|---|---|---|
| 1 | .753 f | .020 f | 1.53019 | 76.57 | Schott PK51 |
| 2 | −.151 f | .0004 f | | | Air |
| 3 | −.156 f | .010 f | 1.65426 | 58.15 | Hoya LAC 7 |
| 4 | −.680 f | | | | |

Two-Glass Lens Triplets:

FIGS. 13A and 13B describe an example of a four-color cemented two-glass lens triplet in which the optical glasses from which the three lens elements of the triplet are made were selected in accordance with the present invention. The lens triplet as shown in FIG. 13B has a focal length that is 40 times the focal length of the lens doublets shown in FIGS. 8–12 at $\lambda_0 = 0.54607$ μm for a relative aperture of f/10. The first and third lens elements of the lens triplet of FIG. 13B are made of Corning-France 486817 glass, and the second (i.e., middle) lens element is made of Corning-France 589612 glass. These glass types were chosen because the ratios of their primary to secondary η-dispersion coefficients are substantially equal, and because the absolute value of the difference between corresponding values of $\eta_1$ for the two glasses is large.

The wavelength scan curve shown in FIG. 13A crosses the horizontal axis at four discrete wavelengths in the spectral range extending from the blue to the near infrared wavelengths, and is close to the horizontal axis throughout this spectral range. Thus, a lens triplet made from this particular pair of optical glasses can provide very effective axial color correction throughout this region of the optical spectrum.

It is convenient to specify the design form of the lens triplet of FIG. 13B in terms of unit focal length for a relative aperture of f/10, as was done above for the lens doublets of FIGS. 8B through 12B. It is noted, however, that the depiction in FIG. 13B shows a lens triplet whose focal length is 40 times that of the lens doublets shown in FIGS. 8B through 12B. In terms of the focal length f, the design form of the lens triplet of FIG. 13B is specified in the tabular format as follows:

| Surface No. | Radius | Thickness | $N_e$ | $V_e$ | Material |
|---|---|---|---|---|---|
| 1 | .368 f | .015 f | 1.48746 | 81.40 | Corn-F 486817 |
| 2 | −2.029 f | .009 f | 1.59129 | 60.94 | Corn-F 589612 |
| 3 | .212 f | .013 f | 1.48746 | 81.40 | Corn-F 486817 |
| 4 | −2.324 f | | | | |

FIGS. 14A and 14B describe a particular example of a four-color two-glass lens triplet in which the three lens elements are made of the same types of optical glasses as for the cemented lens triplet shown in FIG. 13B, with the first and second lens elements being cemented together, and with an air gap being provided between the second and third lens elements. The focal length of the lens triplet shown in FIG. 14B is the same as for the lens triplet shown in FIG. 13B for the same relative aperture of f/10.

The wavelength scan curve shown in FIG. 14A likewise crosses the horizontal axis at four discrete wavelengths in the spectral range extending from the blue to the near infrared wavelengths, and is close to the horizontal axis throughout this spectral range. Thus, the degree of axial color correction obtainable using the pair of glasses of the cemented lens triplet shown in FIG. 13B is seen to be retained when an air space is provided between two of the lens elements. The wavelength scan thus indicates that, for a given pair of optical materials, the quality of axial color correction obtainable with a two-glass lens triplet is determined by the choice of glasses used to make the lens elements of the triplet, and is independent of the design form of the triplet. Of course, the quality of correction for lateral color aberration, spherochromatism and the higher-order monochromatic aberrations is dependent upon the design form of the lens triplet.

In terms of the focal length, the design form of the lens triplet of FIG. 14B is specified in tabular format as follows:

| Surface No. | Radius | Thickness | $N_e$ | $V_e$ | Material |
|---|---|---|---|---|---|
| 1 | .419 f | .015 f | 1.48746 | 81.40 | Corn-F 486817 |
| 2 | −.449 f | .009 f | 1.59129 | 60.94 | Corn-F 589612 |
| 3 | .342 f | .001 f | | | Air |
| 4 | .360 f | .013 f | 1.48746 | 81.40 | Corn-F 486817 |
| 5 | −1.101 f | | | | |

Two-Glass Lens Quadruplets

FIGS. 15A and 15B describe a particular example of a four-color cemented two-glass lens quadruplet having a focal length that is 40 times the focal length of the lens doublets shown in FIGS. 8B through 12B at $\lambda_0 = 0.54607$ μm for a relative aperture of f/10. The optical glasses from which the four lens elements of the quadruplet shown in FIG. 15B are made were selected in accordance with the present invention. The first and third lens elements are made of Corning-France 486817 glass, and the second and fourth lens elements are made of Corning-France 589612 glass. These glasses were chosen because the ratios of their primary to secondary η-dispersion coefficients are substantially equal, and because the absolute value of the difference between corresponding values of $\eta_1$ for the two glasses is large.

The wavelength scan curve shown in FIG. 15A crosses the horizontal axis at four discrete wavelengths in the spectral range extending from the blue to the near infrared region of the optical spectrum. The wavelength scan curve is close to the horizontal axis throughout this spectral range, which indicates that a lens quadruplet made from this particular pair of glasses can provide effective axial color correction throughout this spectral range.

In terms of the focal length, the design form of the lens quadruplet of FIG. 15B is specified in tabular format as follows:

| Surface No. | Radius | Thickness | $N_e$ | $V_e$ | Material |
|---|---|---|---|---|---|
| 1 | .437 f | .015 f | 1.48746 | 81.40 | Corn-F 486817 |
| 2 | 5.098 f | .009 f | 1.59129 | 60.94 | Corn-F 589612 |
| 3 | .285 f | .015 f | 1.48746 | 81.40 | Corn-F 486817 |
| 4 | −.363 f | .009 f | 1.59129 | 60.94 | Corn-F 589612 |
| 5 | −1.147 f | | | | |

FIGS. 16A and 16B describe a particular example of a four-color two-glass lens quadruplet in which the four lens elements are made of the same types of optical glasses as for the cemented lens quadruplet shown in FIG. 15B, with the first and second lens elements being cemented together, the third and fourth lens elements being cemented together, and an air gap being provided between the second and third lens elements. The focal length of the lens quadruplet shown in FIG. 16B is the same as for the lens quadruplet shown in FIG. 15B for the same relative aperture of f/10.

The wavelength scan curve shown in FIG. 16A likewise crosses the horizontal axis at four discrete wavelengths in the spectral range extending from the blue to the near infrared region of the optical spectrum. The wavelength scan curve of FIG. 16A is likewise close to the horizontal axis throughout this spectral range. As can be seen by comparing the wavelength scan of FIG. 16A with the wavelength scan of FIG. 15A, the degree of axial color correction obtainable using the pair of glasses of the cemented lens quadruplet of FIG. 15B is retained when an air space is provided between two of the lens elements.

In terms of the focal length, the design form of the lens quadruplet of FIG. 16B is specified in tabular format as follows:

| Surface No. | Radius | Thickness | $N_3$ | | Material |
|---|---|---|---|---|---|
| 1 | .948 f | .015 f | 1.48746 | 81.40 | Corn-F 486817 |
| 2 | −.375 f | .009 f | 1.59129 | 60.94 | Corn-F 589612 |
| 3 | 1.280 f | .001 f | | | Air |
| 4 | .499 f | .009 f | 1.59129 | 60.94 | Corn-F 589612 |
| 5 | .274 f | .015 f | 1.48746 | 81.40 | Corn-F 486817 |
| 6 | −1.150 f | | | | |

FIGS. 17A and 17B describe a particular example of a four-color two-glass lens quadruplet in which the four lens elements are made of the same types of optical glasses as for the lens quadruplets shown in FIGS. 15B and 16B, except that the first and third lens elements are made of Corning-France 486817 glass and the second and fourth lens elements are made of Corning-France 589612 glass. The focal length of the lens quadruplet shown in FIG. 17B is the same as for the lens quadruplets shown in FIGS. 15B and 16B for the same relative aperture of f/10. As with the lens quadruplet shown in FIG 16B, the first and second lens elements of the lens quadruplet shown in FIG. 17B are cemented together, and the third and fourth lens elements are cemented together, and an air gap is provided between the second and third lens elements.

The wavelength scan curve shown in FIG. 17A likewise crosses the horizontal axis at four discrete wavelengths in the spectral range extending from the blue to the near infrared region of the optical spectrum. The wavelength scan curve of FIG. 16A is likewise close to the horizontal axis throughout this spectral range. When compared with the wavelength scans shown in FIGS. 15A and 16A, the wavelength scan shown in FIG. 17A further indicates that the quality of axial color correction obtainable with a lens multiplet is determined by the choice of glasses used for designing the multiplet, and is independent of the design form of the multiplet.

In terms of the focal length, the design form of the lens quadruplet of FIG. 17B is specified in tabular format as follows:

| Surface No. | Radius | Thickness | $N_e$ | $V_e$ | Material |
|---|---|---|---|---|---|
| 1 | .823 f | .015 f | 1.48746 | 81.40 | Corn-F 486817 |
| 2 | −.400 f | .009 f | 1.59129 | 60.94 | Corn-F 589612 |
| 3 | 1.069 f | .001 f | | | Air |

-continued

| Surface No. | Radius | Thickness | $N_e$ | $V_e$ | Material |
|---|---|---|---|---|---|
| 4 | .645 f | .015 f | 1.48746 | 81.40 | Corn-F 486817 |
| 5 | −.337 f | .009 f | 1.59129 | 60.94 | Corn-F 589612 |
| 6 | −.758 f | | | | |

Two-Glass Collimators

FIGS. 18A and 18B describe a four-color collimator comprising a two-glass lens quadruplet, which can be used for precise collimation of a beam of light having a spectral range from blue to near infrared. The collimator of FIGS 18A and 18B comprise a lens quadruplet wherein the consecutive lens elements are all airspaced. The first and fourth lens elements of the collimator are made of Hoya FCD10 glass, and the second and third lens elements are made of Ohara LAK14 glass.

The wavelength scan curve shown in FIG. 18A crosses the horizontal axis at four discrete wavelengths, and is close to the horizontal axis throughout a wavelength bend that bridges the visible and near infrared spectral regions. In fact, the wavelength scan curve of FIG. 18A substantially coincides with the horizontal axis throughout the near infrared spectral range, which illustrates the suitability of this particular combination of optical glasses for correcting paraxial chromatic aberration in the near infrared spectral range.

The collimator shown in FIG. 18, in addition to being substantially color-corrected in the near infrared spectral range, is also well-corrected for the various monochromatic aberrations. In terms of the focal length for a relative aperture of f/10, the design form of the collimator of FIG. 18B is specified in detail in tabular format as follows:

| Surface No. | Radius | Thickness | $N_e$ | $V_e$ | Material |
|---|---|---|---|---|---|
| 1 | 1.244 f | .015 f | 1.45770 | 90.32 | Hoya FCD10 |
| 2 | −.381 f | .010 f | | | Air |
| 3 | −.381 f | .009 f | 1.69979 | 55.31 | Ohara LAK14 |
| 4 | −.542 f | .002 f | | | Air |
| 5 | −.539 f | .009 f | 1.69979 | 55.31 | Ohara LAK14 |
| 6 | −3.845 f | .0005 f | | | Air |
| 7 | .715 f | .015 f | 1.45770 | 90.32 | Hoya FCD10 |
| 8 | −1.025 f | | | | |

FIGS. 19A and 19B describe a five-color collimator comprising a two-glass lens quadruplet. The first and fourth lens elements of the collimator of FIGS. 19A and 19B are made of Schott PK51 glass, and the second and third lens elements are made of Hoya LAC7 glass. These two optical glasses were selected because of the substantial collinearity of their respective glass points with the origin of the coordinate system in four-dimensional η-dispersion coefficient space, and also because the absolute value of the difference between their respective primary dispersion coefficients is large.

The wavelength scan curve shown if FIG. 19A crosses the horizontal axis at five discrete wavelengths in the spectral range extending from about 0.38 μm to about 0.80 μm. These five wavelengths can therefore be precisely focussed using the collimator of FIG. 19B. The other wavelengths of this spectral range can be focussed with a degree of precision indicated by the closeness with which the wavelength scan curve of FIG. 19A approaches the horizontal axis.

The collimator shown in FIG. 19B is well-corrected for the various monochromatic aberrations, especially spherochromatism. In terms of the focal length for a relative aperture of f/10, the design form of the collimator of FIG. 19B is specified in tabular format as follows:

| Surface No. | Radius | Thickness | $N_e$ | $V_e$ | Material |
|---|---|---|---|---|---|
| 1 | −1.314 f | .018 f | 1.53019 | 76.57 | Schott PK51 |
| 2 | −.295 f | .025 f | | | Air |
| 3 | −.269 f | .010 f | 1.65426 | 58.15 | Hoya LAC7 |
| 4 | −1.795 | .003 f | | | Air |
| 5 | .469 f | .010 f | 1.65426 | 58.15 | Hoya LAC7 |
| 6 | .233 f | .002 f | | | Air |
| 7 | .232 f | .015 f | 1.53019 | 76.57 | Schott PK51 |
| 8 | −.697 f | | | | |

FIGS. 20A and 20B describe a five-color collimator comprising a lens quadruplet having a focal length that is 40 times the focal length of the doublets shown in FIGS. 8B through 12B at $\lambda_0 = 0.54607$ μm for a relative aperture of f/8. The first and fourth lens elements of the collimator of FIG. 20B are made of calcium fluoride crystal, and the second and third lens elements are made of Hoya LAC7 glass. Use of calcium fluoride crystal as one of the optical materials enables a larger aperture (i.e., a lower f-number) to be used than would be possible if both optical materials were glasses. With the collimator of FIG. 20B, a light beam of large diameter can be collimated without significant error due to spherochromatism. The wavelength scan curve shown in FIG. 20A crosses the horizontal axis at five wavelengths, and therefore indicates that precise collimation can be obtained at five wavelengths, in the spectral range from ultraviolet to near infrared. The closeness of the wavelength scan curve to the horizontal axis throughout this spectral range indicates that a high degree of collimation can be obtained for the other wavelengths in this range.

In terms of the focal length for a relative aperture of f/8, the design form of the collimator of FIG. 20B is specified in tabular format as follows:

| Surface No. | Radius | Thickness | $N_e$ | $V_e$ | Material |
|---|---|---|---|---|---|
| 1 | −.668 f | .018 f | 1.43500 | 95.06 | Calcium Fluoride |
| 2 | −.168 f | .032 f | | | Air |
| 3 | −.250 f | .010 f | 1.65426 | 58.15 | Hoya LAC7 |
| 4 | −.565 f | .001 f | | | Air |
| 5 | .455 f | .010 f | 1.65426 | 58.15 | Hoya LAC7 |
| 6 | .384 f | .001 f | | | Air |
| 7 | .424 f | .015 f | 1.43500 | 95.06 | Calcium Fluoride |
| 8 | .635 f | | | | |

Two-Glass Mangin Mirrors

FIGS. 21A and 21B describe a particular example of a cemented Mangin doublet mirror, which is color-corrected at five wavelengths. The Mangin doublet mirror of FIGS 21A and 21B has unit focal length at $\lambda_0 = 0.54607$ μm for relative aperture of f/2, and comprises a first lens element made of Hoya FCD10 glass and a second lens elements made of Hoya FC3 glass. The outward facing surface of the second lens element is provided with a reflective coating, which could comprise a conventional reflecting material such as, e.g., silver or aluminum.

The Hoya FCD10 and Hoya FC3 glasses, used in combination, provide color correction at five wavelengths. The design form of the particular Mangin doublet mirror shown in FIG. 21B is specified in tabular format as follows:

| Surface No. | Radius | Thickness | $N_e$ | $V_e$ | Material |
|---|---|---|---|---|---|
| 1 | −.958 f | .036 f | 1.45770 | 90.32 | Hoya FCD10 |
| 2 | 4.200 f | .057 f | 1.46619 | 65.49 | Hoya FC3 |
| 3 | −1.572 f | −.057 f | 1.46619 | 65.49 | Hoya FC3 |
| 4 | 4.200 f | −.036 f | 1.45770 | 90.32 | Hoya FCD10 |
| 5 | −.958 f | | | | | where the negative values of thickness listed for the lens element after the third surface, as numbered in accordance with conventional practice from left to right in the drawing, indicate that reflection occurs at the third surface. Thus, the fourth surface is the same as the second surface, and the fifth surface is the same as the first surface. Light at a color-corrected wavelength passing consecutively through the first and second surfaces is reflected from the third surface back consecutively through the second (i.e., fourth) and first (i.e., fifth) surfaces to the focal plane of the Mangin doublet mirror.

The wavelength scan curve of FIG. 21A for the Mangin doublet mirror shown in FIG. 21B indicates that precise color correction occurs at five discrete wavelengths in the optical spectrum and that a high degree of axial color correction is achieved over a band of wavelengths extending from the far ultraviolet to the near infrared regions of the spectrum. In general, in accordance with the present invention, dispersive effects can be substantially eliminated from Mangin mirrors by the proper choice of optical materials from which the lens elements are made.

FIGS. 22A and 22B describe another example of a cemented Mangin doublet mirror, which provides substantially complete axial color correction from the blue to the near infrared regions of the spectrum. The Mangin doublet mirror of FIGS. 22A and 22B has unit focal length at $\lambda_0 = 0.54607$ μm for a relative aperture of f/2, and comprises a first lens element made of Hoya BAF11 glass and a second lens element made of Hoya FL6 glass. The outward facing surface of the second lens element is provided with a reflective coating. The design form of the Mangin doublet mirror shown in FIG. 22B is specified in tabular format as follows:

| Surface No. | Radius | Thickness | $N_e$ | $V_e$ | Material |
|---|---|---|---|---|---|
| 1 | −1.897 f | .025 f | 1.67000 | 47.97 | Hoya BAF11 |
| 2 | 3.607 f | .040 f | 1.57047 | 42.57 | Hoya FL6 |
| 3 | −1.825 f | −.040 f | 1.57047 | 42.57 | Hoya FL6 |
| 4 | 3.607 f | −.025 f | 1.67000 | 47.97 | Hoya BAF11 |
| 5 | −1.897 f | | | | |

The wavelength scan curve of FIG. 22A for the Mangin doublet mirror illustrated in FIG. 22b shows that precise axial color correction (i.e., crossing of the horizontal axis) occurs at four discrete wavelengths, and that a high degree of axial color correction (i.e., only insignificant paraxial marginal ray height) occurs throughout the spectral range extending from the blue to beyond 0.8 μm in the near infrared regions of the spectrum.

FIGS. 23A and 23B describe an example of a cemented Mangin doublet mirror, which provides substantially complete color correction from the blue to well into the near infrared regions of the optical spectrum. The Mangin doublet mirror of FIGS. 23A and 23B has unit focal length at $\lambda_0 = 0.54607$ μm for relative aperture of f/2, and comprises a first lens element made of Corning-France 486817 glass and a second lens element made of Corning-France 697554 glass. The outward facing surface of the second lens elements is provided with a reflective coating. The design form of the Mangin doublet mirror shown in FIG. 23B is specified in tabular format as follows:

| Surface No. | Radius | Thickness | $N_e$ | $V_e$ | Material |
|---|---|---|---|---|---|
| 1 | −.753 f | .042 f | 1.48746 | 81.40 | Corn-F 486817 |
| 2 | −7.400 f | .006 f | 1.70000 | 55.18 | Corn-F 697554 |
| 3 | −1.536 f | −.066 f | 1.70000 | 55.18 | Corn-F 697554 |
| 4 | −7.400 f | −.042 f | 1.48746 | 81.40 | Corn-F 486817 |
| 5 | −.753 | | | | |

The wavelength scan curve of FIG. 23A for the Mangin doublet mirror illustrated in FIG. 23A shows that precise axial color correction occurs at four discrete wavelengths, and that a high degree of axial color correction occurs throughout the spectral range extending from the blue to beyond 1.0 μm in the near infrared region of the spectrum.

FIGS. 24A and 24B illustrates a particular example of an air-spaced Mangin doublet mirror, which is color-corrected at five wavelengths. The Mangin doublet mirror of FIG. 24 has unit focal length at $\lambda_0 = 0.54670$ μm for a relative aperture of f/2, and comprises a first lens element made of Schott PK51 glass and a second lens element made of Hoya LAC7 glass. The two lens elements are separated by an air gap, and the outward facing surface of the second lens element is provided with a reflective coating. The design form of the Mangin doublet mirror shown in FIG. 29B is specified in tabular format as follows:

| Surface No. | Radius | Thickness | $N_e$ | $V_e$ | Material |
|---|---|---|---|---|---|
| 1 | −.775 f | .040 f | 1.53019 | 76.57 | Schott PK51 |
| 2 | 3.799 f | .007 f | | | Air |
| 3 | 4.568 f | .061 f | 1.65426 | 58.15 | Hoya LAC7 |
| 4 | −1.501 f | −.061 f | 1.65426 | 58.15 | Hoya LAC7 |
| 5 | 4.568 f | −.007 f | | | Air |
| 6 | −3.799 f | −.040 f | 1.53019 | 76.57 | Schott PK51 |
| 7 | −.775 f | | | | |

The wavelength scan curve of FIG. 24A for the Mangin doublet mirror shown in FIG. 24B indicates that precise color correction occurs at five discrete wavelengths, and that a high degree of axial color correction occurs throughout the spectral range extending from the violet to the near infrared regions of the optical spectrum.

FIGS. 25A and 25B describe an example of an air-spaced Mangin doublet mirror, which provides substantially complete axial color correction throughout the visible and into the near infrared portions of the optical spectrum. The Mangin doublet mirror of FIGS. 25A and 25B has unit focal length at $\lambda_0 = 0.54607$ μm for a relative aperture of f/2, and comprises a first lens element made of Hoya FCD10 glass and a second lens element made of Ohara PSK1 glass. The two lens elements are separated by an air gap, and the outward facing surface of the second lens element is provided with a reflective coating. The design form of the Mangin doublet mirror shown in FIG. 25B is specified in tabular format as follows:

| Surface No. | Radius | Thickness | $N_e$ | $V_e$ | Material |
|---|---|---|---|---|---|
| 1 | −.736 f | .036 f | 1.45770 | 90.32 | Hoya FCD10 |
| 2 | 8.012 f | .004 f | | | Air |
| 3 | 8.273 f | .057 f | 1.54979 | 62.60 | Ohara PSK1 |
| 4 | −1.476 f | −.057 f | 1.54979 | 62.60 | Ohara PSK1 |
| 5 | 8.273 f | −.004 f | | | Air |
| 6 | 8.012 f | −.036 f | 1.45770 | 90.32 | Hoya FCD10 |
| 7 | −.736 f | | | | |

The wavelength scan curve shown in FIG. 25A substantially coincides with the horizontal axis through the visible portion of the optical spectrum, although a larger scale plot would show that the crossings of the horizontal axis actually occur at five discrete wavelengths. Technically, therefore, the Mangin doublet mirror of FIGS. 25A and 25B is color-corrected at only five wavelengths. However, for many practical applications, this Mangin doublet mirror can be considered to be substantially color-corrected throughout the visible wavelength band.

FIGS. 26A and 26B describe an example of an air-spaced Mangin doublet mirror, which provides substantially complete axial color correction from the green region of the visible spectrum to well into the infrared wavelengths. The Mangin doublet mirror of FIGS. 26A and 26B has unit focal length at $\lambda_0 = 0.54607$ μm for a relative aperture of f/2, and comprises a first lens element made of Hoya FCD10 glass and a second lens element made of Hoya LAC14 glass. The two lens elements are separated by an air gap, and the outward facing surface of the second lens element is provided with a reflective coating. The design form of the Mangin doublet mirror shown in FIG. 26B is specified in tabular format as follows:

| Surface No. | Radius | Thickness | $N_3$ | $V_e$ | Material |
|---|---|---|---|---|---|
| 1 | −.661 f | .029 f | 1.45770 | 90.32 | Hoya FCD10 |
| 2 | −2.254 f | .010 f | | | Air |
| 3 | −3.628 f | .054 f | 1.69980 | 55.25 | Hoya LAC14 |
| 4 | −1.519 f | −.054 f | 1.69980 | 55.25 | Hoya LAC14 |
| 5 | −3.628 f | −.010 f | | | Air |
| 6 | −2.254 f | −.029 f | 1.45770 | 9.32 | Hoya FCD10 |
| 7 | −.661 f | | | | |

The wavelength scan curve shown in FIG. 26A substantially coincides with the horizontal axis from the green wavelength region to beyond 1.0 μm in the near infrared wavelength region of the spectrum. A larger scale plot would show that crossings of the horizontal axis actually occur at only four discrete wavelengths. Technically, therefore, the Mangin doublet mirror of FIGS. 26A and 26B is color-corrected at only four wavelengths. However, for many practical applications, particularly applications in the near infrared region of the spectrum, the Mangin doublet mirror of FIGS. 26A and 26B can be considered to be substantially color-corrected throughout the wavelength band of interest.

Two-Glass Petzval Lens System

The designation "Petzval lens system" is generally applied to a lens system comprising two widely separated lens groups, each of which has a net positive dioptric power, followed by a negative lens element or a lens group having a net negative dioptric power. The positive lens groups in combination provide good resolution at high aperture for narrow to moderate fields of view. The negative lens element or lens group functions as a field flattener. A lens group is said to have positive dioptric power when it causes light rays passing through it to converge, and to have negative dioptric power when it causes light rays passing through it to diverge. Often, each lens group of a Petzval lens system is a doublet. However, for a particular application, either one (or all) of the lens groups of a Petzval lens system could be a singlet, a triplet or a high-number multiplet.

The spacing between the two positive lens groups of a Petzval lens system is large in comparison with the thicknesses of the individual lens elements comprising each lens group. Within a lens group, the individual lens elements could be cemented or air-spaced. It is usual for a negative lens element or lens group functioning as a field flattener to be positioned immediately in front of the image plane of the system to correct for field curvature. A Petzval lens system that includes a field flattener is called, appropriately, a flat-field Petzval lens system.

For a given optical design, aberrations scale linearly with the physical size of the system. Thus, a lens system that is reasonably well-corrected for a relatively short focal length (say, less than 10 mm) might have very severe aberration problems at a focal length of more than 100 mm. In the prior art, Petzval lens systems were typically used only in short-focus applications, e.g., in projectors for 16 mm and 8 mm motion-picture films. For very long-focus applications (e.g., more than 200 mm), Petzval-type lens systems were not generally used because of the difficulty in designing high-aperture long-focus Petzval lens systems that are well-corrected.

The lens groups of Petzval lens systems of the prior art were typically "achromats", i.e., doublets color-corrected at only two wavelengths. Furthermore, Petzval lens systems of the prior art were typically used only in relatively narrow field-angle applications. An example of a short-focus narrow field-angle Petzval lens system is described in U.S. Pat. No. 3,255,664.

FIGS. 27A and 27B describe a two-glass flat-field lens system of the Petzval type made of the same two types of optical glasses as used for the lens doublet shown in FIG. 12B, i.e., Schott PK51 and Hoya LAC7 glasses. The last lens element in the system, which is a biconcave lens made of Hoya LAC7 glass, functions as a field flattener. The Petzval lens system of FIGS. 27A and 27B is color-corrected at five wavelengths in the optical spectrum from 0.4 μm to 0.7 μm, and is also well-corrected for monochromatic aberrations in this spectral range.

The design form of a Petzval lens system of FIG. 27B, in terms of the focal length for a relative aperture of f/3.5, is specified in tabular format as follows:

| Surface No. | Radius | Thickness | $N_e$ | $V_e$ | Material |
|---|---|---|---|---|---|
| 1 | .342 f | .031 f | 1.53019 | 76.57 | Schott PK51 |
| 2 | −.497 f | .006 f | | | Air |
| 3 | −1.190 f | .020 f | 1.65426 | 58.15 | Hoya LAC7 |
| 4 | 1.465 f | .015 f | | | Air |
| 5 | −.299 f | .020 f | 1.65426 | 58.15 | Hoya LAC7 |
| 6 | .522 f | .001 f | | | Air |
| 7 | .350 f | .028 f | 1.53019 | 76.57 | Schott PK51 |
| 8 | −.438 f | .274 f | | | Air |
| 9 | −.508 f | .023 f | 1.53019 | 76.57 | Schott PK51 |
| 10 | −.593 f | .016 f | | | Air |
| 11 | −.225 f | .018 f | 1.65426 | 58.15 | Hoya LAC7 |
| 12 | 1.483 f | .014 f | | | Air |
| 13 | .417 f | .025 f | 1.53019 | 76.57 | Schott PK51 |
| 14 | −.356 f | .268 f | | | Air |
| 15 | −.241 f | .013 f | 1.65426 | 58.15 | Hoya LAC7 |
| 16 | 2.412 f | | | | |

The wavelength scan curve of FIG. 27A for the Petzval lens system shown in FIG. 27B shows three crossings of the horizontal axis in the visible spectral range, as well as single crossings in the ultraviolet and infrared portions of the spectrum. For the visible wavelengths from the blue region into the red region, the paraxial marginal ray height is insignificant, indicating that very substantial axial color correction occurs throughout that portion of the visible spectrum. The design form of this Petzval lens system also provides superb correction of the monochromatic aberrations, and the chromatic variation of the spherical aberration and coma.

The Petzval lens system of FIG. 27B is noteworthy for having a long focal length (f=600 mm) at a relative aperture of f/3.5, while providing a field of view of 12°. This particular Petzval lens system is without precedent in enabling diffraction limited performance to be provided at such a large aperture and wide field of view.

FIGS. 28A and 28B describe a two-glass flat-field lens system of the Petzval type made of the same two type of optical glasses as used for the lens doublets shown in FIGS. 10B and 11B, i.e., Corning-France 486817 and Ohara LAK14 glasses. The Petzval lens system of FIGS. 28A and 28B is color-corrected at four wavelengths, two in the visible region and two in the infrared region. This system is also well-corrected for spherochromatism and the monochromatic aberrations.

The design form of the Petzval lens system of FIG. 28B in terms of the focal length for a relative aperture of f/3.5, is specified in tabular format as follows:

| Surface No. | Radius | Thickness | $N_e$ | $V_e$ | Material |
|---|---|---|---|---|---|
| 1 | .305 f | .020 f | 1.48746 | 81.40 | Corn-F 486817 |
| 2 | −.900 f | .005 f | | | Air |
| 3 | −.337 f | .013 f | 1.69979 | 55.31 | Ohara LAK14 |
| 4 | −.398 f | .001 f | | | Air |
| 5 | −.192 f | .018 f | 1.48746 | 81.40 | Corn-F 486817 |
| 6 | −.692 f | .166 f | | | Air |
| 7 | −.441 f | .016 f | 1.48746 | 81.40 | Corn-F 486817 |
| 8 | −.385 f | .010 f | | | Air |
| 9 | −.146 f | .011 f | 1.69979 | 55.31 | Ohara LAK14 |
| 10 | −.552 f | .009 f | | | Air |
| 11 | −.393 f | .060 f | 1.48746 | 81.40 | Corn-F 486817 |
| 12 | −.240 f | .187 f | | | Air |
| 13 | −.162 f | .014 f | 1.69979 | 55.31 | Ohara LAK14 |
| 14 | −.789 f | | | | |

The wavelength scan curve of FIG. 28A for the Petzval lens system shown in FIG. 28B shows very substantial (if not perfect) color-correction throughout the spectral range extending from the blue wavelength region to beyond 1.0 μm in the near infrared region. It is remarkable that such color correction can be obtained for a Petzval lens system using only two different optical glasses. The Petzval lens system of FIG. 28B has a long focal length (f=380 mm) at a relative aperture of f/3.5, while providing a field of view of approximately 12°. The design form of this Petzval lens system provides diffration limited performance throughout the spectral range for which it is color-corrected.

FIGS. 29A and 29B describe another long-focus flat-field Petzval lens system whose lens elements are made of only two different types of optical glasses, viz., Schott FK51 and Schott LAKN14 glasses. This Petzval lens system is color-corrected at three wavelengths, two in the visible region and one in the infrared region. The system is also well-corrected for spherochromatism and the monochromatic aberrations, and provides diffration limited performance throughout the spectral range for which it is color-corrected.

The design form of the Petzval lens system of FIG. 29B, in terms of the focal length for a relative aperture of f/2 (i.e., an extremely wide aperture), is specified in tabular format as follows:

| Surface No. | Radius | Thickness | $N_e$ | $V_e$ | Material |
|---|---|---|---|---|---|
| 1 | 2.066 f | .094 f | 1.48794 | 84.07 | Schott FK51 |
| 2 | −1.933 f | .156 f | | | Air |
| 3 | −4.568 f | .087 f | 1.48794 | 84.07 | Schott FK51 |
| 4 | −1.026 f | .004 f | | | Air |
| 5 | −.991 f | .037 f | 1.69980 | 55.19 | Schott LAKN14 |
| 6 | 24.483 f | .033 f | | | Air |
| 7 | −1.339 f | .037 f | 1.69980 | 55.19 | Schott LAKN14 |
| 8 | 63.427 f | .001 f | | | Air |
| 9 | .850 f | .087 f | 1.48794 | 84.07 | Schott FK51 |
| 10 | −5.545 f | .873 f | | | Air |
| 11 | .422 f | .050 f | 1.48794 | 84.07 | Schott FK51 |
| 12 | −.555 f | .010 f | | | Air |
| 13 | −.473 f | .025 f | 1.69980 | 55.19 | Schott LAKN14 |
| 14 | −5.724 f | .032 f | | | Air |
| 15 | −2.021 f | .025 f | 1.69980 | 55.19 | Schott LAKN14 |
| 16 | .969 f | .001 f | | | Air |
| 17 | .340 f | .050 f | 1.48794 | 84.07 | Schott FK51 |
| 18 | −.798 f | .249 f | | | Air |
| 19 | −.252 f | .025 f | 1.69980 | | Schott LAKN14 |
| 20 | 5.189 f | | | | |

The wavelength scan curve of FIG. 29A for the Petzval lens system shown in FIG. 29B shows that precise axial color-correction occurs at the wavelengths 0.527 μm, 0.640 μm, and 0.778 μm, the degree of color-correction obtainable is very high. The Petzval lens system of FIG. 29B has a focal length of 100 mm, and a field angle of 4.2°.

Two-Glass Prism Systems

FIGS. 30A and 30B describe a two-glass cemented doublet prism system having a deviation angle of 6° for which very substantial color correction (i.e., only insignificant dispersion) occurs throughout the visible spectrum. The deviation angle of a prism is defined as the angle through which a ray changes direction after passing through the prism, i.e., the angle between the direction of the ray entering the system and the direction of the ray exiting from the system. The prism system of FIGS. 30A and 30B comprises a first prism element made of Schott PK51 glass and having an apex angle of $\alpha_1=42.0239°$, and a second prism element made of Hoya LAC7 glass and having an apex angle of $\alpha_2=-25.5872°$. The negative sign for $\alpha_2$ is a convention indicating that the orientation of the apex of the second prism element is inverted with respect to the orientation of the apex of the first prism element.

The curve in FIG. 3A is a plot of change in angular deviation (in degrees) versus wavelength (in micrometers) for this particular doublet prism system for a 6° total deviation angle. The curve in FIG. 30A crosses the horizontal axis at five discrete wavelengths, which indicates that chromatic dispersion from a total deviation angle of 6° is precisely zero at those discrete wavelengths. It is particularly noteworthy, however, that the curve in FIG. 30A is very close to the horizontal axis throughout the entire visible region extending well into the infrared region of the spectrum to about 0.8 μm. For those wavelengths at which the total deviation angle differs from 6°, the difference is approximately 0.0001 degree throughout this wavelength band. Thus, for many applications, the prism system of FIGS. 30A and 30B can be considered to be color-corrected (i.e., as having substantially zero dispersion) for a deviation angle of 6° throughout this rather wide wavelength band, which includes the entire visible region.

The plot of change in angular deviation versus wavelength shown in FIG. 30A described a "real" ray trace, not a paraxial ray trace as in the foregoing plots for dioptric and catadioptric systems. The plots shown in FIG. 30A and in the following examples of other prism systems were based upon data obtained from ray traces according to Snell's law.

FIGS. 31A and 31B describe a two-glass cemented quintuplet prism system, which provides a high degree of color correction throughout the visible spectrum for a total deviation angle of 30°. The prism system of FIGS. 31A and 31B comprises a first prism element made of Schott PK51 glass and having an apex angle of $\alpha_1=43.1695°$, a second prism element made of Hoya LAC7 glass and having an apex angle of $\alpha_2=-43.1695°$, a third prism element made of Schott PK51 glass and having an apex angle of $\alpha_3=43.1695°$, a fourth prism element made of Hoya LAC7 glass and having an apex angle of $\alpha_4=-43.1695°$, and a fifth prism element made of Schott PK51 glass and having an apex angle of $\alpha_5=57.5776°$. From a manufacturing standpoint, it is of special interest that $\alpha_1$, $\alpha_2$, $\alpha_3$ and $\alpha_4$ have the same value, where the negative sign given for $\alpha_2$ and $\alpha_4$ indicates that the orientations of the second and fourth prism elements are inverted with respect to the orientations of the first, third and fifth prism elements.

A plot of change in angular deviation versus wavelength shown in FIG. 31A indicates that chromatic dispersion from a total deviation angle of 30° is precisely zero at five discrete wavelengths. It is to be noted that a total deviation angle of 30° is a large total deviation angle. The 30° deviation of a beam of light that is produced by the prism system of FIGS. 31A and 31B is equivalent to the deviation produced by the marginal zone of a lens with a relative aperture of f/1.0. The plot of change in angular deviation versus wavelength in FIG. 31A indicates that the change in total angular deviation from 30° is only about 0.0005 degree for any wavelength in the spectral band that includes the entire visible region and a portion of the near infrared region extending to almost 0.8 μm. The change in total angular deviation from 30° is in fact zero at five discrete wavelengths in this spectral band.

FIGS. 32A and 32B a two-glass cemented quintuplet prism system, which is designed using the same types of glasses as the quintuplet prism system of FIG. 31B. The only difference between the prism system of FIG. 32B and the prism system of FIG. 31B is that the apex angles of the prism elements of the system shown in FIG. 32B have different values. Thus, for the first prism element $\alpha_1=83.1964°$, for the second prism element $\alpha_2=-44.9553°$, for the third prism element $\alpha_3=40.8576°$, for the fourth prism element $\alpha_4=-46.9210°$, and for the fifth prism element $\alpha_5=37.5019°$.

Optical Systems Comprising More Than Two Glasses

The present invention provides the designer with the ability to design optical systems that are color-corrected at three or more wavelengths using only two different optical materials. Thus, as a result of the present invention, complicated multiglass optical systems of the prior art can be replaced by simpler two-glass optical systems that provide comparable, or better, color correction. This ability to simplify complicated optical systems while improving performance is a major advantage inherent in the present invention.

The method of the present invention for selecting more than two optical materials for designing color-corrected optical systems is of general interest in terms of demonstrating the unified theory. Ordinarily, in practical applications, a two-glass optical system is to be preferred to a system having the same capabilities but comprising more than two optical materials. In particular applications, however, where color correction at particular wavelengths is required, optical systems comprising three or more different optical materials might be used to provide optimum color correction for specified operational requirements.

FIGS. 33A and 33B describe a particular example of a three-glass lens multiplet for which the lens elements comprising the multiplet were selected in accordance with the present invention. The lens multiplet of FIGS. 33A and 33B is a quintuplet having a focal length of 1000 mm at $\lambda_0=0.54607$ μm for a relative aperture of f/10, and provides color correction at five wavelengths. In accordance with conventional practice, the five lens elements comprising the lens quintuplet are described consecutively from left to right as shown in drawing. The design form of the lens quintuplet of FIG. 33B is specified in tabular format as follows:

| Surface No. | Radius | Thickness | $N_e$ | $V_e$ | Material |
|---|---|---|---|---|---|
| 1 | .493 f | .015 f | 1.49845 | 81.22 | Ohara FK01 |
| 2 | −.660 f | .034 f | | | Air |
| 3 | −.538 f | .012 f | 1.72538 | 34.49 | Ohara KZFS8 |
| 4 | 1.078 f | .012 f | 1.49845 | 81.22 | Ohara FK01 |
| 5 | −2.457 f | .001 f | | | Air |
| 6 | −5.045 f | .013 f | 1.70443 | 29.89 | Ohara SF15 |
| 7 | −.288 f | .013 f | 1.72538 | 34.49 | Ohara KZFS8 |
| 8 | −.953 f | | | | |

The wavelength scan curve of FIG. 33A for the three-glass multiple shown in FIG. 33B indicates that a lens system can be designed using Ohara FK01, Ohara KZFS8 and Ohara FK01 glasses for bringing five wavelength from the ultraviolet through the visible to the near infrared regions of the spectrum to a common focus. The wavelength scan further indicates that substantially complete axial color correction can be provided by these three glasses in combination for wavelengths in the near infrared region up to at least 1.0 μm.

FIGS. 34A and 34B describe a particular example of a four-glass lens multiplet for which the lens elements comprising the multiplet were selected in accordance with the present invention. The lens multiplet of FIGS. 34A and 34B is a quintuplet having a focal length of 1000 mm at $\lambda_0 = 0.54607$ μm for a relative aperture of f/10, and provides color correction at five wavelengths. The design form of the lens quintuplet of FIG. 34B is specified in tabular format as follows:

| Surface No. | Radius | Thickness | $N_e$ | $V_e$ | Material |
|---|---|---|---|---|---|
| 1 | .425 f | .015 f | 1.53019 | 76.57 | Schott PK51 |
| 2 | −.749 f | .008 f | | | Air |
| 3 | −.369 f | .012 f | 1.69669 | 51.28 | Schott LAK20 |
| 4 | .416 f | .015 f | 1.53019 | 76.57 | Schott PK51 |
| 5 | −.385 f | .001 f | | | Air |
| 6 | .546 f | .015 f | 1.61669 | 44.07 | Schott KZFSN4 |
| 7 | .170 f | .012 f | 1.59487 | 48.29 | Schott KZFS6 |
| 8 | .434 f | | | | |

The wavelength scan curve of FIG. 34A for the four-glass multiplet shown in FIG. 34B indicates that a lens system can be designed using Schott PK51, Schott LAK20, Schott KZFSN4 and Schott KZFS6 glasses for bringing five wavelengths from the ultraviolet though the visible to the near infrared regions of the spectrum to a common focus. The wavelength scan further indicates that substantially complete color correction can be provided by these four glasses in combination for wavelengths in the range from about 0.60 μm to 0.85 μm.

CONCLUSION

This invention has been described above in terms of particular optical systems designed using particular glasses and other types of optical materials that are commercially available at the present time. However, other kinds of optical systems, which could be designed using other types of glasses and optical materials, could be made by designers skilled in the art on the basis of the foregoing disclosure in conjunction with the accompanying drawing. Therefore, the novel optical systems described above are to be considered as merely illustrative of the invention. The legal definition of the invention is provided more generally by the following claims and their equivalents.

TABLE I

*LEAST SQUARES FITTED COEFFICIENTS*

| | | ORDER 2.0 | BASE WVL 0.5740 | | MIN VL 0.400 | MAX WVL 0.700 | |
|---|---|---|---|---|---|---|---|
| CAT | NAME | ETA1/ETA2 | INDEX | | ETA1 | ETA2 | ARCTAN (ETA1/ETA2) |
| OHARA | SK4 | −.500727+05 | 1.613471 | | −.939625−01 | .187652−05 | −89.998856 |
| OHARA | LAK010 | −.324490+04 | 1.725980 | | −.102990+00 | .317391−04 | −89.982343 |
| OHARA | LAK11 | −.294092+04 | 1.659127 | | −.962812−01 | .327384−04 | −89.980517 |
| CHANCE | 691547 | −.192659+04 | 1.691914 | | −.100937+00 | .523916−04 | −89.970261 |
| SCHOTT | SK15 | −.148992+04 | 1.623767 | | −.951161−01 | .638397−04 | −89.961544 |
| OHARA | ZK1 | −.113189+04 | 1.533817 | | −.952528−01 | .841541−04 | −89.949380 |
| SCHOTT | SK51 | −.882619+03 | 1.621646 | | −.915519−01 | .103728−03 | −89.935084 |
| SCHOTT | BAK5 | −.863211+03 | 1.557397 | | −.941415−01 | .109060−03 | −89.933624 |
| SCHOTT | ZK1 | −.542770+03 | 1.533815 | | −.952493−01 | .175487−03 | −89.894439 |
| OHARA | LAK8 | −.505624+03 | 1.713954 | | −.102540+00 | .202799−03 | −89.886683 |
| CORN-F | 713538 | −.420221+03 | 1.713958 | | −.102594+00 | .244142−03 | −89.863654 |
| HOYA | LAC12 | −.391017+03 | 1.678786 | | −.994099−01 | .254234−03 | −89.853470 |
| OHARA | SK15 | −.360639+03 | 1.623767 | | −.949577−01 | .263304−03 | −89.841127 |
| HOYA | C12 | −.346402+03 | 1.523719 | | −.941556−01 | .271810−03 | −89.834599 |
| HOYA | C3 | −.307862+03 | 1.518870 | | −.936381−01 | .304156−03 | −89.813891 |
| OHARA | ZK4 | −.297025+03 | 1.512537 | | −.949230−01 | .319579−03 | −89.807101 |
| SCHOTT | SK13 | −.245242+03 | 1.592544 | | −.946779−01 | .386059−03 | −89.766372 |
| CHANCE | 572577 | −.238564+03 | 1.572917 | | −.956311−01 | .400862−03 | −89.759831 |
| CORN-F | 651559 | −.207410+03 | 1.651968 | | −.987661−01 | .496189−03 | −89.723757 |
| OHARA | BAK1 | −.203696+03 | 1.573218 | | −.956013−01 | .469332−03 | −89.718722 |
| HOYA | BACD13 | −.195377+03 | 1.592545 | | −.946756−01 | .484579−03 | −89.706745 |
| CORN-F | 658572 | −.193118+03 | 1.658335 | | −.965192−01 | .499794−03 | −89.703314 |
| OHARA | K2 | −.172343+03 | 1.516673 | | −.972221−01 | .564120−03 | −89.667551 |
| OHARA | BAK5 | −.165965+03 | 1.557399 | | −.941142−01 | .567071−03 | −89.654778 |
| OHARA | K01 | −.146523+03 | 1.523717 | | −.944011−01 | .644277−03 | −89.608969 |
| OHARA | LAK12 | −.138588+03 | 1.678787 | | −.997704−01 | .719909−03 | −89.586580 |
| CORN-F | 691548 | −.127310+03 | 1.691921 | | −.100767+00 | .791505−03 | −89.549962 |
| SCHOTT | SK52 | −.953341+02 | 1.639373 | | −.993953−01 | .104260−02 | −89.399022 |
| OHARA | SK10 | −.921555+02 | 1.623589 | | −.966943−01 | .104925−01 | −89.378296 |
| OHARA | LAK13 | −.907372+02 | 1.694441 | | −.103439+00 | .113999−02 | −89.368575 |
| OHARA | LAK011 | −.897967+02 | 1.742014 | | −.104780+00 | .116686−02 | −89.361963 |
| OHARA | LAK013 | −.830518+02 | 1.641813 | | −.969394−01 | .116722−02 | −89.310151 |
| SCHOTT | K10 | −.824042+02 | 1.502014 | | −.978985−01 | .118803−02 | −89.304731 |
| OHARA | SK19 | −.787332+02 | 1.614193 | | −.961291−01 | .122095−02 | −89.272317 |
| SCHOTT | SK19 | −.783834+02 | 1.614195 | | −.961830−01 | .122708−02 | −89.269073 |
| HOYA | BACD10 | −.768258+02 | 1.623591 | | −.969209−01 | .126157−02 | −89.254251 |
| SCHOTT | BAK1 | −.751939+02 | 1.573219 | | −.958644−01 | .127490−02 | −89.238069 |
| HOYA | BACD1 | −.743045+02 | 1.611028 | | −.974048−01 | .131089−02 | −89.228950 |
| HOYA | LACL2 | −.727112+02 | 1.651040 | | −.992233−01 | .136462−02 | −89.212060 |
| HOYA | BACD6 | −.716787+02 | 1.614541 | | −.978361−01 | .136493−02 | −89.200707 |
| SCHOTT | LAKN22 | −.715624+02 | 1.651973 | | −.987132−01 | .137940−02 | −89.199411 |
| CHANCE | 623569 | −.657657+02 | 1.623589 | | −.969717−01 | .147450−02 | −89.128858 |

TABLE I-continued

*LEAST SQUARES FITTED COEFFICIENTS*

| | ORDER 2.0 | BASE WVL 0.5740 | | MIN VL 0.400 | MAX WVL 0.700 | |
|---|---|---|---|---|---|---|
| CAT | NAME | ETA1/ETA2 | INDEX | ETA1 | ETA2 | ARCTAN (ETA1/ETA2) |
| SCHOTT | SK10 | −.654909+02 | 1.623593 | −.969513−01 | .148038−02 | −89.125200 |
| HOYA | SBF5 | −.591198+02 | 1.522013 | −.104595+00 | .176920−02 | −89.030948 |
| OHARA | LASK01 | −.581632+02 | 1.756042 | −.105438+00 | .181279−02 | −89.015014 |
| SCHOTT | SK2 | −.566100+02 | 1.608157 | −.973525−01 | .171971−02 | −88.987988 |
| CORN-F | 623569 | −.561077+02 | 1.623593 | −.969182−01 | .172736−02 | −88.978932 |
| CHANCE | 569561 | −.560878+02 | 1.569560 | −.982912−01 | .175245−02 | −88.978572 |
| CHANCE | 678552 | −.556141+02 | 1.678788 | −.999158−01 | .179659−02 | −88.969873 |
| SCHOTT | SK1 | −.524111+02 | 1.611029 | −.972537−01 | .185559−02 | −88.906936 |
| CORN-F | 614564 | −.520142+02 | 1.614285 | −.977645−01 | .187957−02 | −88.898597 |
| HOYA | BACD2 | −.519914+02 | 1.608159 | −.972569−01 | .187064−02 | −88.898108 |
| HOYA | ADC1 | −.515199+02 | 1.620722 | −.886488−01 | .172067−02 | −88.888030 |
| HOYA | BAC4 | −.500459+02 | 1.569563 | −.981724−01 | .196764−02 | −88.855289 |
| OHARA | BAK6 | −.497699+02 | 1.575177 | −.976194−01 | .196141−02 | −88.848944 |
| SCHOTT | LAKN16 | −.481711+02 | 1.734527 | −.106819+00 | .221749−02 | −88.810749 |
| CHANCE | 691548 | −.474013+02 | 1.691911 | −.100650+00 | .212337−02 | −88.791434 |
| SCHOTT | SK6 | −.472162+02 | 1.614537 | −.977687−01 | .207066−02 | −88.786704 |
| OHARA | SK1 | −.470107+02 | 1.611035 | −.975581−01 | .207523−02 | −88.781403 |
| SCHOTT | BAK4 | −.466145+02 | 1.569563 | −.982860−01 | .210849−02 | −88.771045 |
| OHARA | BAK4 | −.465233+02 | 1.569563 | −.982470−01 | .211178−02 | −88.768640 |
| OHARA | LAK04 | −.461629+02 | 1.651835 | −.982167−01 | .212761−02 | −88.759029 |
| SCHOTT | BAK6 | −.446430+02 | 1.575176 | −.978150−01 | .219105−02 | −88.716792 |
| OHARA | SK6 | −.445799+02 | 1.614537 | −.978164−01 | .219418−02 | −88.714978 |
| SCHOTT | LAKN12 | −.438037+02 | 1.678788 | −.998759−01 | .228008−02 | −88.692214 |
| HOYA | BACD8 | −.418115+02 | 1.611961 | −.988673−01 | .225756−02 | −88.692147 |
| HOYA | BAC1 | −.418595+02 | 1.573217 | −.959622−01 | .229248−02 | −88.631498 |
| OHARA | SK2 | −.415061+02 | 1.608152 | −.970336−01 | .233782−02 | −88.619845 |
| CHANCE | 734517 | −.399053+02 | 1.734527 | −.106738+00 | .267478−02 | −88.564508 |
| SCHOTT | SK8 | −.396332+02 | 1.611961 | −.985867−01 | .248748−02 | −88.554654 |
| OHARA | KZF5 | −.386798+02 | 1.522016 | −.104984+00 | .271418−02 | −88.519047 |
| OHARA | LAK09 | −.386447+02 | 1.735028 | −.107216+00 | .277441−02 | −88.517697 |
| OHARA | KF3 | −.382488+02 | 1.515220 | −.100854+00 | .263679−02 | −88.502365 |
| CORN-F | 569560 | −.377078+02 | 1.569531 | −.984073−01 | .260973−02 | −88.480890 |
| CORN-F | 734514 | −.374738+02 | 1.734545 | −.107304+00 | .286344−02 | −88.471407 |
| OHARA | SK8 | −.370859+02 | 1.611956 | −.985702−01 | .265789−02 | −88.455426 |
| OHARA | ZK5 | −.369012+02 | 1.534444 | −.992690−01 | .269013−02 | −88.447699 |
| SCHOTT | SKN18 | −.361546+02 | 1.639374 | −.994923−01 | .275186−02 | −88.415658 |
| HOYA | TAC4 | −.359864+02 | 1.735038 | −.108040+00 | .300226−02 | −88.408251 |
| HOYA | BAC6 | −.349833+02 | 1.575178 | −.978458−01 | .279693−02 | −88.362641 |
| HOYA | BACD18 | −.343625+02 | 1.639374 | −.994040−01 | .289281−02 | −88.333075 |
| SCHOTT | LAK28 | −.331265+02 | 1.745347 | −.108591+00 | .327807−02 | −88.270920 |
| CORN-F | 639555 | −.330270+02 | 1.639336 | −.993028−01 | .300671−02 | −88.265717 |
| HOYA | BACED4 | −.326817+02 | 1.618461 | −.999157−01 | .305724−02 | −88.247398 |
| CORN-F | 529518 | −.323428+02 | 1.529735 | −.106441+00 | .329102−02 | −88.229052 |
| HOYA | TAF1 | −.321194+02 | 1.773625 | −.111086+00 | .345853−02 | −88.216740 |
| SCHOTT | KF3 | −.321153+02 | 1.515220 | −.100799+00 | .313867−02 | −88.216505 |
| HOYA | ZNC5 | −.317057+02 | 1.534442 | −.995644−01 | .314026−02 | −88.193491 |
| SCHOTT | KZF2 | −.308127+02 | 1.530180 | −.106733+00 | .346394−02 | −88.141160 |
| CHANCE | 639554 | −.303756+02 | 1.639373 | −.994654−01 | .327451−02 | −88.114441 |
| SCHOTT | SSK4 | −.301555+02 | 1.618460 | −.999556−01 | .331467−02 | −88.100686 |
| OHARA | SK18 | −.298634+02 | 1.639372 | −.995302−01 | .333286−02 | −88.082115 |
| SCHOTT | ZK5 | −.298507+02 | 1.534448 | −.996534−01 | .333839−02 | −88.081308 |
| HOYA | NBF3 | −.297358+02 | 1.736068 | −.110662+00 | .372151−02 | −88.073895 |
| CORN-F | 618551 | −.293313+02 | 1.618415 | −.999977−01 | .340924−02 | −88.047360 |
| HOYA | NBF1 | −.292015+02 | 1.744391 | −.111894+00 | .383180−02 | −88.038677 |
| HOYA | BACD9 | −.290570+02 | 1.614853 | −.100019+00 | .344216−02 | −88.028940 |
| OHARA | SSK4 | −.289407+02 | 1.618457 | −.100125+00 | .345966−02 | −88.021023 |
| OHARA | SK9 | −.284730+02 | 1.614855 | −.100310+00 | .352300−02 | −87.988535 |
| OHARA | KZF2 | −.283086+02 | 1.530181 | −.106660+00 | .376777−02 | −87.976865 |
| SCHOTT | SK9 | −.279606+02 | 1.614854 | −.998924−01 | .357262−02 | −87.951707 |
| HOYA | LACL4 | −.276702+02 | 1.670540 | −.106749+00 | .385792−02 | −87.930225 |
| HOYA | C10 | −.274406+02 | 1.502013 | −.979219−01 | .356850−02 | −87.912933 |
| HOYA | LAC10 | −.272641+02 | 1.721032 | −.109430+00 | .401369−02 | −87.899438 |
| OHARA | LAK07 | −.271081+02 | 1.678816 | −.103231+00 | .380814−02 | −87.887345 |
| HOYA | SBF6 | −.262344+02 | 1.527567 | −.107951+00 | .411488−02 | −87.817054 |
| SCHOTT | KZF6 | −.259432+02 | 1.527563 | −.107860+00 | .415756−02 | −87.792576 |
| HOYA | CF3 | −.257701+02 | 1.515220 | −.100945+00 | .391714−02 | −87.777769 |
| OHARA | LAF03 | −.255512+02 | 1.736061 | −.110624+00 | .432953−02 | −87.758739 |
| HOYA | LACL3 | −.251758+02 | 1.665698 | −.103219+00 | .409993−02 | −87.725368 |
| SCHOTT | LAK10 | −.251349+02 | 1.721031 | −.109349+00 | .435050−02 | −87.721663 |
| CHANCE | 694533 | −.249047+02 | 1.694439 | −.103288+00 | .141735−02 | −87.700623 |
| HOYA | SBF2 | −.248584+02 | 1.530180 | −.106777+00 | .429543−02 | −87.696345 |
| SCHOTT | LAF28 | −.245516+02 | 1.774263 | −.110825+00 | .451397−02 | −87.667597 |
| OHARA | KZF6 | −.245076+02 | 1.527565 | −.107804+00 | .439881−02 | −87.663412 |
| HOYA | LAC13 | −.244463+02 | 1.694439 | −.103295+00 | .422538−02 | −87.657568 |
| HOYA | LACL8 | −.240411+02 | 1.678813 | −.103123+00 | .428944−02 | −87.618134 |
| SCHOTT | LAKN13 | −.240258+02 | 1.694440 | −.103269+00 | .429827−02 | −87.616606 |
| OHARA | LASK02 | −.239434+02 | 1.787636 | −.110169+00 | .460124−02 | −87.608415 |

TABLE I-continued

| | | *LEAST SQUARES FITTED COEFFICIENTS* | | | | |
|---|---|---|---|---|---|---|
| | ORDER 2.0 | BASE WVL 0.5740 | | MIN VL 0.400 | MAX WVL 0.700 | |
| CAT | NAME | ETA1/ETA2 | INDEX | ETA1 | ETA2 | ARCTAN (ETA1/ETA2) |
| CORN-F | 720503 | −.237201+02 | 1.721037 | −.109518+00 | .461709−02 | −87.585937 |
| HOYA | BAFL6 | −.232615+02 | 1.589840 | −.103892+00 | .446626−02 | −87.538402 |
| OHARA | SSK1 | −.227995+02 | 1.618021 | −.101915+00 | .447008−02 | −87.488567 |
| OHARA | LASF16 | −.226136+02 | 1.773624 | −.111103+00 | .491310−02 | −87.467966 |
| HOYA | BACED1 | −.225050+02 | 1.618029 | −.102142+00 | .453864−02 | −87.455758 |
| HOYA | BAFL4 | −.215062+02 | 1.580352 | −.102543+00 | .476805−02 | −87.337774 |
| SCHOTT | SSK1 | −.208156+02 | 1.618028 | −.102159+00 | .490781−02 | −87.249574 |
| OHARA | LAF010 | −.207334+02 | 1.744286 | −.111697+00 | .538727−02 | −87.238701 |
| HOYA | LACL5 | −.205079+02 | 1.694488 | −.108445+00 | .528796−02 | −87.208372 |
| CHANCE | 720504 | −.201899+02 | 1.721028 | −.109283+00 | .541278−02 | −87.164460 |
| SCHOTT | BALF4 | −.199801+02 | 1.580348 | −.102533+00 | .513175−02 | −87.134751 |
| SCHOTT | KZFS6 | −.198362+02 | 1.592846 | −.113651+00 | .572949−02 | −87.113990 |
| CORN-F | 623531 | −.191719+02 | 1.623348 | −.103671+00 | .540746−02 | −87.014169 |
| OHARA | LAK10 | −.190226+02 | 1.721029 | −.109318+00 | .574673−02 | −86.990791 |
| HOYA | BACED2 | −.189050+02 | 1.623146 | −.103722+00 | .548647−02 | −86.972110 |
| OHARA | LAK05 | −.188067+02 | 1.659188 | −.103006+00 | .547712−02 | −86.956287 |
| CORN-F | 548535 | −.187923+02 | 1.548492 | −.103039+00 | .548307−02 | −86.953961 |
| OHARA | BALF4 | −.185250+02 | 1.580346 | −.102511+00 | .553369−02 | −86.910091 |
| SCHOTT | SSK51 | −.183513+02 | 1.604421 | −.102659+00 | .559412−02 | −86.880909 |
| OHARA | K10 | −.180011+02 | 1.502013 | −.976985−01 | .542737−02 | −86.820360 |
| HOYA | BAFL3 | −.173226+02 | 1.572127 | −.103848+00 | .599494−02 | −86.696095 |
| OHARA | SSK2 | −.173201+02 | 1.623140 | −.103469+00 | .597395−02 | −86.695603 |
| SCHOTT | SSK2 | −.173039+02 | 1.623147 | −.103564+00 | .598502−02 | −86.692524 |
| SCHOTT | LGSK2 | −.172411+02 | 1.586683 | −.900992−01 | .522584−02 | −86.680509 |
| SCHOTT | LAK20 | −.172277+02 | 1.694457 | −.106718+00 | .619455−02 | −86.677938 |
| SCHOTT | BALF5 | −.172238+02 | 1.548128 | −.102659+00 | .596028−02 | −86.677194 |
| CORN-F | 659510 | −.172101+02 | 1.659435 | −.107970+00 | .627367−02 | −86.674529 |
| SCHOTT | KF6 | −.170349+02 | 1.518136 | −.105524+00 | .619459−02 | −86.640413 |
| HOYA | TAF4 | −.169853+02 | 1.789195 | −.115886+00 | .682271−02 | −86.630638 |
| SCHOTT | BALF6 | −.169177+02 | 1.589843 | −.103831+00 | .613740−02 | −86.617210 |
| OHARA | BALF5 | −.168985+02 | 1.548131 | −.102838+00 | .608566−02 | −86.613349 |
| HOYA | BACED20 | −.168637+02 | 1.649381 | −.103805+00 | .615554−02 | −86.606387 |
| OHARA | SSK01 | −.168448+02 | 1.649380 | −.103806+00 | .616250−02 | −86.602592 |
| OHARA | BALF6 | −.168344+02 | 1.589839 | −.103456+00 | .614550−02 | −86.600567 |
| SCHOTT | BALF3 | −.162086+02 | 1.572132 | −.103962+00 | .641400−02 | −86.469576 |
| CHANCE | 788474 | −.161986+02 | 1.789510 | −.116133+00 | .716935−02 | −86.467387 |
| OHARA | KF6 | −.159867+02 | 1.518131 | −.105272+00 | .658496−02 | −86.420706 |
| HOYA | CF6 | −.159558+02 | 1.518135 | −.105600+00 | .661829−02 | −86.413781 |
| OHARA | BALF3 | −.158921+02 | 1.572130 | −.104100+00 | .655047−02 | −86.399423 |
| HOYA | CF2 | −.155826+02 | 1.527040 | −.107825+00 | .691960−02 | −86.328115 |
| CORN-F | 788474 | −.154159+02 | 1.789201 | −.116099+00 | .753114−02 | −86.288522 |
| HOYA | NBF2 | −.151928+02 | 1.758144 | −.115302+00 | .758923−02 | −86.234198 |
| SCHOTT | SSK50 | −.151161+02 | 1.618802 | −.104581+00 | .691854−02 | −86.215121 |
| SCHOTT | KZFSN9 | −.149861+02 | 1.599477 | −.117431+00 | .783599−02 | −86.182401 |
| OHARA | LASF14 | −.149352+02 | 1.789196 | −.116005+00 | .776721−02 | −86.169432 |
| CORN-F | 689496 | −.148607+02 | 1.690010 | −.110800+00 | .745588−02 | −86.150294 |
| SCHOTT | LAF21 | −.147798+02 | 1.789509 | −.116094+00 | .785489−02 | −86.129281 |
| HOYA | TAF3 | −.144778+02 | 1.805449 | −.118302+00 | .817125−02 | −86.048793 |
| SCHOTT | KF9 | −.144754+02 | 1.524146 | −.106917+00 | .738611−02 | −86.048134 |
| OHARA | LAK08 | −.144013+02 | 1.694480 | −.108231+00 | .751536−02 | −86.027864 |
| CHANCE | 689495 | −.143658+02 | 1.690002 | −.111148+00 | .773696−02 | −86.018091 |
| CHANCE | 530512 | −.143418+02 | 1.531074 | −.107543+00 | .749857−02 | −86.011436 |
| SCHOTT | KF50 | −.143387+02 | 1.531630 | −.107670+00 | .750908−02 | −86.010559 |
| SCHOTT | LAF24 | −.143385+02 | 1.758334 | −.115078+00 | .802579−02 | −86.010528 |
| SCHOTT | BALF51 | −.142959+02 | 1.574727 | −.105621+00 | .738818−02 | −85.998683 |
| HOYA | LAF3 | −.140928+02 | 1.718078 | −.114629+00 | .813393−02 | −85.941167 |
| OHARA | LAF04 | −.140362+02 | 1.758138 | −.114841+00 | .818176−02 | −85.924891 |
| OHARA | KF4 | −.140292+02 | 1.534323 | −.106679+00 | .760410−02 | −85.922841 |
| CHANCE | 717479 | −.137641+02 | 1.718078 | −.114898+00 | .834764−02 | −85.844612 |
| SCHOTT | SSK52 | −.137302+02 | 1.659372 | −.108066+00 | .787070−02 | −85.834369 |
| CORN-F | 803467 | −.136712+02 | 1.804243 | −.117728+00 | .861139−02 | −85.816465 |
| SCHOTT | KZF1 | −.135468+02 | 1.551949 | −.110788+00 | .817816−02 | −85.778192 |
| OHARA | LASF15 | −.134563+02 | 1.805240 | −.117893+00 | .876120−02 | −85.749886 |
| HOYA | CF4 | −.134532+02 | 1.534323 | −.106780+00 | .793714−02 | −85.748924 |
| SCHOTT | BALF50 | −.133403+02 | 1.589757 | −.107074+00 | .802632−02 | −85.713098 |
| SCHOTT | LASF30 | −.131945+02 | 1.804429 | −.118405+00 | .897384−02 | −85.665875 |
| HOYA | CF5 | −.130901+02 | 1.523840 | −.108017+00 | .825177−02 | −85.631474 |
| OHARA | LAK03 | −.129607+02 | 1.670935 | −.106504+00 | .821740−02 | −85.588040 |
| HOYA | ADC2 | −.129435+02 | 1.597777 | −.995685−01 | .769256−02 | −85.582163 |
| OHARA | BALF8 | −.127337+02 | 1.554389 | −.107435+00 | .843705−02 | −85.509683 |
| HOYA | LACL9 | −.127122+02 | 1.678871 | −.108695+00 | .855048−02 | −85.502096 |
| OHARA | KF5 | −.125473+02 | 1.523841 | −.108162+00 | .862031−02 | −85.443265 |
| OHARA | LASF12 | −.125343+02 | 1.804240 | −.117789+00 | .939727−02 | −85.438573 |
| HOYA | CF1 | −.124764+02 | 1.541179 | −.108055+00 | .866075−02 | −85.417464 |
| HOYA | BACED3 | −.124276+02 | 1.615704 | −.107456+00 | .864660−02 | −85.399525 |
| OHARA | KF2 | −.124217+02 | 1.527038 | −.107455+00 | .865053−02 | −85.397401 |
| HOYA | SBF1 | −.124038+02 | 1.551953 | −.111168+00 | .896239−02 | −85.390770 |

TABLE I-continued

*LEAST SQUARES FITTED COEFFICIENTS*

| | ORDER 2.0 | BASE WVL 0.5740 | | MIN VL 0.400 | MAX WVL 0.700 | |
|---|---|---|---|---|---|---|
| CAT | NAME | ETA1/ETA2 | INDEX | ETA1 | ETA2 | ARCTAN (ETA1/ETA2) |
| OHARA | LAK06 | −.123576+02 | 1.678861 | −.108356+00 | .876843−02 | −85.393568 |
| OHARA | SSK5 | −.122989+02 | 1.659370 | −.108016+00 | .878259−02 | −85.351607 |
| OHARA | LASF09 | −.122734+02 | 1.817261 | −.117859+00 | .960282−02 | −85.341990 |
| CORN-F | 717480 | −.121961+02 | 1.718088 | −.114541+00 | .939161−02 | −85.312608 |
| HOYA | BACED5 | −.121267+02 | 1.659369 | −.108146+00 | .891800−02 | −85.285908 |
| SCHOTT | KZFS1 | −.120820+02 | 1.614096 | −.124112+00 | .102724−01 | −85.268574 |
| SCHOTT | KF1 | −.120276+02 | 1.541174 | −.107640+00 | .894940−02 | −85.247248 |
| SCHOTT | SSK3 | −.119842+02 | 1.615703 | −.107446+00 | .896566−02 | −85.230095 |
| SCHOTT | BALF8 | −.117921+02 | 1.554389 | −.107425+00 | .910997−02 | −85.152740 |
| HOYA | TAF2 | −.117637+02 | 1.795759 | −.121061+00 | .102911−01 | −85.141108 |
| CHANCE | 171480 | −.117480+02 | 1.718076 | −.114518+00 | .974783−02 | −85.134682 |
| SCHOTT | SSKN5 | −.117271+02 | 1.659373 | −.108028+00 | .921187−02 | −85.126008 |
| HOYA | FEL6 | −.116556+02 | 1.532505 | −.112562+00 | .965740−02 | −85.096244 |
| OHARA | SSK3 | −.116501+02 | 1.615705 | −.107404+00 | .921912−02 | −85.093989 |
| OHARA | BALF7 | −.115927+02 | 1.589580 | −.107363+00 | .926134−02 | −85.069760 |
| OHARA | KF1 | −.114950+02 | 1.541172 | −.107786+00 | .937680−02 | −85.028093 |
| OHARA | BALF2 | −.114715+02 | 1.517198 | −.108026+00 | .941691−02 | −85.017970 |
| CHANCE | 658509 | −.113934+02 | 1.659369 | −.108049+00 | .948349−02 | −84.983988 |
| HOYA | BAFL2 | −.113366+02 | 1.571798 | −.108081+00 | .953379−02 | −84.959005 |
| CORN-F | 800456 | −.112482+02 | 1.801265 | −.120513+00 | .107140−01 | −84.919575 |
| CORN-F | 616444 | −.110861+02 | 1.617001 | −.123860+00 | .111726−01 | −84.845672 |
| OHARA | LASF17 | −.110210+02 | 1.796261 | −.121371+00 | .110127−01 | −84.815415 |
| HOYA | LAFL2 | −.109266+02 | 1.698033 | −.113261+00 | .103656−01 | −84.770881 |
| SCHOTT | LAF23 | −.104049+02 | 1.690005 | −.111022+00 | .106701−01 | −84.510280 |
| OHARA | LLF6 | −.102947+02 | 1.532500 | −.112374+00 | .109157−01 | −84.451853 |
| HOYA | NBFD14 | −.100981+02 | 1.803002 | −.123911+00 | .122708−01 | −84.344487 |
| HOYA | TAFD1 | −.100908+02 | 1.816026 | −.124285+00 | .123168−01 | −84.340487 |
| CORN-F | 613443 | −.100236+02 | 1.614396 | −.124083+00 | .123790−01 | −84.302802 |
| OHARA | LAF06 | −.999756+01 | 1.687003 | −.111708+00 | .111736−01 | −84.287995 |
| SCHOTT | KZFSN4 | −.992835+01 | 1.614398 | −.124113+00 | .125009−01 | −84.248456 |
| SCHOTT | SSKN8 | −.989874+01 | 1.618614 | −.110403+00 | .111532−01 | −84.231401 |
| HOYA | TAFD10 | −.987546+01 | 1.816820 | −.123359+00 | .124914−01 | −84.217907 |
| SCHOTT | LLF6 | −.987203+01 | 1.532505 | −.112704+00 | .114165−01 | −84.215878 |
| SCHOTT | LAFN3 | −.983210+01 | 1.718074 | −.114425+00 | .116379−01 | −84.192550 |
| OHARA | LASF04 | −.982992+01 | 1.816858 | −.123542+00 | .125679−01 | −84.191297 |
| OHARA | SSK9 | −.978441+01 | 1.621018 | −.110591+00 | .113028−01 | −84.164426 |
| HOYA | BACED9 | −.970537+01 | 1.621015 | −.110247+00 | .113594−01 | −84.117236 |
| CORN-F | 624469 | −.964415+01 | 1.624957 | −.117036+00 | .121355−01 | −84.080138 |
| OHARA | KZF4 | −.959733+01 | 1.571262 | −.114147+00 | .118936−01 | −84.051504 |
| SCHOTT | LAF20 | −.956524+01 | 1.683496 | −.113922+00 | .119100−01 | −84.031681 |
| HOYA | NBFD11 | −.952474+01 | 1.787185 | −.125047+00 | .131287−01 | −84.006467 |
| OHARA | LAF3 | −.950536+01 | 1.718081 | −.114514+00 | .120473−01 | −83.994361 |
| SCHOTT | BAF54 | −.949968+01 | 1.667716 | −.113891+00 | .119889−01 | −83.990808 |
| SCHOTT | BAF5 | −.949139+01 | 1.608175 | −.111149+00 | .117105−01 | −83.985587 |
| HOYA | LAFL1 | −.945834+01 | 1.687005 | −.111199+00 | .117567−01 | −83.964728 |
| OHARA | BAF2 | −.943387+01 | 1.570481 | −.111286+00 | .117964−01 | −83.949199 |
| OHARA | LAF09 | −.936908+01 | 1.698037 | −.113150+00 | .120770−01 | −83.907633 |
| OHARA | BAF5 | −.930348+01 | 1.608177 | −.111627+00 | .119985−01 | −83.864978 |
| OHARA | SSK8 | −.924203+01 | 1.618614 | −.110229+00 | .119269−01 | −83.824557 |
| CHANCE | 614439 | −.915702+01 | 1.615006 | −.125205+00 | .136731−01 | −83.767671 |
| HOYA | ADF4 | −.912199+01 | 1.613480 | −.122486+00 | .134276−01 | −83.743897 |
| SCHOTT | LASF11 | −.895934+01 | 1.802962 | −.124033+00 | .138439−01 | −83.631611 |
| OHARA | BAF6 | −.893555+01 | 1.589873 | −.112906+00 | .126356−01 | −83.614452 |
| HOYA | LAFL3 | −.892589+01 | 1.701356 | −.114758+00 | .128568−01 | −83.607579 |
| CORN-F | 670471 | −.891792+01 | 1.671029 | −.116510+00 | .130647−01 | −83.601938 |
| SCHOTT | ABFN11 | −.886361+01 | 1.667712 | −.113380+00 | .127917−01 | −83.563025 |
| SCHOTT | BAFN6 | −.875482+01 | 1.589874 | −.113357+00 | .129479−01 | −83.483784 |
| OHARA | KZFS4 | −.874989+01 | 1.614407 | −.125274+00 | .143195−01 | −83.480115 |
| OHARA | BAF11 | −.873308+01 | 1.667711 | −.113624+00 | .130108−01 | −83.467654 |
| OHARA | LASF06 | −.867922+01 | 1.842396 | −.126901+00 | .146212−01 | −83.427512 |
| HOYA | BAF5 | −.865291+01 | 1.608178 | −.111318+00 | .128648−01 | −83.407685 |
| CORN-F | 648462 | −.864701+01 | 1.648755 | −.118797+00 | .137386−01 | −83.403180 |
| CORN-F | 667484 | −.863608+01 | 1.667688 | −.116290+00 | .131182−01 | −83.394959 |
| OHARA | LAF01 | −.858138+01 | 1.701046 | −.114132+00 | .133000−01 | −83.353202 |
| HOYA | TAFD5 | −.850256+01 | 1.836398 | −.127685+00 | .150173−01 | −83.292139 |
| HOYA | BAF6 | −.847460+01 | 1.589876 | −.112148+00 | .133514−01 | −83.270249 |
| CHANCE | 744448 | −.844983+01 | 1.745195 | −.122607+00 | .145099−01 | −83.250734 |
| CORN-F | 744448 | −.843366+01 | 1.745195 | −.122509+00 | .145262−01 | −83.237867 |
| SCHOTT | LAF10 | −.840519+01 | 1.785717 | −.125057+00 | .148786−01 | −83.215154 |
| HOYA | FEL2 | −.840377+01 | 1.541543 | −.116334+00 | .138431−01 | −83.214029 |
| HOYA | BAF3 | −.836181+01 | 1.583573 | −.118003+00 | .141122−01 | −83.180280 |
| CHANCE | 541472 | −.835964+01 | 1.541542 | −.116414+00 | .139257−01 | −83.178566 |
| SCHOTT | TIF1 | −.835750+01 | 1.511902 | −.107733+00 | .128906−01 | −83.176814 |
| SCHOTT | BAF9 | −.831442+01 | 1.644242 | −.114405+00 | .137599−01 | −83.141773 |
| HOYA | BAF9 | −.827768+01 | 1.644243 | −.114451+00 | .138265−01 | −83.111640 |
| SCHOTT | LLF2 | −.824244+01 | 1.541544 | −.116392+00 | .141211−01 | −83.082477 |
| OHARA | LASF01 | −.819622+01 | 1.787175 | −.124162+00 | .151487−01 | −83.043862 |

TABLE I-continued

| | | *LEAST SQUARES FITTED COEFFICIENTS* | | | | |
|---|---|---|---|---|---|---|
| | ORDER 2.0 | BASE WVL 0.5740 | | MIN VL 0.400 | MAX WVL 0.700 | |
| CAT | NAME | ETA1/ETA2 | INDEX | ETA1 | ETA2 | ARCTAN (ETA1/ETA2) |
| OHARA | LLF2 | −.819503+01 | 1.541546 | −.116287+00 | .141899−01 | −83.042887 |
| SCHOTT | BAF53 | −.818865+01 | 1.671053 | −.116514+00 | .142287−01 | −83.037509 |
| OHARA | BAF1 | −.816264+01 | 1.557725 | −.113001+00 | .138437−01 | −83.015524 |
| HOYA | FF1 | −.811881+01 | 1.511899 | −.107640+00 | .132581−01 | −82.978203 |
| SCHOTT | LLF3 | −.809326+01 | 1.560985 | −.116392+00 | .143814−01 | −82.956232 |
| HOYA | BAF21 | −.797430+01 | 1.665194 | −.112192+00 | .140692−01 | −82.852256 |
| OHARA | LAS05 | −.797197+01 | 1.836212 | −.128378+00 | .161037−01 | −82.850178 |
| HOYA | BAF8 | −.785487+01 | 1.624693 | −.116626+00 | .148476−01 | −82.744730 |
| OHARA | BAF9 | −.783248+01 | 1.644246 | −.114641+00 | .146366−01 | −82.724218 |
| HOYA | BAF10 | −.777140+01 | 1.671048 | −.116242+00 | .149577−01 | −82.667629 |
| HOYA | NBFD1 | −.771675+01 | 1.790331 | −.128262+00 | .166212−01 | −82.616309 |
| SCHOTT | BAFN10 | −.770727+01 | 1.671054 | −.116443+00 | .151082−01 | −82.607309 |
| HOYA | BAF11 | −.769951+01 | 1.667712 | −.113467+00 | .147369−01 | −82.599946 |
| OHARA | LLF3 | −.765676+01 | 1.560987 | −.116739+00 | .152466−01 | −82.559049 |
| HOYA | LAFL4 | −.759216+01 | 1.713888 | −.126836+00 | .166404−01 | −82.525701 |
| CHANCE | 548456 | −.758952+01 | 1.548553 | −.120302+00 | .158511−01 | −82.493895 |
| CORN-F | 548457 | −.758480+01 | 1.548960 | −.120033+00 | .158254−01 | −82.489323 |
| HOYA | FEL1 | −.756928+01 | 1.548997 | −.119676+00 | .158107−01 | −82.474092 |
| SCHOTT | BAF8 | −.755166+01 | 1.624694 | −.116669+00 | .154494−01 | −82.456735 |
| OHARA | BAF10 | −.754804+01 | 1.671049 | −.116054+00 | .153754−01 | −82.453126 |
| HOYA | FEL3 | −.748347+01 | 1.560980 | −.116432+00 | .155586−01 | −82.388757 |
| OHARA | KF8 | −.748140+01 | 1.511900 | −.107585+00 | .143803−01 | −82.386711 |
| OHARA | LAF011 | −.739885+01 | 1.721126 | −.119064+00 | .160922−01 | −82.302780 |
| HOYA | NBFD12 | −.739653+01 | 1.800860 | −.129473+00 | .175045−01 | −82.300406 |
| OHARA | LLF1 | −.735086+01 | 1.549002 | −.119827+00 | .163011−01 | −82.253117 |
| OHARA | BAF8 | −.732767+01 | 1.624696 | −.116808+00 | .159407−01 | −82.228893 |
| OHARA | LLF7 | −.732480+01 | 1.549555 | −.120369+00 | .164331−01 | −82.225887 |
| HOYA | FEL7 | −.732475+01 | 1.549698 | −.120672+00 | .164746−01 | −82.225824 |
| HOYA | ADF8 | −.731999+01 | 1.687649 | −.128009+00 | .174876−01 | −82.220849 |
| HOYA | TAFD2 | −.725452+01 | 1.839131 | −.130614+00 | .180045−01 | −82.151518 |
| SCHOTT | LLF7 | −.723611+01 | 1.549700 | −.120796+00 | .166935−01 | −82.131801 |
| SCHOTT | LLF1 | −.721689+01 | 1.549001 | −.119877+00 | .166106−01 | −82.111117 |
| OHARA | LAF2 | −.721056+01 | 1.745194 | −.122533+00 | .169936−01 | −82.104247 |
| SCHOTT | LAFN2 | −.717331+01 | 1.745195 | −.122407+00 | .170642−01 | −82.063804 |
| SCHOTT | BAF3 | −.716396+01 | 1.583571 | −.117980+00 | .164686−01 | −82.053539 |
| OHARA | BAF3 | −.709528+01 | 1.583575 | −.118294+00 | .166722−01 | −81.977648 |
| HOYA | LAF2 | −.706147+01 | 1.745189 | −.122231+00 | .173095−01 | −81.939768 |
| SCHOTT | LASF31 | −.700163+01 | 1.882209 | −.133272+00 | .190344−01 | −81.871775 |
| HOYA | BAF7 | −.691393+01 | 1.608959 | −.118646+00 | .171603−01 | −81.770058 |
| SCHOTT | BAF52 | −.684565+01 | 1.609531 | −.118000+00 | .172372−01 | −81.689131 |
| HOYA | FEL4 | −.683556+01 | 1.562271 | −.121229+00 | .177350−01 | −81.677047 |
| SCHOTT | LLF4 | −.683225+01 | 1.562272 | −.121198+00 | .177391−01 | −81.673051 |
| SCHOTT | BAF50 | −.683160+01 | 1.683828 | −.123135+00 | .180242−01 | −81.672325 |
| CORN-F | 558525 | −.679080+01 | 1.558274 | −.104451+00 | .153812−01 | −81.622969 |
| OHARA | LASF02 | −.678640+01 | 1.800873 | −.129573+00 | .190930−01 | −81.617603 |
| OHARA | LASF07 | −.674292+01 | 1.864490 | −.131905+00 | .195620−01 | −81.564310 |
| SCHOTT | BAF51 | −.667683+01 | 1.653284 | −.121957+00 | .182657−01 | −81.482031 |
| HOYA | LAFL5 | −.663890+01 | 1.721176 | −.124870+00 | .188089−01 | −81.434055 |
| CORN-F | 655401 | −.661610+01 | 1.656673 | −.136700+00 | .206617−01 | −81.405012 |
| OHARA | LLF4 | −.661334+01 | 1.562271 | −.121299+00 | .183416−01 | −81.401454 |
| OHARA | LASF08 | −.657825+01 | 1.884553 | −.134296+00 | .204152−01 | −81.356277 |
| HOYA | LAFL6 | −.643226+01 | 1.721231 | −.130376+00 | .202691−01 | −81.163168 |
| SCHOTT | BAF12 | −.634602+01 | 1.640316 | −.121262+00 | .191084−01 | −81.044998 |
| HOYA | NBFD2 | −.623651+01 | 1.798590 | −.133088+00 | .213402−01 | −80.890365 |
| SCHOTT | BAF13 | −.619665+01 | 1.669988 | −.121811+00 | .196576−01 | −80.832764 |
| OHARA | BAF12 | −.616833+01 | 1.640323 | −.122011+00 | .197803−01 | −80.791384 |
| HOYA | NBFD13 | −.612790+01 | 1.807522 | −.134409+00 | .219340−01 | −80.731686 |
| HOYA | BAF13 | −.610432+01 | 1.669986 | −.122007+00 | .199870−01 | −80.696530 |
| HOYA | BAF12 | −.609516+01 | 1.640320 | −.121479+00 | .199305−01 | −80.682753 |
| OHARA | BAF13 | −.609495+01 | 1.669989 | −.121732+00 | .199726−01 | −80.682481 |
| HOYA | BAF20 | −.607026+01 | 1.686899 | −.124740+00 | .205493−01 | −80.645282 |
| SCHOTT | KZFSN5 | −.606110+01 | 1.655302 | −.138283+00 | .228149−01 | −80.631338 |
| OHARA | LF8 | −.603928+01 | 1.565365 | −.125051+00 | .207062−01 | −80.598153 |
| OHARA | KZFS5 | −.596388+01 | 1.655297 | −.137983+00 | .121365−01 | −80.481395 |
| OHARA | LASF03 | −.588457+01 | 1.807515 | −.134140+00 | .227952−01 | −80.355525 |
| OHARA | LAF02 | −.587444+01 | 1.721182 | −.125227+00 | .213173−01 | −80.339188 |
| SCHOTT | LASFN3 | −.585438+01 | 1.809432 | −.134322+00 | .229438−01 | −80.306747 |
| SCHOTT | BAF4 | −.583744+01 | 1.606609 | −.124605+00 | .213459−01 | −80.279103 |
| CHANCE | 606439 | −.582678+01 | 1.606604 | −.124645+00 | .213917−01 | −80.261711 |
| CORN-F | 606439 | −.579984+01 | 1.606597 | −.124659+00 | .214936−01 | −80.217294 |
| HOYA | FL6 | −.578924+01 | 1.568274 | −.127818+00 | .220785−01 | −80.199783 |
| OHARA | LASF24 | −.578901+01 | 1.908697 | −.142651+00 | .246417−01 | −80.199378 |
| OHARA | BAF01 | −.578563+01 | 1.683593 | −.122490+00 | .211714−01 | −80.193776 |
| SCHOTT | LF6 | −.575725+01 | 1.568270 | −.127797+00 | .221976−01 | −80.146363 |
| SCHOTT | LAF25 | −.575068+01 | 1.785634 | −.132542+00 | .230481−01 | −80.135318 |
| CORN-F | 865401 | −.571089+01 | 1.866547 | −.136374+00 | .238797−01 | −80.067945 |
| CHANCE | 567428 | −.570883+01 | 1.568268 | −.127810+00 | .223881−01 | −80.064467 |

TABLE I-continued

*LEAST SQUARES FITTED COEFFICIENTS*

| | ORDER 2.0 | BASE WVL 0.5740 | | MIN VL 0.400 | MAX WVL 0.700 | |
|---|---|---|---|---|---|---|
| CAT | NAME | ETA1/ETA2 | INDEX | ETA1 | ETA2 | ARCTAN (ETA1/ETA2) |
| HOYA | BAF4 | −.569657+01 | 1.606610 | −.124698+00 | .218901−01 | −80.043463 |
| SCHOTT | LAFN8 | −.569485+01 | 1.736465 | −.131618+00 | .231117−01 | −80.040579 |
| HOYA | BAFD15 | −.565905+01 | 1.703234 | −.135739+00 | .239861−01 | −79.978856 |
| SCHOTT | BASF52 | −.565096+01 | 1.703037 | −.133478+00 | .236204−01 | −79.964772 |
| OHARA | LAF07 | −.565078+01 | 1.714032 | −.126717+00 | .224247−01 | −79.964451 |
| HOYA | BAF22 | −.564805+01 | 1.683591 | −.122573+00 | .217019−01 | −79.959669 |
| OHARA | BAF4 | −.564077+01 | 1.606613 | −.125148+00 | .221864−01 | −79.946979 |
| CHANCE | 573426 | −.563993+01 | 1.574053 | −.128546+00 | .227946−01 | −79.944473 |
| HOYA | FL4 | −.562263+01 | 1.579442 | −.131186+00 | .233318−01 | −79.915234 |
| SCHOTT | FL1 | −.560199+01 | 1.574055 | −.128516+00 | .229412−01 | −79.878821 |
| HOYA | NBFD3 | −.559747+01 | 1.805959 | −.138026+00 | .246586−01 | −79.870863 |
| OHARA | LF6 | −.559211+01 | 1.568272 | −.137770+00 | .228483−01 | −79.861323 |
| OHARA | BAF03 | −.558236+01 | 1.686896 | −.124389+00 | .222824−01 | −79.844049 |
| CHANCE | 582421 | −.552595+01 | 1.583140 | −.130084+00 | .235406−01 | −79.742502 |
| OHARA | LF1 | −.545623+01 | 1.574057 | −.128470+00 | .235456−01 | −79.614264 |
| OHARA | LF3 | −.544102+01 | 1.583143 | −.129985+00 | .238897−01 | −79.585934 |
| SCHOTT | LF3 | −.542358+01 | 1.583143 | −.130057+00 | .239800−01 | −79.553095 |
| SCHOTT | LASF15 | −.540814+01 | 1.879649 | −.143284+00 | .264941−01 | −79.523978 |
| HOYA | FL7 | −.537239+01 | 1.576004 | −.131817+00 | .245361−01 | −79.455771 |
| SCHOTT | BASF5 | −.535886+01 | 1.604248 | −.128770+00 | .240293−01 | −79.429816 |
| HOYA | TAFD17 | −.533073+01 | 1.879648 | −.143186+00 | .268606−01 | −79.375233 |
| SCHOTT | LF4 | −.531969+01 | 1.579448 | −.131542+00 | .247273−01 | −79.353765 |
| OHARA | LF7 | −.529916+01 | 1.575999 | −.131817+00 | .248751−01 | −79.313421 |
| OHARA | LASF13 | −.528160+01 | 1.805855 | −.138191+00 | .261646−01 | −79.278728 |
| SCHOTT | LF7 | −.526935+01 | 1.576004 | −.131848+00 | .250216−01 | −79.254414 |
| SCHOTT | LAF26 | −.526858+01 | 1.747309 | −.136722+00 | .259505−01 | −79.252824 |
| OHARA | BASF5 | −.526487+01 | 1.604251 | −.129208+00 | .245415−01 | −79.245464 |
| SCHOTT | TIF2 | −.524856+01 | 1.533389 | −.119097+00 | .226913−01 | −79.212844 |
| HOYA | FL1 | −.522402+01 | 1.574054 | −.128324+00 | .245643−01 | −79.163304 |
| HOYA | FL3 | −.521652+01 | 1.583143 | −.130129+00 | .249455−01 | −79.148149 |
| CHANCE | 700412 | −.521161+01 | 1.701222 | −.132836+00 | .254884−01 | −79.138177 |
| HOYA | BAFD5 | −.521098+01 | 1.604252 | −.129013+00 | .247579−01 | −79.136869 |
| OHARA | LAF8 | −.520302+01 | 1.736482 | −.133072+00 | .255759−01 | −79.120646 |
| CHANCE | 581409 | −.518228+01 | 1.582463 | −.133802+00 | .258191−01 | −79.078160 |
| CORN-F | 702411 | −.517080+01 | 1.703028 | −.133019+00 | .257251−01 | −79.054454 |
| SCHOTT | BASF57 | −.515333+01 | 1.652589 | −.130517+00 | .253268−01 | −79.018248 |
| OHARA | LAF08 | −.514535+01 | 1.721225 | −.129925+00 | .252510−01 | −79.001640 |
| CORN-F | 581408 | −.507744+01 | 1.582416 | −.133988+00 | .263888−01 | −78.858253 |
| HOYA | FL2 | −.506272+01 | 1.590242 | −.133416+00 | .263527−01 | −78.826607 |
| OHARA | LF4 | −.506138+01 | 1.579448 | −.131702+00 | .260211−01 | −78.823695 |
| OHARA | LF2 | −.504860+01 | 1.590234 | −.133114+00 | .263665−01 | −78.796182 |
| HOYA | FF2 | −.503419+01 | 1.533392 | −.119221+00 | .236822−01 | −78.764947 |
| HOYA | FL5 | −.502675+01 | 1.582455 | −.133718+00 | .255013−01 | −78.748707 |
| SCHOTT | LF5 | −.502089+01 | 1.582460 | −.133830+00 | .266547−01 | −78.735891 |
| OHARA | LLF8 | −.501965+01 | 1.533396 | −.119225+00 | .237516−01 | −78.733232 |
| SCHOTT | BASF6 | −.501596+01 | 1.668691 | −.130373+00 | .259916−01 | −78.725145 |
| SCHOTT | LF2 | −.498130+01 | 1.590243 | −.133529+00 | .268061−01 | −78.648690 |
| HOYA | BAFD6 | −.495304+01 | 1.668691 | −.130381+00 | .263235−01 | −78.585609 |
| OHARA | BASF6 | −.494074+01 | 1.668691 | −.130359+00 | .263844−01 | −78.558018 |
| OHARA | LF5 | −.492576+01 | 1.582461 | −.134113+00 | .272268−01 | −78.524123 |
| CHANCE | 579411 | −.492155+01 | 1.579607 | −.132868+00 | .269971−01 | −78.514577 |
| OHARA | BASF07 | −.491985+01 | 1.702758 | −.132646+00 | .269614−01 | −78.510674 |
| CHANCE | 702410 | −.481428+01 | 1.703034 | −.133197+00 | .276670−01 | −78.265675 |
| HOYA | NBFD5 | −.481376+01 | 1.763356 | −.135651+00 | .281799−01 | −78.264393 |
| OHARA | LAF05 | −.473415+01 | 1.763361 | −.136243+00 | .287787−01 | −78.072703 |
| HOYA | BAFD3 | −.470271+01 | 1.608248 | −.135419+00 | .287960−01 | −77.995222 |
| CORN-F | 696365 | −.468160+01 | 1.697353 | −.149696+00 | .319754−01 | −77.942689 |
| OHARA | BASF3 | −.463616+01 | 1.608246 | −.135671+00 | .292636−01 | −77.828046 |
| OHARA | F8 | −.460518+01 | 1.596595 | −.139289+00 | .302460−01 | −77.748667 |
| OHARA | BASF7 | −.459808+01 | 1.702754 | −.132468+00 | .288095−01 | −77.730225 |
| SCHOTT | F8 | −.458732+01 | 1.596597 | −.139423+00 | .303931−01 | −77.702365 |
| HOYA | F8 | −.458564+01 | 1.596601 | −.139300+00 | .303774−01 | −77.698002 |
| HOYA | BAFD7 | −.458385+01 | 1.702763 | −.132739+00 | .289580−01 | −77.693317 |
| OHARA | LASF10 | −.455572+01 | 1.835606 | −.146922+00 | .322499−01 | −77.619716 |
| SCHOTT | LAF13 | −.453378+01 | 1.776974 | −.144324+00 | .318330−01 | −77.561641 |
| CORN-F | 650392 | −.452662+01 | 1.651393 | −.139385+00 | .307922−01 | −77.542600 |
| SCHOTT | KZFSN7 | −.448614+01 | 1.681949 | −.146956+00 | .327578−01 | −77.433705 |
| HOYA | BAFD10 | −.444249+01 | 1.651340 | −.138758+00 | .312344−01 | −77.314174 |
| SCHOTT | BASF51 | −.441666+01 | 1.725087 | −.143230+00 | .324294−01 | −77.242480 |
| HOYA | NBFD4 | −.439865+01 | 1.832225 | −.149417+00 | .339688−01 | −77.191944 |
| SCHOTT | F14 | −.438161+01 | 1.602525 | −.142795+00 | .325895−01 | −77.143821 |
| OHARA | F9 | −.436390+01 | 1.621615 | −.143209+00 | .328166−01 | −77.093400 |
| SCHOTT | LASF13 | −.436139+01 | 1.857116 | −.149118+00 | .341905−01 | −77.086157 |
| HOYA | BAFD1 | −.435910+01 | 1.627203 | −.139565+00 | .320170−01 | −77.079582 |
| HOYA | F5 | −.434251+01 | 1.604552 | −.143573+00 | .330622−01 | −77.031920 |
| HOYA | NBFD10 | −.434016+01 | 1.835598 | −.146158+00 | .336758−01 | −77.025099 |
| HOYA | TAFD13 | −.433808+01 | 1.857070 | −.149204+00 | .343940−01 | −77.019126 |

TABLE I-continued

*LEAST SQUARES FITTED COEFFICIENTS*

| ORDER | BASE WVL | MIN VL | MAX WVL |
|---|---|---|---|
| 2.0 | 0.5740 | 0.400 | 0.700 |

| CAT | NAME | ETA1/ETA2 | INDEX | ETA1 | ETA2 | ARCTAN (ETA1/ETA2) |
|---|---|---|---|---|---|---|
| SCHOTT | F5 | −.433060+01 | 1.604555 | −.143537+00 | .331449−01 | −76.997434 |
| SCHOTT | BASF10 | −.429826+01 | 1.651348 | −.139390+00 | .324293−01 | −76.903029 |
| HOYA | F15 | −.429820+01 | 1.606793 | −.144032+00 | .335099−01 | −76.902791 |
| OHARA | BASF1 | −.428723+01 | 1.627202 | −.139561+00 | .325527−01 | −76.870468 |
| OHARA | BASF10 | −.427365+01 | 1.651338 | −.138503+00 | .324085−01 | −76.830230 |
| OHARA | F5 | −.426141+01 | 1.604555 | −.143543+00 | .336844−01 | −76.793684 |
| CORN-F | 604381 | −.426071+01 | 1.604631 | −.143232+00 | .336168−01 | −76.791644 |
| OHARA | BASF08 | −.425820+01 | 1.724781 | −.143442+00 | .336861−01 | −76.784068 |
| HOYA | F9 | −.425569+01 | 1.621611 | −.143327+00 | .336789−01 | −76.776564 |
| SCHOTT | BASF1 | −.425307+01 | 1.627210 | −.140057+00 | .329309−01 | −76.776564 |
| SCHOTT | F15 | −.423545+01 | 1.606796 | −.144250+00 | .340579−01 | −76.715557 |
| OHARA | BASF12 | −.421880+01 | 1.671199 | −.138730+00 | .328837−01 | −76.665069 |
| SCHOTT | BASF12 | −.421877+01 | 1.671202 | −.139189+00 | .329928−01 | −76.664951 |
| SCHOTT | F9 | −.418601+01 | 1.621616 | −.143307+00 | .342348−01 | −76.564344 |
| HOYA | BAFD4 | −.413166+01 | 1.652493 | −.142370+00 | .344582−01 | −76.394194 |
| SCHOTT | BASF50 | −.411723+01 | 1.711586 | −.148997+00 | .361886−01 | −76.348269 |
| SCHOTT | TIF3 | −.411567+01 | 1.548577 | −.129389+00 | .314381−01 | −76.343284 |
| HOYA | LAF7 | −.410307+01 | 1.751029 | −.155645+00 | .379336−01 | −76.302975 |
| SCHOTT | F3 | −.407372+01 | 1.614114 | −.147267+00 | .361497−01 | −76.208272 |
| CORN-F | 724380 | −.406406+01 | 1.724851 | −.143517+00 | .353137−01 | −76.176455 |
| SCHOTT | KZFS8 | −.403840+01 | 1.721957 | −.157593+00 | .390237−01 | −76.091992 |
| HOYA | F3 | −.403026+01 | 1.614114 | −.147563+00 | .366169−01 | −76.064973 |
| OHARA | F3 | −.401354+01 | 1.614111 | −.147333+00 | .367090−01 | −76.009242 |
| OHARA | BASF4 | −.400294+01 | 1.652501 | −.142588+00 | .356208−01 | −75.973665 |
| SCHOTT | BASF13 | −.398318+01 | 1.698903 | −.141393+00 | .354976−01 | −75.906810 |
| OHARA | KZFS8 | −.398234+01 | 1.721949 | −.157077+00 | .394435−01 | −75.903951 |
| SCHOTT | F4 | −.396937+01 | 1.617794 | −.148869+00 | .375045−01 | −75.859752 |
| SCHOTT | LAFN7 | −.396001+01 | 1.751034 | −.156046+00 | .394054−01 | −75.827716 |
| HOYA | BAFD8 | −.394337+01 | 1.724778 | −.143540+00 | .364005−01 | −75.770256 |
| HOYA | F4 | −.392267+01 | 1.617791 | −.148893+00 | .379571−01 | −75.698284 |
| OHARA | F10 | −.391907+01 | 1.624858 | −.149166+00 | .380616−01 | −75.685695 |
| SCHOTT | F2 | −.391263+01 | 1.621258 | −.149901+00 | .383121−01 | −75.663106 |
| OHARA | F4 | −.390157+01 | 1.617790 | −.148793+00 | .381367−01 | −75.624152 |
| HOYA | F2 | −.389279+01 | 1.621260 | −.150179+00 | .385788−01 | −75.593061 |
| SCHOTT | LAF22 | −.388108+01 | 1.783297 | −.146991+00 | .378738−01 | −75.551401 |
| HOYA | F1 | −.387472+01 | 1.627131 | −.152428+00 | .393390−01 | −75.528740 |
| OHARA | F2 | −.386980+01 | 1.621262 | −.150304+00 | .388404−01 | −75.511025 |
| CHANCE | 620364 | −.386932+01 | 1.621259 | −.149839+00 | .387249−01 | −75.509355 |
| CORN-F | 620363 | −.385979+01 | 1.621230 | −.150183+00 | .389097−01 | −75.475066 |
| SCHOTT | F13 | −.380709+01 | 1.623605 | −.151201+00 | .397156−01 | −75.282714 |
| OHARA | BASF8 | −.379440+01 | 1.724781 | −.143612+00 | .378484−01 | −75.235631 |
| SCHOTT | BASF56 | −.376732+01 | 1.658426 | −.148317+00 | .393695−01 | −75.134134 |
| CHANCE | 626357 | −.376047+01 | 1.627129 | −.152618+00 | .405849−01 | −75.108277 |
| SCHOTT | F1 | −.375478+01 | 1.627133 | −.152611+00 | .406446−01 | −75.086694 |
| CORN-F | 637353 | −.374591+01 | 1.637779 | −.154265+00 | .411822−01 | −75.053026 |
| HOYA | NBFD6 | −.373363+01 | 1.758188 | −.149908+00 | .401507−01 | −75.006072 |
| OHARA | F1 | −.372919+01 | 1.627133 | −.152573+00 | .409131−01 | −74.989038 |
| HOYA | F6 | −.372321+01 | 1.637641 | −.154091+00 | .413867−01 | −74.965958 |
| CORN-F | 626356 | −.368321+01 | 1.627157 | −.153021+00 | .415457−01 | −74.810177 |
| OHARA | F6 | −.366983+01 | 1.637641 | −.153964+00 | .419539−01 | −74.757449 |
| HOYA | NBFD7 | −.366029+01 | 1.784548 | −.151063+00 | .412707−01 | −74.719572 |
| SCHOTT | F6 | −.365072+01 | 1.637644 | −.154102+00 | .422114−01 | −74.681369 |
| HOYA | F7 | −.364428+01 | 1.626617 | −.153009+00 | .419861−01 | −74.655564 |
| SCHOTT | F7 | −.364290+01 | 1.626616 | −.153153+00 | .420416−01 | −74.650002 |
| HOYA | BAFD2 | −.362186+01 | 1.665778 | −.151722+00 | .418906−01 | −75.565116 |
| HOYA | NBFD8 | −.361176+01 | 1.809021 | −.153117+00 | .423939−01 | −74.524049 |
| SCHOTT | BASF2 | −.357610+01 | 1.665783 | −.151969+00 | .424958−01 | −74.377166 |
| OHARA | SF7 | −.356282+01 | 1.641118 | −.157459+00 | .441952−01 | −74.321763 |
| SCHOTT | SF7 | −.354192+01 | 1.641120 | −.157306+00 | .444127−01 | −74.233868 |
| HOYA | FD7 | −.349147+01 | 1.641123 | −.157450+00 | .450956−01 | −74.017641 |
| OHARA | LAF012 | −.347733+01 | 1.784545 | −.150611+00 | .433121−01 | −73.986038 |
| SCHOTT | LASF18 | −.346436+01 | 1.915483 | −.167528+00 | .483576−01 | −73.899012 |
| OHARA | BASF2 | −.344610+01 | 1.665783 | −.151837+00 | .440604−01 | −73.808210 |
| SCHOTT | SF16 | −.342867+01 | 1.647464 | −.159812+00 | .466103−01 | −73.740301 |
| CORN-F | 648339 | −.341481+01 | 1.649352 | −.160369+00 | .469628−01 | −73.677746 |
| OHARA | LAF015 | −.339933+01 | 1.751025 | −.155605+00 | .457753−01 | −73.607368 |
| HOYA | FD9 | −.339567+01 | 1.655845 | −.161352+00 | .475175−01 | −73.590678 |
| SCHOTT | SF9 | −.339174+01 | 1.655847 | −.161676+00 | .476675−01 | −73.572718 |
| SCHOTT | LASF33 | −.338732+01 | 1.807636 | −.158904+00 | .469113−01 | −73.552458 |
| OHARA | SF2 | −.338224+01 | 1.649055 | −.160939+00 | .475835−01 | −73.529069 |
| SCHOTT | SF2 | −.337068+01 | 1.649052 | −.160726+00 | .476834−01 | −73.475689 |
| OHARA | LAF7 | −.336786+01 | 1.751015 | −.154634+00 | .459147−01 | −73.462530 |
| HOYA | FD2 | −.335505+01 | 1.649057 | −.160788+00 | .479242−01 | −73.402875 |
| OHARA | SF9 | −.335368+01 | 1.655846 | −.161900+00 | .482753−01 | −73.396485 |
| SCHOTT | SF12 | −.335230+01 | 1.649675 | −.160766+00 | .479569−01 | −73.390026 |
| SCHOTT | SF17 | −.335175+01 | 1.651546 | −.161571+00 | .482050−01 | −73.387432 |
| CHANCE | 648338 | −.334365+01 | 1.649677 | −.160751+00 | .480766−01 | −73.349392 |

TABLE I-continued

*LEAST SQUARES FITTED COEFFICIENTS*

| | ORDER 2.0 | BASE WVL 0.5740 | | MIN VL 0.400 | MAX WVL 0.700 | |
|---|---|---|---|---|---|---|
| CAT | NAME | ETA1/ETA2 | INDEX | ETA1 | ETA2 | ARCTAN (ETA1/ETA2) |
| HOYA | F11 | −.333766+01 | 1.622794 | −.151489+00 | .453878−01 | −73.321196 |
| HOYA | BAFD14 | −.333152+01 | 1.701106 | −.155796+00 | .467643−01 | −73.292152 |
| SCHOTT | FN11 | −.333151+01 | 1.622185 | −.150518+00 | .451800−01 | −73.292165 |
| CHANCE | 653335 | −.333047+01 | 1.654867 | −.162480+00 | .487860−01 | −73.287169 |
| OHARA | F11 | −.332182+01 | 1.622189 | −.151750+00 | .456827−01 | −73.246145 |
| SCHOTT | BASF14 | −.331917+01 | 1.701107 | −.155615+00 | .468839−01 | −73.233424 |
| HOYA | FD12 | −.331257+01 | 1.649675 | −.160929+00 | .485813−01 | −73.201967 |
| SCHOTT | BASF55 | −.331112+01 | 1.701248 | −.156886+00 | .473815−01 | −73.195038 |
| OHARA | SF19 | −.330308+01 | 1.668237 | −.164555+00 | .498187−01 | −73.156416 |
| CORN-F | 667331 | −.327995+01 | 1.668432 | −.164248+00 | .500766−01 | −73.044371 |
| SCHOTT | SF19 | −.326298+01 | 1.668239 | −.164748+00 | .504901−01 | −72.961339 |
| CHANCE | 850322 | −.326209+01 | 1.852142 | −.168651+00 | .517003−01 | −72.956974 |
| SCHOTT | TIF4 | −.322509+01 | 1.585187 | −.146933+00 | .455594−01 | −72.772945 |
| HOYA | FD19 | −.321631+01 | 1.668233 | −.164381+00 | .511086−01 | −72.728721 |
| SCHOTT | LAFN11 | −.320719+01 | 1.758620 | −.170944+00 | .533003−01 | −72.682533 |
| CORN-F | 673323 | −.318517+01 | 1.674180 | −.168239+00 | .528196−01 | −72.570020 |
| HOYA | NBFD9 | −.316344+01 | 1.758593 | −.170915+00 | .540284−01 | −72.457594 |
| SCHOTT | SF50 | −.314834+01 | 1.656144 | −.165279+00 | .524971−01 | −72.378737 |
| SCHOTT | SF5 | −.314487+01 | 1.674185 | −.168709+00 | .536458−01 | −72.360465 |
| SCHOTT | SF51 | −.313750+01 | 1.661675 | −.164957+00 | .525761−01 | −72.321562 |
| SCHOTT | LASF8 | −.313135+01 | 1.809228 | −.171939+00 | .549090−01 | −72.289032 |
| OHARA | F16 | −.312662+01 | 1.593887 | −.153036+00 | .489462−01 | −72.263928 |
| HOYA | FD5 | −.312422+01 | 1.674190 | −.168891+00 | .540586−01 | −72.251181 |
| OHARA | LASF21 | −.311521+01 | 1.852133 | −.158309+00 | .540281−01 | −72.203088 |
| OHARA | SF5 | −.309993+01 | 1.674192 | −.169243+00 | .545956−01 | −72.120972 |
| SCHOTT | SF62 | −.309010+01 | 1.682857 | −.170099+00 | .550464−01 | −72.067698 |
| HOYA | FF5 | −.307661+01 | 1.593893 | −.153424+00 | .498679−01 | −71.994116 |
| SCHOTT | TIFN5 | −.306922+01 | 1.594745 | −.153142+00 | .498961−01 | −71.953566 |
| HOYA | TAFD9 | −.301491+01 | 1.852179 | −.168822+00 | .559957−01 | −71.650099 |
| CORN-F | 689312 | −.300391+01 | 1.690574 | −.174022+00 | .579318−01 | −71.587436 |
| SCHOTT | SF8 | −.299049+01 | 1.690503 | −.174160+00 | .581279−01 | −71.510421 |
| OHARA | SF8 | −.297801+01 | 1.690507 | −.174702+00 | .586640−01 | −71.438223 |
| SCHOTT | LASF9 | −.297257+01 | 1.852133 | −.168426+00 | .566603−01 | −71.406512 |
| HOYA | FD6 | −.296749+01 | 1.690503 | −.174275+00 | .587279−01 | −71.377003 |
| SCHOTT | BASF54 | −.289811+01 | 1.737899 | −.168843+00 | .582595−01 | −70.962937 |
| SCHOTT | SF52 | −.284569+01 | 1.690119 | −.177173+00 | .622601−01 | −70.638090 |
| OHARA | SF1 | −.277434+01 | 1.719089 | −.183742+00 | .662288−01 | −70.178579 |
| SCHOTT | LASF32 | −.276608+01 | 1.805371 | −.178500+00 | .645317−01 | −70.123956 |
| SCHOTT | SF1 | −.275419+01 | 1.719087 | −.183734+00 | .667106−01 | −70.044926 |
| CORN-F | 699301 | −.274146+01 | 1.700651 | −.180120+00 | .657022−01 | −69.959596 |
| SCHOTT | SF18 | −.272083+01 | 1.723262 | −.185368+00 | .681295−01 | −69.819778 |
| OHARA | SF01 | −.271515+01 | 1.721963 | −.184925+00 | .681086−01 | −69.781050 |
| HOYA | FD1 | −.271396+01 | 1.719086 | −.183727+00 | .676972−01 | −69.772860 |
| CHANCE | 717295 | −.271283+01 | 1.719090 | −.183675+00 | .677062−01 | −69.765126 |
| HOYA | FD18 | −.271048+01 | 1.723258 | −.185364+00 | .683877−01 | −69.749100 |
| OHARA | SF18 | −.270769+01 | 1.723258 | −.185348+00 | .684524−01 | −69.729891 |
| OHARA | SF15 | −.268086+01 | 1.700595 | −.179933+00 | .671176−01 | −69.543760 |
| SCHOTT | SF15 | −.268069+01 | 1.700601 | −.180303+00 | .672598−01 | −69.542593 |
| HOYA | FD15 | −.266205+01 | 1.700596 | −.180349+00 | .677481−01 | −69.411311 |
| CHANCE | 699301 | −.265997+01 | 1.700596 | −.180374+00 | .678107−01 | −69.396501 |
| SCHOTT | SFN64 | −.264749+01 | 1.707504 | −.179020+00 | .676190−01 | −69.307568 |
| HOYA | FD20 | −.264393+01 | 1.721969 | −.185068+00 | .699972−01 | −69.282167 |
| CORN-F | 717295 | −.261491+01 | 1.719138 | −.183728+00 | .702618−01 | −69.072000 |
| SCHOTT | SF53 | −.259177+01 | 1.730102 | −.188827+00 | .728564−01 | −68.901551 |
| SCHOTT | SF3 | −.257858+01 | 1.741863 | −.192066+00 | .744853−01 | −68.803162 |
| HOYA | FDS2 | −.257473+01 | 1.730102 | −.188881+00 | .733595−01 | −68.774325 |
| CORN-F | 836302 | −.257217+01 | 1.838371 | −.179459+00 | .697694−01 | −68.755099 |
| SCHOTT | LAF9 | −.256742+01 | 1.797027 | −.190736+00 | .742911−01 | −68.719235 |
| OHARA | SF3 | −.256672+01 | 1.741853 | −.191425+00 | .745793−01 | −68.714080 |
| HOYA | FD3 | −.256638+01 | 1.741857 | −.191715+00 | .747024−01 | −68.711455 |
| CHANCE | 706300 | −.255413+01 | 1.707527 | −.180644+00 | .707264−01 | −68.618481 |
| CHANCE | 748278 | −.252592+01 | 1.750323 | −.194421+00 | .769700−01 | −68.401712 |
| SCHOTT | SF54 | −.251467+01 | 1.742670 | −.192740+00 | .766461−01 | −68.313977 |
| CORN-F | 728284 | −.251456+01 | 1.730123 | −.190681+00 | .758309−01 | −68.313046 |
| CHANCE | 755276 | −.249572+01 | 1.757145 | −.196256+00 | .786372−01 | −68.164672 |
| SCHOTT | SF4 | −.249448+01 | 1.757142 | −.196269+00 | .786815−01 | −68.154840 |
| OHARA | SF04 | −.249191+01 | 1.752762 | −.195466+00 | .784402−01 | −68.134485 |
| CORN-F | 740281 | −.248406+01 | 1.741869 | −.192609+00 | .775380−01 | −68.071918 |
| HOYA | FD4 | −.247971+01 | 1.757144 | −.196511+00 | .792476−01 | −68.037105 |
| OHARA | SF10 | −.246937+01 | 1.730063 | −.190214+00 | .770293−01 | −67.953959 |
| SCHOTT | SF63 | −.246009+01 | 1.750313 | −.195287+00 | .793819−01 | −67.878828 |
| SCHOTT | SF10 | −.245780+01 | 1.730067 | −.190535+00 | .775228−01 | −67.860112 |
| OHARA | SF4 | −.245714+01 | 1.757145 | −.196693+00 | .800493−01 | −67.854864 |
| CHANCE | 728284 | −.245550+01 | 1.730064 | −.170621+00 | .776304−01 | −67.841390 |
| HOYA | FD10 | −.244881+01 | 1.730075 | −.191179+00 | .780802−01 | −67.786772 |
| SCHOTT | SF61 | −.243535+01 | 1.752775 | −.196666+00 | .807210−01 | −67.684441 |
| CORN-F | 755276 | −.241616+01 | 1.757143 | −.196095+00 | .811598−01 | −67.516314 |

TABLE I-continued

*LEAST SQUARES FITTED COEFFICIENTS*

ORDER 2.0    BASE WVL 0.5740    MIN WVL 0.400    MAX WVL 0.700

| CAT | NAME | ETA1/ETA2 | INDEX | ETA1 | ETA2 | ARCTAN (ETA1/ETA2) |
|---|---|---|---|---|---|---|
| CORN-F | 762269 | −.238586+01 | 1.763809 | −.201033+00 | .842603−01 | −67.259656 |
| OHARA | SF13 | −.238101+01 | 1.742657 | −.194646+00 | .817492−01 | −67.218124 |
| OHARA | SFS5 | −.238461+01 | 1.763788 | −.199484+00 | .840900−01 | −67.162971 |
| HOYA | FD13 | −.237294+01 | 1.742663 | −.195067+00 | .822049−01 | −67.148528 |
| SCHOTT | SF55 | −.236292+01 | 1.763801 | −.200664+00 | .849223−01 | −67.061605 |
| HOYA | FDS5 | −.234664+01 | 1.763809 | −.200827+00 | .855807−01 | −66.919139 |
| SCHOTT | SF13 | −.230283+01 | 1.742671 | −.195912+00 | .850744−01 | −66.527199 |
| OHARA | SFS3 | −.229004+01 | 1.786820 | −.206096+00 | .899966−01 | −66.410396 |
| CHANCE | 805254 | −.227076+01 | 1.807417 | −.212405+00 | .935391−01 | −66.232224 |
| SCHOTT | TASF1 | −.226756+01 | 1.675043 | −.187210+00 | .825602−01 | −66.202369 |
| SCHOTT | SF56 | −.226331+01 | 1.786829 | −.207228+00 | .915596−01 | −66.162707 |
| HOYA | FDS3 | −.225619+01 | 1.786830 | −.207464+00 | .919536−01 | −66.095797 |
| CORN-F | 785259 | −.224900+01 | 1.787139 | −.208574+00 | .927408−01 | −66.028050 |
| SCHOTT | SF6 | −.223844+01 | 1.807421 | −.212348+00 | .948645−01 | −65.927739 |
| OHARA | SF6 | −.222790+01 | 1.807416 | −.212284+00 | .952842−01 | −65.826954 |
| HOYA | FD6 | −.222728+01 | 1.807421 | −.212038+00 | .952005−01 | −65.820946 |
| CORN-F | 805255 | −.222501+01 | 1.807326 | −.211744+00 | .971654−01 | −65.799128 |
| HOYA | FD14 | −.220890+01 | 1.763852 | −.203560+00 | .921545−01 | −65.643063 |
| OHARA | SF14 | −.219571+01 | 1.760848 | −.203384+00 | .926280−01 | −65.513864 |
| SCHOTT | SF14 | −.215204+01 | 1.763850 | −.203549+00 | .945845−01 | −65.076799 |
| OHARA | SFSL3 | −.213910+01 | 1.786805 | −.205349+00 | .959976−01 | −64.944611 |
| CHANCE | 785258 | −.213763+01 | 1.786872 | −.209608+00 | .980564−01 | −64.929408 |
| OHARA | SFL14 | −.212526+01 | 1.763851 | −.203665+00 | .958305−01 | −64.801605 |
| CORN-F | 734265 | −.211212+01 | 1.735978 | −.203755+00 | .964694−01 | −64.664419 |
| OHARA | SF11 | −.209162+01 | 1.768677 | −.209933+00 | .100369+00 | −64.447530 |
| SCHOTT | SF11 | −.208404+01 | 1.786872 | −.209512+00 | .100532+00 | −64.366498 |
| OHARA | SFL6 | −.207789+01 | 1.807416 | −.212223+00 | .102134+00 | −64.300446 |
| HOYA | FD11 | −.207581+01 | 1.786875 | −.209578+00 | .100962+00 | −64.278046 |
| OHARA | SFL11 | −.205802+01 | 1.786881 | −.210162+00 | .102119+00 | −64.084599 |
| HOYA | FDS9 | −.205150+01 | 1.849166 | −.226160+00 | .110242+00 | −64.013018 |
| SCHOTT | SF57 | −.205007+01 | 1.849171 | −.226180+00 | .110323+00 | −63.997438 |
| OHARA | SF03 | −.204471+01 | 1.849159 | −.225686+00 | .110376+00 | −63.938182 |
| SCHOTT | TIF6 | −.188663+01 | 1.617905 | −.174161+00 | .923130−01 | −62.074440 |
| SCHOTT | SF58 | −.179407+01 | 1.920613 | −.249868+00 | .139274+00 | −60.865129 |
| OHARA | SFS01 | −.176690+01 | 1.925912 | −.252358+00 | .142826+00 | −64.491622 |
| OHARA | SFS1 | −.168930+01 | 1.925965 | −.256990+00 | .152128+00 | −59.376132 |
| SCHOTT | SF59 | −.166253+01 | 1.955781 | −.263360+00 | .158409+00 | −58.973417 |
| SCHOTT | LF8 | −.607584+00 | 1.565361 | −.125182+00 | −.206033−01 | −99.346334 |
| SCHOTT | FK5 | .870540+01 | 1.487994 | −.790093−01 | −.907590−02 | −96.552917 |
| HOYA | BSC3 | .883498+01 | 1.498866 | −.853725−01 | −.966302−02 | −96.457629 |
| CORN-F | 487704 | .915227+01 | 1.487751 | −.788591−01 | −.861635−02 | −96.235550 |
| OHARA | BK10 | .921173+01 | 1.498363 | −.831851−01 | −.903035−02 | −96.195613 |
| OHARA | BK9 | .924626+01 | 1.494420 | −.841124−01 | −.909691−02 | −96.172651 |
| OHARA | FK5 | .937660+01 | 1.487996 | −.792315−01 | −.844991−02 | −96.087499 |
| SCHOTT | BK10 | .948819+01 | 1.498363 | −.830447−01 | −.875243−02 | −96.016432 |
| HOYA | FC5 | .953238+01 | 1.487993 | −.789354−01 | −.828076−02 | −95.988739 |
| CORN-F | 488658 | .958277+01 | 1.488042 | −.845033−01 | −.881825−02 | −95.957476 |
| OHARA | PK1 | .972404+01 | 1.504328 | −.831612−01 | −.855213−02 | −95.871542 |
| SCHOTT | BK3 | .972749+01 | 1.498869 | −.854339−01 | −.878274−02 | −95.869477 |
| SCHOTT | PK1 | .992166+01 | 1.504329 | −.830549−01 | −.837107−02 | −95.755382 |
| HOYA | PCS1 | .100388+02 | 1.517825 | −.797593−01 | −.794509−02 | −95.688657 |
| HOYA | PC1 | .102555+02 | 1.504328 | −.831214−01 | −.810504−02 | −95.569218 |
| OHARA | BK4 | .102743+02 | 1.501034 | −.841968−01 | −.819491−02 | −95.559113 |
| SCHOTT | FK1 | .105349+02 | 1.471198 | −.825028−01 | −.783140−02 | −95.422431 |
| OHARA | PK2 | .106726+02 | 1.518786 | −.584542−01 | −.800685−02 | −95.352846 |
| OHARA | BK3 | .107940+02 | 1.498866 | −.854179−01 | −.791344−02 | −95.292991 |
| HOYA | FC1 | .108373+02 | 1.471197 | −.825422−01 | −.761653−02 | −95.272003 |
| SCHOTT | PK50 | .108546+02 | 1.521083 | −.796732−01 | −.734003−02 | −95.263615 |
| OHARA | FK3 | .111977+02 | 1.465011 | −.842295−01 | −.752205−02 | −95.103216 |
| OHARA | PKS1 | .113430+02 | 1.517818 | −.797889−01 | −.703421−02 | −95.038185 |
| OHARA | FK1 | .115831+02 | 1.471198 | −.824182−01 | −.711539−02 | −94.934268 |
| SCHOTT | FK3 | .117421+02 | 1.465014 | −.844297−01 | −.719035−02 | −94.867778 |
| SCHOTT | FK54 | .120508+02 | 1.437351 | −.611697−01 | −.507598−02 | −94.743646 |
| HOYA | PC2 | .121075+02 | 1.518788 | −.851916−01 | −.703627−02 | −94.721540 |
| SCHOTT | PK2 | .122813+02 | 1.518790 | −.853260−01 | −.694761−02 | −94.654999 |
| CORN-F | 465657 | .123644+02 | 1.465014 | −.843998−01 | −.682594−02 | −94.623858 |
| CORN-F | 518651 | .124691+02 | 1.518778 | −.852578−01 | −.683755−02 | −94.585223 |
| HOYA | BSC7 | .126988+02 | 1.517384 | −.864635−01 | −.680679−02 | −94.502611 |
| SCHOTT | PK3 | .127884+02 | 1.526010 | −.858252−01 | −.671118−02 | −94.471197 |
| OHARA | BK12 | .129958+02 | 1.519324 | −.860235−01 | −.661931−02 | −94.400107 |
| HOYA | PC3 | .134431+02 | 1.526011 | −.858534−01 | −.638644−02 | −94.254268 |
| CHANCE | 517642 | .135229+02 | 1.517382 | −.864626−01 | −.639526−02 | −94.229240 |
| CORN-F | 517642 | .135812+02 | 1.517389 | −.864021−01 | −.636190−02 | −94.211164 |
| SCHOTT | BK7 | .136653+02 | 1.517385 | −.864656−01 | −.632739−02 | −94.185336 |
| CHANCE | 510644 | .137233+02 | 1.510273 | −.861023−01 | −.627415−02 | −94.167694 |
| SCHOTT | UBK7 | .137359+02 | 1.517385 | −.863121−01 | −.628369−02 | −94.163899 |
| OHARA | BK7 | .138436+02 | 1.516915 | −.864910−01 | −.629137−02 | −94.161563 |

TABLE I-continued

*LEAST SQUARES FITTED COEFFICIENTS*

| ORDER | BASE WVL | MIN VL | MAX WVL | |
|---|---|---|---|---|
| 2.0 | 0.5740 | 0.400 | 0.700 | |

| CAT | NAME | ETA1/ETA2 | INDEX | ETA1 | ETA2 | ARCTAN (ETA1/ETA2) |
|---|---|---|---|---|---|---|
| OHARA | PSK3 | .137567+02 | 1.552953 | −.869995−01 | −.632415−02 | −94.157620 |
| OHARA | PK3 | .141636+02 | 1.526007 | −.859593−01 | −.606904−02 | −94.038589 |
| SCHOTT | BK8 | .150883+02 | 1.520745 | −.870925−01 | −.577220−02 | −93.791827 |
| HOYA | PCD2 | .152105+02 | 1.569385 | −.878957−01 | −.577861−02 | −93.761437 |
| HOYA | FCD10 | .152753+02 | 1.456866 | −.610293−01 | −.399528−02 | −93.745521 |
| HOYA | FC3 | .153931+02 | 1.465015 | −.842094−01 | −.547060−02 | −93.716953 |
| SCHOTT | PSK50 | .155337+02 | 1.558131 | −.823975−01 | −.530444−02 | −93.683403 |
| HOYA | ZNC7 | .155451+02 | 1.509074 | −.905172−01 | −.582287−02 | −93.680701 |
| CHANCE | 641601 | .156746+02 | 1.641270 | −.923210−01 | −.588984−02 | −93.650374 |
| OHARA | PSK1 | .161505+02 | 1.548344 | −.881099−01 | −.545554−02 | −93.543085 |
| OHARA | LAK01 | .163213+02 | 1.640772 | −.922437−01 | −.565175−02 | −93.506116 |
| SCHOTT | PSK3 | .163302+02 | 1.552954 | −.873711−01 | −.535026−02 | −93.504190 |
| SCHOTT | ZKN7 | .164635+02 | 1.509073 | −.906253−01 | −.550463−02 | −93.475906 |
| OHARA | ZK7 | .165143+02 | 1.509077 | −.911171−01 | −.551746−02 | −93.465229 |
| CORN-F | 510635 | .165281+02 | 1.510575 | −.872466−01 | −.527870−02 | −93.462358 |
| HOYA | BSC1 | .167237+02 | 1.510675 | −.873966−01 | −.522591−02 | −93.421946 |
| OHARA | PSK2 | .168792+02 | 1.569383 | −.877116−01 | −.519644−02 | −93.390503 |
| SCHOTT | PSK2 | .169834+02 | 1.569385 | −.878687−01 | −.517380−02 | −93.369743 |
| CHANCE | 508612 | .172982+02 | 1.508191 | −.906602−01 | −.524101−02 | −93.308551 |
| SCHOTT | FK51 | .175476+02 | 1.486979 | −.655603−01 | −.373614−02 | −93.261635 |
| SCHOTT | BK1 | .178859+02 | 1.510673 | −.873263−01 | −.488241−02 | −93.200073 |
| CORN-F | 486817 | .192375+02 | 1.486475 | −.677108−01 | −.351973−02 | −92.975659 |
| OHARA | BK1 | .192502+02 | 1.510673 | −.870835−01 | −.452377−02 | −92.973700 |
| HOYA | PCD3 | .194229+02 | 1.552952 | −.873730−01 | −.449844−02 | −92.947297 |
| CHANCE | 569631 | .195119+02 | 1.569383 | −.878305−01 | −.450139−02 | −92.933891 |
| OHARA | BK6 | .195970+02 | 1.531743 | −.886865−01 | −.452553−02 | −92.921178 |
| OHARA | FK01 | .197991+02 | 1.497441 | −.678377−01 | −.342631−02 | −92.891407 |
| HOYA | LACL6 | .200987+02 | 1.640776 | −.920358−01 | −.457919−02 | −92.848371 |
| SCHOTT | BK6 | .202252+02 | 1.531750 | −.871374−01 | −.440724−02 | −92.830582 |
| SCHOTT | FK52 | .214118+02 | 1.486484 | −.676504−01 | −.315949−02 | −92.673953 |
| HOYA | BSC6 | .214496+02 | 1.531749 | −.891886−01 | −.415805−02 | −92.669247 |
| OHARA | BK2 | .216654+02 | 1.507162 | −.893758−01 | −.412529−02 | −92.642707 |
| SCHOTT | PSK52 | .233739+02 | 1.603769 | −.846166−01 | −.362012−02 | −92.449769 |
| OHARA | K1 | .238599+02 | 1.510363 | −.891660−01 | −.373707−02 | −92.399940 |
| SCHOTT | K51 | .243787+02 | 1.505796 | −.930316−01 | −.381609−02 | −92.348915 |
| CORN-F | 564609 | .245040+02 | 1.564676 | −.908447−01 | −.370733−02 | −92.336918 |
| OHARA | SK20 | .246088+02 | 1.560289 | −.904751−01 | −.367653−02 | −92.326981 |
| SCHOTT | SK5 | .257685+02 | 1.589828 | −.903533−01 | −.350635−02 | −92.222368 |
| HOYA | C7 | .262127+02 | 1.511735 | −.914766−01 | −.348978−02 | −92.184742 |
| CORN-F | 542734 | .262662+02 | 1.542737 | −.753406−01 | −.286835−02 | −92.180299 |
| CORN-F | 518603 | .270791+02 | 1.518824 | −.918428−01 | −.339165−02 | −92.114906 |
| HOYA | BACD5 | .275634+02 | 1.589827 | −.903801−01 | −.327899−02 | −92.077779 |
| CHANCE | 589613 | .299354+02 | 1.589826 | −.903610−01 | −.301853−02 | −91.913267 |
| OHARA | SK11 | .299784+02 | 1.564512 | −.911508−01 | −.304055−02 | −91.910527 |
| HOYA | BACD165 | .301388+02 | 1.621164 | −.924448−01 | −.306730−02 | −91.900365 |
| SCHOTT | SK20 | .311164+02 | 1.560294 | −.903862−01 | −.290478−02 | −91.840705 |
| HOYA | LACL7 | .312404+02 | 1.670844 | −.964946−01 | −.308878−02 | −91.833405 |
| CORN-F | 589612 | .319377+02 | 1.589696 | −.904002−01 | −.283052−02 | −91.793402 |
| CORN-F | 511604 | .322814+02 | 1.511613 | −.916603−01 | −.283942−02 | −91.774321 |
| SCHOTT | LAK21 | .323056+02 | 1.641269 | −.920718−01 | −.285003−02 | −91.772991 |
| HOYA | LAC7 | .325405+02 | 1.652408 | −.946047−01 | −.290729−02 | −91.760199 |
| SCHOTT | PK51 | .326136+02 | 1.529052 | −.718368−01 | −.220267−02 | −91.756261 |
| SCHOTT | K11 | .327016+02 | 1.500720 | −.900976−01 | −.275514−02 | −91.751530 |
| HOYA | BACD16 | .333124+02 | 1.621155 | −.917238−01 | −.275344−02 | −91.719435 |
| SCHOTT | UK50 | .336648+02 | 1.523199 | −.916329−01 | −.272192−02 | −91.701448 |
| OHARA | LAK7 | .338735+02 | 1.652403 | −.942570−01 | −.278262−02 | −91.690973 |
| CHANCE | 697562 | .339006+02 | 1.698236 | −.784705−01 | −.290468−02 | −91.689619 |
| HOYA | BACD11 | .344348+02 | 1.564512 | −.909246−01 | −.264048−02 | −91.663421 |
| SCHOTT | SK16 | .347019+02 | 1.621157 | −.917065−01 | −.264269−02 | −91.650625 |
| OHARA | SK14 | .349146+02 | 1.603833 | −.911086−01 | −.260947−02 | −91.640578 |
| SCHOTT | LAK31 | .354874+02 | 1.697628 | −.980691−01 | −.276349−02 | −91.614111 |
| OHARA | SK5 | .360112+02 | 1.589827 | −.906992−01 | −.251864−02 | −91.590646 |
| OHARA | LAK014 | .361383+02 | 1.697691 | −.979264−01 | −.270977−02 | −91.585055 |
| CHANCE | 603606 | .362407+02 | 1.603830 | −.912762−01 | −.251861−02 | −91.580577 |
| SCHOTT | SK11 | .362732+02 | 1.564512 | −.909578−01 | −.250757−02 | −91.579158 |
| SCHOTT | SK14 | .363318+02 | 1.603832 | −.912752−01 | −.251227−02 | −91.576617 |
| CORN-F | 540597 | .366064+02 | 1.540160 | −.926842−01 | −.253191−02 | −91.564794 |
| SCHOTT | K50 | .368838+02 | 1.523201 | −.919227−01 | −.249222−02 | −91.553029 |
| HOYA | BACL3 | .369534+02 | 1.518973 | −.916143−01 | −.247919−02 | −91.550112 |
| OHARA | LAK6 | .375794+02 | 1.643293 | −.947540−01 | −.252143−02 | −91.524297 |
| HOYA | BACD14 | .375934+02 | 1.603831 | −.910845−01 | −.242289−02 | −91.523735 |
| CHANCE | 564608 | .389388+02 | 1.564511 | −.909646−01 | −.233609−02 | −91.471107 |
| HOYA | LAC6 | .390387+02 | 1.643302 | −.953703−01 | −.244297−02 | −91.467346 |
| CHANCE | 620603 | .397432+02 | 1.621154 | −.916871−01 | −.230699−02 | −91.441346 |
| CORN-F | 620603 | .404871+02 | 1.621151 | −.916950−01 | −.226480−02 | −91.414876 |
| SCHOTT | KZFSN2 | .414694+02 | 1.559109 | −.102222+00 | −.246500−02 | −91.381373 |
| HOYA | LAC11 | .416691+02 | 1.659130 | −.965613−01 | −.231733−02 | −91.374750 |

TABLE I-continued

*LEAST SQUARES FITTED COEFFICIENTS*

| | ORDER<br>2.0 | BASE WVL<br>0.5740 | | MIN VL<br>0.400 | MAX WVL<br>0.700 | |
|---|---|---|---|---|---|---|
| CAT | NAME | ETA1/ETA2 | INDEX | ETA1 | ETA2 | ARCTAN<br>(ETA1/ETA2) |
| CHANCE | 519604 | .422941+02 | 1.519611 | −.915426−01 | −.216443−02 | −91.354446 |
| CORN-F | 641601 | .439338+02 | 1.641267 | −.919855−01 | −.209373−02 | −91.303914 |
| HOYA | LAC15 | .444092+02 | 1.697695 | −.985518−01 | −.221917−02 | −91.289957 |
| SCHOTT | K7 | .449551+02 | 1.511734 | −.915512−01 | −.203650−02 | −91.274299 |
| CORN-F | 652585 | .450442+02 | 1.652407 | −.944992−01 | −.209792−02 | −91.271780 |
| SCHOTT | BALKN3 | .450955+02 | 1.519112 | −.917996−01 | −.203567−02 | −91.270334 |
| CORN-F | 697562 | .451971+02 | 1.697899 | −.983871−01 | −.217685−02 | −91.267482 |
| OHARA | BALK1 | .456965+02 | 1.527056 | −.921451−01 | −.201646−02 | −91.253633 |
| HOYA | LAC14 | .466141+02 | 1.697713 | −.997339−01 | −.213956−02 | −91.228959 |
| CHANCE | 697554 | .470812+02 | 1.697710 | −.998106−01 | −.211997−02 | −91.216775 |
| HOYA | BACD12 | .471840+02 | 1.583840 | −.928865−01 | −.196860−02 | −91.214122 |
| SCHOTT | PSK53 | .482711+02 | 1.620848 | −.870163−01 | −.180266−02 | −91.186790 |
| OHARA | LAK14 | .486738+02 | 1.697706 | −.994448−01 | −.204309−02 | −91.176973 |
| OHARA | BALK3 | .497837+02 | 1.518974 | −.917072−01 | −.184211−02 | −91.150737 |
| HOYA | LAC9 | .522504+02 | 1.691912 | −.101030+00 | −.193358−02 | −91.096432 |
| HOYA | TAC1 | .543995+02 | 1.726985 | −.103520+00 | −.190295−02 | −91.053118 |
| OHARA | SK16 | .559137+02 | 1.621156 | −.917056−01 | −.164013−02 | −91.024611 |
| SCHOTT | LAKN14 | .576174+02 | 1.697711 | −.997837−01 | −.173183−02 | −90.994316 |
| OHARA | PSK01 | .586782+02 | 1.617713 | −.880364−01 | −.150033−02 | −90.976349 |
| OHARA | SK12 | .596787+02 | 1.583841 | −.930734−01 | −.155957−02 | −90.959978 |
| OHARA | BAK2 | .633248+02 | 1.540616 | −.927256−01 | −.146429−02 | −90.904719 |
| CORN-F | 523594 | .679813+02 | 1.523633 | −.929572−01 | −.136739−02 | −90.842753 |
| OHARA | K7 | .690021+02 | 1.511733 | −.914017−01 | −.132462−02 | −90.830289 |
| OHARA | K50 | .721590+02 | 1.523196 | −.921678−01 | −.127729−02 | −90.793972 |
| HOYA | BACD7 | .747049+02 | 1.608032 | −.928925−01 | −.124346−02 | −90.766915 |
| CHANCE | 524592 | .747616+02 | 1.524639 | −.933783−01 | −.124901−02 | −90.766332 |
| SCHOTT | LAKN7 | .749039+02 | 1.652407 | −.944376−01 | −.126079−02 | −90.764882 |
| CHANCE | 652585 | .757398+02 | 1.652404 | −.944566−01 | −.124712−02 | −90.756438 |
| CORN-F | 697554 | .760379+02 | 1.697916 | −.998003−01 | −.131251−02 | −90.753474 |
| HOYA | LACL1 | .780667+02 | 1.641669 | −.972321−01 | −.124550−02 | −90.733893 |
| SCHOTT | SK7 | .798809+02 | 1.608030 | −.929450−01 | −.116354−02 | −90.717224 |
| SCHOTT | SK12 | .836981+02 | 1.583842 | −.929417−01 | −.111044−02 | −90.684521 |
| SCHOTT | BALK1 | .871857+02 | 1.527057 | −.920710−01 | −.105603−02 | −90.657138 |
| SCHOTT | BAK50 | .875947+02 | 1.568446 | −.952900−01 | −.108785−02 | −90.654072 |
| HOYA | BAC5 | .890026+02 | 1.557397 | −.942542−01 | −.105900−02 | −90.643723 |
| CORN-F | 613585 | .897103+02 | 1.613451 | −.944049−01 | −.105233−02 | −90.638648 |
| CHANCE | 607595 | .897382+02 | 1.608030 | −.929421−01 | −.103570−02 | −90.638449 |
| SCHOTT | TIK1 | .924535+02 | 1.479281 | −.941893−01 | −.101877−02 | −90.619698 |
| SCHOTT | K5 | .939519+02 | 1.523126 | −.929097−01 | −.988908−03 | −90.609818 |
| HOYA | ZNC1 | .957631+02 | 1.533814 | −.951004−01 | −.993080−03 | −90.598286 |
| OHARA | LAK18 | .997389+02 | 1.730123 | −.101009+00 | −.101274−02 | −90.574442 |
| SCHOTT | BAK2 | .103271+03 | 1.540615 | −.925331−01 | −.896020−03 | −90.554791 |
| CORN-F | 604640 | .109857+03 | 1.604192 | −.863228−01 | −.785775−03 | −90.521534 |
| OHARA | SK7 | .110102+03 | 1.608032 | −.930232−01 | −.844881−03 | −90.520373 |
| SCHOTT | LAK11 | .110909+03 | 1.659134 | −.965050−01 | −.870126−03 | −90.516586 |
| OHARA | LAK02 | .114422+03 | 1.670846 | −.963556−01 | −.842108−03 | −90.500729 |
| OHARA | SK3 | .116368+03 | 1.609560 | −.937132−01 | −.805320−03 | −90.492356 |
| OHARA | PSK02 | .125723+03 | 1.618706 | −.871342−01 | −.693063−03 | −90.455719 |
| HOYA | LAC8 | .128627+03 | 1.713957 | −.102430+00 | −.796330−03 | −90.445430 |
| HOYA | C5 | .152053+03 | 1.523124 | −.929279−01 | −.611157−03 | −90.376810 |
| HOYA | BACD15 | .152779+03 | 1.623771 | −.950835−01 | −.622358−03 | −90.375017 |
| CHANCE | 669574 | .156946+03 | 1.669663 | −.962691−01 | −.613390−03 | −90.365062 |
| SCHOTT | SK3 | .158337+03 | 1.609558 | −.937522−01 | −.592104−03 | −90.361854 |
| HOYA | BACL1 | .165873+03 | 1.527052 | −.919471−01 | −.554323−03 | −90.345415 |
| SCHOTT | K3 | .177587+03 | 1.518866 | −.936677−01 | −.527447−03 | −90.322632 |
| CHANCE | 643580 | .179454+03 | 1.643299 | −.953194−01 | −.531164−03 | −90.319275 |
| OHARA | K5 | .192279+03 | 1.523127 | −.924409−01 | −.480765−03 | −90.297979 |
| HOYA | BAC2 | .198263+03 | 1.540616 | −.925125−01 | −.466615−03 | −90.288986 |
| CORN-F | 609590 | .208907+03 | 1.608502 | −.935670−01 | −.447888−03 | −90.274261 |
| CHANCE | 713538 | .211681+03 | 1.713958 | −.102639+00 | −.484875−03 | −90.270667 |
| OHARA | LAK9 | .222992+03 | 1.691914 | −.100754+00 | −.451830−03 | −90.256941 |
| CORN-F | 623581 | .225515+03 | 1.623780 | −.951191−01 | −.421786−03 | −90.254064 |
| HOYA | ADF1 | .228995+03 | 1.565769 | −.104320+00 | −.455555−03 | −90.250203 |
| SCHOTT | LAK23 | .235819+03 | 1.669660 | −.962547−01 | −.408172−03 | −90.242963 |
| SCHOTT | LAKN6 | .237437+03 | 1.643302 | −.952892−01 | −.401324−03 | −90.241308 |
| SCHOTT | LAK9 | .257818+03 | 1.691917 | −.100967+00 | −.391624−03 | −90.222234 |
| SCHOTT | LAK8 | .280438+03 | 1.713962 | −.102629+00 | −.365959−03 | −90.204307 |
| SCHOTT | SK4 | .306677+03 | 1.613477 | −.942118−01 | −.307202−03 | −90.186827 |
| HOYA | BACD4 | .371294+03 | 1.613475 | −.942747−01 | −.253908−03 | −90.154312 |
| HOYA | BACD3 | .416634+03 | 1.609561 | −.938263−01 | −.225201−03 | −90.137521 |
| CHANCE | 613586 | .428948+03 | 1.613475 | −.942101−01 | −.219630−03 | −90.133572 |
| CHANCE | 658573 | .484001+03 | 1.659131 | −.964698−01 | −.199317−03 | −90.118379 |
| OHARA | K3 | .569286+03 | 1.518865 | −.937249−01 | −.164636−03 | −90.100645 |
| SCHOTT | K4 | .572325+03 | 1.519606 | −.962542−01 | −.168181−03 | −90.100111 |
| CORN-F | 678555 | .581978+03 | 1.678889 | −.994888−01 | −.170950−03 | −90.098450 |
| CHANCE | 623581 | .670154+03 | 1.623764 | −.951456−01 | −.141976−03 | −90.085497 |
| HOYA | TAC2 | .914435+03 | 1.742017 | −.104919+00 | −.114737−03 | −90.062657 |

TABLE I-continued

*LEAST SQUARES FITTED COEFFICIENTS*

| | ORDER 2.0 | BASE WVL 0.5740 | | MIN VL 0.400 | MAX WVL 0.700 | |
|---|---|---|---|---|---|---|
| CAT | NAME | ETA1/ETA2 | INDEX | ETA1 | ETA2 | ARCTAN (ETA1/ETA2) |
| CORN-F | 573575 | .116669+05 | 1.573219 | −.961053−01 | −.823742−05 | −90.004910 |

TABLE II

**LEAST SQUARES FITTED COEFFICIENTS**

| | | ORDER 3.0 | BASE WVL 0.5890 | | MIN WVL 0.360 | | MAX WVL 1.014 | |
|---|---|---|---|---|---|---|---|---|
| CAT | NAME | ETA1/ETA2 | INDEX | ETA1 | ETA2 | ETA3 | ETA2/ETA3 | ETA1/ETA3 |
| CORN-F | 558525 | −1050.530 | 1.557434 | −.974752−04 | .927867−04 | −.390622−02 | −.024 | 24.954 |
| SCHOTT | LASF11 | −752.430 | 1.801525 | −.115759+00 | .153847−03 | .524469−02 | .029 | −22.072 |
| OHARA | BAF5 | −594.102 | 1.607198 | −.104136+00 | .175283−03 | .554173−02 | .032 | −18.791 |
| SCHOTT | BAFN11 | −377.046 | 1.666620 | −.105738+00 | .280437−03 | .413480−02 | .068 | −25.573 |
| HOYA | LAFL4 | −351.383 | 1.712584 | −.118572+00 | .337443−03 | .277293−02 | .122 | −42.760 |
| HOYA | BAF10 | −344.527 | 1.669924 | −.108569+00 | .315124−03 | .207762−02 | .152 | −52.256 |
| OHARA | SSK5 | −323.740 | 1.658342 | −.100614+00 | .310787−03 | .104009−01 | .030 | −9.674 |
| SCHOTT | BAF5 | −263.952 | 1.607199 | −.103629+00 | .392606−03 | .601944−02 | .065 | −17.216 |
| SCHOTT | LAF23 | −245.436 | 1.688900 | −.103672+00 | .421584−03 | .795724−02 | .053 | −13.003 |
| HOYA | BAF6 | −234.257 | 1.588914 | −.105634+00 | .450934−03 | .482195−02 | .094 | −21.907 |
| SCHOTT | LAF20 | −231.441 | 1.682372 | −.106184+00 | .458798−03 | .612522−02 | .075 | −17.336 |
| HOYA | NBFD11 | −231.215 | 1.785765 | −.116614+00 | .504353−03 | .718313−02 | .070 | −16.234 |
| OHARA | BAF2 | −203.299 | 1.569565 | −.103725+00 | .510213−03 | .582092−02 | .088 | −17.819 |
| HOYA | BAF5 | −189.571 | 1.607202 | −.103909+00 | .548126−03 | .549668−02 | .100 | −18.904 |
| CORN-F | 548457 | −171.777 | 1.548010 | −.112116+00 | .652683−03 | .238165−02 | .274 | −47.075 |
| OHARA | LAF01 | −154.399 | 1.699891 | −.106472+00 | .689593−03 | .486976−02 | .142 | −21.864 |
| OHARA | LAFO9 | −139.242 | 1.696897 | −.105459+00 | .757380−03 | .640845−02 | .118 | −16.456 |
| SCHOTT | LAF10 | −118.034 | 1.784300 | −.116661+00 | .988369−03 | .616218−02 | .192 | −22.643 |
| SCHOTT | BAF53 | −112.012 | 1.669925 | −.108658+00 | .970051−03 | .386597−02 | .251 | −28.106 |
| CHANCE | 548456 | −107.436 | 1.547602 | −.112271+00 | .104501−02 | .241302−02 | .433 | −46.527 |
| OHARA | BAF6 | −100.221 | 1.588912 | −.105204+00 | .104972−02 | .566316−02 | .185 | −18.577 |
| HOYA | LAFL3 | −97.646 | 1.700195 | −.105981+00 | .109560−02 | .639820−02 | .171 | −16.720 |
| HOYA | FEL3 | −89.849 | 1.560039 | −.108708+00 | .120990−02 | .310242−02 | .390 | −35.040 |
| HOYA | BAF21 | −89.124 | 1.664119 | −.104787+00 | .117575−02 | .578126−02 | .203 | −18.125 |
| OHARA | LAF3 | −81.326 | 1.716894 | −.106686+00 | .131184−02 | .806510−02 | .163 | −13.235 |
| OHARA | BAF1 | +80.823 | 1.556816 | −.105401+00 | .130410−02 | .509190−02 | .256 | −20.700 |
| OHARA | BAF11 | −77.909 | 1.666617 | −.105827+00 | .135835−02 | .544010−02 | .250 | −19.453 |
| SCHOTT | LLF7 | −69.953 | 1.548743 | −.112723+00 | .161141−02 | .233046−02 | .091 | −48.369 |
| OHARA | LLF3 | −69.160 | 1.560042 | −.108884+00 | .157438−02 | .372203−02 | .423 | −29.270 |
| HOYA | BAF9 | −68.508 | 1.643179 | −.106698+00 | .155745−02 | .564904−02 | .276 | −18.888 |
| SCHOTT | KZFSN5 | −65.662 | 1.653997 | −.129255+00 | .196849−02 | −.310441−02 | −.634 | 41.636 |
| SCHOTT | LLF1 | −63.655 | 1.548053 | −.111850+00 | .175712−02 | .253850−02 | .692 | −44.061 |
| OHARA | LASF01 | −63.641 | 1.785766 | −.115810+00 | .181975−02 | .673988−02 | .270 | −17.183 |
| SCHOTT | LAFN3 | −60.968 | 1.716888 | −.106539+00 | .174745−02 | .955062−02 | .183 | −11.155 |
| CORN-F | 670471 | −58.527 | 1.669901 | −.108558+00 | .185484−02 | .814704−02 | .228 | −13.325 |
| HOYA | FF2 | −57.558 | 1.632476 | −.111413+00 | .193568−02 | −.109276−01 | −.177 | 10.196 |
| SCHOTT | BAFN10 | −54.216 | 1.669927 | −.108512+00 | .200146−02 | .413130−02 | .484 | −26.266 |
| OHARA | LASF06 | −53.532 | 1.840854 | −.118293+00 | .220977−02 | .901010−02 | .245 | −13.129 |
| OHARA | LLF1 | −53.174 | 1.548053 | −.111719+00 | .210102−02 | .330115−02 | .636 | −33.843 |
| OHARA | LLF7 | −52.684 | 1.548601 | −.112212+00 | .212992−02 | .302928−02 | .703 | −37.042 |
| HOYA | FEL1 | −51.632 | 1.548049 | −.111508+00 | .215968−02 | .364425−02 | .593 | −30.595 |
| SCHOTT | TIF2 | −51.036 | 1.532474 | −.111177+00 | .217838−02 | −.947587−02 | −.230 | 11.733 |
| HOYA | LAF2 | −49.984 | 1.743876 | −.114058+00 | .228190−02 | .341337−02 | .669 | −33.415 |
| HOYA | TAFD5 | −48.089 | 1.83457 | −.119028+00 | .247515−02 | .924471−02 | .268 | −12.875 |
| SCHOTT | BAF9 | −45.451 | 1.643179 | −.106099−02 | .234445−02 | .706099−02 | .332 | −15.091 |
| OHARA | KZFS5 | −44.759 | 1.653994 | −.128928+00 | .288054−02 | −.161015−02 | −1.789 | 80.072 |
| HOYA | FEL7 | −44.140 | 1.548741 | −.112447+00 | .254752−02 | .376192−02 | .677 | −29.891 |
| OHARA | BAF9 | −40.296 | 1.643181 | −.106837+00 | .265129−02 | .686698−02 | .386 | −15.558 |
| OHARA | BAF10 | −39.937 | 1.669925 | −.108092+00 | .270654−02 | .493908−02 | .548 | −21.885 |
| OHARA | LASF05 | −39.536 | 1.834664 | −.119657+00 | .302656−02 | .845778−02 | .358 | −14.148 |
| SCHOTT | LLF4 | −37.349 | 1.561290 | −.113002+00 | .302554−02 | .337006−02 | .898 | −33.531 |
| HOYA | LAFL1 | −36.213 | 1.685902 | −.103528+00 | .285890−02 | .119049−01 | .240 | −8.696 |
| HOYA | NBFD1 | −34.398 | 1.788869 | −.119434+00 | .347212−02 | .725389−02 | .479 | −16.465 |
| HOYA | BAF11 | −34.301 | 1.666619 | −.105769+00 | .308354−02 | .795536−02 | .388 | −13.295 |
| HOYA | BAF8 | −33.837 | 1.623642 | −.108554+00 | .320811−02 | .707055−02 | .454 | −15.353 |
| HOYA | FEL4 | −33.462 | 1.561288 | −.113039+00 | .337814−02 | .462977−02 | .730 | −24.416 |
| OHARA | LLF8 | −32.139 | 1.532480 | −.111282+00 | .346255−02 | −.794041−02 | −.436 | 14.015 |
| OHARA | LLF4 | −30.955 | 1.561288 | −.113115+00 | .365418−02 | .425506−02 | .859 | −26.584 |
| SCHOTT | BAF8 | −29.261 | 1.623643 | −.108607+00 | .371162−02 | .742686−02 | .500 | −14.623 |
| OHARA | BAFB | −28.362 | 1.623643 | −.108774+00 | .383526−02 | .718593−02 | .534 | −15.137 |
| SCHOTT | BAF3 | −27.953 | 1.582578 | −.109864+00 | .393029−02 | .656546−02 | .598 | −16.725 |
| CORN-F | 667484 | −26.737 | 1.666597 | −.105346+00 | .394003−02 | .112015−01 | .352 | −9.405 |
| HOYA | BAF3 | −24.490 | 1.582578 | −.109451+00 | .446919−02 | .820470−02 | .545 | −13.340 |
| HOYA | BAF7 | −24.292 | 1.607917 | −.110450+00 | .454684−02 | .674832−02 | .674 | −16.367 |
| SCHOTT | BAF52 | −23.590 | 1.608493 | −.109821+00 | .465544−02 | .636994−02 | .731 | −17.240 |
| CORN-F | 606439 | −23.512 | 1.605508 | −.116186+00 | .494161−02 | .131351−02 | 3.762 | −88.454 |
| HOYA | NBFD12 | −23.111 | 1.799364 | −.120496+00 | .521386−02 | .102631−01 | .508 | −11.741 |

TABLE II-continued

**LEAST SQUARES FITTED COEFFICIENTS**

| CAT | NAME | ORDER 3.0 ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
|---|---|---|---|---|---|---|---|---|
| HOYA | TAFD2 | −22.942 | 1.837551 | −.121732+00 | .530614−02 | .118741−01 | .447 | −10.252 |
| OHARA | LAF2 | −22.723 | 1.743877 | −.114027+00 | .501816−02 | .900490−02 | .557 | −12.663 |
| OHARA | BAF3 | −22.658 | 1.582579 | −.110049+00 | .485696−02 | .780848−02 | .622 | −14.094 |
| OHARA | LASF02 | −22.164 | 1.799377 | −.120641+00 | .544307−02 | .803180−02 | .678 | −15.020 |
| OHARA | BAF01 | −20.498 | 1.682384 | −.113645+00 | .554431−02 | −.319651−02 | −1.734 | 35.553 |
| SCHOTT | BAF12 | −19.769 | 1.639197 | −.112813+00 | .570667−02 | .570551−02 | 1.000 | −19.773 |
| SCHOTT | BASF52 | −19.185 | 1.701684 | −.124359+00 | .648195−02 | .301104−02 | 2.153 | −41.301 |
| SCHOTT | BAF51 | −19.184 | 1.652135 | −.113428+00 | .591270−02 | .806229−02 | .733 | −14.069 |
| SCHOTT | LF8 | −19.124 | 1.564341 | −.116535+00 | .609355−02 | .539743−02 | 1.129 | −21.591 |
| SCHOTT | BAF50 | −19.106 | 1.682613 | −.114474+00 | .599166−02 | .852320−02 | .703 | −13.431 |
| HOYA | BAF13 | −18.841 | 1.668807 | −.113565+00 | .602752−02 | .568205−02 | 1.061 | −19.987 |
| HOYA | FL6 | −18.794 | 1.567227 | −.119041+00 | .633390−02 | .410144−02 | 1.544 | −29.024 |
| HOYA | LAFL5 | −18.320 | 1.719877 | −.115979+00 | .633086−02 | .685298−02 | .924 | −16.924 |
| OHARA | LF8 | −18.227 | 1.564346 | −.116391+00 | .638568−02 | .576779−02 | 1.107 | −20.180 |
| SCHOTT | BAF13 | −17.549 | 1.668811 | −.113273+00 | .645484−02 | .633754−02 | 1.019 | −17.873 |
| OHARA | LAF011 | −17.479 | 1.719887 | −.110611+00 | .632831−02 | .120600−01 | .525 | −9.172 |
| SCHOTT | LAFN2 | −17.470 | 1.743879 | −.113731+00 | .651028−02 | .113526−01 | .573 | −10.018 |
| SCHOTT | LAF25 | −17.388 | 1.784133 | −.123364+00 | .709495−02 | .450414−02 | 1.575 | −27.389 |
| HOYA | BAF22 | −17.185 | 1.682384 | −.114314+00 | .665199−02 | .665086−02 | 1.000 | −17.188 |
| OHARA | BAF13 | −16.928 | 1.668813 | −.113221+00 | .668836−02 | .660533−02 | 1.013 | −17.141 |
| OHARA | LASF07 | −16.700 | 1.862845 | −.122676+00 | .734572−02 | .118988−01 | .617 | −10.310 |
| SCHOTT | LF6 | −16.551 | 1.567223 | −.118934+00 | .718604−02 | .544410−02 | 1.320 | −21.846 |
| CHANCE | 567428 | −16.328 | 1.567221 | −.118977+00 | .728671−02 | .571840−02 | 1.274 | −20.806 |
| OHARA | BAF03 | −16.241 | 1.685664 | −.115724+00 | .712537−02 | .376098−02 | 1.895 | −30.770 |
| HOYA | LAFL6 | −16.040 | 1.719874 | −.120916+00 | .753820−02 | .637544−02 | 1.182 | −18.966 |
| SCHOTT | LAFN8 | −15.804 | 1.735068 | −.122469+00 | .774926−02 | .579672−02 | 1.337 | −21.127 |
| HOYA | BAF20 | −15.734 | 1.685663 | −.115826+00 | .736131−02 | .575338−02 | 1.279 | −20.132 |
| HOYA | BAF12 | −15.690 | 1.639198 | −.112862+00 | .719328−02 | .669007−02 | 1.075 | −16.870 |
| HOYA | NBFD2 | −15.464 | 1.797057 | −.123831+00 | .800752−02 | .109175−01 | .733 | −11.342 |
| HOYA | FL4 | −15.210 | 1.578346 | −.121940+00 | .801715−02 | .442920−02 | 1.810 | −27.531 |
| OHARA | BAF12 | −14.896 | 1.639196 | −.113404+00 | .761280−02 | .909745−02 | .837 | −12.465 |
| CHANCE | 573426 | −14.766 | 1.572989 | −.119598+00 | .809957−02 | .675199−02 | 1.200 | −17.713 |
| SCHOTT | LAF26 | −14.692 | 1.745837 | −.127243+00 | .866046−02 | .373026−02 | 2.322 | −34.111 |
| SCHOTT | LASFN3 | −14.611 | 1.807865 | −.124911+00 | .854927−02 | .843706−02 | 1.013 | −14.805 |
| OHARA | LASF03 | −14.547 | 1.805953 | −.124719+00 | .857340−02 | .849751−02 | 1.009 | −14.677 |
| CHANCE | 582421 | −14.544 | 1.582047 | −.121034+00 | .832200−02 | .618517−02 | 1.345 | −19.568 |
| SCHOTT | LF1 | −14.420 | 1.572991 | −.119537+00 | .828961−02 | .659340−02 | 1.257 | −18.130 |
| OHARA | LF6 | −14.084 | 1.567226 | −.118862+00 | .843972−02 | .734061−02 | 1.150 | −16.192 |
| HOYA | BAFD15 | −14.064 | 1.701858 | −.126284+00 | .897935−02 | .846666−02 | 1.061 | −14.916 |
| OHARA | LF3 | −14.044 | 1.582050 | −.120905+00 | .860920−02 | .582093−02 | 1.479 | −20.771 |
| OHARA | LAF07 | −13.840 | 1.712728 | −.117774+00 | .850955−02 | .693729−02 | 1.227 | −16.977 |
| SCHOTT | LF3 | −13.696 | 1.582050 | −.120955+00 | .883166−02 | .613708−02 | 1.439 | −19.709 |
| HOYA | NBFD13 | −13.631 | 1.805957 | −.124868+00 | .916079−02 | .111698−01 | .820 | −11.179 |
| OHARA | LAF02 | −13.622 | 1.719879 | −.116357+00 | .854199−02 | .881269−02 | .969 | −13.203 |
| SCHOTT | LASF31 | −13.091 | 1.880513 | −.123721+00 | .945100−02 | .172923−01 | .547 | −7.155 |
| CHANCE | 606439 | −13.083 | 1.605513 | −.115836+00 | .885368−02 | .978139−02 | .905 | −11.842 |
| SCHOTT | LF4 | −13.066 | 1.578349 | −.122313+00 | .936105−02 | .616887−02 | 1.517 | −19.827 |
| SCHOTT | BAF4 | −12.972 | 1.605519 | −.115760+00 | .892355−02 | .960315−02 | .929 | −12.054 |
| OHARA | LF1 | −12.902 | 1.572993 | −.119457+00 | .925863−02 | .779907−02 | 1.187 | −15.317 |
| SCHOTT | LF7 | −12.737 | 1.574910 | −.122605+00 | .962558−02 | .651416−02 | 1.478 | −18.821 |
| HOYA | FL3 | −12.685 | 1.582049 | −.121048+00 | .954243−02 | .652345−02 | 1.463 | −18.556 |
| HOYA | BAF4 | −12.677 | 1.605519 | −.115915+00 | .914392−02 | .992630−02 | .921 | −11.678 |
| SCHOTT | KZFSN7 | −12.518 | 1.680506 | −.136829+00 | .109307−01 | −.137634−02 | −7.942 | 99.416 |
| CORN-F | 696365 | −12.487 | 1.695850 | −.139493+00 | .111714−01 | .324357−02 | 3.444 | −43.006 |
| SCHOTT | TIF3 | −12.443 | 1.547555 | −.120418+00 | .967782−02 | −.726410−02 | −1.332 | 16.577 |
| OHARA | LASF13 | −12.438 | 1.804250 | −.128526+00 | .103335−01 | .786269−02 | 1.314 | −16.346 |
| HOYA | FL1 | −12.431 | 1.572992 | −.119456+00 | .960991−02 | .818230−02 | 1.174 | −14.599 |
| OHARA | LF7 | −12.209 | 1.574905 | −.122511+00 | .100343−01 | .729838−02 | 1.375 | −16.786 |
| OHARA | LASF08 | −12.208 | 1.882839 | −.124656+00 | .102113−01 | .165761−01 | .616 | −7.520 |
| HOYA | FL7 | −11.928 | 1.574909 | −.122437+00 | .102643−01 | .792764−02 | 1.295 | −15.444 |
| CHANCE | 700412 | −11.906 | 1.699880 | −.123488+00 | .103720−01 | .760763−02 | 1.363 | −16.232 |
| OHARA | BAF4 | −11.837 | 1.605519 | −.116199+00 | .981703−02 | .984560−02 | .997 | −11.802 |
| SCHOTT | LASF15 | −11.816 | 1.877832 | −.133184+00 | .112711−01 | .102767−01 | 1.097 | −12.959 |
| SCHOTT | BASF57 | −11.777 | 1.651362 | −.121285+00 | .102987−01 | .661943−02 | 1.556 | −18.322 |
| HOYA | NBFD3 | −11.652 | 1.804355 | −.128259+00 | .110078−01 | .119855−01 | .918 | −10.701 |
| HOYA | BAFD5 | −11.534 | 1.603128 | −.119932+00 | .103984−01 | .846102−02 | 1.229 | −14.175 |
| OHARA | LF4 | −11.473 | 1.578349 | −.122479+00 | .106745−01 | .766185−02 | 1.393 | −15.986 |
| CHANCE | 581409 | −11.410 | 1.581340 | −.124300+00 | .108938−01 | .764572−02 | 1.425 | −16.257 |
| SCHOTT | BASF5 | −11.378 | 1.603127 | −.119614+00 | .105128−01 | .927692−02 | 1.133 | −12.894 |
| CORN-F | 581408 | −11.181 | 1.581292 | −.124582+00 | .111423−01 | .857334−02 | 1.300 | −14.531 |
| HOYA | FL2 | −11.000 | 1.589106 | −.123975+00 | .112707−01 | .791513−02 | 1.424 | −15.663 |
| OHARA | LF5 | −10.756 | 1.581335 | −.124689+00 | .115920−01 | .795933−02 | 1.456 | −15.666 |
| OHARA | LAF08 | −10.587 | 1.719874 | −.120601+00 | .113914−01 | .844621−02 | 1.349 | −14.279 |
| OHARA | BASF5 | −10.543 | 1.603126 | −.119991+00 | .113807−01 | .105922−01 | 1.074 | −11.328 |
| SCHOTT | LF5 | −10.512 | 1.581336 | −.124312+00 | .118254−01 | .854212−02 | 1.384 | −14.551 |
| HOYA | FL5 | −10.500 | 1.581333 | −.124247+00 | .118332−01 | .915481−02 | 1.293 | −13.572 |
| SCHOTT | LF2 | −10.439 | 1.589107 | −.124023+00 | .118811−01 | .819465−01 | 1.450 | −15.135 |
| OHARA | LAF8 | −10.387 | 1.735068 | −.123420+00 | .118826−01 | .865996−02 | 1.372 | −14.252 |

TABLE II-continued

| | | | **LEAST SQUARES FITTED COEFFICIENTS** | | | | | |
|---|---|---|---|---|---|---|---|---|
| | ORDER 3.0 | | BASE WVL 0.5890 | | MIN WVL 0.360 | | MAX WVL 1.014 | |
| CAT | NAME | ETA1/ETA2 | INDEX | ETA1 | ETA2 | ETA3 | ETA2/ETA3 | ETA1/ETA3 |
| OHARA | LF2 | −10.360 | 1.589102 | −.123610+00 | .119316−01 | .894944−02 | 1.333 | −13.812 |
| OHARA | BASF07 | −10.064 | 1.701415 | −.123199+00 | .122419−01 | .876093−02 | 1.397 | −14.062 |
| CORN-F | 702411 | −10.014 | 1.701680 | −.123468+00 | .123294−01 | .109797−01 | 1.123 | −11.245 |
| SCHOTT | BASF6 | −9.784 | 1.667435 | −.120949+00 | .123619−01 | .912665−02 | 1.354 | −13.252 |
| CORN-F | 865401 | −9.744 | 1.864842 | −.126497+00 | .129823−01 | .168720−01 | .769 | −7.497 |
| HOYA | BAFD6 | −9.686 | 1.667434 | −.121015+00 | .124935−01 | .954491−02 | 1.308 | −12.679 |
| OHARA | BASF7 | −9.469 | 1.701412 | −.122947+00 | .129837−01 | .578976−02 | 2.243 | −21.235 |
| OHARA | BASF6 | −9.396 | 1.667435 | −.120931+00 | .128704−01 | .979036−02 | 1.315 | −12.352 |
| OHARA | LAF05 | −9.241 | 1.76186 | −.126401+00 | .136777−01 | .822010−02 | 1.664 | −15.377 |
| HOYA | TAFD17 | −9.096 | 1.877831 | −.132602+00 | .145775−01 | .138075−01 | 1.056 | −9.604 |
| SCHOTT | f8 | −8.832 | 1.595399 | −.129421+00 | .146544−01 | .915673−02 | 1.600 | −14.134 |
| OHARA | LASF24 | −8.775 | 1.906827 | −.132194+00 | .150656−01 | .213980−01 | .704 | −6.178 |
| CORN-F | 650392 | −8.771 | 1.650085 | −.129383+00 | .147510−01 | .854240−02 | 1.727 | −15.146 |
| HOYA | F8 | −8.686 | 1.595403 | −.129279+00 | .148832−01 | .959313−02 | 1.551 | −13.476 |
| CHANCE | 579411 | −8.585 | 1.578497 | −.123176+00 | .143473−01 | .125785−01 | 1.141 | −9.793 |
| OHARA | LASF10 | −8.554 | 1.833837 | −.136365+00 | .159424−01 | .103311−01 | 1.543 | −13.199 |
| OHARA | BASF3 | −8.533 | 1.607057 | −.125960+00 | .147607−01 | .115804−01 | 1.275 | −10.877 |
| HOYA | BAFD3 | −8.526 | 1.607061 | −.125537+00 | .147239−01 | .101656−01 | 1.448 | −12.349 |
| OHARA | F8 | −8.415 | 1.595398 | −.129199+00 | .153527−01 | .104838−01 | 1.464 | −12.324 |
| HOYA | BAFD7 | −8.369 | 1.701418 | −.123029+00 | .147006−01 | .887196−02 | 1.657 | −13.867 |
| HOYA | F9 | −8.298 | 1.620328 | −.133035+00 | .160322−01 | .675076−02 | 2.375 | −19.707 |
| CHANCE | 702410 | −8.138 | 1.701684 | −.123408+00 | .151639−01 | .128015−01 | 1.185 | −9.640 |
| OHARA | F9 | −8.138 | 1.620332 | −.132829+00 | .163217−01 | .840122−02 | 1.943 | −15.811 |
| SCHOTT | LAF13 | −8.126 | 1.775358 | −.133827+00 | .164687−01 | .108661−01 | 1.516 | −12.316 |
| HOYA | NBFD5 | −7.957 | 1.761863 | −.125708+00 | .157968−01 | .144103−01 | 1.096 | −8.723 |
| SCHOTT | F14 | −7.859 | 1.601285 | −.132434+00 | .168516−01 | .103818−01 | 1.623 | −12.756 |
| SCHOTT | BASF51 | −7.745 | 1.723590 | −.132751+00 | .171397−01 | .106527−01 | 1.609 | −12.462 |
| HOYA | NBFD10 | −7.742 | 1.833838 | −.135598+00 | .175154−01 | .112216−01 | 1.561 | −12.084 |
| SCHOTT | KZFS8 | −7.719 | 1.720318 | −.146318+00 | .189559−01 | .723483−02 | 2.620 | −20.224 |
| SCHOTT | F9 | −7.715 | 1.620332 | −.132927+00 | .172300−01 | .816536−02 | 2.110 | −16.279 |
| HOYA | NBFD4 | −7.715 | 1.830433 | −.138304+00 | .179275−01 | .858925−02 | 2.087 | −16.102 |
| SCHOTT | BASF50 | −7.704 | 1.710059 | −.138257+00 | .179462−01 | .773877−02 | 2.319 | −17.865 |
| SCHOTT | F5 | −7.614 | 1.603305 | −.133082+00 | .174794−01 | .107518−01 | 1.626 | −12.378 |
| HOYA | LAF7 | −7.548 | 1.749345 | −.144365+00 | .191270−01 | .804394−02 | 2.378 | −17.947 |
| HOYA | TAFD13 | −7.526 | 1.855226 | −.138205+00 | .183641−01 | .100732−01 | 1.823 | −13.720 |
| OHARA | KZFS8 | −7.515 | 1.720316 | −.145803+00 | .194006−01 | .712757−02 | 2.722 | −20.456 |
| CORN-F | 604381 | −7.498 | 1.603383 | −.132845+00 | .177178−01 | .109889−01 | 1.612 | −12.089 |
| HOYA | F15 | −7.455 | 1.605534 | −.133509+00 | .179078−01 | .110112−01 | 1.626 | −12.125 |
| SCHOTT | F15 | −7.303 | 1.605535 | −.133736+00 | .183130−01 | .113792−01 | 1.609 | −11.753 |
| SCHOTT | LAFN7 | −7.270 | 1.749346 | −.144760+00 | .199107−01 | .758794−02 | 2.624 | −19.078 |
| OHARA | F5 | −7.206 | 1.603304 | −.133048+00 | .184644−01 | .121634−01 | 1.518 | −10.938 |
| HOYA | F5 | −7.177 | 1.603301 | −.132990+00 | .185296−01 | .127475−01 | 1.454 | −10.433 |
| SCHOTT | BASF12 | −7.152 | 1.669855 | −.128903+00 | .180238−01 | .101709−01 | 1.772 | −12.674 |
| HOYA | BAFD10 | −7.114 | 1.650037 | −.128408+00 | .180496−01 | .129905−01 | 1.389 | −9.885 |
| OHARA | BASF12 | −7.018 | 1.669856 | −.128397+00 | .182949−01 | .101700−01 | 1.799 | −12.625 |
| SCHOTT | BASF1 | −7.013 | 1.625944 | −.129741+00 | .185012−01 | .124187−01 | 1.490 | +10.447 |
| HOYA | NBFD7 | −6.998 | 1.782841 | −.140110+00 | .200213−01 | .234138−02 | 8.551 | −59.841 |
| SCHOTT | BASF13 | −6.990 | 1.697479 | −.130948+00 | .187347−01 | .716289−02 | 2.616 | −18.281 |
| OHARA | BASF1 | −6.879 | 1.625941 | −.129235+00 | .187870−01 | .135298−01 | 1.389 | −9.552 |
| OHARA | BASF08 | −6.850 | 1.723282 | −.132830+00 | .193904−01 | .135401−01 | 1.432 | −9.810 |
| SCHOTT | FN11 | −6.827 | 1.620837 | −.139550+00 | .204406−01 | −.595771−02 | −3.431 | 23.423 |
| SCHOTT | F3 | −6.777 | 1.612811 | −.136443+00 | .201321−01 | .118564−01 | 1.698 | −11.508 |
| HOYA | BAFD8 | −6.767 | 1.723278 | −.132746+00 | .196157−01 | .593488−02 | 3.305 | −22.367 |
| HOYA | F11 | −6.766 | 1.620837 | −.140410+00 | .207514−01 | −.576843−02 | −3.597 | 24.341 |
| OHARA | F11 | −6.751 | 1.620830 | −.150703+00 | .208427−01 | −.546165−02 | −3.815 | 25.757 |
| HOYA | F3 | −6.670 | 1.612808 | −.136691+00 | .204946−01 | .116985−01 | 1.752 | −22.684 |
| SCHOTT | BASF10 | −6.667 | 1.650040 | −.128991+00 | .193478−01 | .144917−01 | 1.335 | −8.901 |
| SCHOTT | LAF22 | −6.643 | 1.781638 | −.136077+00 | .204842−01 | .762574−02 | 2.686 | −17.845 |
| SCHOTT | LASF13 | −6.603 | 1.855273 | −.137989+00 | .208967−01 | .169617−01 | 1.232 | −8.135 |
| OHARA | F3 | −6.561 | 1.612807 | −.136506+00 | .208068−01 | .127433−01 | 1.633 | −10.712 |
| OHARA | BASF10 | −6.551 | 1.650038 | −.128157+00 | .195643−01 | .149071−01 | 1.312 | −8.597 |
| HOYA | BAFD4 | −6.550 | 1.651154 | −.131869+00 | .201397−01 | .143726−01 | 1.401 | −9.175 |
| OHARA | BASF8 | −6.525 | 1.723282 | −.133052+00 | .203923−01 | .807924−02 | 2.524 | −16.468 |
| HOYA | BAFD1 | −6.508 | 1.615941 | −.128946+00 | .198145−01 | .143214−01 | 1.384 | −9.004 |
| SCHOTT | F4 | −6.456 | 1.616469 | −.137862+00 | .213540−01 | .121356−01 | 1.760 | −11.360 |
| OHARA | F10 | −6.315 | 1.623516 | −.138187+00 | .218811−01 | .131919−01 | 1.659 | −10.475 |
| HOYA | F4 | −6.276 | 1.616466 | −.137878+00 | .219691−01 | .129832−01 | 1.692 | −10.620 |
| OHARA | BASF4 | −6.257 | 1.651161 | −.131957+00 | .210898−01 | .134255−01 | 1.571 | −9.828 |
| CORN-F | 724380 | −6.233 | 1.723352 | −.132593+00 | .212715−01 | .120268−01 | 1.769 | −11.025 |
| OHARA | F4 | −6.228 | 1.616466 | −.137789+00 | .221243−01 | .130921−01 | 1.690 | −10.525 |
| SCHOTT | F2 | −6.223 | 1.619916 | −.138788+00 | .223030−01 | .131183−01 | 1.700 | −10.580 |
| SCHOTT | TIF4 | −6.214 | 1.583949 | −.136114+00 | .219042−01 | −.423007−02 | −5.178 | 32.178 |
| CORN-F | 620363 | −6.144 | 1.619886 | −.139062+00 | .226337−01 | .130501−01 | 1.734 | −10.656 |
| OHARA | F2 | −6.102 | 1.619917 | −.139131+00 | .228023−01 | .131765−01 | 1.731 | −10.559 |
| CHANCE | 620364 | −6.084 | 1.619918 | −.138657+00 | .227899−01 | .128088−01 | 1.779 | −10.825 |
| HOYA | F2 | −6.074 | 1.619916 | −.139007+00 | .228849−01 | .139079−01 | 1.639 | −9.958 |
| HOYA | F1 | −6.016 | 1.625753 | −.150925+00 | .234266−01 | .122319−01 | 1.915 | −11.521 |
| SCHOTT | F13 | −5.977 | 1.622246 | −.139915+00 | .234013−01 | .127246−01 | 1.840 | −10.996 |

TABLE II-continued

**\*\*\*\*LEAST SQUARES FITTED COEFFICIENTS\*\*\*\***

| CAT | NAME | ORDER 3.0 ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
|---|---|---|---|---|---|---|---|---|
| CHANCE | 626357 | −5.919 | 1.625751 | −.141288+00 | .238684−01 | .132134−01 | 1.806 | −10.693 |
| CORN-F | 637353 | −5.808 | 1.636362 | −.142766+00 | .245799−01 | .138303−01 | 1.777 | −10.323 |
| SCHOTT | F1 | −5.803 | 1.625754 | −.141185+00 | .243285−01 | .133309−01 | 1.825 | −10.591 |
| OHARA | F1 | −5.776 | 1.615754 | −.141188+00 | .244442−01 | .135281−01 | 1.807 | −10.437 |
| HOYA | NBFD8 | −5.736 | 1.807236 | −.141680+00 | .247020−01 | .108494−01 | 1.177 | −13.059 |
| OHARA | LAF012 | −5.701 | 1.782843 | −.139314+00 | .244377−01 | .703459−02 | 3.474 | −19.804 |
| CORN-F | 626356 | −5.697 | 1.625775 | −.141656+00 | .248670−01 | .142208−01 | 1.749 | −9.961 |
| SCHOTT | BASF56 | −5.691 | 1.657019 | −.137123+00 | .240955−01 | .136697−01 | 1.763 | −10.031 |
| SCHOTT | TIFN5 | −5.630 | 1.593434 | −.141761+00 | .251788−01 | −.388728−02 | −6.477 | 36.468 |
| HOYA | FF5 | −5.598 | 1.592582 | −.142075+00 | .253793−01 | −.249450−02 | −10.174 | 56.955 |
| SCHOTT | BASF55 | −5.591 | 1.699664 | −.145113+00 | .259548−01 | .348875−02 | 7.440 | −41.595 |
| SCHOTT | LASF18 | −5.578 | 1.913275 | −.155052+00 | .277982−01 | .999495−02 | 2.781 | −15.513 |
| OHARA | F6 | −5.565 | 1.636227 | −.142394+00 | .255880−01 | .141436−01 | 1.822 | −10.140 |
| OHARA | F16 | −5.563 | 1.592579 | −.141625+00 | .254589−01 | −.133843−02 | −19.021 | 105.814 |
| HOYA | F6 | −5.509 | 1.636225 | −.142381+00 | .258436−01 | .145004−01 | 1.782 | −9.819 |
| SCHOTT | F6 | −5.486 | 1.636228 | −.142495+00 | .259841−01 | .143701−01 | 1.808 | −9.916 |
| SCHOTT | F7 | −5.457 | 1.625233 | −.141604+00 | .259511−01 | .143641−01 | 1.807 | −9.858 |
| HOYA | F7 | −5.419 | 1.625235 | −.141451+00 | .261046−01 | .146792−01 | 1.778 | −9.636 |
| OHARA | LAF7 | −5.279 | 1.749342 | −.142977+00 | .270864−01 | .944421−02 | 2.868 | −15.139 |
| SCHOTT | SF7 | −5.274 | 1.639667 | −.145428+00 | .275734−01 | .145731−01 | 1.892 | −9.979 |
| SCHOTT | BASF2 | −5.257 | 1.664325 | −.140417+00 | .267122−01 | .144307−01 | 1.851 | −9.730 |
| HOYA | FD7 | −5.233 | 1.639669 | −.145636+00 | .278294−01 | .147764−01 | 1.883 | −9.856 |
| OHARA | SF7 | −5.213 | 1.639664 | −.145486+00 | .279095−01 | .151326−01 | 1.844 | −9.614 |
| HOYA | NBFD6 | −5.193 | 1.756551 | −.138386+00 | .266493−01 | .177375−01 | 1.502 | −7.802 |
| SCHOTT | BASF14 | −5.120 | 1.699536 | −.143764+00 | .280794−01 | .905315−02 | 3.102 | −15.880 |
| HOYA | BAFD14 | −5.098 | 1.699533 | −.143909+00 | .282298−01 | .956098−02 | 2.953 | −15.052 |
| HOYA | BAFD2 | −5.084 | 1.664323 | −.140014+00 | .275421−01 | .162454−01 | 1.695 | −8.619 |
| SCHOTT | SF12 | −5.019 | 1.648171 | −.148531+00 | .295908−01 | .122520−01 | 2.415 | −12.123 |
| CHANCE | 648338 | −5.010 | 1.648173 | −.148536+00 | .296460−01 | .123694−01 | 2.392 | −11.984 |
| SCHOTT | SF16 | −4.983 | 1.645974 | −.147645+00 | .296315−01 | .152709−01 | 1.940 | −9.668 |
| CORN-F | 648339 | −4.948 | 1.647853 | −.148505+00 | .300116−01 | .201143−01 | 1.492 | −7.383 |
| SCHOTT | SF9 | −4.921 | 1.654320 | −.149368+00 | .303534−01 | .154365−01 | 1.966 | −9.676 |
| HOYA | FD2 | −4.904 | 1.647554 | −.148559+00 | .302920−01 | .146703−01 | 2.065 | −10.127 |
| SCHOTT | LASF33 | −4.895 | 1.805788 | −.146754+00 | .299778−01 | .149144−01 | 2.010 | −9.840 |
| HOYA | FD9 | −4.885 | 1.654321 | −.149021+00 | .305049−01 | .155978−01 | 1.956 | −9.554 |
| SCHOTT | SF2 | −4.863 | 1.647550 | −.148460+00 | .305265−01 | .154254−01 | 1.979 | −9.624 |
| HOYA | FD12 | −4.850 | 1.648169 | −.148675+00 | .306537−01 | .141316−01 | 2.169 | −10.521 |
| OHARA | SF9 | −4.845 | 1.654317 | −.149580+00 | .308741−01 | .158054−01 | 1.953 | −9.464 |
| OHARA | SF2 | −4.834 | 1.647550 | −.148652+00 | .307503−01 | .163419−01 | 1.882 | −9.096 |
| OHARA | BASF2 | −4.825 | 1.664327 | −.140209+00 | .290599−01 | .172396−01 | 1.686 | −8.133 |
| SCHOTT | SF17 | −4.817 | 1.650030 | −.149220+00 | .309753−01 | .155351−01 | 1.994 | −9.605 |
| CHANCE | 653335 | −4.805 | 1.543335 | −.150134+00 | .312471−01 | .161343−01 | 1.937 | −9.305 |
| OHARA | SF19 | −4.736 | 1.666653 | −.152025+00 | .320978−01 | .164376−01 | 1.953 | −9.249 |
| OHARA | LAF015 | −4.713 | 1.749342 | −.143590+00 | .304670−01 | .171232−01 | 1.779 | −8.386 |
| SCHOTT | SF19 | −4.680 | 1.666653 | −.152114+00 | .325027−01 | .151201−01 | 2.150 | −10.060 |
| SCHOTT | LAFN11 | −4.677 | 1.756753 | −.157878+00 | .337572−01 | .140857−01 | 2.397 | −11.208 |
| CORN-F | 667331 | −4.674 | 1.666851 | −.151698+00 | .324574−01 | .164434−01 | 1.974 | −9.225 |
| SCHOTT | SF51 | −4.641 | 1.660103 | −.152222+00 | .327980−01 | .102301−01 | 3.206 | −14.880 |
| HOYA | TAFD9 | −4.604 | 1.850107 | −.155881+00 | .338585−01 | .750431−02 | 4.512 | −20.772 |
| SCHOTT | LASF8 | −4.539 | 1.807225 | −.158724+00 | .349707−01 | .135055−01 | 2.589 | −11.753 |
| CORN-F | 673323 | −4.477 | 1.672548 | −.155367+00 | .347024−01 | .177009−01 | 1.960 | −8.777 |
| HOYA | NBFD9 | −4.477 | 1.756726 | −.157724+00 | .352326−01 | .155215−01 | 2.270 | −10.162 |
| CHANCE | 850322 | −4.471 | 1.850071 | −.155534+00 | .347844−01 | .178619−01 | 1.947 | −8.708 |
| OHARA | LASF21 | −4.461 | 1.850068 | −.155280+00 | .348101−01 | .133060−01 | 2.606 | −11.623 |
| HOYA | FD19 | −4.400 | 1.666651 | −.151620+00 | .344628−01 | .179466−01 | 1.920 | −8.448 |
| SCHOTT | SF50 | −4.391 | 1.654583 | −.152470+00 | .347218−01 | .160027−01 | 2.170 | −9.528 |
| SCHOTT | SF5 | −4.349 | 1.672547 | −.155622+00 | .357873−01 | .170565−01 | 2.098 | −9.124 |
| SCHOTT | SF62 | −4.274 | 1.681185 | −.156885+00 | .367053−01 | .167365−01 | 2.193 | −9.374 |
| HOYA | FD5 | −4.266 | 1.672550 | −.155753+00 | .365086−01 | .179888−01 | 2.030 | −8.658 |
| OHARA | SF5 | −4.255 | 1.672549 | −.156105+00 | .366839−01 | .177050−01 | 2.072 | −8.817 |
| SCHOTT | LASF32 | −4.205 | 1.803302 | −.164710+00 | .391719−01 | .491177−02 | 7.975 | −33.534 |
| SCHOTT | SFN64 | −4.116 | 1.705682 | −.165302+00 | .401588−01 | .252126−02 | 15.928 | −65.563 |
| SCHOTT | BASF54 | −4.095 | 1.736105 | −.155574+00 | .379897−01 | .114353−01 | 3.322 | −13.605 |
| CORN-F | 689312 | −4.082 | 1.688844 | −.160491+00 | .393157−01 | .188028−01 | 2.091 | −8.535 |
| SCHOTT | LASF9 | −4.074 | 1.850066 | −.155146+00 | .380864−01 | .147781−01 | 2.577 | −10.498 |
| OHARA | SF8 | −4.050 | 1.688770 | −.151032+00 | .397613−01 | .175491−01 | 2.266 | −9.176 |
| OHARA | SF8 | −4.045 | 1.688772 | −.160524+00 | .396840−01 | .180977−01 | 2.193 | −8.870 |
| HOYA | FD8 | −4.030 | 1.688771 | −.160675+00 | .398746−01 | .181835−01 | 2.193 | −8.836 |
| CHANCE | 706300 | −3.904 | 1.705688 | −.166420+00 | .426291−01 | −.125649−02 | −33.927 | 132.448 |
| SCHOTT | SF52 | −3.813 | 1.688358 | −.163202+00 | .428023−01 | .179492−01 | 2.385 | −9.092 |
| CORN-F | 836302 | −3.799 | 1.836206 | −.165259+00 | .436063−01 | .274394−02 | 15.855 | −60.227 |
| CORN-F | 699301 | −3.746 | 1.698834 | −.165739+00 | .442431−01 | .127899−01 | 3.459 | −12.959 |
| HOYA | FD15 | −3.705 | 1.698777 | −.166066+00 | .448226−01 | .113998−01 | 3.932 | −14.567 |
| SCHOTT | SF15 | −3.702 | 1.698783 | −.165953+00 | .448271−01 | .116878−01 | 3.835 | −14.199 |
| OHARA | SF15 | −3.691 | 1.698780 | −.165577+00 | .448647−01 | .116099−01 | 3.864 | −14.262 |
| CHANCE | 699301 | −3.651 | 1.698778 | −.166161+00 | .455060−01 | .144051−01 | 3.159 | −11.535 |
| OHARA | SF1 | −3.631 | 1.717187 | −.169088+00 | .465651−01 | .195078−01 | 2.387 | −8.668 |
| SCHOTT | SF1 | −3.624 | 1.717185 | −.169134+00 | .466728−01 | .194224−01 | 2.403 | −8.708 |

TABLE II-continued

**LEAST SQUARES FITTED COEFFICIENTS**

| CAT | NAME | ORDER 3.0 ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
|---|---|---|---|---|---|---|---|---|
| HOYA | FD1 | −3.597 | 1.717184 | −.169250+00 | .470500−01 | .198544−01 | 2.370 | −8.525 |
| HOYA | FD20 | −3.587 | 1.720047 | −.170467+00 | .475280−01 | .161718−01 | 2.939 | −10.541 |
| CHANCE | 717295 | −3.578 | 1.717189 | −.169016+00 | .472341−01 | .181433−01 | 2.603 | −9.316 |
| HOYA | FD18 | −3.576 | 1.721329 | −.170626+00 | .477197−01 | .189655−01 | 2.516 | −8.998 |
| SCHOTT | SF18 | −3.561 | 1.721332 | −.170563+00 | .479035−01 | .193173−01 | 2.480 | −8.830 |
| OHARA | SF01 | −3.533 | 1.720041 | −.170120+00 | .481532−01 | .196576−01 | 2.450 | −8.654 |
| OHARA | SF18 | −3.531 | 1.721328 | −.170537+00 | .482918−01 | .197161−01 | 2.449 | −8.650 |
| SCHOTT | TISF1 | −3.526 | 1.673225 | −.172328+00 | .488749−01 | −.942108−02 | −5.188 | 18.292 |
| CORN-F | 717295 | −3.512 | 1.717235 | −.158890+00 | .480868−01 | .128491−01 | 3.742 | −13.144 |
| SCHOTT | SF53 | −3.416 | 1.728118 | −.173616+00 | .508275−01 | .165347−01 | 3.074 | −10.500 |
| HOYA | FDS2 | −3.403 | 1.728117 | −.173734+00 | .510503−01 | .169420−01 | 3.013 | −10.255 |
| SCHOTT | LAF9 | −3.379 | 1.794839 | −.175409+00 | .519128−01 | .173355−01 | 2.995 | −10.118 |
| CORN-F | 728284 | −3.370 | 1.728119 | −.175210+00 | .519861−01 | .122161−01 | 4.256 | −14.343 |
| HOYA | FD10 | −3.347 | 1.728067 | −.175779+00 | .525203−01 | .102814−01 | 5.108 | −17.097 |
| OHARA | SF10 | −3.331 | 1.728065 | −.174981+00 | .515319−01 | .137174−01 | 3.830 | −12.756 |
| CORN-F | 740281 | −3.328 | 1.739811 | −.176848+00 | .531469−01 | .104692−01 | 5.077 | −16.892 |
| CHANCE | 728284 | −3.321 | 1.728063 | −.175405+00 | .528124−01 | .139044−01 | 3.798 | −12.615 |
| SCHOTT | SF10 | −3.318 | 1.728065 | −.175217+00 | .528054−01 | .127250−01 | 4.150 | −13.770 |
| SCHOTT | SF3 | −3.317 | 1.739812 | −.176532+00 | .532265−01 | .199391−01 | 2.669 | −8.854 |
| HOYA | FD3 | −3.309 | 1.739810 | −.176226+00 | .532600−01 | .197209−01 | 2.701 | −8.936 |
| OHARA | SF3 | −3.283 | 1.739809 | −.175936+00 | .535928−01 | .207575−01 | 2.582 | −8.476 |
| SCHOTT | SF54 | −3.279 | 1.740610 | −.177244+00 | .540529−01 | .188731−01 | 2.864 | −9.391 |
| CHANCE | 748278 | −3.259 | 1.748224 | −.178804+00 | .548708−01 | .210530−01 | 2.606 | −8.493 |
| OHARA | SF04 | −3.219 | 1.750644 | −.179544+00 | .557806−01 | .178977−01 | 3.117 | −10.032 |
| HOYA | FD4 | −3.219 | 1.755001 | −.180410+00 | .560502−01 | .157490−01 | 3.559 | −11.455 |
| CHANCE | 755276 | −3.206 | 1.755007 | −.180326+00 | .562432−01 | .196885−01 | 2.857 | −9.159 |
| CORN-F | 755276 | −3.197 | 1.755006 | −.180036+00 | .563099−01 | .123656−01 | 4.554 | −14.559 |
| SCHOTT | SF63 | −3.193 | 1.748205 | −.179540+00 | .562238−01 | .191761−01 | 2.932 | −9.363 |
| SCHOTT | SF4 | −3.192 | 1.755004 | −.180351+00 | .564958−01 | .205532−01 | 2.749 | −8.775 |
| OHARA | SF13 | −3.166 | 1.740577 | −.178843+00 | .564814−01 | .132034−01 | 4.278 | −13.545 |
| OHARA | SF4 | −3.154 | 1.755002 | −.180714+00 | .572879−01 | .196616−01 | 2.914 | −9.191 |
| SCHOTT | SF61 | −3.149 | 1.750645 | −.180774+00 | .574082−01 | .195867−01 | 2.931 | −9.229 |
| CORN-F | 762269 | −3.141 | 1.761598 | −.184460+00 | .587192−01 | .118663−01 | 4.948 | −15.545 |
| HOYA | FD13 | −3.140 | 1.740582 | −.179728+00 | .572369−01 | .210271−01 | 2.722 | −8.547 |
| SCHOTT | SF13 | −3.128 | 1.740578 | −.179992+00 | .575388−01 | .889124−02 | 6.471 | −20.244 |
| SCHOTT | TIF6 | −3.054 | 1.616359 | −.160015+00 | .523949−01 | −.253322−01 | −2.068 | 6.317 |
| OHARA | SFS5 | −3.049 | 1.761595 | −.183071+00 | .600488−01 | .170045−01 | 3.531 | −10.766 |
| HOYA | FDS5 | −3.046 | 1.761600 | −.184171+00 | .604674−01 | .131237−01 | 4.608 | −14.033 |
| SCHOTT | SF55 | −3.040 | 1.761596 | −.184320+00 | .606329−01 | .189400−01 | 3.201 | −9.732 |
| OHARA | SFL14 | −3.030 | 1.761615 | −.187228+00 | .617896−01 | −.149891−03 | −412.230 | 1249.090 |
| OHARA | SFSL3 | −2.984 | 1.784482 | −.188637+00 | .632232−01 | .241489−02 | 26.181 | −78.114 |
| CORN-F | 734265 | −2.969 | 1.733821 | −.186901+00 | .629605−01 | −.296774−02 | −21.215 | 62.978 |
| CORN-F | 785259 | −2.931 | 1.784776 | −.191216+00 | .652490−01 | .115585−01 | 5.592 | −16.387 |
| OHARA | SF14 | −2.917 | 1.761613 | −.166558+00 | .639638−01 | .888133−02 | 7.202 | −21.006 |
| SCHOTT | SF14 | −2.903 | 1.761614 | −.186734+00 | .643310−01 | .591584−02 | 10.874 | −31.565 |
| OHARA | SF53 | −2.902 | 1.784486 | −.188982+00 | .651195−01 | .178789−01 | 3.642 | −10.570 |
| SCHOTT | SF56 | −2.895 | 1.784485 | −.190232+00 | .657154−01 | .189545−01 | 3.467 | −10.036 |
| HOYA | FD14 | −2.895 | 1.761617 | −.186961+00 | .645879−01 | .151099−01 | 4.275 | −12.373 |
| HOYA | FDS3 | −2.884 | 1.784484 | −.190638+00 | .660970−01 | .217325−01 | 3.041 | −8.772 |
| OHARA | SFL11 | −2.879 | 1.784504 | −.193021+00 | .670424−01 | .456981−03 | 146.707 | −422.383 |
| OHARA | SFL6 | −2.858 | 1.804954 | −.194939+00 | .682144−01 | .459951−02 | 14.831 | −42.383 |
| CORN-F | 805255 | −2.841 | 1.804867 | −.194059+00 | .683118−01 | .152341−01 | 4.484 | −12.738 |
| CHANCE | 805254 | −2.834 | 1.804952 | −.195132+00 | .688456−01 | .265278−01 | 2.595 | −7.356 |
| HOYA | FD11 | −2.820 | 1.784496 | −.191123+00 | .677795−01 | −.118843−01 | −5.703 | 16.082 |
| SCHOTT | SF6 | −2.815 | 1.804954 | −.194617+00 | .691471−01 | .186358−01 | 3.710 | −10.443 |
| CHANCE | 785258 | −2.810 | 1.784501 | −.192403+00 | .684671−01 | .128753−01 | 5.318 | −14.944 |
| HOYA | FD6 | −2.803 | 1.804957 | −.194363+00 | .693396−01 | .188400−01 | 3.680 | −10.316 |
| OHARA | SF11 | −2.796 | 1.784502 | −.192467+00 | .688348−01 | .584361−02 | 11.7809 | −32.936 |
| SCHOTT | SF11 | −2.787 | 1.784502 | −.192107+00 | .689216−01 | .605232−02 | 11.388 | −31.741 |
| OHARA | SF6 | −2.779 | 1.804950 | −.194546+00 | .699951−01 | .202121−01 | 3.463 | −9.625 |
| SCHOTT | SF57 | −2.563 | 1.846408 | −.206927+00 | .807402−01 | .162222−01 | 4.977 | −11.882 |
| HOYA | FDS9 | −2.552 | 1.846403 | −.206914+00 | .810766−01 | .174143−01 | 4.656 | −11.882 |
| OHARA | SF03 | −2.533 | 1.846404 | −.206695+00 | .816138−01 | .215868−01 | 3.781 | −9.575 |
| SCHOTT | SF58 | −2.235 | 1.917309 | −.228319+00 | .102142+00 | .149349−01 | 6.839 | −15.288 |
| OHARA | SFS01 | −2.208 | 1.922555 | −.230396+00 | .104355+00 | .113419−01 | 9.201 | −20.314 |
| OHARA | SFS1 | −2.128 | 1.922547 | −.234526+00 | .110212+00 | .744372−02 | 14.806 | −31.507 |
| SCHOTT | SF59 | −2.109 | 1.952164 | −.240117+00 | .113849+00 | .162320−02 | 70.139 | −147.928 |
| OHARA | BK9 | 2.861 | 1.493821 | −.803643−01 | −.280896−01 | −.204052−01 | 1.377 | 3.938 |
| SCHOTT | FK5 | 2.865 | 1.487438 | −.753913−01 | −.263180−01 | −.189047−01 | 1.392 | 3.988 |
| HOYA | FC5 | 2.905 | 1.487438 | −.753744−01 | −.259430−01 | −.188962−01 | 1.373 | 3.989 |
| CORN-F | 488658 | 2.919 | 1.487447 | −.807348−01 | −.276601−01 | −.194901−01 | 1.419 | 4.142 |
| HOYA | BSC3 | 2952 | 1.498252 | −.813643−01 | −.275662−01 | −.193049−01 | 1.428 | 4.215 |
| OHARA | FK5 | 2.960 | 1.487438 | −.756632−01 | −.255643−01 | −.170814−01 | 1.497 | 4.430 |
| SCHOTT | BK10 | 2.960 | 1.497766 | −.792124−01 | −.267620−01 | −.192149−01 | 1.393 | 4.122 |
| SCHOTT | BK3 | 2.991 | 1.498254 | −.814789−01 | −.272409−01 | −.195328−01 | 1.395 | 4.171 |
| CORN-F | 487704 | 2.993 | 1.487196 | −.752048−01 | −.251274−01 | −.167875−01 | 1.497 | 4.480 |
| OHARA | BK10 | 3.025 | 1.497765 | −.792615−01 | −.262056−01 | −.177864−01 | 1.473 | 4.456 |
| SCHOTT | PK1 | 3.075 | 1.503725 | −.791244−01 | −.257320−01 | −.180104−01 | 1.429 | 4.393 |

TABLE II-continued

**LEAST SQUARES FITTED COEFFICIENTS**

| CAT | ORDER 3.0 NAME | ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
|---|---|---|---|---|---|---|---|---|
| OHARA | BK4 | 3.126 | 1.500426 | −.802655−01 | −.256745−01 | −.169697−01 | 1.513 | 4.730 |
| SCHOTT | FK1 | 3.163 | 1.470638 | −.785719−01 | −.248440−01 | −.170414−01 | 1.458 | 4.611 |
| HOYA | PC1 | 3.178 | 1.503723 | −.791104−01 | −.248895−01 | −.168196−01 | 1.480 | 4.703 |
| OHARA | BK3 | 3.185 | 1.498251 | −.813600−01 | −.255469−01 | −.174240−01 | 1.466 | 4.669 |
| OHARA | PK1 | 3.188 | 1.503723 | −.790943−01 | −.248065−01 | −.162425−01 | 1.527 | 4.870 |
| OHARA | PK2 | 3.242 | 1.518146 | −.812802−01 | −.250680−01 | −.170417−01 | 1.471 | 4.769 |
| HOYA | FC1 | 3.259 | 1.470636 | −.785432−01 | −.240986−01 | −.159417−01 | 1.512 | 4.927 |
| OHARA | FK3 | 3.275 | 1.464446 | −.801760−01 | −.244804−01 | −.161796−01 | 1.513 | 4.955 |
| SCHOTT | PK50 | 3.298 | 1.520484 | −.757644−01 | −.229694−01 | −.150775−01 | 1.523 | 5.025 |
| OHARA | FK1 | 3.343 | 1.470638 | −.784884−01 | −.234806−01 | −.143948−01 | 1.631 | 5.453 |
| SCHOTT | FK3 | 3.377 | 1.464448 | −.802741−01 | −.237720−01 | −.157250−01 | 1.512 | 5.105 |
| CORN-F | 465657 | 3.379 | 1.464448 | −.803645−01 | −.237823−01 | −.151281−01 | 1.572 | 5.312 |
| SCHOTT | PK2 | 3.397 | 1.518151 | −.811341−01 | −.238813−01 | −.160876−01 | 1.484 | 5.043 |
| HOYA | PC2 | 3.429 | 1.518151 | −.809744−01 | −.236126−01 | −.154907−01 | 1.524 | 5.227 |
| CORN-F | 518651 | 3.477 | 1.518140 | −.810585−01 | −.233110−01 | −.146698−01 | 1.589 | 5.526 |
| OHARA | PKS1 | 3.486 | 1.517222 | −.757358−01 | −.217277−01 | −.135002−01 | 1.609 | 5.610 |
| HOYA | PCS1 | 3.493 | 1.517229 | −.756531−01 | −.216566−01 | −.118306−01 | 1.831 | 6.395 |
| SCHOTT | PK3 | 3.512 | 1.525358 | −.815369−01 | −.232167−01 | −.151485−01 | 1.533 | 5.383 |
| OHARA | PK3 | 3.535 | 1.525355 | −.817364−01 | −.231251−01 | −.153467−01 | 1.507 | 5.326 |
| HOYA | FC3 | 3.566 | 1.464450 | −.802805−01 | −.225129−01 | −.131702−01 | 1.709 | 6.096 |
| HOYA | PC3 | 3.588 | 1.525360 | −.815538−01 | −.227293−01 | −.155628−01 | 1.573 | 5.643 |
| SCHOTT | BK7 | 3.595 | 1.516740 | −.821247−01 | −.228469−01 | −.147828−01 | 1.545 | 5.555 |
| HOYA | BSC7 | 3.597 | 1.516738 | −.820635−01 | −.228162−01 | −.243071−01 | 1.595 | 5.736 |
| SCHOTT | UBK7 | 3.623 | 1.516740 | −.819592−01 | −.226221−01 | −.144807−01 | 1.562 | 5.660 |
| OHARA | BK12 | 3.627 | 1.518679 | −.815145−01 | −.225015−01 | −.143862−01 | 1.564 | 5.673 |
| CORN-F | 517642 | 3.627 | 1.516744 | −.820742−01 | −.226262−01 | −.138974−01 | 1.628 | 5.906 |
| OHARA | BK7 | 3.667 | 1.516270 | −.821115−01 | −.223890−01 | −.138449−01 | 1.617 | 5.931 |
| CHANCE | 510644 | 3.682 | 1.509639 | −.816942−01 | −.221864−01 | −.140498−01 | 1.579 | 5.815 |
| CHANCE | 517642 | 3.704 | 1.516736 | −.820335−01 | −.221500−01 | −.137473−01 | 1.611 | 5.967 |
| CHANCE | 641601 | 3.706 | 1.640616 | −.876494−01 | −.236528−01 | −.159457−01 | 1.483 | 5.497 |
| OHARA | PSK3 | 3.760 | 1.552259 | −.825119−01 | −.219468−01 | −.131672−01 | 1.667 | 6.266 |
| SCHOTT | BK8 | 3.839 | 1.520091 | −.825798−01 | −.215109−01 | −.132199−01 | 1.627 | 6.247 |
| OHARA | LAK01 | 3.856 | 1.639919 | −.875043−01 | −.226923−01 | −.143658−01 | 1.580 | 6.091 |
| HOYA | ZNC7 | 3.900 | 1.508409 | −.858151−01 | −.220015−01 | −.132040−01 | 1.666 | 6.499 |
| SCHOTT | ZKN7 | 3.914 | 1.508407 | −.859278−01 | −.219515−01 | −.135941−01 | 1.615 | 6.321 |
| CORN-F | 510635 | 3.945 | 1.509933 | −.827472−01 | −.209770−01 | −.123052−01 | 1.705 | 6.725 |
| CHANCE | 508612 | 3.952 | 1.507526 | −.859436−01 | −.217458−01 | −.137590−01 | 1.580 | 6.246 |
| HOYA | PCD2 | 4.003 | 1.568663 | −.831973−01 | −.207821−01 | −.122812−01 | 1.692 | 6.774 |
| OHARA | ZK7 | 4.006 | 1.508408 | −.863600−01 | −.215569−01 | −.125222−01 | 1.721 | 6.897 |
| SCHOTT | PSK3 | 4.017 | 1.552257 | −.827823−01 | −.206068−01 | −.119426−01 | 1.725 | 6.932 |
| HOYA | BSC1 | 4.059 | 1.510031 | −.827665−01 | −.203921−01 | −.120206−01 | 1.696 | 6.885 |
| SCHOTT | PSK50 | 4.060 | 1.557468 | −.780233−01 | −.192169−01 | −.105060−01 | 1.829 | 7.427 |
| SCHOTT | K51 | 4.098 | 1.505117 | −.881892−01 | −.215198−01 | −.151929−01 | 1.416 | 5.805 |
| SCHOTT | PSK2 | 4.101 | 1.568663 | −.832147−01 | −.202894−01 | −.115953−01 | 1.750 | 7.177 |
| SCHOTT | BK1 | 4.108 | 1.510030 | −.827070−01 | −.201308−01 | −.119323−01 | 1.687 | 6.931 |
| OHARA | PSK2 | 4.128 | 1.568662 | −.830341−01 | −.201158−01 | −.114936−01 | 1.750 | 7.224 |
| SCHOTT | KZFSN2 | 4.129 | 1.558285 | −.970219−01 | −.234949−01 | −.287953−01 | 1.250 | 5.162 |
| SCHOTT | FK54 | 4.131 | 1.436964 | −.577929−01 | −.139897−01 | −.573847−02 | 2.438 | 10.071 |
| OHARA | BK1 | 4.179 | 1.510032 | −.825826−01 | −.197592−01 | −.103612−01 | 1.909 | 7.978 |
| OHARA | PSK1 | 4.183 | 1.547646 | −.833594−01 | −.199288−01 | −.108206−01 | 1.842 | 7.704 |
| HOYA | PCD3 | 4.295 | 1.552255 | −.827597−01 | −.192709−01 | −.992002−02 | 1.943 | 8.343 |
| SCHOTT | BK6 | 4.356 | 1.531066 | −.843429−01 | −.193615−01 | −.107182−01 | 1.806 | 7.869 |
| CHANCE | 569631 | 4.362 | 1.568661 | −.831007−01 | −.190507−01 | −.101752−01 | 1.872 | 8.167 |
| OHARA | BK6 | 4.459 | 1.531062 | −.839051−01 | −.188158−01 | −.907097−02 | 2.074 | 9.250 |
| SCHOTT | BK6 | 4.520 | 1.500069 | −.852812−01 | −.188674−01 | −.121052−01 | 1.559 | 7.045 |
| CORN-F | 518603 | 4.533 | 1.518137 | −.869053−01 | −.191735−01 | −.111896−01 | 1.714 | 7.767 |
| OHARA | BK2 | 4.606 | 1.506507 | −.844496−01 | −.183355−01 | −.948703−02 | 1.933 | 8.902 |
| CORN-F | 564609 | 4.654 | 1.563936 | −.859088−01 | −.184594−01 | −.927684−02 | 1.990 | 9.261 |
| HOYA | LACL6 | 4.704 | 1.639924 | −.868917−01 | −.184710−01 | −.862896−02 | 2.141 | 10.070 |
| HOYA | BSC6 | 4.709 | 1.531064 | −.842204−01 | −.178850−01 | −.870653−02 | 2.054 | 9.673 |
| CHANCE | 589613 | 4.770 | 1.589057 | −.854452−01 | −.179132−01 | −.941120−02 | 1.903 | 9.079 |
| CORN-F | 540597 | 4.851 | 1.539438 | −.876151−01 | −.180594−01 | −.102980−01 | 1.754 | 8.508 |
| SCHOTT | SK5 | 4.875 | 1.589059 | −.853376−01 | −.175035−01 | −.825204−02 | 2.121 | 10.341 |
| OHARA | SK20 | 4.884 | 1.559557 | −.854291−01 | −.174927−01 | −.809035−02 | 2.162 | 10.559 |
| HOYA | FCD10 | 4.904 | 1.456463 | −.575592−01 | −.117369−01 | −.235336−02 | 4.987 | 24.458 |
| SCHOTT | LAK31 | 4.909 | 1.696641 | −.926829−01 | −.188813−01 | −.103613−01 | 1.822 | 8.945 |
| SCHOTT | PSK52 | 4.969 | 1.603031 | −.798370−01 | −.160673−01 | −.689272−02 | 2.331 | 11.583 |
| OHARA | K1 | 4.980 | 1.509706 | −.841213−01 | −.168921−01 | −.744747−02 | 2.268 | 11.295 |
| OHARA | LAK014 | 5.015 | 1.696705 | −.925209−01 | −.184487−01 | −.951720−02 | 1.938 | 9.721 |
| HOYA | BACD5 | 5.026 | 1.589057 | −.853142−01 | −.169741−01 | −.765990−02 | 2.216 | 11.138 |
| CHANCE | 697562 | 5.048 | 1.697243 | −.929825−01 | −.184184−01 | −.940164−02 | 1.959 | 9.890 |
| SCHOTT | UK50 | 5.057 | 1.522507 | −.865220−01 | −.171107−01 | −.854471−02 | 2.002 | 10.126 |
| CORN-F | 486817 | 5.064 | 1.486000 | −.638663−01 | −.126120−01 | −.337675−02 | 3.735 | 18.914 |
| CORN-F | 511604 | 5.127 | 1.510937 | −.865685−01 | −.168846−01 | −.727215−02 | 2.322 | 11.904 |
| OHARA | SK11 | 5.140 | 1.563770 | −.860269−01 | −.167378−01 | −.734932−02 | 2.277 | 11.705 |
| SCHOTT | K50 | 5.158 | 1.522507 | −.867957−01 | −.168285−01 | −.806276−02 | 2.090 | 10.778 |
| SCHOTT | LAK21 | 5.183 | 1.640417 | −.868864−01 | −.167639−01 | −.758897−02 | 2.209 | 11.449 |
| SCHOTT | FK51 | 5.195 | 1.486518 | −.617162−01 | −.118794−01 | −.295916−02 | 4.014 | 20.856 |

TABLE II-continued

| | | | **LEAST SQUARES FITTED COEFFICIENTS** | | | | |
|---|---|---|---|---|---|---|---|
| | | ORDER 3.0 | BASE WVL 0.5890 | | MIN WVL 0.360 | | MAX WVL 1.014 |
| CAT | NAME | ETA1/ETA2 | INDEX | ETA1 | ETA2 | ETA3 | ETA2/ETA3 | ETA1/ETA3 |
| CORN-F | 697562 | 5.201 | 1.696908 | −.929539−01 | −.178730−01 | −.870714−02 | 2.053 | 10.676 |
| CORN-F | 589612 | 5.201 | 1.588927 | −.853444−01 | −.164087−01 | −.673590−02 | 2.436 | 12.670 |
| SCHOTT | SK20 | 5.221 | 1.559563 | −.852772−01 | −.163329−01 | −.702539−02 | 2.325 | 12.138 |
| HOYA | BACD16 | 5.244 | 1.620333 | −.865455−01 | −.165044−01 | −.727648−02 | 2.268 | 11.894 |
| OHARA | LAK6 | 5.246 | 1.642414 | −.894287−01 | −.170461−01 | −.800976−02 | 2.128 | 11.165 |
| OHARA | FK01 | 5.273 | 1.496953 | −.639181−01 | −.121214−01 | −.282021−02 | 4.298 | 22.664 |
| OHARA | LAK14 | 5.280 | 1.696705 | −.939134−01 | −.177852−01 | −.877056−02 | 2.028 | 10.708 |
| HOYA | LACL7 | 5.283 | 1.669910 | −.910488−01 | −.172354−01 | −.690969−02 | 2.494 | 13.177 |
| HOYA | ADF1 | 5.284 | 1.564918 | −.985658−01 | −.186537−01 | −.125719−01 | 1.484 | 7.840 |
| CORN-F | 523594 | 5.284 | 1.522931 | −.878077−01 | −.166168−01 | −.907534−02 | 1.831 | 9.675 |
| CHANCE | 697554 | 5.305 | 1.696705 | −.942321−01 | −.177644−01 | −.873633−02 | 2.033 | 10.786 |
| SCHOTT | SK16 | 5.308 | 1.620335 | −.865128−01 | −.162986−01 | −.709247−02 | 2.298 | 12.198 |
| OHARA | LAK7 | 5.324 | 1.651515 | −.889115−01 | −.166990−01 | −.712987−02 | 2.342 | 12.470 |
| SCHOTT | BALKN3 | 5.354 | 1.518425 | −.866198−01 | −.161787−01 | −.781501−02 | 2.070 | 11.084 |
| OHARA | K50 | 5.382 | 1.522501 | −.869886−01 | −.161615−01 | −.901797−02 | 1.792 | 9.646 |
| HOYA | LAC14 | 5.399 | 1.696709 | −.941316−01 | −.174345−01 | −.799765−02 | 2.180 | 11.770 |
| HOYA | C7 | 5.425 | 1.511059 | −.861484−01 | −.158813−01 | −.577050−02 | 2.752 | 14.929 |
| SCHOTT | TIK1 | 5.446 | 1.478630 | −.889197−01 | −.163273−01 | −.906127−02 | 1.802 | 9.813 |
| SCHOTT | LAKN14 | 5.459 | 1.696707 | −.941778−01 | −.172531−01 | −.835559−02 | 2.065 | 11.271 |
| CHANCE | 603606 | 5.467 | 1.603035 | −.860735−01 | −.157455−01 | −.621115−02 | 2.535 | 13.858 |
| OHARA | SK5 | 5.472 | 1.589055 | −.855443−01 | −.156340−01 | −.591099−02 | 2.645 | 14.472 |
| SCHOTT | K7 | 5.485 | 1.522058 | −.863398−01 | −.157415−01 | −.709100−02 | 2.220 | 12.176 |
| HOYA | BACD14 | 5.497 | 1.603037 | −.859069−01 | −.156274−01 | −.598718−02 | 2.610 | 14.349 |
| HOYA | LAC6 | 5.505 | 1.642416 | −.899007−01 | −.163322−01 | −.705862−02 | 2.314 | 12.736 |
| SCHOTT | SK11 | 5.515 | 1.563771 | −.857460−01 | −.155488−01 | −.607616−02 | 2.559 | 14.112 |
| CORN-F | 697554 | 5.518 | 1.696912 | −.942449−01 | −.170810−01 | −.808880−02 | 2.112 | 11.651 |
| HOYA | LAC15 | 5.536 | 1.696703 | −.930117−01 | −.168024−01 | −.636116−02 | 2.641 | 14.622 |
| SCHOTT | SK14 | 5.540 | 1.603037 | −.860309−01 | −.155286−01 | −.604468−02 | 2.569 | 14.232 |
| OHARA | SK14 | 5.546 | 1.603039 | −.858583−01 | −.154822−01 | −.594749−02 | 2.603 | 14.436 |
| CORN-F | 641601 | 5.546 | 1.640416 | −.867823−01 | −.156484−01 | −.606702−02 | 2.579 | 14.304 |
| CHANCE | 519604 | 5.551 | 1.518924 | −.862977−01 | −.155461−01 | −.661172−02 | 2.351 | 13.052 |
| CHANCE | 564608 | 5.563 | 1.563770 | −.857603−01 | −.154164−01 | −.594402−02 | 2.594 | 14.428 |
| OHARA | BALK3 | 5.569 | 1.518287 | −.865144−01 | −.155354−01 | −.650411−02 | 2.389 | 13.301 |
| HOYA | BACD11 | 5.580 | 1.563771 | −.856299−01 | −.153440−01 | −.627698−02 | 2.444 | 13.636 |
| HOYA | BACD165 | 5.606 | 1.620335 | −.870460−01 | −.155275−01 | −.543135−02 | 2.859 | 16.027 |
| CORN-F | 620603 | 5.621 | 1.620330 | −.864614−01 | −.153816−01 | −.551740−02 | 2.788 | 15.671 |
| CHANCE | 620603 | 5.698 | 1.620332 | −.863890−01 | −.151603−01 | −.556257−02 | 2.725 | 15.530 |
| OHARA | K7 | 5.723 | 1.511058 | −.862441−01 | −.150695−01 | −.606722−02 | 2.484 | 14.215 |
| CORN-F | 652585 | 5.741 | 1.651517 | −.890910−01 | −.155172−01 | −.540970−02 | 2.868 | 16.469 |
| SCHOTT | FK52 | 5.757 | 1.486008 | −.636069−01 | −.110490−01 | −.176256−02 | 6.269 | 36.088 |
| HOYA | LAC7 | 5.793 | 1.651516 | −.890710−01 | −.153745−01 | −.463508−02 | 3.317 | 19.217 |
| OHARA | PSK01 | 5.814 | 1.616928 | −.830255−01 | −.142800−01 | −.507654−02 | 2.813 | 16.355 |
| HOYA | LAC11 | 5.858 | 1.658211 | −.909119−01 | −.155199−01 | −.562700−02 | 2.758 | 16.156 |
| OHARA | SK16 | 5.878 | 1.620334 | −.864307−01 | −.147049−01 | −.533035−02 | 2.759 | 16.215 |
| OHARA | BALK1 | 5.891 | 1.526355 | −.868165−01 | −.147361−01 | −.474932−02 | 3.103 | 18.280 |
| HOYA | LACL1 | 5.938 | 1.640768 | −.915550−01 | −.154181−01 | −.735562−02 | 2.096 | 12.447 |
| HOYA | LAC9 | 5.942 | 1.690902 | −.950630−01 | −.159979−01 | −.704038−02 | 2.272 | 13.503 |
| OHARA | LAK18 | 5.942 | 1.729059 | −.952316−01 | −.160259−01 | −.688214−02 | 2.329 | 13.837 |
| CORN-F | 542734 | 5.962 | 1.542146 | −.708682−01 | −.118868−01 | −.182265−02 | 6.522 | 38.882 |
| HOYA | BACL3 | 5.999 | 1.518287 | −.862077−01 | −.143706−01 | −.403006−02 | 3.566 | 21.391 |
| SCHOTT | K5 | 6.089 | 1.522424 | −.875396−01 | −.143774−01 | −.559514−02 | 2.570 | 15.645 |
| SCHOTT | K4 | 6.146 | 1.518884 | −.907123−01 | −.147606−01 | −.709774−02 | 2.080 | 12.781 |
| CHANCE | 713538 | 6.147 | 1.712901 | −.967482−01 | −.157384−01 | −.675252−02 | 2.331 | 14.328 |
| OHARA | K5 | 6.150 | 1.522429 | −.871256−01 | −.141669−01 | −.590165−02 | 2.331 | 14.763 |
| SCHOTT | LAK8 | 6.151 | 1.712905 | −.967281−01 | −.157262−01 | −.711774−02 | 2.209 | 13.590 |
| HOYA | BACD12 | 6.203 | 1.583057 | −.873666−01 | −.140851−01 | −.440023−02 | 3.201 | 19.855 |
| SCHOTT | LAKN7 | 6.213 | 1.651518 | −.889269−01 | −.143121−01 | −.481842−02 | 2.970 | 18.456 |
| CHANCE | 607595 | 6.216 | 1.607215 | −.875668−01 | −.150868−01 | −.458911−02 | 3.070 | 19.081 |
| OHARA | LAK9 | 0.218 | 1.690909 | −.949531−01 | −.152697−01 | −.629513−02 | 2.426 | 15.084 |
| CORN-F | 613585 | 6.232 | 1.612616 | −.889349−01 | −.142702−01 | −.464760−02 | 3.070 | 19.136 |
| SCHOTT | LAK11 | 6.233 | 1.658216 | −.909186−01 | −.145874−01 | −.523021−02 | 2.789 | 17.383 |
| SCHOTT | BAK50 | 6.237 | 1.567664 | −.897380−01 | −.143880−01 | −.501834−02 | 2.867 | 17.882 |
| CHANCE | 652858 | 6.241 | 1.651515 | −.889501−01 | −.142526−01 | −.459356−02 | 3.103 | 19.364 |
| SCHOTT | LAK9 | 6.277 | 1.690909 | −.951366−01 | −.151571−01 | −.622629−02 | 2.434 | 15.280 |
| OHARA | SK12 | 6.313 | 1.583056 | −.875592−01 | −.138698−01 | −.431570−02 | 3.214 | 20.289 |
| CHANCE | 524592 | 6.327 | 1.523932 | −.878863−01 | −.138896−01 | −.445128−02 | 3.120 | 19.744 |
| SCHOTT | K3 | 6.336 | 1.518164 | −.882051−01 | −.139217−01 | −.551445−02 | 2.525 | 15.995 |
| CORN-F | 623581 | 6.368 | 1.622924 | −.896154−01 | −.140731−01 | −.509693−02 | 2.761 | 17.582 |
| HOYA | BACL1 | 6.376 | 1.526353 | −.866298−01 | −.135861−01 | −.445183−02 | 3.052 | 19.459 |
| HOYA | SBF5 | 6.382 | 1.521226 | −.986168−01 | −.154515−01 | −.988293−02 | 1.563 | 9.978 |
| SCHOTT | BALK1 | 6.383 | 1.526356 | −.866673−01 | −.135777−01 | −.425036−02 | 3.194 | 20.391 |
| HOYA | LAC8 | 6.449 | 1.712902 | −.964279−01 | −.149521−01 | −.514611−02 | 2.906 | 18.738 |
| OHARA | LAK02 | 6.499 | 1.669913 | −.906677−01 | −.139503−01 | −.471304−02 | 2.960 | 19.238 |
| SCHOTT | PSK53 | 6.508 | 1.620068 | −.817978−01 | −.125688−01 | −.266930−02 | 4.709 | 30.644 |
| OHARA | BAK2 | 6.520 | 1.539892 | −.872113−01 | −.133754−04 | −.336252−02 | 3.978 | 25.937 |
| SCHOTT | BAK2 | 6.556 | 1.539893 | −.870826−01 | −.132837−01 | −.374755−02 | 3.545 | 23.237 |
| SCHOTT | SK12 | 6.568 | 1.583058 | −.874398−01 | −.133138−01 | −.353850−02 | 3.763 | 24.711 |
| HOYA | TAC1 | 6.590 | 1.725898 | −.972090−01 | −.147516−01 | −.457236−02 | 3.226 | 21.260 |

TABLE II-continued

| | | | | | | | | |
|---|---|---|---|---|---|---|---|---|
| **LEAST SQUARES FITTED COEFFICIENTS** | | | | | | | | |
| | ORDER 3.0 | | BASE WVL 0.5890 | | MIN WVL 0.360 | | MAX WVL 1.014 | |
| CAT | NAME | ETA1/ETA2 | INDEX | ETA1 | ETA2 | ETA3 | ETA2/ETA3 | ETA1/ETA3 |
| SCHOTT | SK7 | 6.590 | 1.607214 | −.874337−01 | −.132673−01 | −.337933−02 | 3.926 | 25.873 |
| CORN-F | 713538 | 6.606 | 1.712902 | −.966678−01 | −.146339−01 | −.535544−02 | 2.733 | 18.050 |
| OHARA | K01 | 6.610 | 1.523003 | −.889419−01 | −.134552−01 | −.583532−02 | 2.306 | 15.242 |
| HOYA | BAC2 | 6.622 | 1.539894 | −.870947−01 | −.131533−01 | −.391689−02 | 3.358 | 22.236 |
| HOYA | C3 | 6.658 | 1.518169 | −.882289−01 | −.132510−01 | −.465668−02 | 2.846 | 18.947 |
| HOYA | ZNC1 | 6.663 | 1.533081 | −.894813−01 | −.134302−01 | −.328172−02 | 4.092 | 27.267 |
| SCHOTT | K10 | 6.695 | 1.501305 | −.921918−01 | −.137707−01 | −.724901−02 | 1.900 | 12.718 |
| HOYA | C5 | 6.713 | 1.522423 | −.875458−01 | −.130419−01 | −.233649−02 | 5.582 | 37.469 |
| OHARA | LAK010 | 6.714 | 1.725900 | −.969928−01 | −.144462−01 | −.477007−02 | 3.029 | 20.334 |
| OHARA | K3 | 6.721 | 1.518164 | −.882441−01 | −.131296−01 | −.392919−02 | 3.342 | 22.459 |
| OHARA | KZF5 | 6.796 | 1.521226 | −.989376−01 | −.145579−01 | −.962169−02 | 1.513 | 10.283 |
| SCHOTT | SK3 | 6.812 | 1.608733 | −.881775−01 | −.129447−01 | −.355097−02 | 3.645 | 24.832 |
| CHANCE | 669574 | 6.830 | 1.668732 | −.905610−01 | −.132587−01 | −.336905−02 | 3.935 | 26.880 |
| HOYA | C12 | 6.844 | 1.523007 | −.886949−01 | −.129586−01 | −.370803−02 | 3.495 | 23.920 |
| SCHOTT | LAK23 | 6.851 | 1.668729 | −.905576−01 | −.132185−01 | −.358112−02 | 3.691 | 25.287 |
| HOYA | BACD7 | 6.855 | 1.607216 | −.873371−01 | −.127414−01 | −.214385−02 | 5.943 | 40.738 |
| OHARA | K2 | 6.860 | 1.515949 | −.914926−01 | −.133366−01 | −.549090−02 | 2.429 | 16.663 |
| OHARA | LAK8 | 6.895 | 1.712897 | −.965187−01 | −.139977−01 | −.452147−02 | 3.096 | 21.348 |
| SCHOTT | ZK1 | 6.901 | 1.533081 | −.896179−01 | −.129867−01 | −.447048−02 | 2.905 | 20.047 |
| CORN-F | 573575 | 6.931 | 1.572425 | −.904539−01 | −.130502−01 | −.351043−02 | 3.718 | 25.767 |
| HOYA | LACL2 | 6.953 | 1.650109 | −.934514−01 | −.134408−01 | −.589840−02 | 2.279 | 15.844 |
| OHARA | SK7 | 6.958 | 1.607216 | −.874465−01 | −.125676−01 | −.262312−02 | 4.791 | 33.337 |
| CORN-F | 678555 | 6.978 | 1.677914 | −.935998−01 | −.134144−01 | −.352755−02 | 3.803 | 26.534 |
| CHANCE | 658573 | 7.029 | 1.658213 | −.907356−01 | −.129095−01 | −.329672−02 | 3.916 | 27.523 |
| SCHOTT | PK51 | 7.035 | 1.528503 | −.673937−01 | −.957963−02 | .453233−03 | −21.136 | −148.695 |
| CHANCE | 643580 | 7.044 | 1.642414 | −.896155−01 | −.127217−01 | −.285256−02 | 4.460 | 31.416 |
| OHARA | SK3 | 7.093 | 1.608735 | −.880631−01 | −.124147−01 | −.235977−02 | 5.261 | 37.319 |
| SCHOTT | SK4 | 7.117 | 1.612643 | −.885774−01 | −.124460−01 | −.283700−02 | 4.387 | 31.222 |
| CORN-F | 529518 | 7.163 | 1.528923 | −.100340+00 | −.140072−01 | −.820824−02 | 1.706 | 12.224 |
| CHANCE | 572577 | 7.177 | 1.572126 | −.899434−01 | −.125326−01 | −.381528−02 | 3.285 | 23.575 |
| SCHOTT | LAKN6 | 7.183 | 1.642417 | −.895749−01 | −.124711−01 | −.250159−02 | 4.985 | 35.807 |
| OHARA | BAK1 | 7.186 | 1.572428 | −.899356−01 | −.125151−01 | −.366446−02 | 3.415 | 24.543 |
| HOYA | BACD15 | 7.211 | 1.622915 | −.892737−01 | −.123807−01 | −.308693−02 | 4.011 | 28.920 |
| CHANCE | 691547 | 7.229 | 1.690906 | −.949247−01 | −.131317−10 | −.307969−02 | 4.264 | 30.820 |
| SCHOTT | KZF2 | 7.233 | 1.529364 | −.100562+00 | −.139033−01 | −.883979−02 | 1.573 | 11.376 |
| OHARA | ZK1 | 7.241 | 1.533083 | −.895476−01 | −.123663−01 | −.319562+02 | 3.870 | 28.022 |
| HOYA | BAC5 | 7.254 | 1.556638 | −.883840−01 | −.121843−01 | −.324910−02 | 3.750 | 27.203 |
| CHANCE | 613586 | 7.301 | 1.612640 | −.885524−01 | −.121292−01 | −.232589−02 | 5.215 | 38.073 |
| OHARA | LAK011 | 7.317 | 1.740893 | −.986297−01 | −.134798−01 | −.417016−02 | 3.232 | 23.651 |
| CORN-F | 609590 | 7.373 | 1.608679 | −.879735−01 | −.119318−01 | −.107720−02 | 11.077 | 81.669 |
| OHARA | KZF2 | 7.403 | 1.529366 | −.100473+00 | −.135712−01 | −.873342−02 | 1.554 | 11.505 |
| CHANCE | 623581 | 7.415 | 1.622907 | −.894283−01 | −.120602−01 | −.198530−02 | 6.075 | 45.045 |
| HOYA | BACD4 | 7.444 | 1.612640 | −.885957−01 | −.119024−01 | −.171424−02 | 6.943 | 51.682 |
| HOYA | BACD3 | 7.459 | 1.608735 | −.881444−01 | −.118178−01 | −.203789−02 | 5.799 | 43.253 |
| OHARA | LAK13 | 7.462 | 1.693404 | −.972759−01 | −.130362−01 | −.437388−02 | 2.980 | 22.240 |
| SCHOTT | SK15 | 7.532 | 1.622911 | −.893772−01 | −.118666−01 | −.213051−02 | 5.571 | 41.961 |
| HOYA | SBF6 | 7.598 | 1.526746 | −.101704+00 | −.133847−01 | −.827299−02 | 1.618 | 12.293 |
| SCHOTT | KZFS6 | 7.605 | 1.591875 | −.107110+00 | −.140833−01 | −.115092−01 | 1.224 | 9.306 |
| SCHOTT | KZF6 | 7.606 | 1.526743 | −.101593+00 | −.133562−01 | −.862104−02 | 1.549 | 11.784 |
| OHARA | PSK02 | 7.643 | 1.617927 | −.818372−01 | −.107073−01 | −.110198−03 | 97.164 | 742.638 |
| HOYA | SBF2 | 7.646 | 1.529364 | −.100648+00 | −.131629−01 | −.780821−02 | 1.686 | 12.890 |
| OHARA | LAK11 | 7.657 | 1.658211 | −.904552−01 | −.118128−01 | −.170177−02 | 6.941 | 53.154 |
| SCHOTT | BAK5 | 7.677 | 1.556640 | −.884378−01 | −.115204−01 | −.178067−02 | 6.470 | 49.665 |
| CORN-F | 651559 | 7.682 | 1.651038 | −.928350−01 | −.120842−01 | −.210084−02 | 5.752 | 44.189 |
| OHARA | ZK4 | 7.685 | 1.511834 | −.892013−01 | −.116065−01 | −.192179−02 | 6.039 | 46.416 |
| SCHOTT | SK51 | 7.688 | 1.620824 | −.859845−01 | −.111842−01 | −.188495−02 | 5.933 | 45.616 |
| HOYA | C10 | 7.703 | 1.501305 | −.923216−01 | −.119846−01 | −.567892−02 | 2.110 | 16.257 |
| HOYA | TAC2 | 7.741 | 1.740893 | −.984759−01 | −.127209−01 | −.236823−02 | 5.371 | 41.582 |
| OHARA | LAK013 | 7.747 | 1.640915 | −.911302−01 | −.117626−01 | −.317403−02 | 3.706 | 28.711 |
| OHARA | SK15 | 7.779 | 1.622912 | −.892144−01 | −.114685−01 | −.154793−02 | 7.409 | 57.635 |
| CORN-F | 691548 | 7.823 | 1.690915 | −.947209−01 | −.121087−01 | −.207882−02 | 5.825 | 45.565 |
| OHARA | SK4 | 7.852 | 1.612638 | −.882629−01 | −.112411−01 | −.811949−03 | 13.844 | 108.705 |
| SCHOTT | SK52 | 7.868 | 1.638455 | −.934108−01 | −.118722−01 | −.268132−02 | 4.428 | 34.838 |
| CORN-F | 658572 | 7.983 | 1.657418 | −.906808−01 | −.113589−01 | −.118132−02 | 9.615 | 76.763 |
| OHARA | KZF6 | 8.073 | 1.526745 | −.101431+00 | −.125642−01 | −.806489−02 | 1.558 | 12.577 |
| HOYA | BACD13 | 8.081 | 1.591735 | −.889125−01 | −.110026−01 | −.112692−02 | 9.763 | 78.898 |
| OHARA | LASK01 | 8.106 | 1.754892 | −.991531−01 | −.122321−01 | −.261430−02 | 4.679 | 37.927 |
| SCHOTT | SK13 | 8.157 | 1.591734 | −.888920−01 | −.108980−01 | −.861306−03 | 12.653 | 103.206 |
| OHARA | LAK09 | 8.164 | 1.733892 | −.100890+00 | −.123579−01 | −.374200−02 | 3.302 | 26.961 |
| SCHOTT | LAKN16 | 8.186 | 1.733395 | −.100420+00 | −.122675−01 | −.353129−02 | 3.474 | 28.437 |
| HOYA | BAC4 | 8.396 | 1.568754 | −.925165−01 | −.110188−01 | −.271226−02 | 4.063 | 34.110 |
| OHARA | BAK5 | 8.442 | 1.556642 | −.883742−01 | −.104688−01 | .113065−04 | −925.906 | −7816.220 |
| CORN-F | 604640 | 8.470 | 1.603439 | −.809551−01 | −.955736−02 | .201133−02 | −4.752 | −40.149 |
| SCHOTT | BAK6 | 8.480 | 1.574364 | −.918813−01 | −.108344−01 | −.311720−02 | 3.476 | 29.476 |
| OHARA | SK19 | 8.485 | 1.613341 | −.902771−01 | −.105402−01 | −.113363−02 | 9.386 | 79.635 |
| HOYA | LAC12 | 8.544 | 1.677812 | −.932141−01 | −.109101−01 | −.446700−03 | 24.424 | 208.673 |
| OHARA | SK10 | 8.731 | 1.622718 | −.907040−01 | −.103893−01 | −.105581−02 | 9.840 | 85.909 |
| SCHOTT | KF3 | 8.780 | 1.514471 | −.947050−01 | −.107861−01 | −.380584−02 | 2.834 | 24.884 |

TABLE II-continued

**LEAST SQUARES FITTED COEFFICIENTS**

| CAT | NAME | ORDER 3.0 ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
|---|---|---|---|---|---|---|---|---|
| SCHOTT | BAK4 | 8.842 | 1.568755 | −.922830−01 | −.104366−01 | −.200230−02 | 5.212 | 46.089 |
| CHANCE | 569561 | 8.976 | 1.568752 | −.922182−01 | −.102743−01 | −.154966−02 | 6.630 | 59.509 |
| OHARA | LAK12 | 8.976 | 1.677809 | −.935008−01 | −.104171−01 | −.405546−03 | 25.687 | 230.555 |
| SCHOTT | SL19 | 9.015 | 1.613342 | −.902379−01 | −.100103−01 | −.251304−03 | 39.833 | 359.078 |
| SCHOTT | LAK10 | 9.053 | 1.719894 | −.102773+00 | −.113521−01 | −.488559−02 | 2.324 | 21.036 |
| HOYA | BAC6 | 9.077 | 1.574366 | −.919126−01 | −.101259−01 | −.220226−02 | 4.598 | 41.735 |
| SCHOTT | LAKN22 | 9.114 | 1.651044 | −.926400−01 | −.101646−01 | .130301−03 | −78.009 | −710.970 |
| OHARA | LAK04 | 9.118 | 1.650910 | −.921923−01 | −.101114−01 | −.135790−02 | 7.446 | 67.894 |
| HOYA | CF3 | 9.168 | 1.514470 | −.948556−01 | −.103464−01 | −.392678−02 | 2.635 | 24.156 |
| OHARA | K10 | 9.179 | 1.501306 | −.918246−01 | −.100037−01 | −.722028−01 | 1.385 | 12.718 |
| SCHOTT | KZFSN9 | 9.220 | 1.598463 | −.110530+00 | −.119880−01 | −.993952−02 | 1.206 | 11.120 |
| OHARA | LAF03 | 9.263 | 1.734887 | −.103971+00 | −.112248−01 | −.398197−02 | 2.819 | 26.111 |
| CORN-F | 569560 | 9.314 | 1.568722 | −.924370−01 | −.992437−02 | −.959931−03 | 10.339 | 96.295 |
| SCHOTT | LAK28 | 9.335 | 1.744179 | −.101990+00 | −.109256−01 | −.222904−02 | 4.901 | 45.755 |
| SCHOTT | BAK1 | 9.337 | 1.572426 | −.899074−01 | −.962889−02 | .348458−03 | −27.633 | −258.015 |
| OHARA | BAK4 | 9.365 | 1.568756 | −.921768−01 | −.984275−02 | −.991787−03 | 9.924 | 92.940 |
| OHARA | BAK6 | 9.392 | 1.574366 | −.916184−01 | −.975546−02 | −.244339−03 | 39.926 | 374.964 |
| HOYA | TAC4 | 9.414 | 1.733893 | −.101592+00 | −.107914−01 | .141620−03 | −76.200 | −717.353 |
| HOYA | BAC1 | 9.426 | 1.572424 | −.901217−01 | −.956143−02 | −.168226−03 | 56.837 | 535.719 |
| SCHOTT | SKN18 | 9.569 | 1.638456 | −.933396−01 | −.975467−02 | −.181507−02 | 5.374 | 51.425 |
| SCHOTT | SK10 | 9.598 | 1.622720 | −.908955−01 | −.947032−02 | .369531−03 | −25.628 | −245.976 |
| OHARA | KF3 | 9.645 | 1.514470 | −.946095−01 | −.980925−02 | −.134816−02 | 7.276 | 70.177 |
| CHANCE | 623569 | 9.672 | 1.622616 | −.909436−01 | −.940274−02 | .958374−03 | −9.811 | −94.894 |
| CORN-F | 734514 | 9.796 | 1.733407 | −.100712+00 | −.102813−01 | −.543492−03 | 18.917 | 185.305 |
| CHANCE | 678552 | 9.798 | 1.677809 | −.937135−01 | −.956504−02 | .811637−03 | −11.785 | −115.462 |
| OHARA | SK18 | 9.850 | 1.638454 | −.933611−01 | −.947800−02 | −.242891−02 | 3.902 | 38.437 |
| SCHOTT | SK1 | 9.906 | 1.610171 | −.912011−01 | −.920641−02 | .728678−03 | −12.634 | −125.160 |
| CHANCE | 734517 | 10.006 | 1.733395 | −.100140+00 | −.100080−01 | .441798−04 | −226.528 | −2266.650 |
| HOYA | BACD10 | 10.054 | 1.622719 | −.908052−01 | −.903132−02 | .146881−02 | −6.149 | −61.822 |
| CORN-F | 548535 | 10.127 | 1.547678 | −.958188−01 | −.956016−02 | −.428149−02 | 2.233 | 22.613 |
| CORN-F | 623569 | 10.167 | 1.622720 | −.908938−01 | −.894014−02 | .186653−02 | −4.790 | −48.697 |
| HOYA | BACD1 | 10.204 | 1.610168 | −.912395−01 | −.894152−02 | .160556−02 | −5.569 | −56.827 |
| SCHOTT | SK2 | 10.234 | 1.607302 | −.912395−01 | −.891538−02 | .132736−02 | −6.717 | −68.737 |
| CHANCE | 639554 | 10.318 | 1.638455 | −.932891−01 | −.904120−02 | −.105759−02 | 8.549 | 88.209 |
| HOYA | BACD18 | 10.325 | 1.638456 | −.932041−01 | −.902681−02 | −.515061−03 | 17.526 | 180.957 |
| SCHOTT | KZFS1 | 10.361 | 1.612997 | −.116813+00 | −.112746−01 | −.107927−01 | 1.045 | 10.823 |
| HOYA | BACD2 | 10.377 | 1.607305 | −.912003−01 | −.878874−02 | .199064−02 | −4.415 | −45.815 |
| CORN-F | 614564 | 10.505 | 1.613418 | −.915306−01 | −.872255−02 | .178191−02 | −4.895 | −51.423 |
| CHANCE | 691548 | 10.549 | 1.690906 | −.943467−01 | −.894354−02 | .150095−02 | −5.586 | −58.932 |
| HOYA | BACD6 | 10.585 | 1.613673 | −.916544−01 | −.865859−02 | .263028−02 | −3.292 | −34.846 |
| HOYA | BACD8 | 10.730 | 1.611087 | −.926409−01 | −.863371−02 | .127109−02 | −6.792 | −72.883 |
| OHARA | SK6 | 10.806 | 1.613669 | −.916329−01 | −.847967−02 | .125900−02 | −6.735 | −72.782 |
| SCHOTT | SK6 | 10.863 | 1.613669 | −.915980−01 | −.843184−02 | .180368−02 | −4.675 | −50.784 |
| SCHOTT | SK8 | 10.923 | 1.611090 | −.923874−01 | −.845805−02 | .132397−02 | −6.388 | −69.780 |
| HOYA | ADC2 | 10.941 | 1.596919 | −.933579−01 | −.853277−02 | −.980123−02 | .871 | 9.525 |
| OHARA | SK1 | 11.050 | 1.610174 | −.913639−01 | −.826836−02 | .177398−02 | −4.661 | −51.502 |
| OHARA | SK8 | 11.072 | 1.611085 | −.923511−01 | −.834113−02 | .103501−02 | −8.059 | −89.227 |
| HOYA | TAF1 | 11.091 | 1.772385 | −.104132+00 | −.104132+00 | −.938892−02 | −14.855 | −164.754 |
| SCHOTT | LAKN12 | 11.169 | 1.677809 | −.935780−01 | −.837855−02 | .226014−02 | −3.707 | −41.404 |
| OHARA | SK2 | 11.276 | 1.607300 | −.909568−01 | −.806679−02 | .270714−02 | −2.980 | −33.599 |
| HOYA | ADC1 | 11.314 | 1.619928 | −.831119−01 | −.734596−02 | −.378705−02 | −1.940 | −21.946 |
| SCHOTT | LAF28 | 11.449 | 1.773025 | −.103947+00 | −.907951−02 | −.145718−03 | 62.309 | 713.343 |
| HOYA | ZNC5 | 11.466 | 1.533674 | −.933141−01 | −.813812−02 | .133897−02 | −6.078 | −69.691 |
| HOYA | LACL3 | 11.476 | 1.664706 | −.966720−01 | −.842380−02 | −.139428−02 | 6.042 | 69.335 |
| SCHOTT | KF6 | 11.549 | 1.517348 | −.990185−01 | −.857394−02 | −.357701−02 | 2.397 | 27.682 |
| SCHOTT | ZK5 | 11.879 | 1.533679 | −.933704−01 | −.786021−02 | .143778−02 | −5.467 | −64.941 |
| OHARA | LAF010 | 11.990 | 1.743087 | −.104735+00 | −.873505−02 | −.111923−02 | 7.804 | 93.577 |
| HOYA | BACD9 | 12.004 | 1.613965 | −.937155−01 | −.780691−02 | .155036−02 | −5.036 | −60.448 |
| OHARA | LASF16 | 12.026 | 1.772383 | −.104200+00 | −.866460−02 | .250196−03 | −34.631 | −416.471 |
| SCHOTT | SSK4 | 12.138 | 1.617567 | −.936250−01 | −.771354−02 | −.170370−01 | −4.528 | −54.954 |
| CORN-F | 623531 | 12.187 | 1.622416 | −.972221−01 | −.797728−02 | −.122081−02 | 6.634 | 79.637 |
| CORN-F | 616444 | 12.201 | 1.615900 | −.116471+00 | −.954589−02 | −.872605−02 | 1.094 | 13.347 |
| HOYA | CF6 | 12.229 | 1.517246 | −.990930−01 | −.810337−02 | −.296959−02 | 2.729 | 33.369 |
| CORN-F | 720503 | 12.249 | 1.719898 | −.102682+00 | −.838272−02 | .931710−03 | −8.997 | −110.208 |
| OHARA | LASK02 | 12.262 | 1.786384 | −.103301+00 | −.842462−02 | .113170−02 | −7.444 | −91.280 |
| HOYA | BACED4 | 12.367 | 1.617569 | −.935749−01 | −.756683−02 | .257766−02 | −2.936 | −36.314 |
| OHARA | SSK4 | 12.461 | 1.617563 | −.937492−01 | −.752339−02 | .161793−02 | −4.650 | −57.944 |
| CHANCE | 720504 | 12.481 | 1.719891 | −.102491+00 | −.821181−02 | −.617128−04 | 133.065 | 1660.770 |
| SCHOTT | SK9 | 12.495 | 1.613968 | −.935765−01 | −.748881−01 | .195235−02 | −3.836 | −47.930 |
| OHARA | ZK5 | 12.558 | 1.533678 | −.928794−01 | −.739597−02 | .263766−02 | −2.804 | −35.213 |
| HOYA | LACL4 | 12.573 | 1.669507 | −.997206−01 | −.793134−02 | −.131342−02 | 6.039 | 75.924 |
| HOYA | NBF1 | 12.797 | 1.743188 | −.104665+00 | −.817900−02 | .104589−02 | −7.820 | −100.072 |
| OHARA | BALF5 | 12.811 | 1.547317 | −.964399−01 | −.752779−02 | −.164868−02 | 4.566 | 58.495 |
| CORN-F | 618551 | 12.905 | 1.617522 | −.936587−01 | −.725764−02 | .290431−02 | −2.499 | −32.248 |
| OHARA | SK9 | 12.927 | 1.613965 | −.938917−01 | −.726304−02 | .198750−02 | −3.654 | −47.241 |
| CORN-F | 639555 | 12.947 | 1.638420 | −.929858−01 | −.718212−02 | .354561−02 | −2.026 | −26.226 |
| SCHOTT | KF9 | 13.444 | 1.523338 | −.100273+00 | −.745843−02 | −.291589−02 | 2.558 | 34.389 |
| OHARA | KF6 | 13.639 | 1.517344 | −.986996−01 | −.723664−02 | −.135495−02 | 5.341 | 72.844 |

TABLE II-continued

| | | **LEAST SQUARES FITTED COEFFICIENTS** | | | | | | |
|---|---|---|---|---|---|---|---|---|
| | | ORDER 3.0 | BASE WVL 0.5890 | | MIN WVL 0.360 | | MAX WVL 1.014 | |
| CAT | NAME | ETA1/ETA2 | INDEX | ETA1 | ETA2 | ETA3 | ETA2/ETA3 | ETA1/ETA3 |
| SCHOTT | BALF4 | 13.740 | 1.579490 | −.960428−01 | −.698979−02 | .744760−03 | −9.385 | −128.958 |
| HOYA | LACL8 | 13.877 | 1.677803 | −.965912−01 | −.696055−02 | .289141−02 | −2.407 | −33.406 |
| HOYA | LAC10 | 13.936 | 1.719893 | −.102337+00 | −.734346−02 | .230514−02 | −3.186 | −44.395 |
| SCHOTT | KZF1 | 14.155 | 1.551068 | −.103919+00 | −.734141−02 | −.286232−02 | 2.565 | 36.306 |
| OHARA | LAK07 | 14.187 | 1.677804 | −.965340−01 | −.680458−02 | .253105−02 | −2.688 | −38.140 |
| HOYA | SBF1 | 14.214 | 1.551069 | −.104347+00 | −.734135−02 | −.358390−02 | 2.048 | 29.115 |
| CHANCE | 694533 | 14.319 | 1.693404 | −.966723−01 | −.675121−02 | .301339−02 | −2.240 | −32.081 |
| HOYA | ADF4 | 14.818 | 1.612398 | −.115112+00 | −.776814−02 | −.954514−02 | .814 | 12.060 |
| CHANCE | 530512 | 14.971 | 1.530250 | −.100801+00 | −.673296−02 | −.139736−02 | 4.818 | 72.137 |
| SCHOTT | KF50 | 15.057 | 1.530805 | −.100922+00 | −.670262−02 | −.126310−02 | 5.306 | 79.900 |
| CORN-F | 659510 | 15.061 | 1.658408 | −.101156+00 | −.671657−02 | .105713−02 | −6.354 | −95.689 |
| CHANCE | 717479 | 15.086 | 1.716888 | −.107691+00 | −.713844−02 | −.227627−02 | 3.136 | 47.310 |
| SCHOTT | SSK1 | 15.101 | 1.617117 | −.956034−01 | −.633102−02 | .213161−02 | −2.970 | −44.850 |
| HOYA | CF5 | 15.338 | 1.523024 | −.101296+00 | −.660428−02 | −.188990−02 | 3.495 | 53.599 |
| OHARA | BALF4 | 15.431 | 1.579487 | −.959797−01 | −.622008−02 | .173836−02 | −3.578 | −55.213 |
| HOYA | BAFL4 | 15.545 | 1.579492 | −.958654−01 | −.616684−02 | .187385−02 | −3.291 | −51.160 |
| OHARA | LAK05 | 15.547 | 1.658208 | −.964179−01 | −.620174−02 | .175631−02 | −3.531 | −54.898 |
| CORN-F | 613443 | 15.685 | 1.613297 | −.116508+00 | −.742786−02 | −.678856−02 | 1.094 | 17.162 |
| SCHOTT | KZFSN4 | 16.142 | 1.613300 | −.116512+00 | −.721776−02 | −.671142−02 | 1.075 | 17.360 |
| SCHOTT | SSK51 | 16.233 | 1.603525 | −.960450−01 | −.591653−02 | .170910−02 | −3.462 | −56.196 |
| CHANCE | 788474 | 16.262 | 1.788187 | −.108792+00 | −.668985−02 | .152448−02 | −4.388 | −72.363 |
| OHARA | SSK1 | 16.306 | 1.617111 | −.952664−01 | −.584239−02 | .324455−02 | −1.801 | −29.362 |
| SCHOTT | BALF5 | 16.447 | 1.547316 | −.960768−01 | −.584179−02 | .151808−02 | −3.848 | −63.289 |
| CORN-F | 788474 | 16.507 | 1.787879 | −.108794+00 | −.659072−02 | .145711−02 | −4.523 | −74.664 |
| HOYA | BAFL6 | 16.509 | 1.588954 | −.970442−01 | −.587840−02 | .272633−02 | −2.156 | −35.595 |
| HOYA | BACED1 | 16.647 | 1.617119 | −.956235−01 | −.574419−02 | .531776−02 | −1.080 | −17.982 |
| SCHOTT | LAKN13 | 16.651 | 1.693405 | −.965749−01 | −.580002−02 | .470656−02 | −1.232 | −20.519 |
| HOYA | CF2 | 16.697 | 1.526220 | −.100885+00 | −.604216−02 | .325851−04 | 185.427 | 3096.060 |
| HOYA | BACED2 | 16.822 | 1.622213 | −.969745−01 | −.576476−02 | .200675−02 | −2.873 | −48.324 |
| HOYA | CF4 | 17.216 | 1.533501 | −.100100+00 | −.581455−02 | .488402−03 | −11.905 | −204.955 |
| OHARA | KF5 | 17.262 | 1.523024 | −.101342+00 | −.587085−02 | −.153240−02 | 3.831 | 66.132 |
| SCHOTT | LAF24 | 17.540 | 1.757075 | −.107786+00 | −.614507−02 | .763045−03 | −8.053 | −141.257 |
| OHARA | SSK01 | 17.750 | 1.648407 | −.970851−01 | −.546945−02 | .179478−02 | −3.047 | −54.093 |
| OHARA | LASF14 | 18.277 | 1.787875 | −.108668+00 | −.594573−02 | .244923−02 | −2.428 | −44.368 |
| SCHOTT | BALF6 | 18.277 | 1.588959 | −.971123−01 | −.531324−02 | .239830−02 | −2.215 | −40.492 |
| SCHOTT | SSK2 | 18.640 | 1.622215 | −.968524−01 | −.519584−02 | .291178−02 | −1.784 | −33.262 |
| HOYA | LACL9 | 18.652 | 1.677806 | −.101805+00 | −.545801−02 | −.407621−03 | 13.390 | 249.755 |
| SCHOTT | LAF21 | 18.706 | 1.788187 | −.108670+00 | −.580932−02 | .169762−02 | −3.422 | −64.013 |
| OHARA | KF2 | 18.719 | 1.526221 | −.100681+00 | −.537852−02 | −.243200−03 | 22.134 | 414.316 |
| HOYA | TAF4 | 18.749 | 1.787875 | −.108413+00 | −.578226−02 | .330225−02 | −1.751 | −32.830 |
| HOYA | LAF3 | 19.027 | 1.716891 | −.107419+00 | −.564562−02 | .261948−02 | −2.155 | −41.008 |
| OHARA | LAK10 | 19.066 | 1.719891 | −.102216+00 | −.536107−02 | .445067−02 | −1.205 | −22.967 |
| SCHOTT | TIF1 | 19.159 | 1.511107 | −.100985+00 | −.527083−02 | −.886545−02 | .595 | 11.391 |
| HOYA | CF1 | 19.423 | 1.540336 | −.101153+00 | −.520790−02 | −.527047−03 | 9.881 | 191.924 |
| OHARA | BALF6 | 19.469 | 1.588958 | −.967387−01 | −.496895−02 | .306967−02 | −1.619 | −31.514 |
| SCHOTT | KF1 | 19.848 | 1.540334 | −.100772+00 | −.507724−02 | −.886894−03 | 5.725 | 113.623 |
| HOYA | FF1 | 20.191 | 1.511105 | −.100973+00 | −.500089−02 | −.796293−02 | .628 | 12.680 |
| HOYA | LAC13 | 20.254 | 1.693403 | −.964648−01 | −.476272−02 | .649559−02 | −.733 | −14.851 |
| CHANCE | 614439 | 20.474 | 1.613896 | −.117400+00 | −.573407−02 | −.599192−02 | .957 | 19.593 |
| HOYA | BACED20 | 20.529 | 1.648408 | −.970644−01 | −.472826−02 | .392752−02 | −1.204 | −24.714 |
| SCHOTT | BALF51 | 20.561 | 1.573851 | −.987925−01 | −.480482−02 | .178292−02 | −2.685 | −55.214 |
| OHARA | SSK2 | 20.641 | 1.622210 | −.967020−01 | −.468498−02 | .375988−02 | −1.246 | −25.719 |
| OHARA | BALF8 | 20.937 | 1.553529 | −.100465+00 | −.479854−02 | −.339661−03 | 14.127 | 295.781 |
| OHARA | LAF04 | 21.195 | 1.756882 | −.107470+00 | −.507061−02 | .257934−02 | −1.966 | −41.666 |
| CORN-F | 803467 | 21.559 | 1.802877 | −.110198+00 | −.511139−02 | .268767−02 | −1.902 | −41.002 |
| OHARA | LASF15 | 21.760 | 1.803870 | −.110339+00 | −.507084−02 | .234348−02 | −2.164 | −47.083 |
| SCHOTT | BALF50 | 22.529 | 1.588846 | −.100140+00 | −.444492−02 | .176678−02 | −2.516 | −56.679 |
| SCHOTT | SSK50 | 22.629 | 1.617868 | −.977415−01 | −.431922−02 | .310087−02 | −1.393 | −31.521 |
| OHARA | KF4 | 22.700 | 1.533500 | −.997623−01 | −.439479−02 | .265009−02 | −1.658 | −37.645 |
| HOYA | NBF2 | 22.805 | 1.756882 | −.107835+00 | −.472864−02 | .432778−02 | −1.093 | −24.917 |
| HOYA | BAFL3 | 23.295 | 1.571269 | −.969991−01 | −.416399−02 | .475507−02 | −.876 | −20.399 |
| OHARA | KF8 | 24.035 | 1.511106 | −.100728+00 | −.419082−02 | −.103850−01 | .404 | 9.699 |
| SCHOTT | LASF30 | 24.230 | 1.803055 | −.110777+00 | −.457199−02 | .311257−02 | −1.469 | −35.590 |
| OHARA | KZFS4 | 24.658 | 1.613297 | −.117432+00 | −.476240−02 | −.497424−02 | .957 | 23.608 |
| SCHOTT | BALF3 | 25.410 | 1.571273 | −.971088−01 | −.382163−02 | .499134−02 | −.766 | −19.455 |
| SCHOTT | SSK52 | 25.644 | 1.658344 | −.101000+00 | −.393850−01 | .319719−02 | −1.232 | −31.590 |
| HOYA | TAF3 | 25.839 | 1.804074 | −.110495+00 | −.428013−02 | .479869−02 | −.892 | −23.047 |
| OHARA | LASF12 | 27.378 | 1.802873 | −.110166+00 | −.402388−02 | .323075−02 | −1.245 | −34.099 |
| OHARA | KZF4 | 28.093 | 1.570322 | −.106837+00 | −.380300−02 | −.185012−02 | 2.056 | 57.746 |
| OHARA | KF1 | 28.415 | 1.540330 | −.100853+00 | −.354933−02 | .233569−02 | −1.520 | −43.179 |
| OHARA | BALF3 | 28.705 | 1.571270 | −.972122−01 | −.338658−02 | .578056−02 | −.586 | −16.817 |
| SCHOTT | BALF8 | 29.064 | 1.553529 | −.100435+00 | −.345567−02 | .214805−02 | −1.609 | −46.756 |
| SCHOTT | LAK20 | 30.727 | 1.693387 | −.996050−01 | −.324156−02 | .715069−02 | −.453 | −13.929 |
| HOYA | FEL6 | 31.142 | 1.531640 | −.105050+00 | −.337320−02 | .342800−03 | −9.840 | −306.446 |
| SCHOTT | LLF6 | 31.422 | 1.531639 | −.105432+00 | −.335532−02 | −.436874−03 | 7.680 | 241.334 |
| OHARA | LAK03 | 32.351 | 1.669904 | −.994844−01 | −.307520−02 | .399695−02 | −.769 | −24.890 |
| CORN-F | 624469 | 34.682 | 1.623903 | −.109483+00 | −.315675−02 | −.166283−03 | 18.984 | 658.417 |
| SCHOTT | SSKN5 | 35.061 | 1.658345 | −.100884+00 | −.287739−02 | .249156−02 | −1.155 | −40.490 |

TABLE II-continued

| | | **LEAST SQUARES FITTED COEFFICIENTS** | | | | | | |
|---|---|---|---|---|---|---|---|---|
| CAT | ORDER 3.0 NAME | ETA1/ETA2 | BASE WVL 0.5890 INDEX | ETA1 | MIN WVL 0.360 ETA2 | ETA3 | MAX WVL 1.014 ETA2/ETA3 | ETA1/ETA3 |
| HOYA | BACED5 | 35.924 | 1.658340 | −.100946+00 | −.280997−02 | .284249−02 | −.989 | −35.513 |
| OHARA | LAK08 | 36.549 | 1.693394 | −.101018+00 | −.276392−02 | .607351−02 | −.455 | −16.632 |
| HOYA | LACL5 | 37.367 | 1.693399 | −.100887+00 | −.269993−02 | .732856−02 | −.368 | −13.766 |
| CORN-F | 800456 | 39.017 | 1.799872 | −.112702+00 | −.288856−02 | .456701−02 | −.632 | −24.678 |
| OHARA | LASF17 | 39.614 | 1.794867 | −.113455+00 | −.286402−02 | .359110−02 | −.798 | −31.593 |
| OHARA | SSK3 | 40.938 | 1.614751 | −.100315+00 | −.245043−02 | .383497−02 | −.639 | −26.158 |
| SCHOTT | SSKN8 | 42.626 | 1.617629 | −.103142+00 | −.241973−02 | .731294−03 | −3.309 | −141.041 |
| OHARA | LLF6 | 43.533 | 1.531637 | −.104948+00 | −.241078−02 | .143303−02 | −1.682 | −73.235 |
| SCHOTT | SSK3 | 44.156 | 1.614748 | −.100322+00 | −.227196−02 | .459550−02 | −.494 | −21.830 |
| CHANCE | 658509 | 45.108 | 1.658341 | −.100900+00 | −.223684−02 | .389522−02 | −.574 | −25.904 |
| OHARA | SSK8 | 47.221 | 1.617630 | −.103089+00 | −.218311−02 | .103056−02 | −2.118 | −100.033 |
| OHARA | LAK06 | 51.478 | 1.677799 | −.101095+00 | −.196383−02 | .530494−02 | −.370 | −19.057 |
| CORN-F | 717480 | 52.282 | 1.716901 | −.106944+00 | −.204553−02 | .633514−02 | −.323 | −16.881 |
| CHANCE | 689495 | 52.735 | 1.688895 | −.103672+00 | −.196592−02 | .808088−02 | −.243 | −12.829 |
| HOYA | BACED9 | 54.952 | 1.620028 | −.102983+00 | −.187407−02 | .177196−02 | −1.058 | −58.119 |
| HOYA | BACED3 | 59.401 | 1.614749 | −.100224+00 | −.168724−02 | .583482−02 | −.289 | −17.177 |
| CORN-F | 689496 | 61.515 | 1.688907 | −.103341+00 | −.167993−02 | .946170−02 | −.178 | −10.922 |
| HOYA | TAF2 | 67.909 | 1.794368 | −.112925+00 | −.166289−02 | .595338−02 | −.279 | −18.968 |
| CORN-F | 648462 | 68.088 | 1.647644 | −.111090+00 | −.163156−02 | .108405−02 | −1.505 | −102.476 |
| HOYA | BAFL2 | 76.831 | 1.570906 | −.100876+00 | −.133027−02 | .601909−02 | −.221 | −16.759 |
| HOYA | LAFL2 | 80.252 | 1.696892 | −.105622+00 | −.131613−02 | .446973−02 | −.294 | −23.631 |
| SCHOTT | BAFN6 | 82.245 | 1.588910 | −.105894+00 | −.128755−02 | .101844−02 | −1.264 | −103.978 |
| OHARA | LASF09 | 86.389 | 1.815871 | −.109998+00 | −.127328−02 | .886117−02 | −.147 | −12.700 |
| OHARA | BALF7 | 86.735 | 1.588666 | −.100152+00 | −.115469−02 | .628747−02 | −.184 | −15.929 |
| OHARA | BALF2 | 93.719 | 1.570906 | −.100739+00 | −.107491−02 | .600537−02 | −.179 | −16.775 |
| CHANCE | 717480 | 96.594 | 1.716889 | −.106822+00 | −.110588−01 | .723681−02 | −.153 | −14.761 |
| HOYA | ADF8 | 104.577 | 1.686380 | −.119723+00 | −.114483−02 | −.294973−02 | .388 | 40.588 |
| SCHOTT | LLF3 | 109.564 | 1.560043 | −.108768+00 | −.992740−03 | .356505−04 | −28.650 | −3139.010 |
| CHANCE | 541472 | 122.952 | 1.540633 | −.108770+00 | −.884652−03 | .119241−02 | −.741 | −91.142 |
| OHARA | SSK9 | 143.292 | 1.620027 | −.103179+00 | −.720058−03 | .410703−02 | −.175 | −25.122 |
| OHARA | LASF04 | 143.537 | 1.815402 | −.115359+00 | −.803689−03 | .568507−02 | −.141 | −20.292 |
| SCHOTT | BAF54 | 149.969 | 1.666619 | −.106286+00 | −.708719−03 | .385235−02 | −.184 | −27.590 |
| SCHOTT | LLF2 | 171.096 | 1.540635 | −.108727+00 | −.632476−03 | .125404−02 | −.504 | −86.701 |
| CHANCE | 744448 | 183.119 | 1.743877 | −.114507+00 | −.625315−03 | .184080−02 | −.340 | −62.205 |
| HOYA | FEL2 | 184.340 | 1.540634 | −.108625+00 | −.589262−03 | .142463−02 | −.414 | −76.247 |
| CORN-F | 744448 | 192.746 | 1.743879 | −.114440+00 | −.593713−03 | .220180−02 | −.270 | −51.976 |
| HOYA | TAFD1 | 205.243 | 1.814564 | −.115964+00 | −.565007−03 | .622681−02 | −.091 | −18.623 |
| HOYA | NBFD14 | 224.677 | 1.801566 | −.115564+00 | −.514356−03 | .564119−02 | −.091 | −20.486 |
| HOYA | TAFD10 | 258.348 | 1.815368 | −.115241+00 | −.446069−03 | .763394−02 | −.058 | −15.096 |
| OHARA | LLF2 | 363.647 | 1.540638 | −.108587+00 | −.298606−03 | .161567−02 | −.185 | −67.200 |
| SCHOTT | LGSK2 | 452.288 | 1.585919 | −.837990−01 | −.185278−03 | .107401−01 | −.017 | −7.803 |
| OHARA | LAF06 | 978.209 | 1.685896 | −.104144030 00 | −.106464−03 | .570256−02 | −.019 | −18.163 |
| CORN-F | 655401 | 1271.950 | 1.655380 | −.127954+00 | −.100597−03 | −.301127−01 | .033 | 42.492 |

We claim:

1. A method of manufacturing an optical system that is color-corrected at a number of discrete wavelengths, said manufacturing method including a process for selecting compatible optical materials from among available optical materials for fabricating optical elements of said system, each of said available optical materials having a characteristic dispersive power, said process for selecting compatible optical materials comprising:

a) representing the dispersive power of each available optical material by a polynomial expression in a variable that is a function of wavelength, the polynomial expression for each available optical material being of a degree that is numerically one less than the number of wavelengths for which color correction of said system is required;

b) comparing a ratio of coefficients in the polynomial expression for one of said available optical materials with corresponding ratios of coefficients in the polynomial expressions for others of said available optical materials;

c) identifying particular optical materials from among said others of said available optical materials for which said corresponding ratios of coefficients are substantially equal to said ratio of coefficients for said one of said available optical materials; and d) choosing said compatible optical materials from among those particular optical materials for which said corresponding ratios of coefficients are substantially equal, said compatible optical materials so chosen being used for fabricating said optical elements as specified in a design form that provides color correction for said system at said discrete wavelengths.

2. The method of claim 1 further comprising:

a) determining absolute values of differences between a coefficient in said polynomial expression for said one optical material and corresponding coefficients in the polynomial expressions for those particular optical materials for which said corresponding ratios of coefficients are substantially equal to said ratio of coefficients for said one optical material; and b) selecting optical materials for designing said system from among those particular optical materials for which said corresponding ratios of coefficients are substantially equal, and for which the absolute values of differences between said corresponding coefficients are sufficiently large to permit construction of optical elements having dioptric powers of appropriate configuration for said system.

3. The method of claim 1 wherein the dispersive power of each optical material is represented by a polynomial expression of the form $$D(\lambda) = \sum_{i=1}^{n} \eta_i \omega^i(\lambda),$$

where $D(\lambda)$ is the dispersive power, $\lambda$ is the wavelength, $\omega(\lambda)$ is said variable that is a function of wavelength; $\omega(\lambda)$ being defined by the expression $\omega(\lambda) = \delta\lambda/(1+\alpha\delta\lambda)$, where $\delta\lambda$ represents change in wavelength with respect to a base wavelength and $\alpha$ is a constant that is substantially independent of the dispersive power of the optical material; where $\eta_i$ are the coefficients in said polynomial expression; and where $\eta$ is the degree of said polynomial.

4. The method of claim 3 wherein absolute values are determined for differences between a coefficient $\eta_i$ in the polynomial expression for said one optical material and corresponding coefficients $\eta_i$ in the polynomial expressions for the particular optical materials for which corresponding ratios $(\eta_i/\eta_j)$, where $j \neq i$, are substantially equal to the ratio $(\eta_i/\eta_j)$ for said one optical material.

5. The method of claim 3 wherein said polynomial expression is of $(n-1)$th degree.

6. The method of claim 5 wherein, when said polynomial expression is quadratic, the ratio $(\eta_1/\eta_2)$ for said one optical material is compared with the corresponding ratios $(\eta_1/\eta_2)$ for the others of said optical materials.

7. The method of claim 6 wherein said optical materials for designing said system are selected from the group consisting of optical glasses listed in TABLE I, which is incorporated herein by reference, each optical glass listed in TABLE I being described in terms of refractive index at a base wavelength of 0.574 micrometer, and in terms of numerical values for said coefficients $\eta_i(i=1, 2)$ for a wavelength range extending from approximately 0.40 micrometer to approximately 0.70 micrometer.

8. The method of claim 5 wherein, when said polynomial expression is cubic, the ratios $(\eta_1/\eta_2)$, $(\eta_2/\eta_3)$ and $(\eta_1/\eta_3)$ for said one optical material are compared with the corresponding ratios $(\eta_1/\eta_2)$, $(\eta_2/\eta_3)$ and $(\eta_1/\eta_3)$ for the others of said optical materials.

9. The method of claim 8 wherein said optical materials for designing said system are selected from the group consisting of optical glasses listed in TABLE II, which is incorporated herein by reference, each optical glass listed in TABLE II being described in terms of refractive index at a base wavelength of 0.589 micrometer, and in terms of numerical values for said coefficients $\eta_i$ $(i=1, 2, 3)$ for a wavelength range extending from approximately 0.36 micrometer to approximately 1.01 micrometers.

10. An optical system color-corrected at more than three discrete wavelengths, said system comprising a plurality of optical elements, at least one of said elements being made of a first optical material and at least one other of said elements being made of a second optical material, said first and second optical materials having different indices of refraction, the indices of refraction of said first and second optical materials being related to each other so that said elements of said system can coact to produce a substantially identical effect on said more than three discrete wavelengths.

11. The optical system of claim 10 wherein said system is a lens system, said elements of said system causing zero paraxial marginal ray height at a focal surface of said system for said discrete wavelengths.

12. A lens doublet that is color-corrected at more than three discrete wavelengths, each lens element of said doublet being made of a different optical material in accordance with a design form such that said doublet causes zero paraxial marginal ray height at a focal surface of said doublet for said discrete wavelengths.

13. A lens doublet that is color-corrected at more than four discrete optical wavelengths, each lens element of said doublet being made of a different optical material in accordance with a design form such that said doublet causes zero paraxial marginal ray height at a focal surface of said doublet for said discrete wavelengths.

14. In a process for manufacturing an optical system that is color-corrected at a plurality of discrete wavelengths, said process including selection of compatible optical materials from which optical elements of said system are made, said optical elements being configured and disposed with respect to each other so that said system is color-corrected at said wavelengths, each of said optical materials having a characteristic dispersive power that is a function of wavelength, said optical materials being selected by a method comprising:
  a) representing the dispersive power of each optical material by a polynomial expression in a variable that is a function of wavelength;
  b) comparing a ratio of coefficients in a polynomial expression for one of said optical materials with corresponding ratios of coefficients in the polynomial expressions for others of said optical materials;
  c) identifying particular optical materials from among said others of said optical materials for which said corresponding ratios of coefficients are substantially equal to said ratio of coefficients for said one optical material; and
  d) choosing optical materials for making said optical elements of said system from among those particular optical materials for which said corresponding ratios of coefficients are substantially equal.

15. A dioptric optical system color-corrected at three discrete wavelengths, said system comprising lens elements made of only two optical materials, namely, Schott FK51 glass and Schott K51 glass, said lens elements being configured and disposed with respect to each other in accordance with a design form such that paraxial marginal ray height at a focal surface of said system is zero for said three discrete wavelengths.

16. The optical system of claim 15, said system being a lens doublet.

17. A dioptric optical system color-corrected at four discrete wavelengths, said system comprising lens elements made of only two optical materials, namely, Corning-France 486817 glass and Ohara LAK14 glass, said lens elements being configures and disposed with respect to each other in accordance with a design form such that paraxial marginal ray height at a focal surface of said system is zero for said four discrete wavelengths.

18. The optical system of claim 17, said system being a lens doublet.

19. The optical system of claim 18, said lens doublet comprising two air-spaced lens elements.

20. A dioptric optical system color-corrected at five discrete wavelengths, said system comprising lens elements made of only two optical materials, namely, Schott PK51 glass and Hoya LAC7 glass, said lens elements being configured and disposed with respect to each other in accordance with a design form such that paraxial marginal ray height at a focal surface of said system is zero for said five discrete wavelengths.

21. The optical system of claim 20, said system being a lens doublet.

22. The optical system of claim 21, said lens doublet comprising two air-spaced lens elements.

23. A method of selecting optical materials from among available optical materials for use in fabricating optical elements of an optical system that is color-corrected at a number of discrete wavelengths in a particular wavelength region, said elements of said system being configured and disposed with respect to each other in accordance with a design form such that said elements produce a substantially identical effect on said discrete wavelengths, each available optical material having a characteristic dispersive power $D(\lambda)$ represented by an nth degree polynomial in a variable $\omega(\lambda)$, said polynomial being of the form:

$$D(\lambda) = \sum_{i=1}^{n} \eta_i \omega^i(\lambda)$$

where $\omega(\lambda) = \delta\lambda/(1+\alpha\delta\lambda)$, where $\delta\lambda$ represents change in wavelength with respect to a base wavelength and $\alpha$ is a constant that is substantially independent of optical material; and where $\eta_i$ are coefficients of terms in said variable $\omega(\lambda)$, said polynomial having n terms in said variable $\omega(\lambda)$, said method of selecting optical materials comprising use of a digital computer for:
 a) calculating said coefficients $\eta_i$ for a plurality of specified wavelengths in said wavelength region for each available optical material;
 b) calculating ratios $\eta_i/\eta_j$, where $j \neq i$, for each available optical material;
 c) comparing corresponding ratios $\eta_i/\eta_j$ for said available optical materials; and
 d) identifying candidate optical materials for use in fabricating said elements of said system from among those available optical materials for which said corresponding ratios $\eta_i/\eta_j$ are substantially equal.

24. The method of claim 23 wherein said coefficients $\eta_i$ are calculated using a least-squares technique.

25. The method of claim 23 wherein said polynomial is quadratic, the coefficients $\eta_1$ and $\eta_2$ being calculated for each optical material, and wherein said candidate optical materials for designing said system are identified from among those optical materials for which corresponding ratios $\eta_1/\eta_2$ are substantially equal.

26. The method of claim 25 wherein optical materials for designing said system are selected by forming paired combinations of said candidate optical materials for which corresponding ratios $\eta_1/\eta_2$ are substantially equal, subtracting corresponding values of $\eta_1$ for each paired combination of said candidate optical materials, and selecting optical materials for designing said system from among those paired combinations for which the absolute value of the difference between corresponding values of $\eta_1$ is greater than a specified value appropriate for said system.

27. The method of claim 23 wherein said polynomial is cubic, the coefficients $\eta_1$, $\eta_2$ and $\eta_3$ being calculated for each optical material, and wherein said candidate optical materials for designing said system are identified from among those optical materials for which corresponding ratios $(\eta_1/\eta_2)$, $(\eta_2/\eta_3)$ and $(\eta_1/\eta_3)$ are substantially equal.

28. The method of claim 27, said method being used to select three different optical materials from among said candidate optical materials for designing said system, said method further comprising:
 a) locating each candidate optical material with respect to a three-dimensional coordinate system defined by axes corresponding to the coefficients $\eta_1$, $\eta_2$ and $\eta_3$;
 b) designating a first one of said candidate optical materials as a reference optical material;
 c) defining a two-dimensional transformed coordinate system by axes $\mu_1$ and $\mu_2$, with origin at the location of said reference optical material;
 d) locating the other candidate optical materials with respect to said transformed coordinate system;
 e) calculating the ratio $\mu_2/\mu_1$ for each of said other candidate optical materials; and
 f) selecting a second one and a third one of said candidate optical materials from among those other candidate optical materials having substantially the same value as said reference optical material for the ratio $\mu_2/\mu_1$.

* * * * *